(12) United States Patent
Brekne

(10) Patent No.: US 7,162,032 B2
(45) Date of Patent: Jan. 9, 2007

(54) ENCRYPTION OF PROGRAMS REPRESENTED AS POLYNOMIAL MAPPINGS AND THEIR COMPUTATIONS

(76) Inventor: Tonnes Brekne, Jonsvannsveien 93A, N-7050 Trondheim (NO)

( * ) Notice: Subject to any disclaimer, the term of this patent is extended or adjusted under 35 U.S.C. 154(b) by 985 days.

(21) Appl. No.: 09/737,742

(22) Filed: Dec. 18, 2000

(65) Prior Publication Data

US 2002/0027986 A1    Mar. 7, 2002

Related U.S. Application Data

(60) Provisional application No. 60/172,572, filed on Dec. 20, 1999.

(51) Int. Cl.
*H04C 9/00* (2006.01)
*H04K 1/00* (2006.01)
(52) U.S. Cl. .............................. 380/30; 380/28; 380/44
(58) Field of Classification Search ................ 380/28, 380/30, 44; 713/189, 190
See application file for complete search history.

(56) References Cited

OTHER PUBLICATIONS

A.M. Turing, Proceedings of the London Mathematical Society, Series 2, vol. 42, pp. 230-237, "On Computable Numbers, With an Application to the Entscheidungsproblem", 1936-1937.
T. Sander, et al., Mobile Agents and Security, pp. 44-60, "Protecting Mobile Agents Against Malicious Hosts", 1996.
L. Blum, et al., 29th Annual Symposium on Foundations of Computer Science, pp. 387-397, "On a Theory of Computation Over the Real Numbers; NP Completeness, Recursive Functions and Universal Machines", Oct. 24-26, 1988.
Created by J. Van der Spiegel, University of Pennsylvania, 3 pages, "Finite State Machine Implemented as a Synchronous Mealy Machine: a Non-Resetting Sequence Recognizer", Dec. 30, 1997.

*Primary Examiner*—Gilberto Barrón, Jr.
*Assistant Examiner*—Benjamin E. Lanier
(74) *Attorney, Agent, or Firm*—Oblon, Spivak, McClelland, Maier & Neustadt, P.C.

(57) ABSTRACT

Three variations of a method of representing (abstract) state machines as polynomial mappings, and three variations of a corresponding encryption program stored on a computer readable medium. The encryption program is based directly on symbolic functional composition of polynomial mappings with permutations expressed as polynomial mappings.

8 Claims, 80 Drawing Sheets

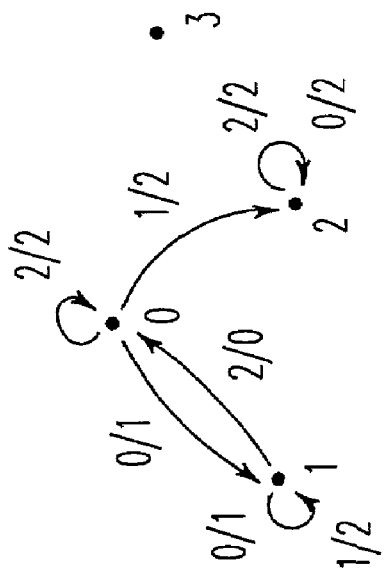
FIG.5A
| STATE \ INPUT | 0 | 1 | 2 |
|---|---|---|---|
| 0 | (1,1) | (2,2) | (0,2) |
| 1 | (1,1) | (1,2) | (0,0) |
| 2 | (2,2) | (2,2) | (2,2) |
FIG.5B
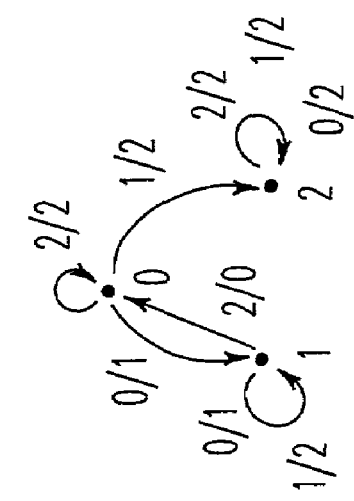
FIG.5C
| STATE \ INPUT | 0 | 1 | 2 |
|---|---|---|---|
| 0 | (1,1) | (2,2) | (0,2) |
| 1 | (1,1) | (1,2) | (0,0) |
| 2 | (2,2) | — | (2,2) |
FIG.5D $$\begin{cases} \text{INPUT SPACE:} \quad \Sigma' = \{0,1,2,B\} \\ \text{STATE SPACE:} \quad Q' = \{0,1,2,q_0\}, \; q_0=3 \\ \text{OUTPUT SPACE:} \quad \Delta' = \{0,1,2,3\} \\[1em] \text{VECTORIZATION EXAMPLE FOR N=2:} \\ \quad\quad\quad\quad\quad\quad\quad\quad\;\; 0 \quad\; 1 \quad\;\; 2 \quad\;\; B \\ \text{INPUT SPACE:} \quad \Sigma' = \{(0,0),\, (0,1),\, (1,0),\, (1,1)\} \\ \quad\quad\quad\quad\quad\quad\quad\quad\;\; 0 \quad\; 1 \quad\;\; 2 \quad\; q_0=3 \\ \text{STATE SPACE:} \quad Q' = \{(0,0),\, (0,1),\, (1,0),\, (1,1)\} \\ \quad\quad\quad\quad\quad\quad\quad\quad\;\; 0 \quad\; 1 \quad\;\; 2 \quad\;\; 3 \\ \text{OUTPUT SPACE:} \quad \Delta' = \{(0,0),\, (0,1),\, (1,0),\, (1,1)\} \end{cases}$$

*FIG. 7A*

$$\begin{cases} \text{VECTORIZATION EXAMPLE FOR N=3:} \\ \quad\quad\quad\quad\quad\quad\quad\quad\;\; 0 \quad\; 1 \quad\;\; 2 \quad\;\; B \\ \text{INPUT SPACE:} \quad \Sigma' = \{(0,0),\, (0,1),\, (0,2),\, (1,0)\} \\ \quad\quad\quad\quad\quad\quad\quad\quad\;\; 0 \quad\; 1 \quad\;\; 2 \quad\; q_0=3 \\ \text{STATE SPACE:} \quad Q' = \{(0,0),\, (0,1),\, (0,2),\, (1,0)\} \\ \quad\quad\quad\quad\quad\quad\quad\quad\;\; 0 \quad\; 1 \quad\;\; 2 \quad\;\; B \\ \text{OUTPUT SPACE:} \quad \Delta' = \{(0,0),\, (0,1),\, (0,2),\, (1,0)\} \end{cases}$$

*FIG. 7B*

$$\begin{cases} \text{VECTORIZATION EXAMPLE FOR N} \geq 4 \\ \quad\quad\quad\quad\quad\quad\quad\quad\;\; 0 \quad\; 1 \quad\;\; 2 \quad\;\; B \\ \text{INPUT SPACE:} \quad \Sigma' = \{(0),\, (1),\, (2),\, (3)\} \\ \quad\quad\quad\quad\quad\quad\quad\quad\;\; 0 \quad\; 1 \quad\;\; 2 \quad\; q_0=3 \\ \text{STATE SPACE:} \quad Q' = \{(0),\, (1),\, (2),\, (3)\} \\ \quad\quad\quad\quad\quad\quad\quad\quad\;\; 0 \quad\; 1 \quad\;\; 2 \\ \text{OUTPUT SPACE:} \quad \Delta' = \{(0),\, (1),\, (2),\, (3)\} \end{cases}$$

*FIG. 7C*

VECTORIZATION EXAMPLE FOR N'=2:

INPUT SPACE: $\Sigma' = \{(0,0), (0,1), (1,0), (1,1)\}$

STATE SPACE: $Q' = \{(0,0), (0,1), (1,0), (1,1)\}$

OUTPUT: $\Delta' = \{(0,0), (0,1), (1,0), (1,1)\}$

IN THIS CASE N MAY BE SET TO ANY PRIME NUMBER $\geq 2$.
SELECTING PRIMES N>2 RESULTS IN $(N-2)^2$ INPUT, STATE AND
OUTPUT REPRESENTATIONS THAT INITIALLY REMAIN UNUSED.

*FIG. 8A*

VECTORIZATION EXAMPLE FOR N'=3:

INPUT SPACE: $\Sigma' = \{(0,0), (0,1), (0,2), (1,0)\}$

STATE SPACE: $Q' = \{(0,0), (0,1), (0,2), (1,0)\}$

OUTPUT: $\Delta' = \{(0,0), (0,1), (0,2), (1,0)\}$

IN THIS CASE N MAY BE SET TO ANY PRIME NUMBER $\geq 3$.
FOR EVERY N THERE ARE $N^2-4$ UNUSED REPRESENTATIONS FOR INPUT VECTORS
(INPUT "SYMBOLS"), STATE VECTORS, AND OUTPUT VECTORS (OUTPUT "SYMBOLS").

*FIG. 8B*

VECTORIZATION EXAMPLE FOR N' $\geq$ 4:

INPUT SPACE: $\Sigma' = \{(0), (1), (2), (3)\}$

STATE SPACE: $Q' = \{(0), (1), (2), (3)\}$

OUTPUT: $\Delta' = \{(0), (1), (2), (3)\}$

IN THIS CASE N MAY BE SET TO ANY PRIME NUMBER $\geq 5$
FOR EVERY N THERE ARE N-4 UNUSED REPRESENTATIONS FOR
INPUT VECTORS, STATE VECTORS, AND OUTPUT VECTORS.

SELECTING AN N SUCH THAT THERE ARE MORE VALUES FOR N THAN OUTPUT VECTORS,
INPUT VECTORS OR STATES IS SOMETHING THAT CAN BE DONE TO INCREASE THE
POSSIBILITIES FOR INTRODUCING RANDOMNESS INTO THE PLAINTEXT STATES MACHINE

*FIG. 8C*

| | INPUT STATE | (0,0) | (0,1) | (0,2) | (1,0) |
|---|---|---|---|---|---|
| 0 | (0,0) | ((0,1),(0,1)) | ((0,2),(0,2)) | ((0,0),(0,2)) | ((1,0),(1,0)) |
| 1 | (0,1) | ((0,1),(0,1)) | ((0,1),(0,2)) | ((0,0),(0,0)) | ((1,0),(1,0)) |
| 2 | (0,2) | ((0,2),(0,2)) | — | ((0,2),(0,2)) | ((1,0),(1,0)) |
| $q_0$ = 3 | (1,0) | ((1,0),(1,0)) | ((1,0),(1,0)) | ((1,0),(1,0)) | ((1,0),(1,0)) |
| 4 | (1,1) | — | — | — | — |
| 5 | (1,2) | — | — | — | — |
| 6 | (2,0) | — | — | — | — |
| 7 | (2,1) | — | — | — | — |
| 8 | (2,2) | — | — | — | — |

*FIG. 9A*

| INPUT\STATE | (0,0) | (0,1) | (0,2) | (1,0) | (1,1) | (1,2) | (2,0) | (2,1) | (2,2) |
|---|---|---|---|---|---|---|---|---|---|
| (0,0) | ((0,1),(0,1)) | ((0,2),(0,2)) | ((0,0),(0,0)) | ((1,0),(1,0)) | ((1,0),(1,0)) | ((1,0),(1,0)) | ((1,0),(1,0)) | ((1,0),(1,0)) | ((1,0),(1,0)) |
| (0,1) | ((0,1),(0,1)) | ((0,1),(0,2)) | ((0,0),(0,0)) | ((1,0),(1,0)) | ((1,0),(1,0)) | ((1,0),(1,0)) | ((1,0),(1,0)) | ((1,0),(1,0)) | ((1,0),(1,0)) |
| (0,2) | ((0,2),(0,2)) | ((1,0),(1,0)) | ((0,2),(0,2)) | ((1,0),(1,0)) | ((1,0),(1,0)) | ((1,0),(1,0)) | ((1,0),(1,0)) | ((1,0),(1,0)) | ((1,0),(1,0)) |
| (1,0) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) |
| (1,1) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) |
| (1,2) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) |
| (2,0) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) |
| (2,1) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) |
| (2,2) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) | ((1,0),(1,0)) |

*FIG. 9B*

| INPUT\STATE | (0,0) | (0,1) | (0,2) | (1,0) | (1,1) | (1,2) | (2,0) | (2,1) | (2,2) |
|---|---|---|---|---|---|---|---|---|---|
| (0,0) | ((0,1),(0,1)) | ((0,2),(0,2)) | ((0,0),(0,2)) | ((1,0),(1,0)) | ((*,*),(*,*)) | ((*,*),(*,*)) | ((*,*),(*,*)) | ((*,*),(*,*)) | ((*,*),(*,*)) |
| (0,1) | ((0,1),(0,1)) | ((0,1),(0,2)) | ((0,0),(0,0)) | ((1,0),(1,0)) | ((*,*),(*,*)) | ((*,*),(*,*)) | ((*,*),(*,*)) | ((*,*),(*,*)) | ((*,*),(*,*)) |
| (0,2) | ((0,2),(0,2)) | ((*,*),(*,*)) | ((0,2),(0,2)) | ((1,0),(1,0)) | ((*,*),(*,*)) | ((*,*),(*,*)) | ((*,*),(*,*)) | ((*,*),(*,*)) | ((*,*),(*,*)) |
| (1,0) | ((1,0),(1,0)) | ((1,0),(1,0)) | ((1,0),(1,0)) | ((*,*),(*,*)) | ((*,*),(*,*)) | ((*,*),(*,*)) | ((*,*),(*,*)) | ((*,*),(*,*)) | ((*,*),(*,*)) |
| (1,1) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) |
| (1,2) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) |
| (2,0) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) |
| (2,1) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) |
| (2,2) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) | ((*,*),(*,*)) |

*FIG. 10*

| INPUT STATE | (0,0) | (0,1) | (0,2) | (1,0) |
|---|---|---|---|---|
| (0,0) | ((0,1),(0,1)) | ((0,2),(0,2)) | ((0,0),(0,2)) | ((1,0),(1,0)) |
| (0,1) | ((0,1),(0,1)) | ((0,1),(0,2)) | ((0,0),(0,0)) | ((1,0),(1,0)) |
| (0,2) | ((0,2),(0,2)) | — | ((0,2),(0,2)) | ((1,0),(1,0)) |
| (1,0) | ((1,0),(1,0)) | ((1,0),(1,0)) | ((1,0),(1,0)) | ((1,0),(1,0)) |
| (1,1) |  |  |  |  |

*FIG. 11A*

| INPUT STATE | (0,0) | (0,1) | (0,2) | (1,0) |
|---|---|---|---|---|
| (0,0) | ((0,1),(0,1)) | ((0,2),(0,2)) | ((0,0),(0,2)) | ((1,0),(1,0)) |
| (0,1) | ((0,1),(0,1)) | ((0,1),(0,2)) | ((0,0),(0,0)) | ((1,0),(1,0)) |
| (0,2) | ((0,2),(0,2)) | — | ((0,2),(0,2)) | ((1,0),(1,0)) |
| (1,0) | ((1,0),(1,0)) | ((1,0),(1,0)) | ((1,0),(1,0)) | ((1,0),(1,0)) |
| (1,1) | ((0,1),(0,1)) | ((0,1),(0,2)) | ((0,0),(0,0)) | ((1,0),(1,0)) |

*FIG. 11B*

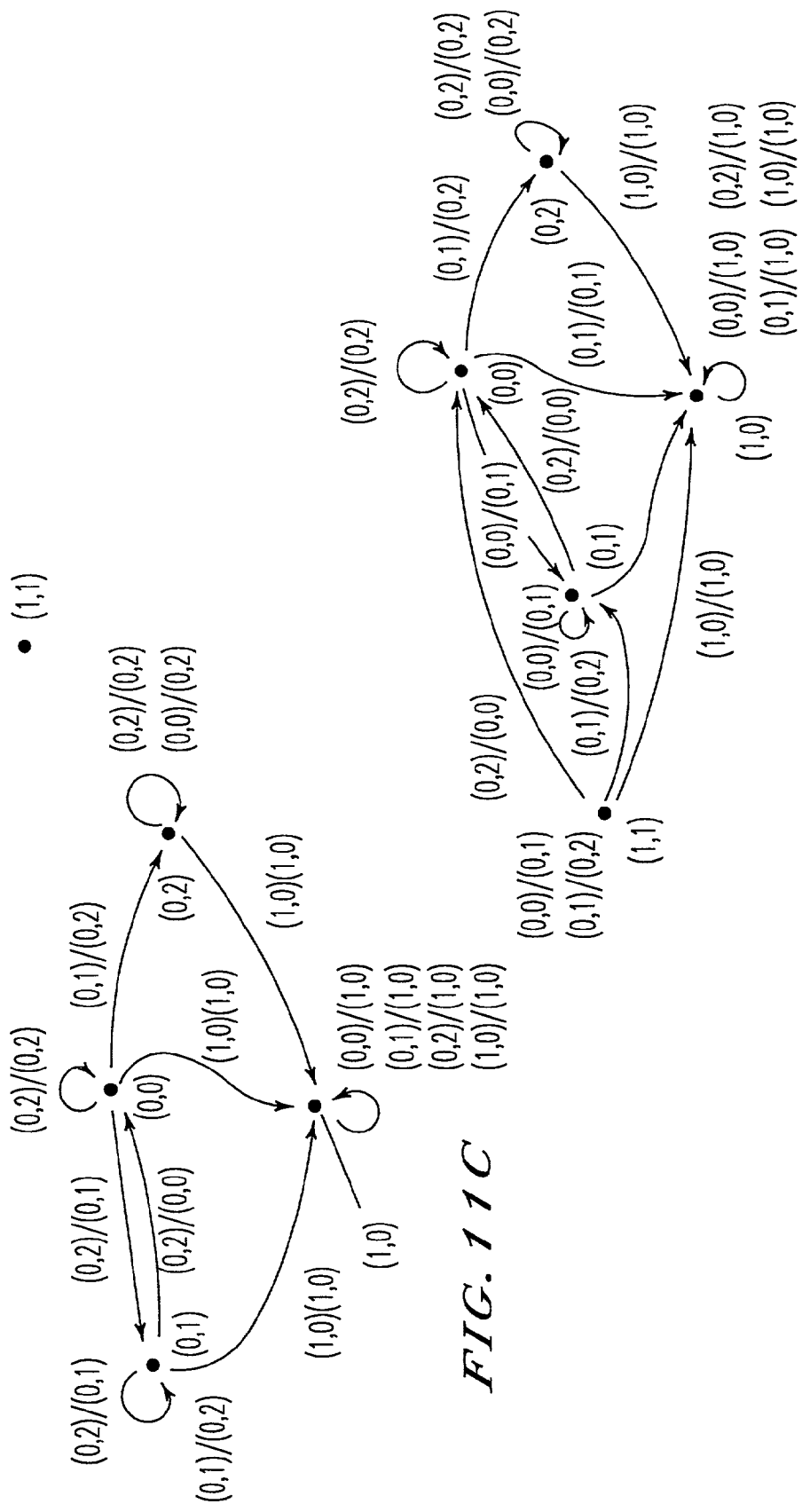

| INPUT STATE | (0,0) | (0,1) | (0,2) | (1,0) |
|---|---|---|---|---|
| (0,0) | ((0,1),(0,1)) | ((0,2),(0,2)) | ((0,0),(0,2)) | ((1,0),(1,0)) |
| (0,1) | ((0,1),(0,1)) | ((0,1),(0,2)) | ((0,0),(0,0)) | ((1,0),(1,0)) |
| (0,2) | ((0,2),(0,2)) | — | ((0,2),(0,2)) | ((1,0),(1,0)) |
| (1,0) | ((1,0),(1,0)) | ((1,0),(1,0)) | ((1,0),(1,0)) | ((1,0),(1,0)) |
| (1,1) | ((0,1),(0,1)) | ((0,1),(0,2)) | ((0,0),(0,0)) | ((1,0),(1,0)) |

*FIG. 12A*

| INPUT STATE | (0,0) | (0,1) | (0,2) | (1,0) |
|---|---|---|---|---|
| (0,0) | ((0,1),(0,1)) | ((0,2),(0,2)) | ((0,0),(0,2)) | ((1,0),(1,0)) |
| (0,1) | ((0,1),(0,1)) | ((1,1),(0,2)) | ((0,0),(0,0)) | ((1,0),(1,0)) |
| (0,2) | ((0,2),(0,2)) | — | ((0,2),(0,2)) | ((1,0),(1,0)) |
| (1,0) | ((1,0),(1,0)) | ((1,0),(1,0)) | ((1,0),(1,0)) | ((1,0),(1,0)) |
| (1,1) | ((0,1),(0,1)) | ((0,1),(0,2)) | ((0,0),(0,0)) | ((1,0),(1,0)) |

*FIG. 12B*

| INPUT\STATE | (0,0) | (0,1) | (0,2) | (1,0) |
|---|---|---|---|---|
| (0,0) | ((0,1),(0,1)) | ((0,2),(0,2)) | ((0,0),(0,2)) | ((1,0),(1,0)) |
| (0,1) | ((0,1),(0,1)) | ((0,1),(0,2)) | ((0,0),(0,0)) | ((1,0),(1,0)) |
| (0,2) | ((0,2),(0,2)) | ——— | ((0,2),(0,2)) | ((1,0),(1,0)) |
| (1,0) | ((1,0),(1,0)) | ((1,0),(1,0)) | ((1,0),(1,0)) | ((1,0),(1,0)) |
| (1,1) | ((0,1),(0,1)) | ((0,1),(0,2)) | ((0,0),(0,0)) | ((1,0),(1,0)) |

*FIG. 13A*

| INPUT\STATE | (0,0) | (0,1) | (0,2) | (1,0) |
|---|---|---|---|---|
| (0,0) | ((1,0),(0,1)) | ((0,2),(0,2)) | ((0,0),(0,2)) | ((0,1),(1,0)) |
| (0,1) | ((0,1),(1,0)) | ((0,1),(1,0)) | ((0,1),(1,0)) | ((0,1),(1,0)) |
| (0,2) | ((0,2),(0,2)) | ——— | ((0,2),(0,2)) | ((0,1),(1,0)) |
| (1,0) | ((1,0),(0,1)) | ((1,0),(0,2)) | ((0,0),(0,0)) | ((0,1),(1,0)) |
| (1,1) | ((1,0),(0,1)) | ((1,0),(0,2)) | ((0,0),(0,0)) | ((0,1),(1,0)) |

*FIG. 13B*

| INPUT STATE | (0,0) | (0,1) | (0,2) | (1,0) |
|---|---|---|---|---|
| (0,0) | ((1,0),(0,1)) | ((0,2),(0,2)) | ((0,0),(0,2)) | ((0,1),(1,0)) |
| (0,1) | ((0,1),(1,0)) | ((0,1),(1,0)) | ((0,1),(1,0)) | ((0,1),(1,0)) |
| (0,2) | ((0,2),(0,2)) | — | ((0,2),(0,2)) | ((0,1),(1,0)) |
| (1,0) | ((1,0),(0,1)) | ((1,0),(0,2)) | ((0,0),(0,0)) | ((0,1),(1,0)) |
| (1,1) | ((1,0),(0,1)) | ((1,0),(0,2)) | ((0,0),(0,0)) | ((0,1),(1,0)) |

*FIG. 14A*

| INPUT STATE | (0,0) | (0,1) | (0,2) | (1,0) |
|---|---|---|---|---|
| (0,0) | ((1,0),(0,1)) | ((0,2),(0,2)) | ((0,1),(1,0)) | ((0,0),(0,2)) |
| (0,1) | ((0,1),(1,0)) | ((0,1),(1,0)) | ((0,1),(1,0)) | ((0,1),(1,0)) |
| (0,2) | ((0,2),(0,2)) | — | ((0,1),(1,0)) | ((0,2),(0,2)) |
| (1,0) | ((1,0),(0,1)) | ((1,0),(0,2)) | ((0,1),(1,0)) | ((0,0),(0,0)) |
| (1,1) | ((1,0),(0,1)) | ((1,0),(0,2)) | ((0,1),(1,0)) | ((0,0),(0,0)) |

*FIG. 14B*

| INPUT\STATE | (0,0) | (0,1) | (0,2) | (1,0) |
|---|---|---|---|---|
| (0,0) | ((1,0),(0,1)) | ((0,2),(0,2)) | ((0,1),(1,0)) | ((0,0),(0,2)) |
| (0,1) | ((0,1),(1,0)) | ((0,1),(1,0)) | ((0,1),(1,0)) | ((0,1),(1,0)) |
| (0,2) | ((0,2),(0,2)) | — | ((0,1),(1,0)) | ((0,2),(0,2)) |
| (1,0) | ((1,0),(0,1)) | ((1,0),(0,2)) | ((0,1),(1,0)) | ((0,0),(0,0)) |
| (1,1) | ((1,0),(0,1)) | ((1,0),(0,2)) | ((0,1),(1,0)) | ((0,0),(0,0)) |

*FIG. 15A*

| INPUT\STATE | (0,0) | (0,1) | (0,2) | (1,0) |
|---|---|---|---|---|
| (0,0) | ((1,0),(0,1)) | ((0,2),(1,0)) | ((0,1),(0,2)) | ((0,0),(1,0)) |
| (0,1) | ((0,1),(0,2)) | ((0,1),(0,2)) | ((0,1),(0,2)) | ((0,1),(0,2)) |
| (0,2) | ((0,2),(1,0)) | — | ((0,1),(0,2)) | ((0,2),(1,0)) |
| (1,0) | ((1,0),(0,1)) | ((1,0),(1,0)) | ((0,1),(0,2)) | ((0,0),(0,0)) |
| (1,1) | ((1,0),(0,1)) | ((1,0),(1,0)) | ((0,1),(0,2)) | ((0,0),(0,0)) |

*FIG. 15B*

PRECALCULATE $a_i(x)$ FOR $k=\{0,1,2,4,5,\}<Z_{11}$.

PRECOMPUTATION RESULTS IN THE SERIES OF POLYNOMIALS $a_0(x)$
$a_1(x)$
$a_2(x)$
$a_4(x)$
$a_5(x)$

REPRESENTED BY THEIR RESPECTIVE ARRAYS OF COEFFECIENTS

*FIG. 17*

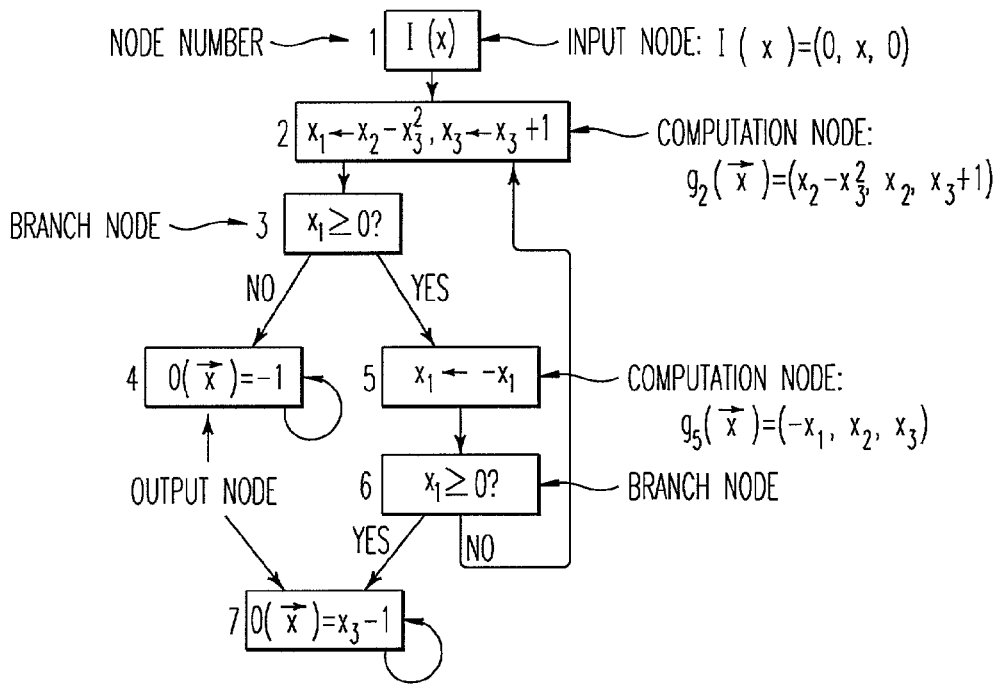

- WHEN RESTRICTING A BSS MACHINE TO A FINITE FIELD $\mathbb{Z}_N$, THE CHOICE OF N IS DICTATED BY THE FOLLOWING:
    1) N MUST BE A PRIME NUMBER
    2) N MUST BE AT LEAST AS GREAT AS THE NUMBER OF NODES
    3) N MUST MAKE ALLOWANCE FOR CONSTANTS USED IN THE MACHINE
    4) N MUST ACCOMODATE USER REQUIREMENTS
- FOR THE ABOVE EXAMPLE:
    N SATISFIES THE FIRST CONDITION IF IT IS EQUAL TO 2, 3, 5, 7, 11,...
    N SATISFIES THE SECOND CONDITION IF IT IS $\geq 7$
    N THE GREATEST CONSTANTS HAVE ABSOLUTE VALUE 1, SO N SATISFIES THE THIRD CONDITION IF IT IS $\geq 2$
    IF THE USER REQUIRES THAT THE x INPUT MUST BE ABLE TO BE AS LARGE AS 100, N SATISFIES THE FOURTH CONDITION IF IT IS > 100. THE LEAST N SATISFYING ALL FOUR CONDITIONS WOULD THEN BE N=101
- SINCE ALL MAPPINGS IN THE BSS MACHINE ABOVE ARE POLYNOMIAL, THE RESTRICTION OF COMPUTATION MAPPINGS TO POLYNOMIAL MAPPINGS IS ALREADY SATISFIED.
- THE NEW NODE-NUMBERING CONVENTION SIMPLY SUBTRACTS 1 FROM EACH NODE NUMBER, SUCH THAT NUMBERING BEGINS AT 0. 1 2 3 4 5 6 7
  ↓ ↓ ↓ ↓ ↓ ↓ ↓
  0 1 2 3 4 5 6

*FIG. 18*

THE FULL STATE SPACE OF THE BSS MACHINE, AS ADAPTED SO FAR, IS:

$\underbrace{\{0,...,6\}}_{\text{NODE NUMBER SPACE}} \times \underbrace{\mathbb{Z}_N \times \mathbb{Z}_N \times \mathbb{Z}_N}_{\text{STATE SPACE}}$  CORRESPONDING VECTORS HAVE THE COMPONENTS:

| n | $x_1$ | $x_2$ | $x_3$ |

THE REVISED FULL STATE SPACE ADDS THE OUTPUT AND INPUT COMPONENTS:

$\{0,...,6\} \times \mathbb{Z}_N \times \mathbb{Z}_N \times \mathbb{Z}_N \times \underbrace{\mathbb{Z}_N}_{\text{OUTPUT}} \times \underbrace{\mathbb{Z}_N}_{\text{INPUT}}$  CORRESPONDING VECTORS HAVE THE COMPONENTS:

| n | $x_1$ | $x_2$ | $x_3$ | $x_4$ | $x_5$ |

OUTPUT / INPUT

ALSO A COMPUTATION MAPPING $g_i$ IS ADDED TO EVERY NODE RHAT DOESN'T ALREADY HAVE ONE. THUS FOR EACH NODE VIEWED IN ISOLATION:

NODE 0: $g_0(\vec{x}) = (0, x_5, 0, 0, x_5)$ IS ADDED

NODE 1: "$g_2$" (NOW $g_1$) IS CHANGED TO $g_1(\vec{x}) = (x_2 - x_3^2, x_2, x_3+1, 0, x_5)$ NODE 2: $g_2(\vec{x}) = (x_1, x_2, x_3, 0, x_5)$ IS ADDED NODE 3: $g_3(\vec{x}) = (x_1, x_2, x_3^{N-1}, x_5)$ IS ADDED NODE 4: $g_4$ (PREVIOUSLY "$g_5$") IS CHANGED TO $g_4(\vec{x}) = (-x_1, x_2, x_3, 0, x_5)$ NODE 5: $g_5(\vec{x}) = (x_1, x_2, x_3, 0, x_5)$ IS ADDED NODE 6: $g_6(\vec{x}) = (x_1, x_2, x_3, x_3-1, x_5)$ IS ADDED AS THE RELATION $\geq 0$ HOLDS FOR ALL ELEMENTS IN $\mathbb{Z}_N$, IT IS REPLACED BY A SERIES OF SET INCLUSION RELATIONS. BECAUSE $\mathbb{Z}_N$ DOES NOT HAVE NEGATIVE NUMBERS AS ELEMENTS, THE RELATIONS WILL NOT HAVE AN EXACT CORRESPONDENCE TO THE ORIGINAL RELATIONS. REASONABLE SET INCLUSION RELATIONS FOR THIS EXAMPLE ARE:

FOR NODE 2: $\in \mathbb{Z}_p - \{0\}$ WITH THE SAME MAPPING IN NODE 1 AS BEFORE.
FOR NODE 5: $\in \{1\}$, CHANGING $g_4$ TO $g_4(\vec{x}) = (x_3+1, x_2, x_3, 0, x_5)$

*FIG. 19*

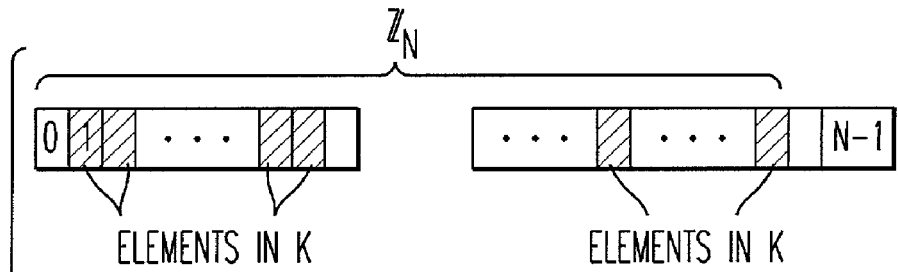
$((x-i)^{(N-1)} \mod N)=0$ IF $x=i$ AND 0 OTHERWISE.
TO CONSTRUCT A FUNCTION RETURNING 1 IF $x \in K$ AND 0 OTHERWISE,
SYMBOLICALLY MULTIPLY $(x-i)^{(N-1)}$ FOR EVERY $i \notin K$ MODULO N.
NODE WITH NO BRANCHES:
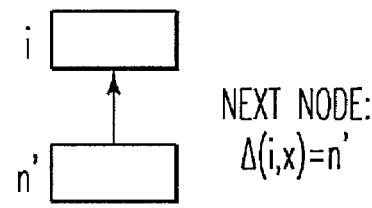
NEXT NODE:
$\Delta(i,x)=n'$
NODE WITH BRANCHES
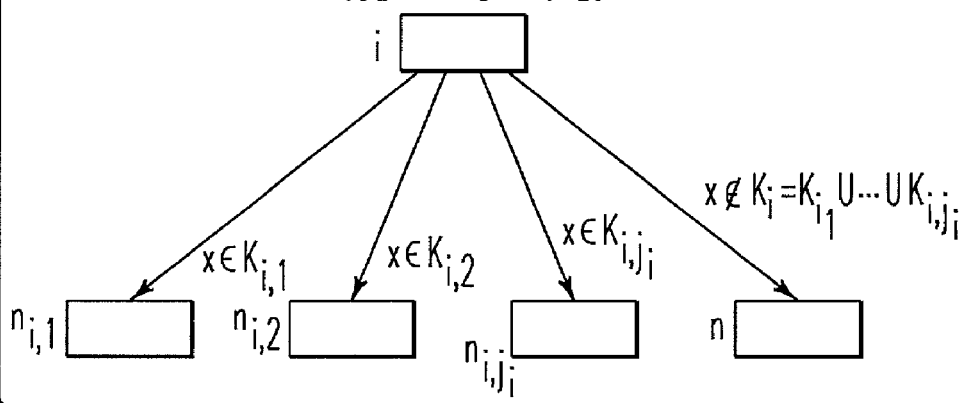
*FIG. 21*

| X Y MOD 5 | | | | | |
|---|---|---|---|---|---|
| X\Y | 0 | 1 | 2 | 3 | 4 |
| 0 | 0 | 0 | 0 | 0 | 0 |
| 1 | 0 | 1 | 2 | 3 | 4 |
| 2 | 0 | 2 | 4 | 1 | 3 |
| 3 | 0 | 3 | 1 | 4 | 2 |
| 4 | 0 | 4 | 3 | 2 | 1 |

$X^Y$ MOD 5

| X\Y | 0 | 1 | 2 | 3 | 4 |
|---|---|---|---|---|---|
| 0 | 1 | 0 | 0 | 0 | 0 |
| 1 | 1 | 1 | 1 | 1 | 1 |
| 2 | 1 | 2 | 4 | 3 | 1 |
| 3 | 1 | 3 | 4 | 2 | 1 |
| 4 | 1 | 4 | 1 | 4 | 1 |

| $x_1$ \ $x_2$ | 0 | 1 | 2 | 3 | 4 |
|---|---|---|---|---|---|
| 0 | (3,4) | (1,2) | (4,0) | (2,1) | (1,3) |
| 1 | (0,0) | (2,3) | (3,4) | (4,1) | (0,2) |
| 2 | (2,0) | (3,2) | (1,2) | (0,1) | (1,4) |
| 3 | (4,0) | (2,0) | (4,4) | (4,4) | (2,4) |
| 4 | (1,1) | (2,2) | (1,0) | (4,1) | (4,2) |

*FIG. 27A*

| x  | 0  | 1 | 2 | 3 | 4 | 5  | 6  | 7  | 8  | 9  | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| $t_f$ | 23 | 2 | 4 | 6 | 11 | 17 | 13 | 2 | 12 | 4 | 23 | 11 | 24 | 1 | 7 | 9 | 5 | 24 | 18 | 16 | 9 | 10 | 21 | 22 | 14 |

*FIG. 27B*

FUNCTION TABLE FOR f

| 1 | 2 | 3 | 4 | 5 |
|---|---|---|---|---|
| 1 | 3 | 4 | 5 |  |

*FIG. 27C*

FUNCTION TABLE FOR $t_f$

| 1 | 2 | 3 | 4 | 5 |
|---|---|---|---|---|

*FIG. 27D*

| X1\X2 | 0 | 1 | 2 | 3 | 4 |
|---|---|---|---|---|---|
| 0 | 0 | 1 | 3 | 2 | 0 |
| 1 | 2 | 2 | 4 | 2 | 0 |
| 2 | 1 | 0 | 4 | 2 | 1 |
| 3 | 2 | 3 | 3 | 2 | 1 |
| 4 | 2 | 0 | 1 | 1 | 2 |

| X | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| tf | 23 | 0 | 2 | 4 | 6 | 11 | 17 | 13 | 2 | 12 | 4 | 23 | 11 | 24 | 1 | 7 | 9 | 5 | 24 | 9 | 16 | 10 | 21 | 22 | 14 |

| X | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| tg | 0 | 2 | 1 | 2 | 2 | 1 | 2 | 0 | 3 | 0 | 3 | 4 | 4 | 3 | 1 | 2 | 2 | 2 | 1 | 0 | 0 | 1 | 1 | 2 |

| X | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| tgf | 1 | 0 | 1 | 2 | 2 | 4 | 2 | 3 | 1 | 4 | 2 | 1 | 4 | 2 | 2 | 0 | 0 | 1 | 2 | 0 | 2 | 3 | 0 | 1 | 1 |

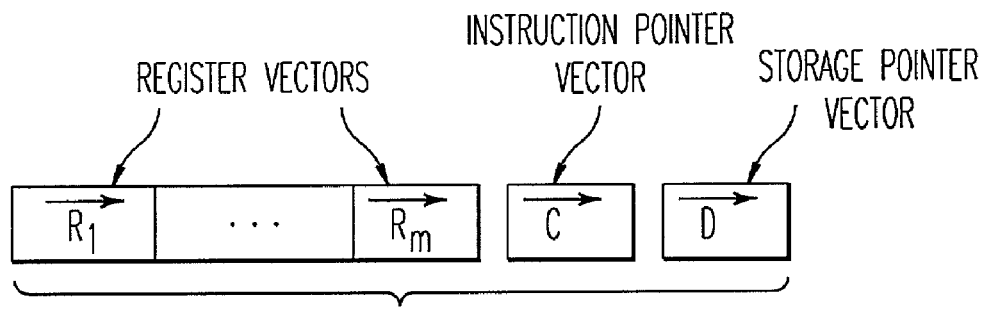
*FIG. 36A*
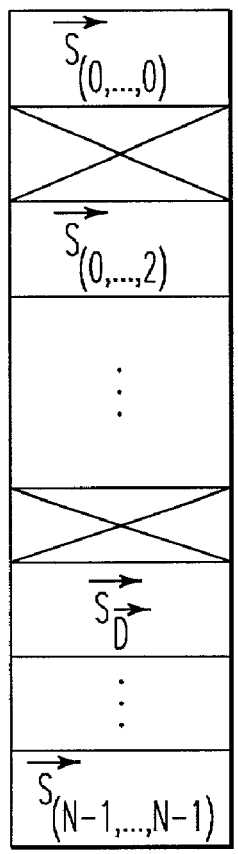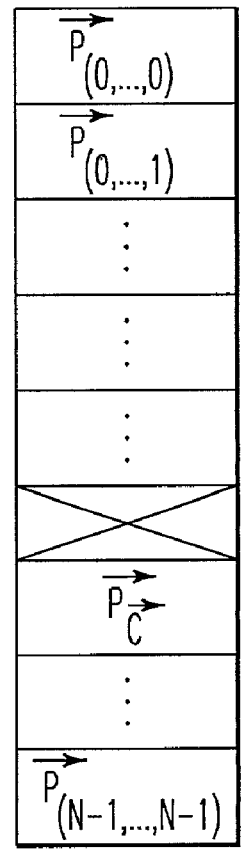
*FIG. 36B*  *FIG. 36C*

| $h_1: \mathbb{Z}_2^2 \to \mathbb{Z}_2^2$ | |
|---|---|
| $\vec{x}$ | $h(\vec{x})$ |
| (0,0) | (1,0) |
| (0,1) | (1,1) |
| (1,0) | (0,0) |
| (1,1) | (0,1) |

1. COMPONENT
2. COMPONENT

| $h_2: \mathbb{Z}_2^2 \to \mathbb{Z}_2^2$ | |
|---|---|
| $\vec{x}$ | $h(\vec{x})$ |
| (0,0) | (1,1) |
| (0,1) | (0,0) |
| (1,0) | (1,0) |
| (1,1) | (1,0) |

| $f: \mathbb{Z}_2^4 \to \mathbb{Z}_2^3$ | |
|---|---|
| $\vec{x}$ | $f(\vec{x})$ |
| (0,0,0,0) | (1,0,1) |
| (0,0,0,1) | (0,0,1) |
| (0,0,1,0) | (1,0,1) |
| (0,0,1,1) | (0,0,0) |
| (0,1,0,0) | (1,0,0) |
| (0,1,0,1) | (0,0,0) |
| (0,1,1,0) | (1,1,1) |
| (0,1,1,1) | (1,0,0) |
| (1,0,0,0) | (1,1,0) |
| (1,0,0,1) | (0,0,1) |
| (1,0,1,0) | (0,1,1) |
| (1,0,1,1) | (1,0,1) |
| (1,1,0,0) | (1,1,1) |
| (1,1,0,1) | (0,0,0) |
| (1,1,1,0) | (1,1,0) |
| (1,1,1,1) | (0,1,0) |

| $g: \mathbb{Z}_2^3 \to \mathbb{Z}_2^3$ | |
|---|---|
| $\vec{x}$ | $g(\vec{x})$ |
| (0,0,0) | (1,0,1) |
| (0,0,1) | (0,0,0) |
| (0,1,0) | (1,1,1) |
| (0,1,1) | (1,0,0) |
| (1,0,0) | (0,1,1) |
| (1,0,1) | (1,0,1) |
| (1,1,0) | (1,1,0) |
| (1,1,1) | (1,1,1) |

FIG. 39B

ENCRYPTION OF PROGRAMS REPRESENTED AS POLYNOMIAL MAPPINGS AND THEIR COMPUTATIONS

This application claims benefit of Provisional 60/172,572 filed Dec. 20, 1999.

DISCUSSION OF THE BACKGROUND

1. Field of Invention

The present invention relates to a secure encryption method, and more particularly to a method for converting a class of abstract computation machines (state machines) to a polynomial representation.

2. Background of the Invention

Previous work on encrypted functions is described in T. Sander and C. Tschudin, "Protecting Mobile Agents Against Malicious Hosts," Springer LNCS 1419, pp. 44–60 (hereinafter "Sander") (the contents of which are incorporated herein by reference), which describes a system for evaluating a single encrypted polynomial. Sander describes encrypting polynomials by selecting an appropriate algorithm for encryption of the polynomial's coefficients on an individual basis.

Additional research was performed on privacy homomorphisms. A simplistic description of a privacy homomorphism is an encryption function, e, such that $$e(x+y)=e(x)+e(y), e(xy)=e(x)e(y), \text{etc.}$$

Such privacy homomorphisms are discussed in R. Rivest, L. Adleman, and M. Dertouzos, "On Data Banks and Privacy Homomorphisms," in "Foundations of Secure Computation," editor R. DeMillo, Academic Press, 1978, ISBN 0-12-210350-5 (hereinafter "Rivest"), the contents of which are incorporated herein by reference.

Multi-party computations are also known. Common for many of these protocols is that they solve the problem where m people wish to evaluate a function $f(x_1, \ldots, x_m)$, where each person $P_i$ knows only $x_i$, such that:

1. no information or a minimum of information about any $x_j$ for $j \neq i$ is leaked to $P_i$ during the evaluation of the function $f$
2. the identity of all cheaters is known by the time the evaluation is completed
3. the value of $f(x_1, \ldots, x_m)$ becomes known to all participants simultaneously (or almost simultaneously) upon termination of the protocol.

One of the first protocols for secure multiparty computations was proposed in A. Yao, "Protocols for Secure Computations (extended abstract)", $23^{rd}$ Annual Symposium on Foundations of Computer Science, 1982, IEEE Computer Society's Technical Committee on Mathematical Foundations of Computing (hereinafter "Yao"), the contents of which are incorporated herein by reference. Yao describes the case where m people want to compute $f(x_1, \ldots, x_m)$ under the following conditions:

1. each person $P_i$ initially knows only $x_i$, and does not the value of any $x_j$ for $j \neq i$
2. $f$ must be computed such that after the computation, person $P_i$ still knows the exact value of only $x_i$, and does not the value of any $x_j$ for $j \neq i$ Yao describes computing functions of the form $f: X_1 \times \ldots \times X_m \rightarrow V$.

Another approach is described in G. Brassard and C. Crepeau, "Zero-Knowledge Simulation of Boolean Circuits," Advances in Cryptology—CRYPTO'86: Proceedings, Lecture Notes in Computer Science, Vol. 263, pp. 223–233, Springer-Verlag, 1986 (hereinafter "Brassard"), the contents of which are incorporated herein by reference. Brassard describes a method of simulating boolean circuits using zero-knowledge interactive protocols. For example, person B computes a function $f: D \rightarrow \{0,1\}$ in several rounds with the aid of person A. Person A provides data about the evaluation to person B using a zero-knowledge interactive protocol. Person B cannot compute the encrypted evaluation from encrypted data supplied by person A.

Chaum, Damgård, and van de Graaf, "Multiparty Computations Ensuring Privacy of Each Party's Input and Correctness of the Result," Advances in Cryptology—CRYPTO'87: Proceedings, editor C. Pomerance, Lecture Notes in Computer Science, Vol. 293, pp. 87–119, Springer-Verlag, 1987 (hereinafter "Chaum") (the contents of which are incorporated herein by reference) describes an alternative to Yao's protocols. That alternative requires less computation, but assumes quadratic residues.

Abadi, Feigenbaum, and Kilian, "On Hiding Information from an Oracle," Journal Computer System Science, Vol. 39 (1989), 21–50 (hereinafter "Abadi—1") (the contents of which are incorporated herein by reference) discusses computing with encrypted data. The abstract describes that: Player A wishes to know the value $f(x)$ for some x but lacks the power to compute it. Player B has the power to compute f and is willing to send $f(y)$ to A if she sends him y, for any y. A encrypts x, sends $y=E(x)$ to B, who then computes $f(y)$, returns this result to A, who then infers $f(x)$ from $f(y)$. M. Abadi and J. Feigenbaum, "Secure Circuit Evaluation," Journal of Cryptology, No. 2, pp. 1–12, 1990 (hereinafter "Abadi—2") (the contents of which are incorporated herein by reference) describes a related problem. A protocol is used to evaluate a function $f(x)$ by two parties, where one knows how to compute $f$ but does not know x, and the other party knows x, but not how to compute $f$. The $f$ in question would be expressed as a boolean circuit. This is in fact again the privacy homomorpism problem.

Additional work has been performed recently by M. Naor and B. Pinkas, "Oblivious Transfer and Polynomial Evaluation", STOC'99, pp.245–254, and C. Cachin, J. Camenisch, J. Kilian, and J. Mueller, "One-Round Secure Computation and Secure Autonomous Mobile Agents", ICALP 2000, pp.512–523, and D. Beaver, "Minimal-Latency Secure Function Evaluation", EUROCRYPT 2000, pp.335–350 (the contents of each of those references is incorporated herein by reference).

Encryption systems are discussed in patents such as: U.S. Pat. No. 4,120,030, U.S. Pat. No. 4,168,396, U.S. Pat. No. 4,278,837, U.S. Pat. No. 4,306,389, U.S. Pat. No. 4,319,079, U.S. Pat. No. 4,433,207, U.S. Pat. No. 4,465,901, U.S. Pat. No. 4,633,388, U.S. Pat. No. 4,764,959, U.S. Pat. No. 4,847,902, U.S. Pat. No. 4,937,861, U.S. Pat. No. 5,007,082, U.S. Pat. No. 5,033,084, U.S. Pat. No. 5,153,921, U.S. Pat. No. 5,341,429, U.S. Pat. No. 5,392,351, U.S. Pat. No. 5,544,244, U.S. Pat. No. 5,592,549, U.S. Pat. No. 5,892,899, U.S. Pat. No. 6,052,870, and U.S. Pat. No. 6,049,609.

As additional background, a brief discussion of representing programs as polynomials is provided herein. The polynomial representation of a program is generated in two steps. First, the program as represented in a programming language is transformed to an abstract computation machine. Second, the abstract computation machine is transformed to a polynomial mapping. As would be appreciated by one of ordinary skill in the art, the transformation of a program in a programming language is a process specific to the selected programming language, and transformation methods are constructed for each programming language.

L. Blum, M. Shub, and S. Smale, "On a Theory of Computation and Complexity over the Real Numbers: NP-completeness, Recursive Functions, and Universal Machines," Bulletin of the American Mathematical Society, vol. 21, No. 1, pp. 1–46 (hereinafter "Blum") (the contents of which are incorporated herein by reference) describes transforming abstract computation machines to polynomials. In addition, it is possible to represent the computations of most types of finite automata using polynomials over a finite field.

SUMMARY OF THE INVENTION

The present invention addresses computation when secrets are kept in the memory of a computer, such that no secrets are represented in plaintext prior to-, during- or after the computation, unless the computation itself dictates otherwise. The invention reduces the need for communication between parties during computation. The invention achieves this with a method and system for encrypting programs, as well as a method and system for representing a class of abstract computation machines using polynomials. The invention also achieves this with a method and system for directly encrypting function tables.

Additionally, the invention also provides a method and system for encrypting abstract computation machines represented in part using state-transition tables. Accordingly, it is an object of the present invention to overcome deficiencies in known encryption methods and systems.

It is a further object of the present invention to provide encrypted universal (Turing) computation.

It is a still further object of the present invention to provide encrypted universal interactive (Turing) computation.

It is another object of the present invention to provide a method and system for transforming abstract computation devices to computation devices expressed with polynomials.

Another object of the present invention is to provide a method and system for renewing—or re-encrypting—a partially encrypted state machine.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A is an automata transition diagram illustrating inputs, outputs and transitions in an exemplary state machine that does not already have a dedicated stopping state, $q_a$;

FIG. 5B is a function table corresponding to the transition diagram of FIG. 5A;

FIG. 5C is a transition diagram illustrating inputs, outputs and transitions in an exemplary state machine that already has an isolated node that can be used as a dedicated stopping state, $q_a$;

FIG. 5D is a function table corresponding to the transition diagram of FIG. 5C;

FIGS. 7A–7C illustrate vectorization examples for N=2, 3, and at least 4 for the diagram of FIG. 6C;

FIGS. 8A–8C illustrate determining prime numbers N based on a selected vectorization of a state machine as defined in FIG. 7;

FIGS. 9A and 9B illustrate a method of adding states to Q', adding dummy input symbols, dummy output symbols, and completing the state machine function table, using the example of FIG. 5C as augmented in FIG. 7;

FIG. 10 illustrates a random assignment of entries after adding dummy input and output symbols;

FIG. 11A illustrates an initial function table (corresponding to the vectorization of FIG. 8B) prior to adding entries corresponding to a random duplication of states;

FIG. 11B illustrates an augmented function table in which a randomly selected non-dedicated state was selected as a source of a copy operation for a first row with undefined elements;

FIGS. 11C and 11D illustrate transition diagrams corresponding to the function tables of FIGS. 11A and 11B, respectively;

FIG. 12A illustrates an augmented function table (repeated from FIG. 11B) prior to randomizing links transitions (or arcs) during a random row copying process;

FIG. 12B illustrates an augmented function table in which a transition of FIG. 12A is modified after copying a row;

FIGS. 13A and 13B illustrate a function table before and after two nodes are switched;

FIGS. 14A and 14B illustrate a function table before and after two input symbols are switched;

FIGS. 15A and 15B illustrate a function table before and after two output symbols are switched;

FIG. 17 illustrates a method of precomputing the $a_1(x)$ functions;

FIG. 18 illustrates an exemplary BSS machine to be converted to a BSS' machine according to one aspect of the present invention;

FIG. 19 illustrates a method of transforming the BSS machine of FIG. 18;

FIG. 21 illustrates a method of transforming a BSS' machine into a single polynomial mapping;

FIG. 27A illustrates a mapping $f$ represented by a function table;

FIG. 27B illustrates a function table $t_f$ from the function table of FIG. 27A;

FIGS. 27C and 27D generally illustrate converting from a function table for $f$ to a function table for $t_f$;

FIG. 36A illustrates a state of a register machine including register vectors, an instruction pointer vector, and a storage pointer vector;

FIG. 36B illustrates shared data in the form of D-vectors including a storage cell $\vec{S}_{\vec{D}}$ that is indexed by $\vec{D}$;

FIG. 36C illustrates instructions in the form of C-vectors including a storage cell $\vec{S}_{\vec{C}}$ that is indexed by $\vec{C}$;

FIGS. 37A–38D illustrate a method of symbolic composition of two mappings using function tables;

Figure 39B:
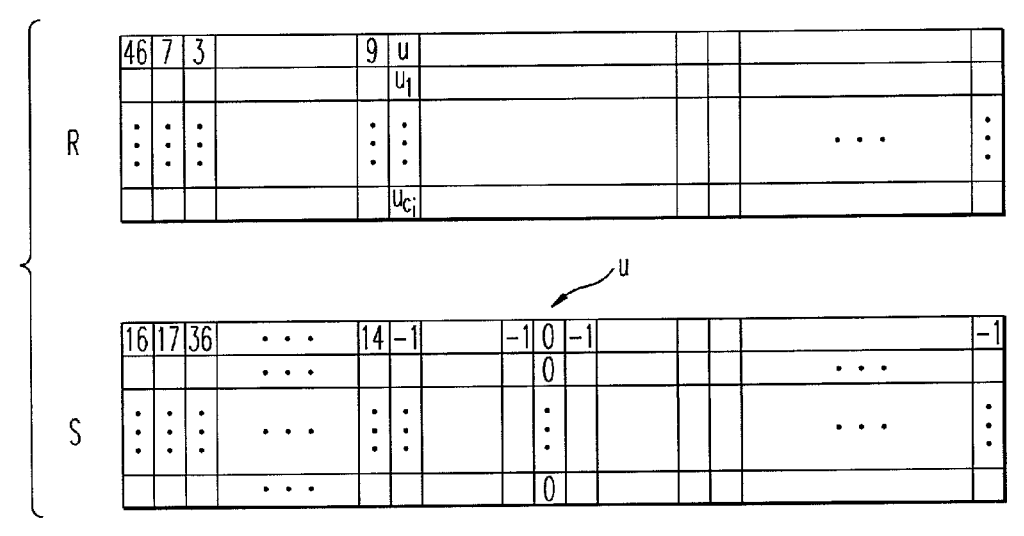

FIG. 39B illustrates a result after one step of the process of FIG. 39A;

DETAILED DESCRIPTION OF THE PREFERRED EMBODIMENT

Figure 1:
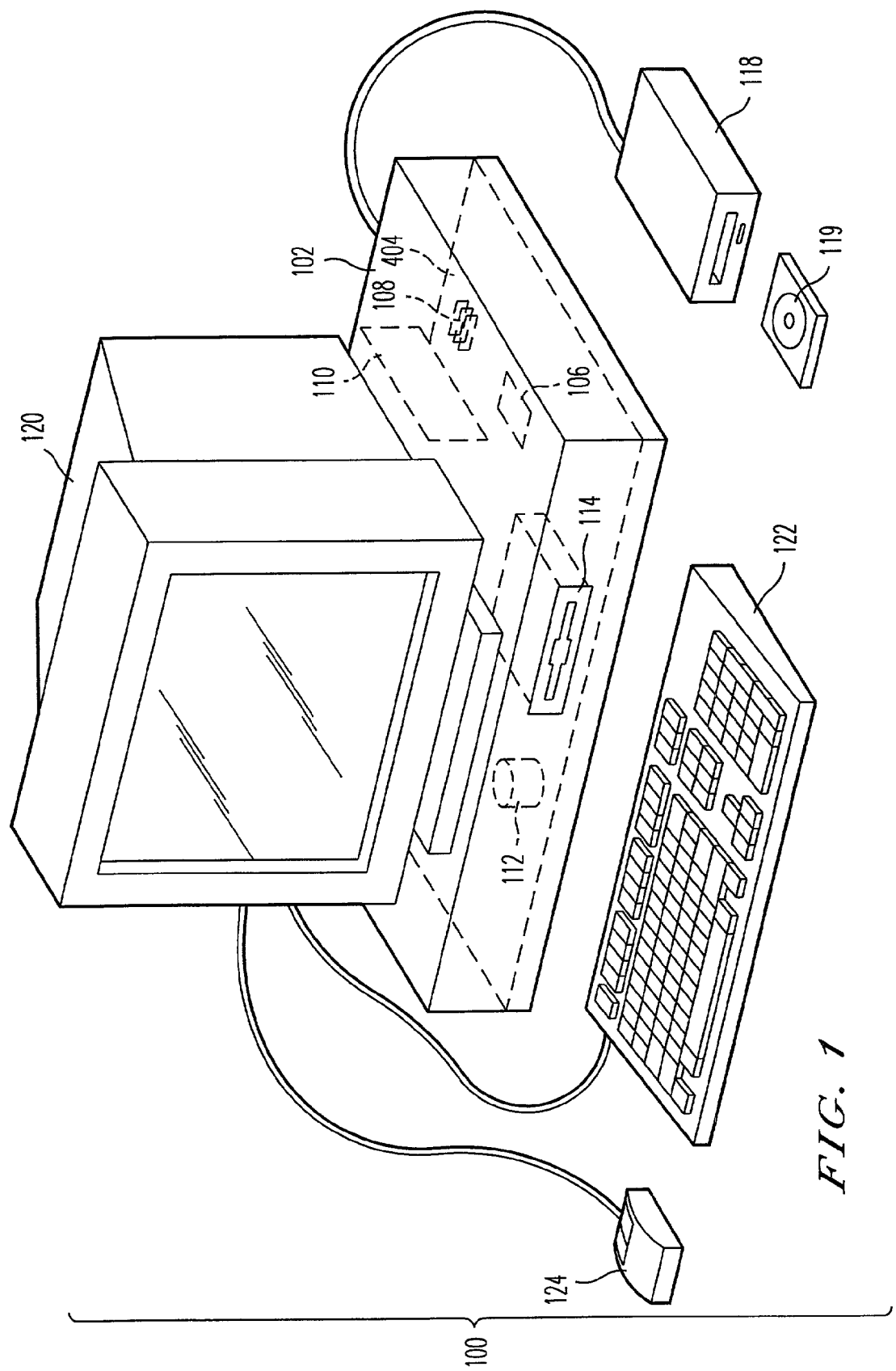
FIG. 1 is a schematic illustration of a computer system for providing encrypted computing according to one embodiment of the present invention.

Referring now to the drawings, wherein like reference numerals designate identical or corresponding parts throughout the several views, FIG. 1 is a schematic illustration of a computer system for providing encrypted computing. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer (not shown) also provides printed listings of the results of encrypted computing.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for providing encrypted computing. The computer code devices of the present invention can be any interpreted or executable code mechanism, including but not limited to scripts, interpreters, dynamic link libraries, Java classes, and complete executable programs. Such computer code devices may also be dynamically loaded across a network (e.g., downloaded from a Wide Area Network (e.g., the Internet)).

As described above, the computer program devices of the present invention can be implemented in numerous ways. In one embodiment of those code devices, the devices are not separate programs but rather are plug-ins to a separate program. In such an embodiment, an Application Programming Interface (API) provides a definition of how the encryption and decryption parameters are passed between the program and the plug-in performing the encryption. APIs and plug-ins, such as the Pretty Good Privacy (PGP) interface and plug-in that enables e-mail to be encrypted or decrypted within mail programs such as Eudora Mail and Microsoft Outlook, are known. Accordingly, one of ordinary skill in the art, based on the present specification, would be able to make and use an API and/or interface for performing encrypted computing.

Figure 2:
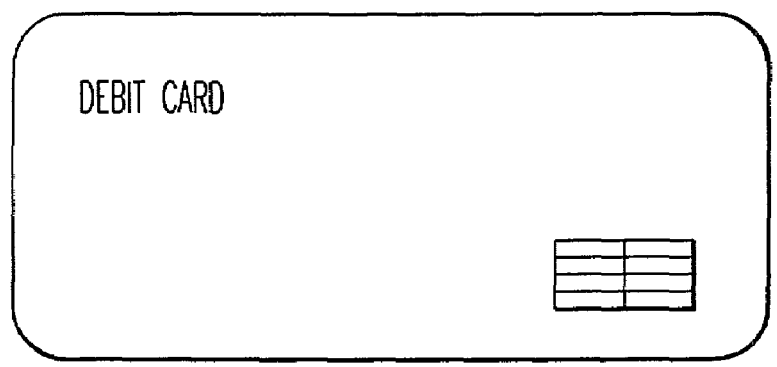
FIG. 2 is a top view of a smartcard for performing encrypted computation.
Figure 3:
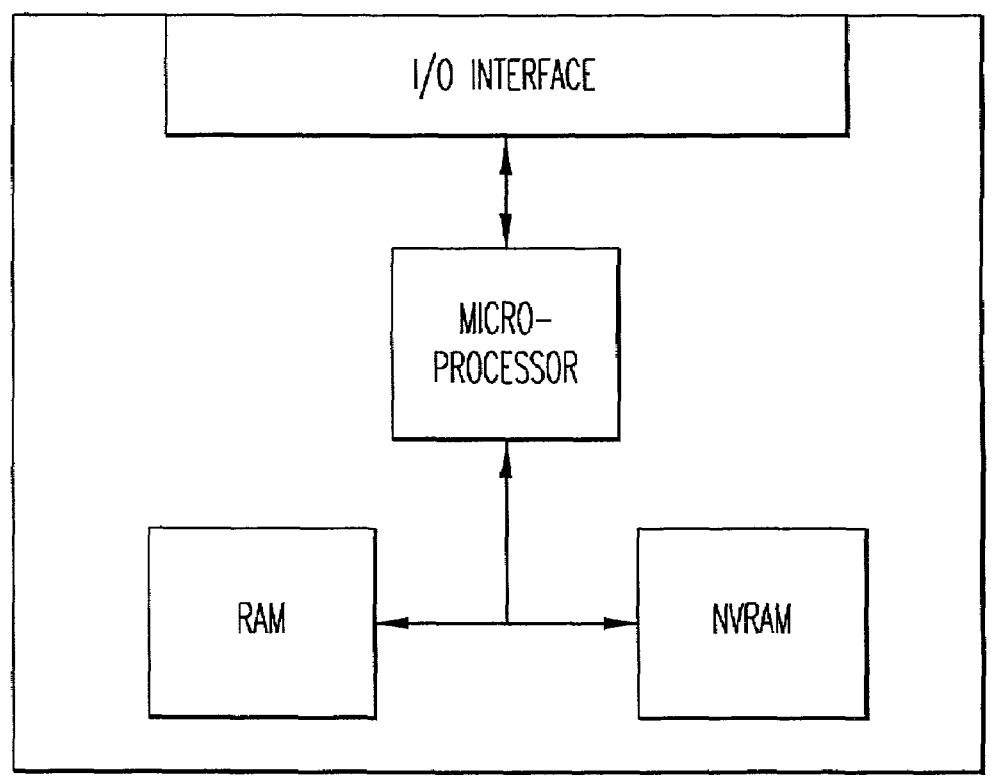
FIG. 3 is a block diagram of a smartcard chip for the smartcard of FIG. 2.
Figure 4:
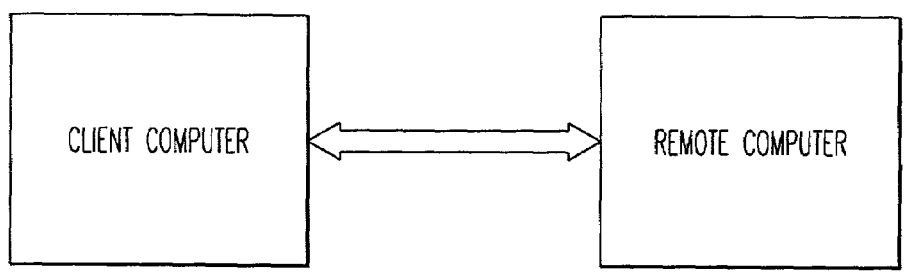
FIG. 4 is a schematic illustration of a client remotely logging into a server computer.

Applications of the present invention include, but are not limited to, the following:

smart cards (see FIGS. 2 and 3) and similar trusted computing bases for high-security applications since current smart cards are vulnerable because they still do sensitive processing unencrypted software implementations of cryptosystems on insecure platforms (see FIG. 1)

third party key generation systems, where trust of the party generating the keys is crucial to its value as a part of a security system secure remote logins and cryptographic operations (see FIG. 4).

The present invention also enables the construction of secure mobile agents for computer systems that have no inherent limitations on their computing ability.

The present invention provides a method and system for constructing "black-box" programs for computations. The cryptographically enhanced functions (e.g. polynomials or state transition tables) produced by the method and system are applied to carry out a computation specified by a state machine. Thus, the method:

1. makes incomprehensible the nature of the program itself in its cryptographically enhanced function representation,
2. ensures that workspace used by the program is encrypted during use, and
3. ensures encryption of output, if desirable.

As a preliminary matter, as used herein, the phrase "partially encrypted" refers to a set of functions in which at least one function is cryptographically enhanced without requiring that all functions in the set be cryptographically enhanced. The present invention is applicable in at least four computations. The first computation involves at least two parties, A and B, where A wishes to execute a computation using B's computing resources such that:

1. A supplies B with a partially encrypted abstract computing machine, $f$, expressed using cryptographically enhanced functions, and a partially encrypted initial state, wherein the abstract computation machine is transmitted either alone or within a conventional programming language (e.g. Java, Pascal, C, C++, machine code), part of which executes the computations of the partially encrypted abstract computing machine, and
2. B supplies any input "requested" by $f$, depending on which variant of the abstract computing machine A decides to use. When using a conventional program, B supplies input indirectly through the program.

Such computation can be used in an electronic wallet environment.

The second computation involves one party, A that uses A's own resources where A supplies the partially encrypted abstract computing machine, the partially encrypted initial state, and any resources the abstract computing machine interacts with during its computation. In all three of those computations, A may also choose to supply some additional data with the abstract computing machine, that will allow parts of it to become re-encrypted under new encryption keys. Such encrypted computations can be used by users who wish to prevent "eavesdropping" on ongoing computation.

The third computation involves at least two parties A and B, where B wishes to execute a computation using A's data such that:

1. A supplies B with a conventional program, expressed in a conventional programming language, part of which executes a computation of a partially encrypted abstract computing machine, $f$, expressed using polynomial, where a partially encrypted initial state is given by A (either separately or along with the program), and
2. A supplies B with the input "requested" by $f$ indirectly through the program sent to B by A, depending on the variant abstract computing machine A decides to use, and whether or not A decides to let its program allocate resources.

Such encrypted computations can be used to enable off-line document release and online interactive document services.

The fourth computation involves at least two parties A and B, where B wishes to execute a computation using A's data such that:

1. A supplies B with a conventional program, expressed in a conventional programming language, part of which executes a computation of a partially encrypted abstract computing machine, $f$, expressed using polynomials or state transition tables, where a partially encrypted initial state is given by A (either separately or along with the program), and
2. A supplies B with input "requested" by $f$ indirectly through the program sent to B by A in addition to input supplied by B, depending on the variant abstract computing machine A decides to use, and whether or not A decides to let its program allocate resources.

In one such example, A provides B with data content (e.g. a DVD movie) that B plays back. The decision process as to whether or not the DVD is to be played (e.g. based on release date) is based on an encrypted computation.

The present invention provides a method and apparatus for using a polynomial permutation as an asymmetric secret key cryptosystem in constructing encrypted programs. The cryptosystem is based on the symbolic function composition operation, and the fact that decomposing certain types of multivariate polynomials over a field is an NP-hard problem. See M. Dickerson, "The Functional Decomposition of Polynomials", Ph.D. Thesis, Cornell University, 1989, the contents of which are incorporated herein by reference.

The relevant problem upon which the cryptosystem of the present invention is based is described herein as a special non-deterministic case of the so-called "General Decomposition Problem" for polynomials. Preliminary cryptanalysis suggests that it may offer very good cryptographic-protection of the abstract state machine itself. The only currently known (cryptographical) vulnerability is statistical analysis of input and output as the computation progresses. Only the ciphertext itself appears to be vulnerable to such analysis. The partially encrypted polynomial representation itself has no known vulnerabilities As a basis for the rest of the description provided herein, the process of representing abstract computing machines using polynomials is described herein. A Mealy machine is a six-tuple $M=(Q,\Sigma,\Delta,\delta,\lambda,q_0)$, where Q is the set of states, $\Sigma$ is the input alphabet, $\Delta$ is the output alphabet, $\delta:Q\times\Sigma\rightarrow Q$ is the state transition function, $\lambda:Q\times\Sigma\rightarrow\Delta$ is the output function, and $q_0$ is the initial state.

A Mealy machine M is converted to a polynomial mapping by augmenting the definition to provide what is effectively a halting state. Thereafter, $\delta$ and $\lambda$ are interpolated, using their definitions to provide interpolation data. The result is a multivariate polynomial mapping that can be iterated with input at each iteration to do the same computation as the machine M. The initial state is specified as a vector of the form $(\vec{x}(0), \vec{y}(0), \vec{z}(0))$, where $\vec{x}(0)$ is the actual initial state of the Mealy machine M, $\vec{y}(0)$ is the initial input, and $\vec{z}(0)$ the initial output.

$$(\delta_1(\vec{x}(n), \vec{y}(n)), \ldots, \delta_S(\vec{x}(n), \vec{y}(n)), \quad (1)$$
$$\tilde{\lambda}_1(\vec{x}(n), \vec{y}(n)), \ldots, \tilde{\lambda}_O(\vec{x}(n), \vec{y}(n)), \vec{y}(n+1)).$$

The computation is executed by iterating the mapping given in equation 1. This gives the relations:

$$\vec{x}(n) = \begin{cases} \delta(\vec{x}(n-1), \vec{y}(n-1)), & \text{for } n > 0 \\ \text{given} & \text{for } n = 0 \end{cases} \quad (2)$$

-continued $$\vec{z}(n) = \begin{cases} \vec{\lambda}(\vec{x}(n-1), \vec{y}(n-1)), \text{ for } n > 0 \\ \text{given for } n = 0 \end{cases} \quad (3)$$

$\vec{y}(n)$ is given for $n \geq 0$. (4)

The class of automata presented in Blum requires modifications for it to be of use in expressing automata as polynomial mappings. The modifications are as follows:

1. Comparison nodes have their greater-than-or-equal-to-zero relation replaced by a set membership relation, which is actually expressible as a polynomial over a finite field consisting of the integers modulo a prime numbers p.
2. Computation and comparison nodes may be mixed.
3. Output nodes are required to do computations (to avoid undue key exposure).
4. There is one final node at which all halting computations must halt.

According to the present invention, modified Blum-Shub-Smale machines (hereinafter referred to as "BSS' machines") operate over a finite field $Z_N$ for a fixed prime number N. Such a machine includes (1) a state space $Z_N^S$, (2) an output space $Z_N^O$, (3) an input space $Z_N^I$, and (4) a directed graph with p numbered nodes; where S, O, and I are positive integers. The set $\overline{S} = \{0, \ldots, p-1\} \times Z_N^S \times Z_N^O \times Z_N^I$ is called the full state space of the Blum-Shub-Smale-like machine. The first component is the node number, the next S components are the automaton's internal work space, the O components after that, the output, and lastly, the I input components. The graph of the automaton has two main types of node variants:

1. normal nodes, which must have at least one and at most p outgoing edges, and may have incoming edges; and
2. the halting node, which can only have incoming edges, and one out-going edge pointing to itself.

The nodes may also do one or more of the following:

1. compute one or more relations of the type $\in K \subseteq Z_N - \{0\}$ in order to select one of a list of possible outgoing edges for that node, in order to select the next node to be used in the computation;
2. compute output to the output vector;
3. assimilate input in the input vector; and
4. carry out a computation with existing information from the state vector and the input vector.

Such an automaton is transformed to a polynomial mapping $$H: \{0, \ldots, p-1\} \times Z_N^S \times Z_N^O \times Z_N^I \to \{0, \ldots, p-1\} \times Z_N^S \times Z_N^O \times Z_N^I$$

called its computing endomorphism. H is of the form:

$$\left( \beta(n, \chi(\vec{x})), \sum_{i=0}^{p-1} a_i(n) g_i(\vec{x}) \right).$$

Where $a_i(n)$ "chooses" the correct $g_i$ mapping to apply on the internal work space and output depending on which node the computation has reached. The next-node function $\beta(n, \vec{x})$ computes at which node the next computation step will take place. In this manner the automaton moves through its graph as though it were following a flow-chart.

Because the set $\{0, \ldots, p-1\}$ must be a subset of $Z_N$, it is possible to denote the node number by $x_1$, the internal state components by $x_2, \ldots, x_{S+1}$, the output components by $x_{S+2}, \ldots, x_{S+O+1}$, and the input components by $x_{S+O+2}, \ldots, x_{S+O+I+1}$. The components may or may not be in this order in any given embodiment. The components are hereafter assumed to be in this order to simplify notation. Then the computing endomorphism simply operates on $\vec{x}$, and is essentially a mapping $H: Z_p^{1+S+O+I} \to Z_p^{1+S+O+I}$. This notation will henceforth be used, as it seems to be better with respect to the BSS' machines.

The use of univariate polynomials in encryption will now be discussed. Let m+n pairs $(r_i, s_i)$ of mutually inverse permutations permuting the integers modulo N, be given such that they are expressed as univariate polynomials. There may or may not be equal pairs $(r_i, s_i)$ of mutually inverse permutations. Some pairs may or may not be the identity mappings (that is, they do no encryption/decryption). Let the $r_i$s denote the encryption keys, and $s_i$s the decryption keys. Encryption of a polynomial mapping $$(f_1(x_1, \ldots, x_m), \ldots, f_n(x_1, \ldots, x_m))$$

over the integers modulo N is done by composition, resulting in the encrypted mapping:

$$(r_1(f_1(s_{n+1}(x_1), \ldots, s_{n+m}(x_m))), \ldots, r_n(f_n(s_{n+1}(x_1), \ldots, s_{n+m}(x_m)))). \quad (5)$$

This mapping will effectively compute $f$ on data partially encrypted with the keys $r_{n+1}, \ldots, r_{n+m}$. It is then possible to decrypt the result by applying $s_1, \ldots, s_n$ to the individual components. The simplest option is to set all pairs $(r_i, s_i)$ to some chosen pair $(r, s)$. It is fully possible, however, to select individual encryption keys for each variable and function component. Note: to limit the size of the polynomials, and increase computational efficiency, the composition method employed by the invention exploits the fact that exponents greater than N−1 may be reduced in steps of N−1 until the exponent is less than N and greater-than-or-equal-to 0 (zero). This is done during the computation of the symbolic composition, so that no polynomial ever has any variable raised to a power higher than N−1.

In order to apply this encryption system to the polynomial mapping representing a Mealy machine, some restrictions must be placed on the selection of key pairs $(r_i, s_i)$. Recalling the form of the polynomial representation of a Mealy machine given in equation (1), it is clear that there are S+I variables, and S+O function components. Since the S first function components are always fed back into the S first variables, it becomes necessary to require $(r_i, s_i) = (r_{S+O+i}, s_{S+O+i})$ for all $1 \leq i \leq S$. It is assumed that $\vec{y}(n)$ has I components. In order to simplify subsequent notation, the partially encrypted version of the polynomial representation of an abstract state machine is written $(E_{r,s} \circ H)$, where H is the plaintext representation of the state machine. The symbol $\circ$ usually denotes functional composition, such that $(f \circ g)(x) = f(g(x))$. The resulting general expression for this encryption system applied to H is then:

$$(E_{r,s} \circ H)(\vec{x}(n+1), \vec{z}(n+1)) = r_1(\delta_1(s_1(x_1(n)), \ldots, s_S(x_S(n)), \quad (6)$$
$$s_{2S+O+1}(y_1(n)), \ldots, s_{2S+O+I}(y_I(n))), \ldots,$$

-continued $$r_S(\delta_S(s_1(x_1(n)), \ldots, s_S(x_S(n)),$$
$$s_{2S+O+1}(y_1(n)), \ldots, s_{2S+O+I}(y_I(n))), \ldots,$$
$$r_{S+1}(\lambda_1(s_1(x_1(n)), \ldots, s_S(x_S(n)),$$
$$s_{2S+O+1}(y_1(n)), \ldots, s_{2S+O+I}(y_I(n))), \ldots,$$
$$r_{S+O}(\lambda_1(s_1(x_1(n)), \ldots, s_S(x_S(n)),$$
$$s_{2S+O+1}(y_1(n)), \ldots, s_{2S+O+I}(y_I(n)))),$$

Although this encryption system protects the computation of the state machine from the platform it runs on, that does not preclude the possibility of the partially encrypted state machine sharing one or more encryption/decryption key pairs with the platform. This is why also the input components in equation (6) are displayed as (partially) encrypted.

For a BSS' machine there will effectively be 1+S+O mappings, and 1+S+O+I variables. Only 1+S+I variables are used in the mappings. Also, similar to the partial encryption of the polynomial representation of a Mealy machine, the choice of mappings is restricted by the fact that output from the first 1+S mapping components is fed into the first 1+S variables for the state space at the next computation step. Thus, $(r_{1+S+O+i}, s_{1+S+O+i})=(r_i, s_i)$ for $1 \leq i \leq S+1$. Thus, the resulting expression for the encrypted machine is of the form:

$$\vec{x}(n+1) = (E_{r,s} \circ H)(\vec{x}(n)) \quad (7)$$
$$= r_1(H_1(s_1(x_1(n)), \ldots, s_{1+S}(x_{1+S})),$$
$$s_{1+S+O+S+O+2}(x_{S+O+2}(n)), \ldots,$$
$$s_{1+S+O+S+O+I+1}(x_{S+O+I+1}(n)), \ldots,$$
$$r_{1+S+O}(H_{1+S+O}(s_1(x_1(n)), \ldots, s_{1+S}(x_{1+S})),$$
$$s_{1+S+O+S+O+2}(x_{S+O+2}(n)), \ldots,$$
$$s_{1+S+O+S+O+I+1}(x_{S+O+I+1}(n))))$$

Note, in one embodiment of the present invention, at least one output component is chosen to be unencrypted. In that embodiment, the encryption function $r_i$ is the identity mapping x, and is not applied to the component. Similarly, variables that do not need decrypting use the identity mapping x as decryption function $s_j$.

The encryption system of the present invention is strengthened by the fact that it effectively includes a special type of non-linear equation system with an integer solution, half of whose variables remain undetermined by any equation. Moreover, the present invention protects the process of composing polynomials to produce a cryptosystem.

It is possible to re-encrypt a mapping $E_{r,s} \circ f$ partially encrypted with univariate polynomials, such that:
1. None of the old encryption keys are revealed;
2. None of the new encryption keys are revealed;
3. The plaintext mapping $f$ is not revealed; and
4. None of the encryption keys protecting the new encryption keys are revealed.

Let $f$ be a mapping with n functional components expressed as polynomials in m variables. Assume $f$ is partially encrypted using the key pairs $(r_1, s_1), \ldots, (r_{n+m}, s_{n+m})$ such that $E_{r,s} \circ f$ may be written in the form given in equation (5).

Re-encryption is achieved by:
1. selecting a new set of key pairs $(r_1^l, s_1^l), \ldots, (r_{n+m}^l, s_{n+m}^l)$;
2. for every $1 \leq i \leq n+m$, symbolically composing $r_1^l$ with $s_i$ to generate $r_i^l(s_i(x))$;
3. for every $1 \leq i \leq n+m$, symbolically composing $r_i$ with $s_i^l$ to generate $r_i(s_i^l(x))$;
4. for every variable $x_i$, $n<i \leq n+m$, symbolically substituting $x_i$ with $r_i(s_i^l(x))$; and
5. for every function component $f_i$, $1 \leq i \leq n$, symbolically composing $r_i^l(s_i(x))$ with $r_i(f_i(\ldots))$.

The re-encryption of a function component $f_i$ is possible based on the following equation:

$$(r_i' \circ s_i) \circ r_i(f_i(s_{n+1}(r_{n+1}(s'_{n+1}(x_1))), \ldots, s_{n+m}(r_{n+m}(s'_{n+m}(x_m))))) = \quad (8)$$
$$r_i'(s_i(r_i(f_i(s_{n+1}(r_{n+1}(s'_{n+1}(x_1))), \ldots, s_{n+m}(r_{n+m}(s'_{n+m}(x_m))))))) =$$
$$r_i'(f_i s'_{n+1}(x_1), \ldots, s'_{n+m}(x_m)))$$

so the result is $f$ partially encrypted with the keys $(r_1^l, s_1^l), \ldots, (r_{n+m}^l, s_{n+m}^l)$. Since all $(r_i, s_i)$ and $(r_i^l, s_i^l)$ are initially secrets, the compositions $r_i^l \circ s_i$ and $r_i \circ s_i^l$ are effectively encrypted data for purposes of cryptanalysis.

Encryption using multivariate polynomials is similar to encryption with univariate polynomials, except that tuples or blocks of variables may be encrypted and/or decrypted simultaneously. In the most general case, let $f$ be a mapping with n components that is applied to m variables. Select k triples $(c_i, r_i, s_i)$ satisfying:
1. Every $c_i$ is a positive integer;
2. There is an $l<k$ such that $\Sigma \text{hd } i=1^l c_i$ equals the number of components, n, in the mapping to be partially encrypted, and $\Sigma_{i=l+1}^k c_i$ equals the number of variables, m, used by the mapping;
3. Every $r_i$ is a permutation of $c_i$-tuples of variables, and $s_i$ is its inverse, thus $s_i: Z_p^c \to Z_p^c$; and
4. Every $r_i$ and $s_i$ is expressed as a polynomial mapping, such that if $c_i>1$, then $r_i$ and $s_i$ are multivariate polynomial mappings with functional (polynomial) components $(r_{i,1}, \ldots, r_{i,c_i})$ and $(s_{i,1}, \ldots, s_{i,c_i})$, respectively.

The $r_i$s denote encryption keys. The $s_i$s denote decryption keys. There may or may not be equal triples. Some permutations $r_i$ and $s_i$ may be selected to be the identity mapping (thus encryption and/or decryption are not performed).

Illustratively, the n functional components and m variables are assembled in one "tuple" $f_1, \ldots, f_n, x_1, \ldots, x_m$. This is then partitioned into blocks as shown in the equation below:

$$f_1, \ldots, f_{c_l}, \ldots, f_{n-c_l+1}, \ldots, f_n, x_1, \ldots,$$
$$x_{c_l+1}, \ldots, x_{m-c_k+1}, \ldots, x_m,$$

where $f_1, \ldots, f_n$ is $\Sigma_{i=1}^l c_i=n$ components and $x_1, \ldots, x_m$ is $\Sigma_{i=l+1}^k c_i=m$ variables.

To achieve partial encryption, the keys are then applied to blocks as shown in the equation below:

$$r_1=\{f_1, \ldots, f_{c_l}\} r_l \{f_{n-c_l+1}, \ldots, f_n\} s_{l+1}=\{x_1, \ldots,$$
$$x_{c_l+1}\} s_k=\{x_{m-c_k+1}, \ldots, x_m\}.$$

This general case can be reduced to the univariate case by setting $c_1=1$ for all $1 \leq i \leq m+n$. The partial encryption of $$f(\vec{x})=(f_1(x_1, \ldots, x_m), \ldots, f_n(x_1, \ldots, x_m))$$

over the integers modulo N is done by functional composition, resulting in the encrypted mapping:

$$(r_1(f_1(s_{l+1}(x_1, \ldots, x_{c_{l+1}}), \ldots, s_k(x_{m-c_k+1}, \ldots, x_m)), \ldots, \qquad (9)$$
$$f_{c_1}(s_{l+1}(x_1, \ldots, x_{c_l}), \ldots, s_k(x_{m-c_k+1}, \ldots, x_m))), \ldots,$$
$$r_1(f_{n-c_l+1}(s_{l+1}(x_1, \ldots, x_{c_{l+1}}), \ldots,$$
$$s_k(x_{m-c_k+1}, \ldots, x_m)), \ldots,$$
$$f_n(s_{l+1}(x_1, \ldots, x_{c_1}), \ldots s_k(x_{m-c_k+1}, \ldots, x_m))))$$

Note that every $r_i$ produces a tuple with $c_l$ components, so in all, the partially encrypted mapping should have as many polynomial components as does $f$. To simplify the above notation, denote the tuple $x_1, \ldots, x_{c_{l+1}}$ by $\vec{w}_1$, the tuple $x_{c_{l+1}+1}, \ldots, x_{c_{l+1}c_{l+2}}$ by $\vec{w}_2$, and so on up to $x_{m-c_k+1}, \ldots, x_m$ by $\vec{w}_{k-l}$. Denote the function component tuple $f_1, \ldots, f_{c_l}$ by $v_1$, the tuple $f_{c_l+1}, \ldots, f_{c_l+c_2}$ by $v_2$, and so on up to $f_{n-c_l+1}, \ldots, f_n$ by $v_l$. This notation is illustrated in the equation below:

$$f_1, \ldots, f_{c_l}, \ldots, f_{n-c_l+1}, \ldots, f_n, x_1, \ldots,$$
$$x_{c_{l+1}}, \ldots, x_{m-c_k+1}, \ldots, x_m.$$

Using this notation, equation (9) may be rewritten as:

$$(r_1(v_1(s_{l+1}(\vec{w}_1), \ldots, s_k(\vec{w}_{k-l}))), \ldots, r_l(v_l(s_{l+1}(\vec{w}_1), \ldots, s_k(\vec{w}_{k-l})))). \qquad (10)$$

When a polynomial representation, H, of a Mealy machine is to be encrypted using multivariate polynomials, there are some constraints on the selection of encryption keys. As in the univariate case, there are S function components of H, which are fed back into variables, and O function components which are not. This will only work as intended if $(c_i, r_i, s_i) = (c_{l+i}, r_{l+i}, s_{l+i})$ for all $1 \leq i \leq \overline{T}$, where $\overline{T}$ is such that $\Sigma_{j=1}^{\overline{T}} c_j \geq S$. In the following set $D = \Sigma_{j=1}^{\overline{T}} c_j$. In any case, D may not exceed the number of variables, so in the case where there are more function components than variables, there may be function components free of such restrictions when deciding upon triples for encryption. Thus, the first $\overline{T}$ partially encrypted blocks of H's components must use the same key pairs as the first $\overline{T}$ partially decrypted blocks of H's variables. Recall that H's variables are written $\vec{x}(n)$, $\vec{y}(n)$, and that $\vec{x}$ is the state of the Mealy machine. Therefore the first $\overline{T}$ vectors/blocks $\vec{w}_i(n)$ will represent $\vec{x}(n)$ and possibly a little of $\vec{y}(n)$, and the remaining vectors/blocks will represent the rest of $\vec{y}(n)$—the input to the Mealy machine. The partially encrypted version of H, written $E_{r,s} \circ H$, may for the case D=S be written as:

$$\vec{x}(n+1), \vec{z}(n+1) = (E_{r,s} \circ H)(\vec{x}(n), \vec{y}(n)) \qquad (11)$$
$$= (r_1(\delta_1(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$\delta_{c_1}(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n)))), \ldots,$$

-continued
$$(r_{\bar{l}}(\delta_{D-c_{\bar{l}}+1}(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$\delta_D(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$r_{\bar{l}+1}(\tilde{\lambda}_1(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$\tilde{\lambda}_{c_{\bar{l}+1}}(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n)))), \ldots,$$
$$r_l(\tilde{\lambda}_{O-c_l+1}(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$\tilde{\lambda}_O(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n)))))$$

For the case D>S, the partially encrypted version of H, $E_{r,s} \circ H$ is defined as:

$$E_{r,s}(\vec{x}(n+1), \vec{z}(n+1)) = (E_{r,s} \circ H)(\vec{x}(n), \vec{y}(n)) \qquad (12)$$
$$= (r_1(\delta_1(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$\delta_{c_1}(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n)))), \ldots,$$
$$(r_{\bar{l}}(\delta_{D-c_{\bar{l}}+1}(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$\delta_S(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$r_{\bar{l}+1}(\tilde{\lambda}_1(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$\delta_{D-S}(s_1(\vec{w}_1(n)), \ldots, s_{l+\bar{l}+1}(\vec{w}_{\bar{l}+1}(n)),$$
$$s_k(\vec{w}_{k-l}(n)))), \ldots,$$
$$r_l(\tilde{\lambda}_{O-c_l+1}(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n))), \ldots,$$
$$\tilde{\lambda}_O(s_1(\vec{w}_1(n)), \ldots, s_{\bar{l}}(n)),$$
$$s_{l+\bar{l}+1}(\vec{w}_{\bar{l}+1}(n)), \ldots, s_k(\vec{w}_{k-l}(n)))))$$

The mapping $E_{r,s} \circ H$ effectively consists of polynomials $q_i: Z_p^{S+I} \to Z_p$.

For the BSS' machines, the resulting expression resembles the above expressions, but is slightly simpler. There is one variable vector $\vec{x}(n)$ with 1+S+O+I components. H has 1+S+O components. As with the Mealy machine, the triples $(c_i, r_i, s_i)$ must equal $(c_{l+i}, r_{l+i}, s_{l+i})$ for $1 \leq i \leq \overline{T}$, where $\overline{T}$ is such that $\Sigma_{j=1}^{\overline{T}} c_j \geq 1+S$ and $\Sigma_{j=1}^{\overline{T}-1} c_j \leq 1+S$. Set $D=\Sigma_{j=1}^{\overline{T}} c_j$. In any case, D may not exceed the number of variables, so in the case where there are more function components than variables, there may be function components free of such restrictions when deciding upon triples for encryption. The partially encrypted state and output data after n applications of H is defined as $\vec{w}$ $$(\vec{w}_l(n), \ldots, \vec{w}_{k-l}(n)).$$

The partially encrypted version of H for a BSS' machine is defined as:

$$\vec{x}(n+1) = (E_{r,s} \circ H)(\vec{x}(n)) \qquad (13)$$

$$(r_1(H_1(s_1(\vec{w}_1(n)), \ldots, s_{\bar{i}}(n)),$$

$$s_{l+\bar{i}+1}(\vec{w}_{\bar{i}+1}(n)), \ldots, s_k(\vec{w}_{k-l}(n))), \ldots,$$

$$H_{c_1}(s_1(\vec{w}_1(n)), \ldots, s_{\bar{i}}(\vec{w}_{\bar{i}}(n)),$$

$$s_{l+\bar{i}+1}(\vec{w}_{\bar{i}+1}(n)), \ldots, s_k(\vec{w}_{k-l}(n))),$$

$$r_l(H_{1+S+O-c_{l+1}}(s_1(\vec{w}_1(n)), \ldots, s_{\bar{i}}(\vec{w}_{\bar{i}}(n)),$$

$$s_{l+\bar{i}+1}(\vec{w}_{\bar{i}+1}(n)), \ldots, s_k(\vec{w}_{k-l}(n))),$$

$$H_{1+S+O}(s_1(\vec{w}_1(n)), \ldots, s_{\bar{i}}(\vec{w}_{\bar{i}}(n)),$$

$$s_{l+\bar{i}+1}(\vec{w}_{\bar{i}+1}(n)), \ldots, s_k(\vec{w}_{k-l}(n)))))$$

This cryptosystem appears to be based on an NP-hard problem—that of decomposing the encrypted polynomial mapping to obtain the obscured polynomials doing the actual computation. Also, as in the univariate case, solution of the problem requires solving a system of non-linear integer equations, where there are half as many equations as there are variables.

It is possible to re-encrypt a mapping $E_{r,s} \circ f$ partially encrypted with multivariate polynomials, such that:
1. None of the old encryption keys are revealed;
2. None of the new encryption keys are revealed;
3. The plaintext mapping $f$ is not revealed; and
4. None of the encryption keys protecting the new encryption keys are revealed.

Let $f$ be a mapping with n functional components expressed as polynomials in m variables. Assume $f$ is partially encrypted using the key triples $(c_1, r_1, s_1), \ldots, (c_k, r_k, s_k)$ as described above such that $E_{r,s} \circ f$ may be written in the form given in equation (9). Re-encryption is achieved by:
1. selecting a new set of key triples $(c_1, r_1', s_1'), \ldots, (c_k, r_k^L, s_k^L)$, such that block sizes are preserved;
2. for every $1 \leq i \leq k$ symbolically composing $r_i^L$ with $s_i$ to generate $r_i^L(S_i(v))$;
3. for every $1 \leq i \leq k$ symbolically composing $r_i$ with $s_i^L$ to generate $r_i(s_i^L(\vec{w}_{i-1}))$;
4. for every block of variables $\vec{w}_{i-l}, 1 < i \leq k$, symbolically substituting $\vec{w}_{i-l}$ with $r_i(s_i^L(\vec{w}_{i-l}))$; and
5. for every block of function components $v_i$, $1 \leq i \leq l$, symbolically composing $r_i^L(s_i(\ldots))$ with $r_i(f_i(\ldots))$.

The re-encryption of a function component $f_i$ described herein according to the following equation:

$$(r_i' \circ s_i) \circ r_i(f_i(s_{l+1}(r_{l+1}(s_{l+1}'(\vec{w}_1))), \ldots, s_k(r_k(s_k'(\vec{w}_{k-l}))))) = \qquad (14)$$

$$r_i'(s_i(r_i(f_i(s_{l+1}(r_{l+1}(s_{l+1}'(\vec{w}_1))), \ldots, s_k(r_k(s_k'(\vec{w}_{k-l})))))))= $$

$$r_i'(f_i(s_{l+1}'(\vec{w}_1), \ldots, s_k'(\vec{w}_{k-l})))$$

so the result is $f$ partially encrypted with the keys $(c_1 r_1^L, s_1^L), \ldots, (c_k, r_k^L, s_k^L)$. Note that for the multivariate case, proper re-encryption is possible only if the new key triples partition $f$ and its variables into the same blocks as the original key triples did. Since all $(c_i, r_l, s_i)$ and $(c_i, r_i^L, s_i^L)$ are initially secrets, the compositions $r_i^L \circ s_i$ and $r_i \circ s_i^L$ are effectively encrypted data for purposes of cryptanalysis. It is important to note that equation (14) includes three instances of the use of the identity operator. In applying $s_i(r_i(\ldots))$, the operators s and r cancel and could, therefore, be replaced by the identity operator.

In order for the polynomial representation of Mealy machines, and the BSS' machines to be of significant usefulness, proper host support is required. Such support is called a Turing platform. This support is required for the subsequently described register machine.

Call the host $\bigcirc$. A Turing platform T includes:
 a very simple, slightly modified Turing machine with unbounded, linearly addressed storage, each storage unit being called a cell; and with a so-called finite control with position in the storage;
 an output register writeable by the finite control, which holds one storage unit;
 an input register readable by the finite control, which holds one storage unit, and one of three possible movement directions (left, stand still, right);
 an output register writeable by $\bigcirc$, which is part of the input of the supported state machine; and
 an input register readable by $\bigcirc$, which is part of the output of the supported state machine.

Figure 35:
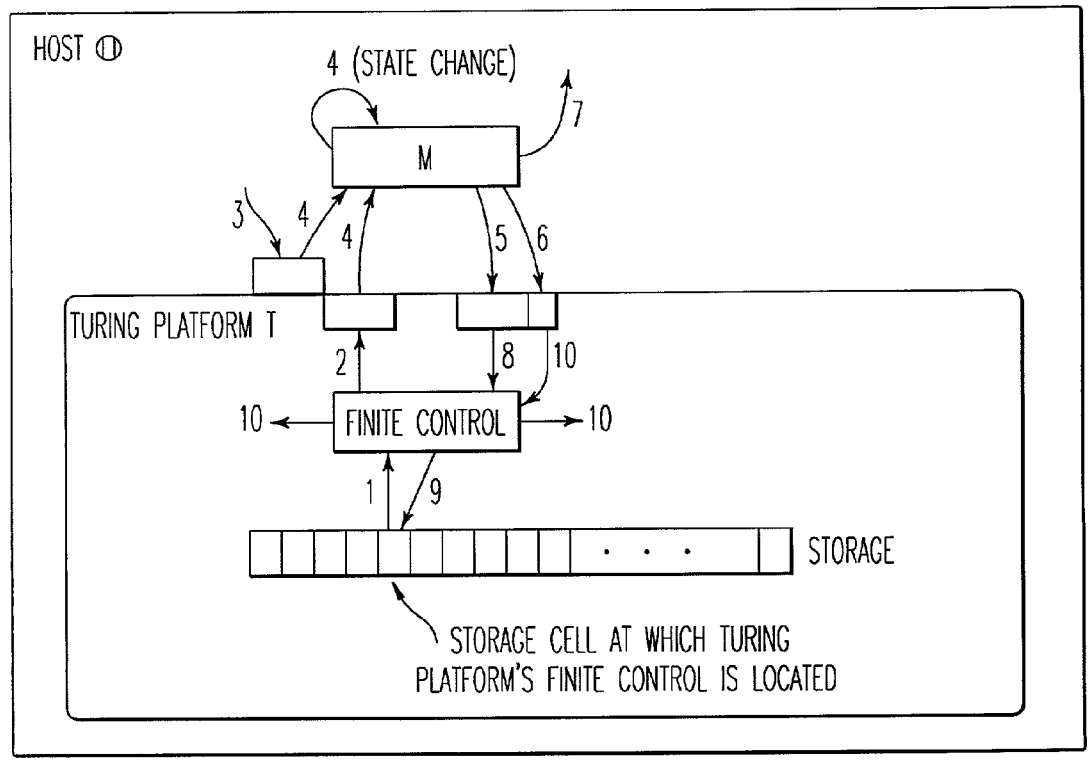
FIG. 35 illustrates a method of computing with host O running a Turing platform T supporting at least one Mealy register or BSS' machine M.
Figure 36D:
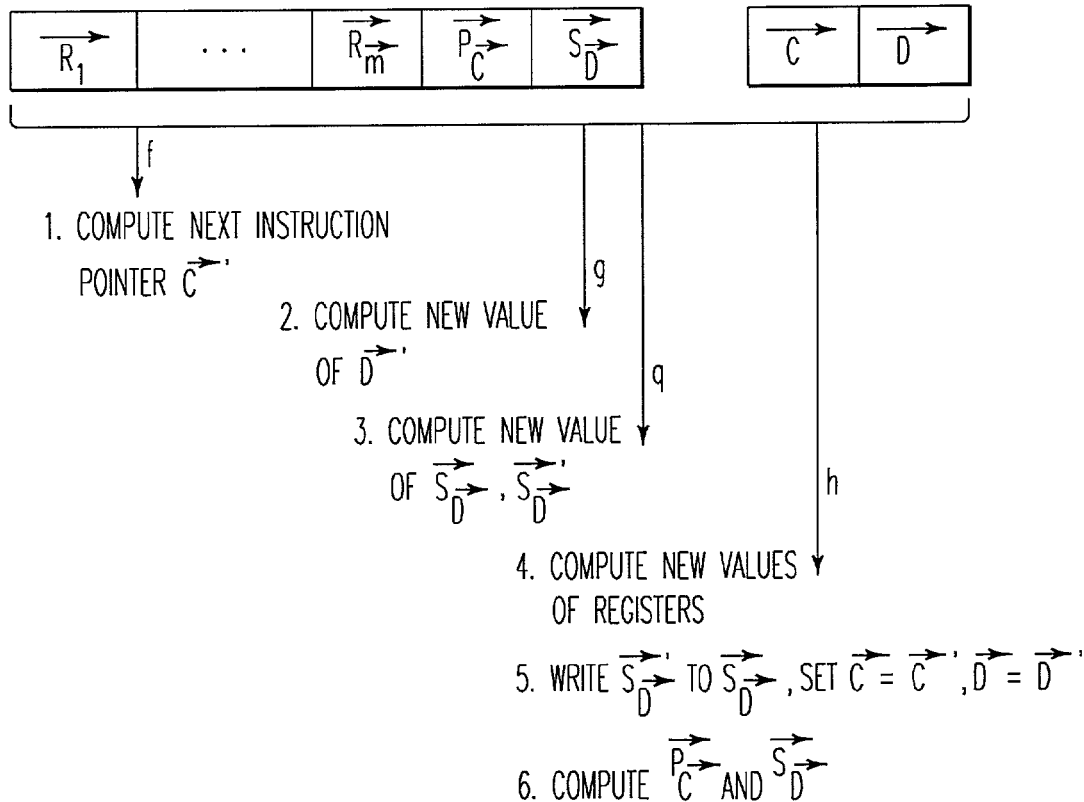
FIG. 36D illustrates a method of operating one the state of FIG. 36A.
Figure 36E:
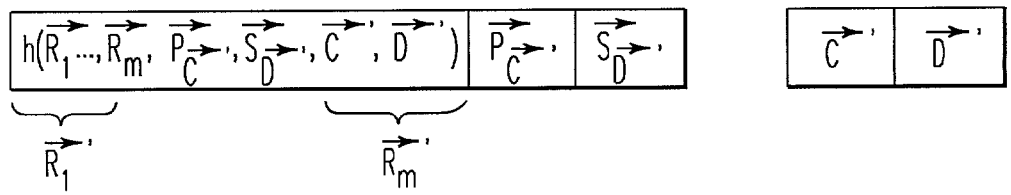
FIG. 36E illustrates the result of the method of FIG. 36D.
Figures 37A, 37B, 37C, 37D:
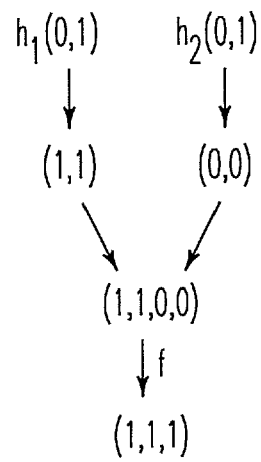

A complete computation step for a Mealy machine or a BSS' machine M supported by a Turing platform proceeds according the diagram of FIG. 35 in which the numbered steps correspond to:
1. T reads the cell at which its finite control is placed,
2. T writes the cell to the input of M,
3. $\bigcirc$ writes to the input of M,
4. M computes the next state,
5. M computes output and writes it to the input of T.
6. M computes output and writes it to the input of $\bigcirc$,
7. M computes the direction of movement, and writes it to T.
8. T reads from its input register,
9. T writes the input to the cell,
10. T moves left, right, or stands still, if possible.

Use of a Turing platform to support the computations of Mealy and BSS' machines allows them to do completely general computations, if necessary, effectively making them equivalent to Turing machines in computational power.

The basic structure of the method and apparatus of the present invention implements:
1. preprocessing of a Mealy machines' mappings in preparation for either transformation to polynomial mappings or direct encryption,
2. transformation of Mealy machines' mappings to polynomial mappings,
3. a BSS' machine,
4. transformation of the mappings of BSS' machines to polynomial mappings,
5. symbolic composition of mappings (including polynomial mappings) using their function tables, 6. encryption of Mealy machines with finite controls, expressed as function tables, using composition of function tables,
7. encryption and decryption of polynomial mappings and data using univariate polynomials,
8. re-encryption of mappings partially encrypted with univariate polynomial mappings,
9. encryption and decryption of polynomial mappings and data using multivariate polynomials,
10. re-encryption of mappings partially encrypted with multivariate polynomial mappings,
11. a specialization of encryption and decryption of polynomial mappings with multivariate polynomials using two-variable polynomials,
12. a device for supporting polynomial-based computation,
13. a register machine well adapted to encryption by the cryptosystems presented herein, and
14. a system for parameterized multivariate encryption presented, will now be described in detail.

Using a modified notation as compared to above, a Mealy machine is a six-tuple $M=(Q,\Sigma,\Delta,\delta,\lambda,q_0)$, where Q is the set of states, $\Sigma$ the input alphabet, $\Delta$ the output alphabet, $\delta:D\to Q$ the state transition function, $\lambda:D\to\Delta$ the output function, and $q_0$ the initial state. The domain D of $\delta$ and $\lambda$ is a possibly trivial subset of $Q\times\Sigma$.

Prior to transformation, state machines are augmented, such that they halt in one particular state. This is necessary for Mealy machines and BSS' machines that are not intended for use with Turing platforms in their cryptographically enhanced form. The augmentation is also intended to partially obscure the workings of the machine by introducing redundant states and transitions, without affecting the machine's functionality during any error-free execution. Therefore, augmentation may be beneficial also for Mealy and BSS' machines intended for use with Turing platforms in their cryptographically enhanced form. The augmented machine will be called M'. The augmentation is carried out using the following steps:

If M does not have an output symbol B reserved as a "blank" symbol (i.e., a symbol indicating that there is no semantic content), add a new symbol B (which cannot equal any symbol in $\Delta$) to the output alphabet $\Delta$, setting $\Delta'=\Delta\cup\{B\}$, otherwise set $\Delta'=\Delta$, and call B the previously reserved "blank" symbol (also referred to herein as the stopping state output symbol).

If M has a state $q\in Q$ such that for all inputs $\sigma\in\Sigma$ no pair $(q,\sigma)$ is contained in D, then call the state $q_a$ and define $Q'=Q$. If M has a state $q\in Q$ such that for all inputs $\Sigma\in\Sigma$, $\delta(q,\sigma)=q$, call the state $q_a$, set $\lambda(q,\sigma)=B$ for all inputs $\sigma\in\Sigma$, and define $Q'=Q$. Otherwise:
add a new state, such that $Q'=\{q_a\}\cup Q$,
for every node $q\neq q_a$ such that $\delta(q,\sigma)=q$ for all inputs $\sigma\in\Sigma$, set $\delta(q,\sigma)=q_a$ and $\lambda(q,\sigma)=B$ for every $\sigma\in\Sigma$.

Q' is the set of states of M'. The state $q_a$ hereinafter is referred to as "the augmentation state". M is the augmented Mealy machine.

The next step is to determine the number of elements in Q' and $\Delta$, and how they are to be represented using (possibly one-dimensional) vectors over the ring $Z_N$ of integers modulo N. This step determines the least possible selectable N. If the Mealy machine is to be represented using polynomials, N must be a prime number. If the Mealy machine is to be represented using function tables, N does not have to be a prime number. When N has been selected, the elements of Q' are given a representation in $Z_N^S$, $S\geq 1$ fixed. Similarly, the elements of $\Delta$ are represented by elements in $Z_N^O$, $O\geq 1$ fixed; and the elements of $\Sigma$ are represented by elements in $Z_N^I$, $I\geq 0$ fixed. Thus, $Q^L\subseteq Z_N^S$, $\Delta\subseteq Z_N^O$, and $\Sigma\subseteq Z_N^I$.

Set $\Delta'=\Delta$. The next step can be done in four different ways:
1. Nothing more is done to complete the state transition table of M', and the undefined entries are marked as such. This requires an additional table with flags, each flag marking whether a corresponding entry in the state transition table is defined or not. This may only be done if the Mealy machine is represented using polynomials.
2. If Q' contains a number of states less than that representable within $Z_N^S$, add dummy states to Q', until it contains $N^S$ states. If $\Sigma$ contains a number of inputs less than that representable within $Z_N^I$, add dummy input symbols to $\Sigma$' until it contains $N^I$ symbols. If $\Delta'$ contains a number of outputs less than that representable within $Z_N^O$, add dummy output symbols to $\Delta'$ until it contains $N^O$ symbols. For each pair $(q,\sigma)\notin D$, set $\delta'(q,\sigma)=q_a$ and $\lambda'(q,\sigma)=B$, where B is a fixed symbol chosen from the output alphabet.
3. If $Q\cup\{q_a\}$ contains a number of states less than that representable within $Z_N^S$, do the following until Q' contains $N^S$ states:
For a randomly chosen state $q\in Q$ (alternatively the current $Q'-\{q_a\}$) add a state q' to Q'.
For every input $\Sigma\in\Sigma$ set $\delta'(q',\sigma)=\delta(q,\sigma)$.
Optionally, one may also for every pair $(q,\sigma)\in Q'\times\Sigma$ such that $\delta(q,\sigma)=q$, randomly set $\delta'(q',\sigma)$ to q or q'.
If $\Sigma$ contains a number of inputs less than that representable within $Z_N^I$, add dummy input symbols to $\Sigma'$ until it contains $N^I$ symbols. If $\Delta'$ contains a number of outputs less than that representable within $Z_N^O$, add dummy output symbols to $\Delta'$ until it contains $N^O$ symbols. For each pair $(q,\sigma)\notin Q'\times\Sigma$, set $\delta'(q,\sigma)$ to a random $q'\in Q'$ and set $\lambda'(q,\sigma)$ to a random symbol from $\Delta'$.
4. If Q' contains a number of states less than that representable within $Z_N^S$, add dummy states to Q', until it contains $N^S$ states. If $\Sigma$ contains a number of inputs less than that representable within $Z_N^I$, add dummy input symbols to $\Sigma'$ until it contains $N^I$ symbols. If $\Delta'$ contains a number of outputs less than that representable within $Z_N^O$, add dummy output symbols to $\Delta'$ until it contains $N^)$ symbols. For each pair $(q,\sigma)\notin D$, set $\delta'(q,\sigma)$ equal to a random $q'\in Q'$ and set $\lambda'(q,\sigma)$ equal to a random symbol from the output alphabet.

Define the domain of M' to be $D'=Q'\times\Sigma'$. The resulting M' should now be somewhat differently from M, yet still compute the same function as M.

Three optional additional steps may be carried out, provided the augmentation made use of methods 2–4 above. Each of the options is independent of the others, so that any embodiment may elect to employ one of, two of, or all of the three steps described below.

First, it is possible to permute some or all of the states without affecting the computation carried out by M'. When interchanging a state q with q', $\delta'(q,\sigma)$ takes on the old value of $\delta'(q',\sigma)$ for every $\sigma\in\Sigma'$, and vice-versa. Similarly, $\lambda'(q,\sigma)$ takes on the old value of $\lambda'(q',\sigma)$ for every $\sigma\in\Sigma'$. The interchanges may be made one by one or may be entirely precomputed in the form of a permutation expressed using a function table.

Second, it is possible to permute part or all of the extended input alphabet $\Sigma'$. When interchanging a symbol $\sigma$ with $\sigma'$, $\delta'(q,\sigma)$ takes on the old value of $\delta'(q,\sigma)$ for every $q \in Q'$ and vice-versa. Similarly, $\lambda'(q,\sigma)$ takes on the old value of $\lambda'(q,\sigma')$ for every $q \in Q'$ and vice-versa. The interchanges may be made one by one or may be entirely precomputed in the form of a permutation expressed using a function table. These interchanges, however, must have corresponding interchanges in the output alphabet for any symbols used to represent state information. Changes must be made known to the host that is to execute the cryptographically enhanced Mealy machine if they affect inputs to be made by the host platform. Thus at some changes may have to be recorded during augmentation.

Third, it is possible to permute part or all of the extended output alphabet $\Delta'$. When interchanging a symbol x with another symbol x', every $\lambda'(q,\sigma)=x$ takes on the value x'. Similarly every $\lambda'(q,\sigma)=x'$ takes on the value x. Similar restrictions apply to this operation as with the permutation of the extended input alphabet. Changes must be made known to the host that is to execute the cryptographically enhanced Mealy machine if they affect outputs to the remote host platform. Thus at some changes may have to be recorded during augmentation.

Note that x, x', q, q', $\sigma$, $\sigma'$, $\lambda$, $\lambda'$, and $\delta'$ may or may not have vectorized representations. The act of permuting certain vector components of, say $\sigma$, is the same as selecting a subset of $\Sigma'$ which one intends to permute.

The next step is the specification of what will be called the full state vector of M. This vector is written:

$$(\vec{x}(i), \vec{z}(i), \vec{y}(i)) = (x_1(i), \ldots, x_S(i), z_1(i), \ldots, z_O(i), y_1(i), \ldots, y_I(i)),$$

where $\vec{x}(i)$ is a vector containing the state of the Mealy machine after i computation steps, $\vec{z}(i)$ is a vector containing the output after i computation steps, and $\vec{y}(i)$ is a vector containing the input given at the $i^{th}$ computation step. This is a notational convenience, which is adapted to the subsequent descriptions of the cryptosystem(s).

In some embodiments where the Mealy machine is represented using polynomials, the coefficients of the polynomials $$a_i(x) = \left(\prod_{i \in Z_N} \frac{x-k}{i-k}\right) \bmod N \tag{15}$$

for $i \in Z_N$ are precomputed and stored to improve efficiency. Note that henceforth, all computation is done modulo N.

It is possible to compute the polynomial mappings for M's represented with polynomials using interpolation as shown below:

$$\tilde{\delta}(\vec{x}, \vec{y}) = \sum_{(\vec{i},\vec{j}) \in D'} a_{i_1}(x_1) \cdots a_{i_S}(x_S) a_{j_1}(y_1) \cdots a_{j_I}(y_I) \delta'(\vec{x}, \vec{y}),$$

and $$\tilde{\lambda}(\vec{x}, \vec{y}) = \sum_{(\vec{i},\vec{j}) \in D'} a_{i_1}(x_1) \cdots a_{i_S}(x_S) a_{j_1}(y_1) \cdots a_{j_I}(y_I) \lambda'(\vec{x}, \vec{y})$$

The resulting machine is called $\overline{M}$.

Given $\overline{M}$'s state after n state-transitions, $\vec{x}(n)$, and the $(n+1)^{st}$ input $\vec{y}(n)$, the next state transition and output is computed by the mapping:

$$\tilde{\delta}_1(\vec{x}(n), \vec{y}(n)), \ldots, \tilde{\delta}_s(\vec{x}(n), \vec{y}(n)), \tag{16}$$
$$\tilde{\lambda}_1(\vec{x}(n), \vec{y}(n)), \ldots, \tilde{\lambda}_s(\vec{x}(n), \vec{y}(n)),$$

The computation of M' transformed is executed by iterating the mapping given in equation 16. This gives the relations (originally presented as equations (2)–(4)):

$$\vec{x}(n) = \begin{cases} \tilde{\delta}(\vec{x}(n-1), \vec{y}(n-1)), & \text{for } n > 0 \\ \text{given} & \text{for } n = 0 \end{cases} \tag{17}$$

$$\vec{z}(n) = \begin{cases} \tilde{\lambda}(\vec{x}(n-1), \vec{y}(n-1)), & \text{for } n > 0 \\ \text{given} & \text{for } n = 0 \end{cases} \tag{18}$$

$$\vec{y}(n) \text{ is given for } n \geq 0. \tag{19}$$

The original machines defined by Blum, Shub, and Smale are defined over a ring R, each having:

a state space $R^S$,
an output space $R^O$,
an input space $R^I$, and
a graph defining its computations, where S, O, and I are positive integers. The graph of any machine has four node variants, numbered by type in the list below:

1. Input node (node of type 1)

This node has one outgoing edge to the node numbered (n) and no incoming edges.

The number of the input node is n. Associated with this node is the injective input mapping $I: R^I \rightarrow R^S$. There is only one input node in any automaton over R.

2. Output node (node of type 2)

These nodes have one incoming edge, and no outgoing edges. The computation of the automaton is finished when an output node is reached. Each of these nodes has an output mapping $O_n: R^S \rightarrow R^O$, where n is the number of the node in question.

3. Computation node (node of type 3)

Each node of this type, numbered n, has one incoming and one out-going edge to node number $\beta(n)$. Each such node has a mapping $g_n: R^S \rightarrow R^S \cdot g_n$ is in general rational for R a field, and polynomial otherwise.

4. Branch node (node of type 4)

Each node number n of this type has one incoming edge, and two outgoing edges to the nodes numbered $\beta^-(n)$ and $\beta^+(n)$. Each such node has a polynomial or rational (for R a field) mapping $h_n: R^S \rightarrow R$. If R is an ordered ring, the automaton "moves" to node $\beta^-(n)$ when $h_n(\vec{x}) < 0$, $\vec{x} \in R^S$, and to node number $\beta^+(n)$ when $h_n(\vec{x}) \geq 0$. If R is not ordered, the automaton "moves" by convention to node $\beta^-(n)$ when $h_n(\vec{x}) = 0$ and to node number $\beta^+(n)$ when $h_n(\vec{x}) \neq 0$.

A BSS' machine "moves" by executing the following steps until it halts at an output node or cannot execute another computation step for some reason:

1. Compute the new state $\vec{x} \to g_n(\vec{x})$; and
2. Change "location" from node number n to the next node, which is node number $\beta(n)$, or one of $\beta^+(n)$ or $\beta^-(n)$ for a branch node.

The set of node numbers from 1 top can be written $\overline{N}$. A BSS machine thus has p nodes in all. The full state space of a Blum-Shub-Smale machine is then $\overline{N} \times R^S$. It is possible to express the computation of a Blum-Shub-Smale machine using only the "computing endomorphism"

$$H: \overline{N} \times R^S \to \overline{N} \times R^S.$$

The computing endomorphism generally has the form $$H(n, \vec{x}) = (\beta(n, \chi(\vec{x})), g_n(\vec{x})),$$

where $\beta$ is the next node function, computing the node the automaton is to "move" to when $g_n$ has been applied to the state vector $\vec{x}$. The sign function, denoted by $\chi(\vec{x})$, is defined as follows:

$$\chi(\vec{x}) = \begin{cases} 1, & x_1 > 0 \\ 1, & x_1 = 0 \\ -1, & x_1 < 0 \end{cases} \quad (20)$$

The next node function $\beta(n, \sigma): \tilde{N} \times \{-1, 0, 1\} \to \tilde{N}$ is in general $$\beta(n, \sigma) = \begin{cases} \beta(n), & n < p \text{ and } n \text{ is not a branch node} \\ \beta^+(n), & n \text{ is a branch node and } \sigma = 0, 1 \\ \beta^-(n), & n \text{ is a branch node and } \sigma = -1 \end{cases} \quad (21)$$

In an alternate embodiment, an additional constraint is added such that $\beta(p)$ must equal p.

In order to understand the extent of the modifications introduced later on, it is necessary to have an overview of the general functional composition of the computing endomorphism H. Fix a Blum-Shub-Smale machine M over $Z_N$ for a prime number N. When N is a prime number, $Z_N$ is finite field. Let B={branch nodes in M}, and let $a_i(x)$ be defined as $$a_i(x) = \left( \prod_{i \in \tilde{N}} \frac{x-k}{i-k} \right) \bmod N, \quad (22)$$

When $y \in \overline{N}$, $a_n(y)=1$ if and only if $n=y$, otherwise $a_n(y)=0$. For $y \notin \overline{N}$, $a_n(y)$ produces nonsense. It is necessary to know that $\beta(y, \sigma) = \beta(y, \chi(\vec{x}))$ is expressible as a polynomial, for which an expression can be found in the article by Blum, Shub, and Smale. When computing $\beta(y, \sigma)$ for a node, $\sigma = \chi(\vec{x})$ must be evaluated. Over a finite field it is possible to express $\chi$ as a polynomial.

A mapping $g(n, \vec{x}) = g_n(\vec{x})$ does all "useful" computation in M. Let $$g(y, \vec{x}) = \sum_{n \in \overline{N}} a_n(y) g_n(\vec{x}). \text{ Generally,}$$

$$g_n(\vec{x}) = \left( \frac{f_{n,1}(\vec{x})}{q_{n,1}(\vec{x})}, \frac{f_{n,2}(\vec{x})}{q_{n,2}(\vec{x})}, \frac{f_{n,3}(\vec{x})}{q_{n,3}(\vec{x})}, \ldots \right),$$

where $f_{n,i}(\vec{x})$ and $q_{n,i}(\vec{x})$ are polynomials in general. If n is a computation node, $f_{n,l}$ is a polynomial in $\vec{x}$ with its dimension bounded by the dim M, and degree bounded by deg M. If n is not a computation node, then $q_{n,i}(\vec{x}) \equiv 1$ and $p_n^l(\vec{x})$ is identical to the $l^{th}$ component of $\vec{x}$ for all l. It is then possible to express g(n, x) as:

$$g_n(\vec{x}) = \left( \frac{\sum_{n \in \overline{N}} a_n(y) f_{n,1}(\vec{x})}{\sum_{n \in \overline{N}} a_n(y) q_{n,1}(\vec{x})}, \frac{\sum_{n \in \overline{N}} a_n(y) f_{n,2}(\vec{x})}{\sum_{n \in \overline{N}} a_n(y) q_{n,2}(\vec{x})}, \ldots \right). \quad (23)$$

This gives the explicit expression for the computing endomorphism for M in the form $$H(n, \vec{x}) = (\beta(n, \chi(\vec{x})), g(n, \vec{x})). \quad (24)$$

At this stage, H is at best piecewise polynomial. In order to encrypt such a machine with polynomial mappings, it must be modified.

For adaption to encrypted computation, the following changes are made:
An integer N is selected using the following criteria:
1. N must be a prime number.
2. N must be at least as great as the number of nodes ($N \geq p$).
3. N must make allowance for any constants selected as important by the user, meaning that N must be greater than any such selected constant.
4. N must accommodate any other requirements on it imposed by the user, if possible.

R is restricted to the class of finite fields $R = Z_N$ for the selected N. This ensures that no polynomials over $Z_N$ have more than $N^l$ coefficients, where d is the number of variables of a given polynomial. This is due to the fact that for any $x \in Z_N$, $x^e = x^{e'}$ for some $e > N-1$ and $0 < e' \leq N$.

Each $g_n$ may only be polynomial, so each $q_{n,i} \equiv 1$.

By convention, nodes are numbered from 0 to p−1 instead of from 1 to p.

The full state space concept is changed to include both the input and output spaces, such that the full state space $Z$ is now:

$$S = Z_N \times Z_N^S \times Z_N^O \times Z_N^I$$

giving 1+S+O+I components in all.

Every mapping $g_n$ is the identity for all the last I components. This ensures that the machine cannot write to input.

No mapping $g_n$ may have as variables any of the components 1+S+1 to 1+S+O.

This ensures that no output is used in further computation.

All nodes accept input from the last I components in the full state vector $\vec{x} \in S$ without use of any special input mapping.

All nodes compute output to components number 1+S+1 through 1+S+O.

There are only two types of nodes:
1. computation nodes: these may contain a computation, and/or a branching; and
2. halting nodes: these nodes have at least two incoming edges (one from itself), and only one outgoing edge to itself.

As an option, one may explicitly list halting nodes of the machine, or define certain output symbols as "halting signals" (as per the symbol "B" for augmented Mealy machines), or do both.

Since the modified machines are constructed over $Z_N$, which contains only non-negative integers, the original version of the branch node becomes meaningless. Instead, the next-node function takes the form $\beta: \overline{N} \times Z_N \to \overline{N}$. To simplify, require $\overline{N} \subseteq Z_N$, even though one could make do with a smaller prime than some $N \geq p$ for the state-space. This implies that $\beta$ is extended to $\beta: Z_N^2 \to Z_N$.

The selected replacement relation for branch nodes is a series of relations of the type $\in K \subseteq (Z_N - \{0\})$. For each node n there is a list of mutually disjoint subsets of $Z_N - \{0\}$. Define $K_n$ to be the union of all $K_{nj}$. For any $K \subseteq Z_N - \{0\}$ define $$b_K(z) = \left(\prod_{i \in Z_N - K} (z-i)^{N-1}\right) \bmod N. \quad (25)$$

When $z \in Z_N$, $b_K(z)$ maps to 1 if any one if $z \in K$ and to 0 otherwise. The function $b_K$ exploits a property of elements of the finite multiplicative subgroup $Z_N^*$ of the finite field $Z_N$, which effectively implies $x^{N-1} = 1 \bmod N$. Since 0 is not in this subgroup, it does not satisfy this property, and thus cannot be included in K.

Let $B \subset Z_p$ be the set of all branch nodes. Using $b_K$, it becomes possible to express $\beta$ using a polynomial:

$$\beta(n, x) = \sum_{i=0}^{p-1} a_i(n) \Delta(i, x), \text{ where} \quad (26)$$

$$\Delta(i, x) = \begin{cases} \sum_{j=1}^{j_i} b_{K_{i,j}}(x) n_{i,j} + (1 - b_{K_n}(x)) n', & i \notin B \\ n'', & i \in B. \end{cases} \quad (27)$$

The constants n', n", and all $n_{ij}$ are all elements in $Z_p$, the node space. This enables the expression of the computing endomorphism of the BSS' machine as a polynomial over $Z_N$. Thus the computing endomorphism for the modified BSS' machine over $Z_N$ is:

$$H(n, \vec{x}) = \left(\beta(n, x_{c_i}), \sum_{i=0}^{p-1} a_i(n) g_i(\vec{x})\right), \quad (28)$$

where $1 \leq C_i \leq d$ is fixed for the node.

It is also possible to take a further step, using the resulting polynomial expression to fill in a function table for H, such that computation can be done by using the function table. Such a function table may have its entries and indices represented in any vectorization deemed convenient for the purposes of its application.

Let a mapping $f(x_1, \ldots, x_m) = (f_1(x_1, \ldots, x_m), \ldots, f_n(x_1, \ldots, x_m))$ be given as a table indexed by $(x_1, \ldots, x_m)$. The table entry $(f_1, \ldots, f_n)$ at $(x_1, \ldots, x_m)$ is the mapping evaluated at $(x_1, \ldots, x_m)$. Assume $f$ is a mapping from $Z_N^m$ to $Z_N^n$, where N, m and n are positive integers (that do not have to be prime numbers). Then $f$ can be completely defined by its function table.

The mapping $f$ is prepared for symbolic composition by generating a new function t: $Z_N^m \to Z_N^n$. Every entry $(f_1, \ldots, f_n)$ corresponding to $(x_1, \ldots, x_m)$ is placed in entry number $X = N^{m-1} x_m + \ldots + N^1 x_2 + x_1$ as the number $F = N^{n-1} f_n + \ldots + N^1 f_2 + f_1$. Note that X and F are both integers.

Let g be a mapping from $Z_N^n$ to $Z_N^O$ and $t_g$ be prepared for g as t was for $f$. Denote by $t_{g,f}$ the function table defining the composition of g with $f$. Symbolic composition of g with $f$ is done by setting $t_{g,f}(X) = t_g(t(X))$ for every $X \in Z_N^m$. Denote by $t_{fh}$ the function table defining the composition of $f$ with $h_1, \ldots, h_m$. Symbolic composition of $f$ with $h_1, \ldots, h_m$ is done by setting $t_{fh}(X) = t(N^{m-1} t(N^{m-1} t_m(X) + \ldots + N^1 t_2(X) + t_1(X))$ for every $X \in Z_N^m$.

After composition, the resulting function table may be converted back into a polynomial representation, provided N is a prime number. Given a function table t: $Z_N^m \to Z_N^n$, t may be converted into a polynomial as follows:

---

Create a table t' indexed by tuples on the form $(x_1, \ldots, x_m)$, whose entries are tuples on the form $(f_1, \ldots, f_n)$.
For every tuple of arguments, $(x_1, \ldots, x_m)$:
    compute $X = N^{m-1} x_m + \ldots + N^1 x_2 + x_1$.
    Set $F = t(X)$. Reduce F to a base-N representation, such that F is represented by a tuple $(f_1, \ldots, f_n)$.
    Set the tuple in t' indexed by $(x_1, \ldots, x_m)$ to $(f_1, \ldots, f_n)$.
Using t' as the interpolation data, one may optionally symbolically interpolate a polynomial to find the polynomial form of the function composition.

---

A function $f$ can also be composed with multivariate functions which do not have a number of variables directly corresponding to $f$s number of components or a number of components directly corresponding to $f$s number of variables. Let a mapping $f(x_1, \ldots, x_m) = (f_1(x_1, \ldots, x_m), \ldots, f_n(x_1, \ldots, x_m))$ be given as a table indexed by $(x_1, \ldots, x_m)$. The table entry $(f_1, \ldots, f_n)$ at $(x_1, \ldots, x_m)$ is the mapping evaluated at $(x_1, \ldots, x_m)$. Assume $f$ is a mapping from $Z_N^m$ to $Z_N^n$, where N, m and n are positive integers (that do not have to be prime numbers). Then $f$ can be completely defined by its function table.

The mapping $f$ is prepared for symbolic composition by generating a new function t: $Z_N^m \to Z_N^n$. Every entry $(f_1, \ldots, f_n)$ corresponding to $(x_1, \ldots, x_m)$ is placed in entry number $X = N^{m-1} x_m + \ldots + N^1 x_2 + x_1$ as the number $F = N^{n-1} f_n + \ldots + N_1 f_2' f_1$. Note that X and F are both integers. There are two cases to be considered:
1. the symbolic composition of $f$ with $h_1, \ldots, h_k$, using function tables, such that one computes $f(h_1(x_1, \ldots, x_{c_1}), h_2(x_{c_1+1}, \ldots, x_{c_1+c_2}), \ldots, h_k(x_{m-c_k+1}, \ldots, x_m))$, where $\Sigma_{i=1}^k c_i = m$, every, $c_i$ being a positive integer, and 2. the symbolic composition of $h_1, \ldots, h_k$ with $f$, using function tables, such that one computes $(h_1(f_1(x_1, \ldots, x_m), \ldots, f_{c_1}(x_1, \ldots, x_m)), \ldots, h_k(f_{n-c_k+1}(x_1, \ldots, x_m), \ldots, f_n(x_1, \ldots, x_m)))$, where $\Sigma_{i=1}^k c_i = n$, every, $c_i$ being a positive integer.

For case 1, denote by $t_{fh}$ the function table defining the composition of $f$ with $h_1, \ldots, h_k$. The mappings $h_i: Z_N^{c_i} \to Z_N$ are prepared for composition by computing a function table $t_{h,i}: Z_{N^c} \to Z_{N^i}$, where every mapping value $(h_{i,1}, \ldots, h_{i,c_i})$ corresponding to a $(x_{a+1}, \ldots, x_{a+c_i})$, where $a = \Sigma_{j=1}^{i-1} c_j$, is placed in entry number $X = N^{c_i-1}x_{a+c_i} + \ldots + N^1 x_{a+2} + x_{a+1}$ as the number $H = N^{c_i-1}h_{i,c_i} + \ldots + N^1 h_{i,2} + h_{i,1}$.

The symbolic composition of $f$ with $h_1, \ldots, h_k$ is done as follows:

---

For every i from 1 to k set $y_i = N^{c_i}$.
Set a vector $(b_1, \ldots, b_k)$ to $(0, \ldots, 0)$ and reserve a vector $(b_1', \ldots, b_k')$.
For every i from 0 to $N^m$ do:
    Set u = 0.
    For every j from k to 1 do:
        Set $b_j' = t_{h,j}(b_j)$.
        Multiply u by $y_j$.
        Add $b_j'$ to u.
    Set $t_{fh}(i)$ to $t_f(u)$.
    Increment the vectorized index $(b_1, \ldots, b_k)$, taking into account that $b_1$ is in base $y_1$, $b_2$ is in base $y_2$, ..., $b_k$ is in base $y_k$.

---

After the composition, the resulting function table may be optionally be converted into a polynomial representation. This procedure is identical to that described above for the previously discussed function table compositions.

For case 2, denote by th $f$ the function table defining the composition of $f$ with $h_1, \ldots, h_k$. The mappings $h_i: Z_N^{c_i} \to Z_N^{c_i}$ are prepared for composition by computing a function table $t_{h,i}: Z_N^{c_i} \to Z_N^{c_i}$, where every mapping value $(h_{i,1}, \ldots, h_{i,c_i})$ corresponding to a $(x_{a+1}, \ldots, x_{a+c_i})$, where $a = \Sigma_{j=1}^{i-1} c_j$, is placed in entry number $X = N^{c_i-1}x_{a+c_i} + \ldots + N^1 x_{a+2} + x_{a+1}$ as the number $H = N^{c_i-1}h_{i,c_i} + \ldots + N^1 h_{i,2} + h_{i,1}$.

The symbolic composition of $h_1, \ldots, h_k$ with $f$ is done as follows:

---

Set $y_1 = 1$;
For every i from 2 to k set $y_i = y_{i-1} N^{c_i-1}$.
Set a vector $(b_1, \ldots, b_k)$ to $(0, \ldots, 0)$ and reserve a vector $(b_1', \ldots, b_k')$.
For every i from 0 to $N^n$ do:
    Set $u = t_f(i)$.
    Set q = 0.
    For every j from k to 1 do:
        Set p to the integer result of $u/y_j$.
        Set $u = u - py_j$.
        Set $b_j$ to $t_{h,j}(u)$.
        Add $y_j b_j$ to q
    Set $t_{hf}(i)$ to q.

---

A function $f$ can also be composed with multivariate functions that do not have a number of variables directly corresponding to $f$s number of components or a number of components directly corresponding to $f$s number of variables, and that in addition may "reuse" one or more variables. Thus each variable may be used in more than one mapping $h_i$, and there is no explicit requirement that any given variable be used at all by any of the $h_i$. Let a mapping $f(x_1, \ldots, x_m) = (f_1(x_1, \ldots, x_m), \ldots, \eta_n(x_1, \ldots, x_m))$ be given as a table indexed by $(x_1, \ldots, x_m)$. The table entry $(f_1, \ldots, f_n)$ at $(x_1, \ldots, x_m)$ is the mapping evaluated at $(x_1, \ldots, x_m)$. Assume $f$ is a mapping from $Z_N^m$ to $Z_N^n$, where N, m and n are positive integers (that do not have to be prime numbers). Then $f$ can be completely defined by its function table.

The mappings $f$ may in some embodiments be prepared for symbolic composition by generating a new function $t: Z_{N^m} \to Z_{N^n}$ as for previously described methods of composition. The mappings $h_1, \ldots, h_k$ may be prepared similarly for some embodiments. As earlier, $\vec{w}_i$ denotes $i^{th}$ group of variables. There are two cases to be considered:

1. the symbolic composition of $f$ with $h_1, \ldots, h_k$, using function tables, such that one computes $f(h_1(x_{e(1,1)}, \ldots, x_{e(1,d_1)}), \ldots, h_k(x_{e(k,1)}, \ldots, x_{e(k,d_k)}))$, where $\Sigma_{i=1}^k c_i = m$, every $c_i$ being a positive integer, each $d_i \geq 1$, $e(i,j)$ is the index of the variable "originally fed to $f$" fed into the $j^{th}$ variable in mapping $h_i$; and 2. the symbolic composition of $h_1, \ldots, h_k$ with $f$, using function tables, such that one computes $$(h_1(f_{e'(1,1)}(x_1, \ldots, x_m), \ldots, f_{e'(1,c_1)}(x_1, \ldots, x_m), x_{e(1,1)}, \ldots, x_{e(1,d_1)}), \ldots, h_k(f_{e'(k,1)}(x_1, \ldots, x_m), \ldots, f_{e'(k,c_k)}(x_1, \ldots, x_m), x_{e(k,1)}, \ldots, x_{e(k,d_k)})),$$

where each $c_i \geq 1$, $e'(i,j)$ is the index of a component of $f$, each $d_i \geq 1$, $e(i,j)$ is the index of the variable "originally fed to $f$" fed into the $j^{th}$ variable in mapping $h_i$.

For case 1, denote by $t_{fh}$ the function table defining the composition of $f$ with $h_1, \ldots, h_k$. The symbolic composition of $f$ with $h_1, \ldots, h_k$ is done as follows:

---

Set a vector $(a_1, \ldots, a_m)$ to $(0, \ldots, 0)$.
For every i from 0 to $N^m$ do:
    For every j from k to 1 compute $h_j(a_{e(j,1)}, \ldots, a_{e(j,d_j)})$;
    set $t_{fh}(a_1, \ldots, a_m) = f(h_1, \ldots, h_k)$;
    Increment the vectorized index $(a_1, \ldots, a_m)$.

---

After the composition, the resulting function table may be optionally be converted into a polynomial representation. This procedure is identical to that described above for the previously discussed function table compositions, and requires that N be a prime number. This composition method has many different potential embodiments, depending on the context in which the method is used. An example is the method of parameterized encryption of the register machine, presented later on, where this method is incorporated into the method of encryption in a highly specialized version.

For case 2, denote by $t_{hf}$ the function table defining the composition of $f$ with $h_1, \ldots, h_k$. As with the variables in case 1, there is no explicit requirement that all components of $f$ must be used. Also they may be used by more than one $h_i$ mapping.

The symbolic composition of $h_1, \ldots, h_k$ with $f$ is done as follows:

```
Set a vector (a_1, ..., a_m) to (0, ..., 0).
For every i from 0 to N^m do:
    For every j from k to 1 compute
    h_j(f_e'(j,1), ..., f_e'(j,e_j), x_e(j,1), ..., x_e(j,d_j))
    Set t_hf(a_1, ..., a_m) = (h_1, ..., h_k).
    Increment the vectorized index (a_1, ..., a_m).
```

As with the previous case, the result of this composition can be converted into a polynomial, provided N is a prime number. Also this method of composition can be highly specialized, with actual embodiment characteristics depending on application context. In addition to using the composition method of the previous case, the parameterized encryption method also makes use of this composition method, and is an example of a specialized embodiment of the method.

The method of encryption of polynomial mappings using univariate polynomials uses key pairs described by a prime number N and key pairs $(r_i, s_i)$. The number N is given by the specification of the mapping to be encrypted. Each key pair $r_i$ and $s_i$ are univariate polynomials computing non-linear permutations of $Z_N$ such that $s_i(r_i(x))=x$ for $x \in Z_N$. From the particular properties of the field $Z_N$, $r_i$ and $s_i$ are always uniquely expressible as polynomials over $Z_N$ with at most N non-zero coefficients. Equal key pairs are allowed, such that for some i and some $j \neq i$, $r_i=r_j$ and $s_i=s_j$. The user may also choose to let some pairs be the identity mapping x, such that $r_i=s_i=x$. All apparatus for computations described below may or may not make use of precomputed tables for one or more of the following operations, dependent on what the most efficient means of computation for any given operational environment is:

addition modulo N
subtraction modulo N
incrementation modulo N
exponentiation modulo N
multiplication modulo N
multiplicative inversion modulo N One assumes the user has a source of random numbers (or pseudo-random numbers with period much greater than $N^N$). The number of key pairs $(r_i, s_i)$ to be generated is dependent on the number of function components and variables in the plaintext mapping.

In one embodiment, the coefficients of the functions $$a_k(x) = \prod_{0 \leq j < N, j \neq k} \frac{x-j}{k-j}$$

are precomputed modulo N using an algorithm based on Horn polynomial evaluation and stored in a two-dimensional array $a(k,j)$, where $0 \leq k < N$ gives the function subscript, and $0 \leq j < N$ the individual coefficient. In an alternate embodiment, the coefficients are calculated as needed.

The procedure then generates pairs $(r_i, s_i)$ for those key pairs not chosen to be the identity mappings, and those not copied from previously generated key pairs (because they are chosen to be equal).

Accordingly, for each pair, let R and S be arrays of N numbers in $Z_N$ indexed from 0 to N−1. Every element of S is initiated to the negative integer −1. For every $0 \leq k < N$ a random number $j \in S_N$ is generated until $S(j)=-1$. Then one sets $R(k)=j$ and $S(j)=k$.

The encryption key $r_i(x)$, which is a univariate polynomial, is then symbolically interpolated using the array R according to the expression:

$$r_i(x) = \sum_{j=0}^{N-1} a_j(x) R(j).$$

Thus the $k^{th}$ coefficient is computed as the $$\left(\sum_{j=0}^{N-1} a(j,k) R(j)\right) \bmod N$$

Similarly, the decryption key $s_i(x)$ is interpolated using the array S according to the expression:

$$s_i(x) = \sum_{j=0}^{N-1} a_j(x) S(j).$$

The coefficients of $s_i$ are computed in the same manner as for $r_i$. If $r_i$ and $s_i$ are linear, the procedure is repeated until $r_i$ is non-linear or a preset limit for generation attempts is exceeded.

Only polynomial mappings in the form $h: Z_N^d \to Z_N^e$ where $h(x_1, ..., x_d) = (h_1(x_1, ..., x_d), ..., h_e(x_1, ..., x_d))$ may be encrypted. Prior to encryption, one must decide which $x_i$ to decrypt. Let $I \subseteq \{e+1, ..., e+d\}$ be this set. In addition, one must decide which mapping components to encrypt. Let $J \subseteq \{1, ..., e\}$ be this set. All keypairs $(r_i, s_i)$ such that $i \notin I \cup J$ are then set to the identity mapping x.

Encryption is achieved by replacing each $x_j$ where $(j+e) \in I$, with $s_{j+e}(x_j)$, and each $h_i()$ where $i \in J$ with $r_i(h_i(...))$, such that one composes $r_i$ with $h_i$ symbolically. The resulting expression will be:

$$(r_1(h_1(s_{e+1}(x_1), ..., s_{e+d}(x_d))), ..., r_e(h_e(s_{e+1}(x_1), ..., s_{e+d}(x_d)))).$$

The mapping h is thus encrypted with the key pairs $(r_1, s_1), ..., (r_{e+d}, s_{e+d})$ using symbolic function composition. This results in a polynomial mapping:

$$H(x_1, ..., x_d) = (H_1(x_1, ..., x_d), ..., H_e(x_1, ..., x_d)).$$

where inputs with index in I are taken in encrypted form and decrypted, and other inputs are taken in plaintext form. The original computation h is applied, and components in J are output in encrypted form, while the rest are output as plaintext.

Decryption is not meant to be performed on encrypted polynomial mappings, only encrypted data. A datum $x \in Z_N$ is encrypted by applying r, giving $y=r(x)$. Similarly, an encrypted datum y is decrypted by applying s, giving $x=s(y)$.

In particular, the expressions for the partial encryptions of Mealy machines will in general be in the form given in equation (6), duplicated below with the I index in the original equation replaced by L:

$$(E_{r,s} \circ H)(\vec{x}(n+1), \vec{z}(n+1)) = r_1(\tilde{\delta}_1(S_1(x_1(n)), \ldots, s_S(x_S(n))),$$
$$s_{2S+O+1}(y_1(n)), \ldots, s_{2S+O+L}(y_L(n))), \ldots,$$
$$r_S(\tilde{\delta}_S(S_1(x_1(n)), \ldots, s_S(x_S(n))),$$
$$s_{2S+O+1}(y_1(n)), \ldots, s_{2S+O+L}(y_L(n))), \ldots,$$
$$r_{S+1}(\tilde{\lambda}_1(S_1(x_1(n)), \ldots, s_S(x_S(n))),$$
$$s_{2S+O+1}(y_1(n)), \ldots, s_{2S+O+L}(y_L(n))), \ldots,$$
$$r_{S+O}(\tilde{\lambda}_1(S_1(x_1(n)), \ldots, s_S(x_S(n))),$$
$$s_{2S+O+1}(y_1(n)), \ldots, s_{2S+O+L}(y_L(n)))).$$

In the above equation, the $r_i$s and $s_i$s are key pairs as above in this sub-subsection, except that I and J may now contain indexes pointing to components formally given in different vectors.

For a BSS' machine, the resulting expression for the partially encrypted machine is of the form given in equation (7), duplicated below with the I index in the original equation replaced by L:

$$\vec{x}(n+1) = (E_{r,s} \circ H)(\vec{x}(n))$$
$$= r_1(H_1(s_1(x_1(n)), \ldots, s_{1+S}(x_{1+S}(n)),$$
$$s_{1+S+O+S+O+2}(x_{S+O+2}(n)), \ldots,$$
$$s_{1+S+O+S+O+L+1}(x_{S+O+L+1}(n)), \ldots,$$
$$r_{1+S+O}(H_{1+S+O}(s_1(x_1(n)), \ldots, s_{1+S}(x_{1+S}(n)),$$
$$s_{1+S+O+S+O+2}(x_{S+O+2}(n)), \ldots,$$
$$s_{1+S+O+S+O+L+1}(x_{S+O+L+1}(n))))$$

In the above equation, the $r_i$s and $s_i$s are key pairs as described above.

In a method of re-encrypting polynomial mappings partially encrypted with univariate polynomials, let $f$ be a mapping with n functional components expressed as polynomials in m variables. Assume $f$ is partially encrypted using the key pairs $(r_1, s_1), \ldots, (r_{n+m}, s_{n+m})$, such that $E_{r,s} \circ f$ may be written in the form given in equation (5).

Re-encryption is achieved by:
1. generating a new set of key pairs $(r_1', s_1'), \ldots, (r_{n+m}', s_{n+m}')$ possibly subject to the same constraints of the original encryption of $f$,
2. for every $1 \leq i \leq n+m$ symbolically composing $r_i'$ with $s_i$ to generate $r_i'(s_i(x))$,
3. for every $1 \leq i \leq n+m$ symbolically composing $r_i$ with $s_i'$ to generate $r_i(s_i'(x))$,
4. for every variable $x_i$, $n < i \leq n+m$, symbolically substituting $x_i$ with $r_i(s_i'(x))$, and
5. for every function component $f_p$, $1 \leq i \leq n$, symbolically composing $r_i'(s_i(x))$ with $r_i(f_i(\ldots))$.

The method of encryption of Mealy machines with permutations of $Z_N$, defined using state transition mappings and output mappings, uses function tables to express the state transition mappings and the encryption and decryption functions. The method uses key pairs $(r_i, s_i)$ are permutations of $Z_N$. The state transition mapping is $\delta'$, and the output mapping is $\lambda'$.

This method can encrypt mappings of the form: $(\delta', \lambda')$: $Z_N^{S+I} \to Z_n^{S+O}$, with corresponding function table $t_h$ effectively representing a function: $t_h: Z_N^{S+I} \to Z_N^{S+O}$.

To simplify notation consider $(\delta', \lambda')$ as the mapping $h(x_1, \ldots, x_d) = (h_1(x_1, \ldots, x_d), \ldots, h_e(x_1, \ldots, x_d))$, where $d = S+I$, and $e = S+O$. The actual order of the components of $\delta'$ and $\lambda'$ in h may vary from embodiment to embodiment. Prior to encryption, one must decide which $x_i$ to decrypt. Let $K \subseteq \{e+1, \ldots, e+d\}$ be this set. In addition, one must decide which mapping components to encrypt. Let $J \subseteq \{1, \ldots, e\}$ be this set. All key pairs $(r_i, s_i)$ such that $i \in K \cup J$ are then generated. Different pairs of keys may or may not be equal, depending on choices made by the user. Thus it is possible to have $r_i = r_j$ and $s_i = s_j$ for some $i \neq j$. Key pairs $(r_i, s_i)$ such that $i \notin K \cup J$ are meant to be identity mappings, and are left unused by the method described here.

Key generation is done as with encryption using univariate polynomials. For each $i \in K \cup J$ do the following:

For every j from 0 to N − 1 set $s_i(j) = -1$.
For every k from 0 to N − 1:
    Generate a random number $j \in Z_N$ until $s_i(j) = -1$.
    Set $r_i(k) = j$ and $s_i(j) = k$.
Encryption is achieved as follows:
Reserve a temporary table $t_h'$ defining a function $t_h': Z_N^{S+I} \to Z_{N_S+0}$.
Initialize a vector $(x_1, \ldots, x_d)$ to $(0, \ldots, 0)$.
First do symbolic composition of the inputs assumed to be encrypted with the relevant decryption functions (using function tables). For every i from 0 to $N^d − 1$ do:
    Set k = 0.
    Partially decrypt $(x_1, \ldots, x_d)$ by doing for every j from d to 1:
        if $j + e \ominus K$, then set $y_j = s_{j+e}(x_j)$ otherwise set $y_j = x_j$
        Set $k = kp + y_j$
    Set $t_h'(k) = t_h(i)$.
    Increment the vector x as if it were a number in base-N representation.
The powers $N^1, \ldots, N^{d-1}$ may optionally be precomputed at this point, any previous point in this method, or may be read from a table precomputed independently of this particular method.
Second: symbolic composition of the outputs that are to be encrypted with the relevant encryption functions (using function tables). For every i from 0 to $N^d − 1$ do:
    Set $k = t_h'(i)$.
    Compute a vector $(x_1, \ldots, x_d)$ from k.
    For every j from d to 1 do:
        if $j \in J$, then set $y_j = r_j(x_j)$ otherwise set $y_j = x_j$
    Evaluate $(y_1, \ldots, y_d)$ as digits of a number in base-N representation to give the number m.
    Set $t_h'(i) = m$.
Lastly, copy the function table of $t_h'$ to the function table of $t_h$.

Re-encryption is identical to the method for the direct polynomial representations, except that all mappings are always represented as function tables:
1. Generate a new set of key pairs $(r_1', s_1'), \ldots, (r_{n+m}', s_{n+m}')$, possibly subject to the same constraints applied to the original encryption of h.
2. For every $1 \leq i \leq n+m$ symbolically composing $r_i'$ with $s_i$ to generate the function table for $r_i'(s_i(x))$.
3. For every $1 \leq i \leq n+m$ symbolically composing $r_i$ with $s_i'$ to generate the function table for $r_i(s_i'(x))$.
4. For every variable $x_i$ in h where $n < i \leq n+m$, symbolically substituting $x_i$ with $r_i(s_i'(x))$.
5. For every function component $h_i$, $1 \leq i \leq n$, symbolically composing $r_i'(s_i(x))$ with $r_i(f_i(\ldots))$.

The method of encryption of polynomial mappings using multivariate polynomials uses key triples $(c_i, r_i, s_i)$ with the following properties:

1. $c_i$ is an integer such that $c_i \geq 1$
2. $r_i$ and $s_i$ are bijections (permutations) from $Z_N{}^{C}{}_i$ to $Z_N{}^{C}{}_i$, where N is a prime number given by the specification of the machine to be encrypted.
3. $r_i$ and $s_i$ are selected so they are non-linear.
4. Each component $r_{i,j}$ of $r_i$ and $s_{i,j}$ of $s_i$ is expressed as a multivariate polynomial from $Z_N{}^c{}_i$ into $S_N$.

The mappings $r_i$ are the encryption mappings, and are written $$r_i(x_1, \ldots, x_{c_i}) = (r_{i,1}(x_1, \ldots, x_{c_i}), \ldots, r_{i,c_i}(x_1, \ldots, x_{c_i})).$$

The mappings $s_i$ are the decryption mappings, and are written $$s_i(x_1, \ldots, x_{c_i}) = (s_{i,1}(x_1, \ldots, x_{c_i}), \ldots, s_{i,c_i}(x_1, \ldots, x_{c_i})).$$

Different $c_i$s may be chosen to be equal such that for some $i$ and some $j \neq i$, $c_i = c_j$. Furthermore, if $c_i = c_j$ for some $j \neq i$, then one may choose to set $r_i = r_j$ and $s_i = s_j$. Also, $r_i$ and $s_i$ may in general be set to the identity mapping $(x_1, \ldots, x_{c_i})$ for one or more i.

From the particular properties of the field $Z_N$, it follows that $r_i$ and $s_i$ are always uniquely expressible as polynomials over $Z_N$ with at most $N^{C_i}$ non-zero coefficients.

All apparatus for computations described below may or may not make use of precomputed tables for one or more of the following operations, dependent on what the most efficient means of computation for any given operational environment is:

addition modulo N
subtraction modulo N
incrementation modulo N
exponentiation modulo N
multiplication modulo N
multiplicative inversion modulo N The number N is given by the specification of the mapping to be encrypted. It is assumed that the user has a source of random numbers (or pseudo-random numbers with period much greater than $N^{N^2}$. The selection of block sizes $c_i$ are specified by the user. When this is done, the number of triples ($c_i$, $r_i$, $s_i$) to be generated is dependent on the number of function components and variables in the plaintext mapping.

In one embodiment of the present invention, next the coefficients of the functions $$a_k(x) = \left( \prod_{0 \leq j < N, j \neq k} \frac{x-j}{k-j} \right) \bmod N$$

are precomputed using an algorithm based on Horn polynomial evaluation and stored in a two-dimensional array a(k,j), where $0 \leq k < N$ gives the function subscript, and $0 \leq j < N$ the individual coefficient. In an alternate embodiment, the coefficients are computed as needed.

The procedure then generates triples ($c_i$, $r_i$, $s_i$), for those triples not chosen to be the identity mappings, and those not copied from previously generated triples (because they are chosen to be equal).

Accordingly, for each triple, select $c_i$, and let R and S be arrays of $N^{C_i}(c_i+1)$ numbers in $Z_N$ indexed by two indexes: the first from 0 to $N^{c_i}-1$, the second from 0 to $c_i$. Every element S(k, 0) is initiated to the negative integer "-1".

For every k such that $0 \leq k < N^{c_i}$, the following steps are executed:

1. A random number $j \in Z_N{}^{c_i}$ is generated until $S(j) = -1$.
2. R(k, 0) is set equal to j and S(j, 0) is set equal to k.
3. The base-N representation of k is computed and stored in S(j, 1) to S(j, $c_i$).

This is the $c_i$-tuple or -vector, which k represents. This will be used to symbolically compute the polynomial mappings of $s_i$.

4. The base-N representation of j is computed and stored in R(k, 1) to R(k, $c_i$).

This will be used to symbolically compute the polynomial mappings of $r_i$

Let the polynomial $f$ be given as $$f(l_1, \ldots, l_{c_i}) = \sum_{k=0}^{c_i-1} N^k l_{k+1}.$$

$f$ converts a base-N index vector with $c_i$ components to one index integer $0 \leq l < N^{c_i}$.

The encryption key $r_i(\vec{x})$, which is a vector of multivariate polynomials is symbolically interpolated using the array R according to the expression:

$$r_{i,j}(x_1, \ldots, x_{c_i}) = \sum_{\vec{l} \in Z_N^{c_i}} a_{l_1}(x_1) \cdots a_{l_{c_i}}(x_{c_i}) R(f(\vec{l}), j)).$$

Similarly, the decryption key $s_i(\vec{x})$ is symbolically interpolated using the array S according to the expression:

$$s_{i,j}(x_1, \ldots, x_{c_i}) = \sum_{\vec{l} \in Z_N^{c_i}} a_{l_1}(x_1) \cdots a_{l_{c_i}}(x_{c_i}) S(f(\vec{l}), j)).$$

The process of encryption and decryption is ellaborated below. Assuming series of triples $(c_1, r_1, s_1), \ldots, (c_k, r_k, s_k)$, and letting h be a polynomial plaintext mapping $$h: Z_N{}^d \to Z_N{}^e,$$

creates $$H(x_1, \ldots, x_d) = (H_1(x_1, \ldots, x_d), \ldots, H_e(x_1, \ldots, x_d)),$$

It is possible to partially encrypt h using the given series of key triples, provided 1. there exists some l such that $1 \leq l < k$ and $\Sigma_{j=1}^{l} c_j = e$,
2. $\Sigma_{j=l+1}^{k} c_j = d$, As a convention, the function components of h are grouped in groups of $c_1, \ldots, c_l$ components. That is: the first group contains $c_1$ function components, the second $c_2$ components, etc. up to the $l^{th}$ group, which contains the last $c_l$ components of h. The $j^{th}$ group of function components may for brevity's sake be written $v_j$ in the following, where $$v_j = (h_{a+1}, \ldots, h_{a+c_j}), a = \sum_{b=1}^{j-1} c_b.$$

Similarly, the variables are grouped in groups of $c_{l+1}, \ldots, c_k$ variables, such that the first group contains $c_{l+1}$ variables, the second $c_{l+2}$ variables, and so on to the last group, which contains $c_k$ variables. The $j^{th}$ group of variables may for brevity's sake be written $\vec{w}_J$ in the following.

Prior to encryption, one must decide which groups $\vec{w}_j$ of variables to decrypt. Let $I \subseteq \{l+1, \ldots, k\}$ be the set of indexes of variable groups to decrypt. In addition, one must decide which groups $v_j$ of function components to encrypt. Let $J \subseteq \{1, \ldots, l\}$ be the set of indexes of function component groups to encrypt.

Encryption is then achieved by replacing each group of variables $\vec{w}_j$ where $j+l \in I$ by the mapping $s_{l+j}(\vec{w}_j)$, and each group of function components $v_j$ where $j \in J$ with $r_j(v_j(\ldots))$ such that one composes $r_j$ with $v_j$ symbolically. The resulting expression will be:

$$(r_1(v_1(s_{l+1}(\vec{w}_1), \ldots, s_k(\vec{w}_{k-l}))), \ldots, r_l(v_l(s_{l+1}(\vec{w}_1), \ldots, s_k(\vec{w}_{k-l})))),$$

which, when written out, is:

$$(r_1(h_1 s_{l+1}(x_1, \ldots, x_{c_{l+1}}), \ldots, s_k(x_{d-c_{k+1}}, \ldots, x_d)), \ldots,$$
$$h_{c_1}(s_{l+1}(x_1, \ldots, x_{c_1}), \ldots, s_k(x_{d-c_{k+1}}, \ldots, x_d))), \ldots,$$
$$(r_l(h_{c_{l-1}}(s_{l+1}(x_1, \ldots, x_{c_{l+1}}), \ldots, s_k(x_{d-c_{k+1}}, \ldots, x_d)), \ldots,$$
$$h_l(s_{l+1}(x_1, \ldots, x_{c_1}), \ldots, s_k(x_{d-c_{k+1}}, \ldots, x_d))))$$

Inputs in a group whose indexes are in I are taken in encrypted form and decrypted before use, while the other inputs are already in plaintext form. The original mapping is applied to the decrypted and plaintext inputs, before those components in a group whose index is in J are encrypted. The remaining components are output as plaintext.

Decryption is not meant to be performed on partially encrypted polynomial mappings, only on encrypted data. A datum $\vec{w}_i \in Z_N^{c_i}$ is encrypted by applying $r_i$, giving $\vec{y}_i = r_i(\vec{w}_i)$. Similarly, an encrypted datum $\vec{y}_i$ is decrypted by applying $s_i$, giving $\vec{w}_i = s_i(\vec{y}_i)$.

The partially encrypted state and output data after n applications of H (for the Mealy machine) is written $$(\vec{w}_1(n), \ldots, \vec{w}_{k-l}(n)).$$

The general expression for a partially encrypted Mealy machine may be written as in equation (11), duplicated here:

$$\vec{x}(n+1), \vec{z}(n+1)) = (E_{r,s} \circ H)(\vec{x}(n), \vec{y}(n)) \quad (29)$$
$$= (r_1(\tilde{\delta}_1(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))), \ldots,$$
$$\tilde{\delta}_{c_1}(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n)))), \ldots,$$
$$(r_{\tilde{l}}(\tilde{\delta}_{D-c_{\tilde{l}}+1}(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))), \ldots,$$
$$\tilde{\delta}_D(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n)))),$$
$$r_{\tilde{l}+1}(\tilde{\lambda}_1(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))), \ldots,$$
$$\tilde{\lambda}_{c_{\tilde{l}+1}}(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n)))), \ldots,$$
$$r_l(\tilde{\lambda}_{O-c_{\tilde{l}}+1}(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))), \ldots,$$
$$\tilde{\lambda}_O(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))))$$

or as in equation (12), duplicated here:

$$E_{r,s}(\vec{x}(n+1), \vec{z}(n+1)) = (E_{r,s} \circ H)(\vec{x}(n), \vec{y}(n)) \quad (30)$$
$$= (r_1(\tilde{\delta}_1(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))), \ldots,$$
$$\tilde{\delta}_{c_1}(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n)))), \ldots,$$
$$(r_{\tilde{l}}(\tilde{\delta}_{D-c_{\tilde{l}}+1}(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))), \ldots,$$
$$\tilde{\delta}_S(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))),$$
$$r_{\tilde{l}+1}(\tilde{\lambda}_1(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))), \ldots,$$
$$\tilde{\delta}_{D-S}(s_1(\vec{w}_1(n)), \ldots, s_{l+\tilde{l}+1}(\vec{w}_{\tilde{l}+1}(n)),$$
$$s_k(\vec{w}_{k-l}(n)))), \ldots,$$
$$r_l(\tilde{\lambda}_{O-c_{\tilde{l}}+1}(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))), \ldots,$$
$$\tilde{\lambda}_O(s_1(\vec{w}_1(n)), \ldots, s_{\tilde{l}}(n)),$$
$$s_{l+\tilde{l}+1}(\vec{w}_{\tilde{l}+1}(n)), \ldots, s_k(\vec{w}_{k-l}(n))))$$

In both the above equations $\tilde{l}$ is such that $D = \sum_{j=1}^{\tilde{l}} c_j \geq S$, and $D - c_{\tilde{l}} < S$. The number of mapping components is $S+O$: $S$ in the next-state mapping $\tilde{\delta}$, and $O$ in the output mapping $\tilde{\lambda}$. The first equation is for the case where $D=S$, and the second for the case where $D>S$. The $r_i$s and $s_j$s are the encryption keys in the triples chosen during key generation.

For the BSS' machines, the resulting expression resembles the above expressions, but is slightly simpler.

There is one variable vector $\vec{x}(n)$ with $1+S+O+I$ components. H has $1+S+O$ components. As with the Mealy machine, the triples $(c_i, r_i, s_i)$ must equal $(c_{l+i}, r_{l+i}; s_{l+i})$ for $1 \leq i \leq \tilde{l}$, where $\tilde{l}$ is such that $\sum_{j=\tilde{l}}^{\tilde{l}} c_j \geq 1+S$ and $\sum_{j=1}^{\tilde{l}-1} c_j < 1+S$.

Set $D=\Sigma_{j=1}^{l} c_j$. In any case, D may not exceed the number of variables, so in the case where there are more function components than variables, there may be function components free of such restrictions when deciding upon triples for encryption. The partially encrypted state and output data after n applications of H is defined as $$(\vec{w}_1(n), \ldots, \vec{w}_{k-l}(n)).$$

The partially encrypted version of H for a modified BSS' machine is defined as equation (13).

It is also possible to re-encrypt polynomial mappings partially encrypted with multivariate polynomial mappings. Let $f$ be a mapping with n functional components expressed as polynomials in m variables. Assume $f$ is partially encrypted using the key triples $(c_1, r_1, s_1), \ldots, (c_k, r_k, s_k)$, such that $E_{r,s} \circ f$ may be written in the form given in equation (9). Note in particular that there are l groups/blocks of function components and k–l groups/blocks of variables.

Re-encryption is achieved by:
1. generating a new set of key triples $(c_1, r_1', s_1'), \ldots, (c_k, r_k', s_k')$, such that block sizes are preserved, possibly subject to the same constraints of the original encryption of $f$,
2. for every $1 \leq i \leq l$ symbolically composing $r_i^I$ with $s_i$ to generate $r_i^I(s_i(\ldots))$,
3. for every $1 < i \leq k$ symbolically composing $r_i$ with $s_i^I$ to generate $r_i(s_i^I(\ldots))$,
4. for every block of variables $\vec{w}_i$, $l < i \leq k$, symbolically substituting $\vec{w}_i$ with $r_i(s_i^I(\vec{w}))$, and
5. for every block of function components $v_i$, $1 \leq i \leq l$, symbolically composing $r_i^I(s_i(\ldots))$ with $r_i(f_i(\ldots))$.

Encryption of polynomial mappings using two-variable polynomials, is an important special case of encryption using multivariate polynomials, where all $c_i=2$. The only differences between the general multivariate case and the two-variable case will be in the way some of the mathematical operations are implemented, as different algorithms are optimal for different cases.

The method of encryption of Mealy machines represented using function tables with permutations of $Z_{N^c}$ for some $c \geq 1$, uses triples $(c_i, r_i, s_i)$ with the following properties:
1. $c_i$ is a positive integer.
2. $r_i$ and $s_i$ are bijections (permutations) from $Z_{N^{c_i}}$ to $Z_{N^{c_i}}$ expressed using function tables $t_{r,i}:Z_{N^{c_i}} \to Z_{N^{c_i}}$.
3. $r_i$ and $s_i$ are selected such that they are non-linear.

The mappings $r_i$ are the encryption mappings, and the $s_i$ are the corresponding decryption mappings.

Different $c_i$s may be chosen equal such that for some i and some $j \neq i, c_i = c_j$. Furthermore, if $c_i = c_j$ for some $j \neq i$, then one may choose to set $r_{i=j}$ and $s_i = s_j$. Also, $r_i$ and $s_i$ may in general set to the identity mapping $(x_1, \ldots, x_{c_i})$ for one or more i.

The number N is given by the augmented Mealy machine M. When generating the key triples, it is assumed that the user has a source of pseudo-random numbers with period much greater than $N^{m+n}$. For each triple $(c_i, r_i, s_i)$ select $c_i$ and let $t_{r,i}$ and $t_{s,i}$ be function tables of $r_i$ and $s_i$, respectively. The tables $t_{r,i}$ and $t_{s,i}$ of $N^{c_i}$ numbers in $Z_{N^{c_i}}$ are indexed from 0 to $N^{c_i}-1$. Every element in $t_{s,i}$ is set to $-1$.

For every k from 0 to $N^{c_i}-1$ do:
    A random number $j \in Z_{N^{c_i}}$ is generated until $S(j)=-1$.
    Set $t_{r,i}(k)=j$ and $t_{s,i}(j)=k$.

When key generation is finished, there will be a series of triples $(c_1, r_1, s_1), \ldots, (c_k, r_k, s_k)$. This series of triples can be used to encrypt mappings of the form: $(\delta', \lambda') = h: Z_N^{S+I} \to Z_N^{S+O}$, with corresponding function table $t_h$ effectively representing a function: $t_h: Z_N^{S+I} \to Z_N^{S+O}$. The actual order of the components of $\delta'$ and $\lambda'$ in h may vary from embodiment to embodiment. The mapping h is assumed to be on the form: $(h_1(x_1, \ldots, x_d), \ldots, h_e(x_1, \ldots, x_d))$, where $d=S+I$, and $e=S+O$.

The generated key triples can partially encrypt $t_h$, provided:
1. there exists some l such that $1 \leq l < k$ and $\Sigma_{j=1}^{l} c_i = e$, and
2. $\Sigma_{j=l+1}^{k} c_i = d$.

To simply notation denote the jth group of function components $v_j = (h_{a+1}, \ldots, h_{a+c_j})$, where $a = \Sigma_{b=1}^{j-1} c_b$. Similarly, group the variables into groups of $c_{l+1}, \ldots, c_k$ variables, such that the jth group of variables is written: $\vec{w}_j = (x_{a+1}, \ldots, x_{a+c_{j+l}})$, where $a = \Sigma_{b=1}^{j-1} c_{b+l}$. Prior to encryption, one must decide which groups $\vec{w}_j$ of variables to decrypt. Let $K \subseteq \{l+1, \ldots, k\}$ be the set of indexes of variable groups to decrypt. In addition, one must decide which groups $v_j$ of function components to encrypt. Let $J \subseteq \{1, \ldots, l\}$ be the set of indexes of function component groups to encrypt.

Encryption is achieved as follows:
Reserve a temporary table $t_h'$ defining a function $t_h': Z_N^d \to Z_N^e$.
For every i from 1 to k set $y_i = N^{c_i}$.
Set $z_1 = 1$.
For every i from 2 to l set $z_i = y_{i-1} z_{i-1}$.
    Set $z_{l+1} = 1$.
For every i from l + 2 to k set $z_i = y_{i-1} z_{i-1}$.
    Initialize a vector $(b_1, \ldots, b_{k-1})$ to $(0, \ldots, 0)$. This vector represents the k – l
    variable blocks, in a base $N^{C_i}$, representation. For each variable block i:
    $b_i = \Sigma_{j=1}^{C_{i+1} N^{j-1}} x_{a+j}$, where $a = \Sigma_{j=1}^{i-1} c_{j+l}$.
Reserve a vector $(b_1', \ldots, b_{k-1}')$.
For every i from 0 to $N^d - 1$ do:
    Set $u = 0$.
    For every j from k to l do:
        if $s_j$ is not the identity mapping set $b_{j-1}' = r_j(b_{j-1})$
        else set $b_{j-1}' = b_{j-1}$.
        Multiply u by $y_j$.
        Add $b_{j-1}'$ to u
    Set $t_h'(i) = t_h(u)$.
    Increment the vectorized index $(b_1, \ldots, b_{k-1})$, taking into account the different sets from
    which the individual components may be taken.
Reserve a vector $(b_1, \ldots, b_l)$.
For every i from 0 to $N^d - 1$ do:
    Set $u = t_h'(i)$.
    Set $q = 0$;
    For every j from l to 1 to:
        Set p to the integer result of $u/z_j$.
        Subtract $pz_j$ from u to get the remainder.
        Set $b_j = u$.
        if $r_j$ is not the identity mapping set $b_j = r_j(b_j)$
        Add $z_j b_j$ to q.
    Set $t_h'(i) = q$.
Lastly, copy the function table of $t_h'$ to the function table of $t_h$.

Decryption is not meant to be performed on partially encrypted function tables, only on encrypted data. A datum $\vec{w}_i \in Z_N^{c_i}$ is encrypted by applying $t_{r,i+l}$ to the evaluation of the polynomial $N^{c_{l+i}-1} x_{a+c_{l+i}} + \ldots + N^1 x_{a+2} + x_{a+1}$, where $a = \Sigma^{j=l-1} c_{l+j}$.

It is also possible to re-encrypt function tables partially encrypted with key triples $(c_i, r_i, s_i)$. Let h be a mapping over $Z_N$ with n functional components and m variables expressed as a function table $t_h: Z_N^m \to Z_N^n$. Assume that h is partially encrypted using the key triples $(c_1, r_1, s_1), \ldots, (c_k, r_k, s_k)$.

Take the first l of these to be triples applied to function components (although this may vary from embodiment to embodiment) and last k−l to be triples applied to variables.

Re-encryption is achieved by:

1. generating a new set of key triples $(c_1, r_1^l, s_1^l), \ldots, (c_k, r_k^l, s_k^l)$, such that block sizes are preserved, possibly subject to the same constraints of h's original encryption;
2. for every $1 \leq i \leq l$ symbolically composing $r_i^l$ with $s_i$ using their function table representations to generate a new function table representation for $r_i^l(s_i(v))$;
3. for every $1 < i \leq k$ symbolically composing $r_i$ with $s_i^l$ using their function table representations to generate a new function table representation for $r_i(s_i^l(\vec{w}))$;
4. for every block of variables $\vec{w}_i$, $1 < i \leq k$ symbolically substituting $\vec{w}_i$ with $r_i^l(s_i(\vec{w}))$ using the already available function tables; and
5. for every block of function components $v_i$, $1 \leq i \leq l$, symbolically composing $r_i^l(s_i(\ldots))$ with $r_i(h_i(\ldots))$ using the already available function tables.

As described above, Turning Platform is a device supporting polynomial and encrypted polynomial computations. In order for the polynomial representation of Mealy machines, and BSS' machines to be of significant usefulness, proper host support is required. If a host is referred to as "○", then a Turing platform T includes:

- a very simple, slightly modified Turing machine with unbounded, linearly addressed storage, each storage unit being called a cell; and with a so-called finite control with position in the storage
- an output register writeable by the finite control, which holds one storage unit
- an input register readable by the finite control, which holds one storage unit, and one of three possible movement directions (left, stand still, right)
- an output register writeable by ○, which is part of the input of the supported state machine
- an input register readable by ○, which is part of the output of the supported state machine A complete computation step for a Mealy machine or BSS' machine M supported by a Turing platform proceeds according to the following steps:

1. T reads the cell at which its finite control is placed
2. T writes the cell to the input of M
3. ○ writes the input of M
4. M computes the next state
5. M computes output and writes it to the input of T
6. M computes output and writes it to the input of ○.
7. M computes the direction of movement, and writes it to T
8. T reads form its input register
9. T writes the input to the cell
10. T moves left, right, or stands still, if possible Note that the inputs to the Min points 2 and 3 above are supplied to different components of the same input vector. Similarly, all generated outputs mentioned in points 5, 6, and 7 are extracted from different parts of M's output vector. The computation halts either when M outputs a predetermined "halting" signal to the host via its designated output-to-host, or when the host detects that M is stuck in one state, is outputting only a "B" to the writeable register, and is not moving the finite control of the Turing platform about.

Use of a Turing platform to support the computations of Mealy and BSS' machines allows them to do completely general computations if necessary, effectively making them equivalent to Turing machines in computational power.

A register machine is constructed to enable more efficient use of cryptographically enhanced machine representations. Different embodiments of the register machine are possible and two distinct types are discussed below. Different embodiments may further be combined to provide register machines with different capabilities.

Embodiment 1: Allows random memory access, but does not allow universal Turing computation. This type of register machine consists of the following:

2. A set $P = \{\vec{P}_{(i_1, \ldots, i_d)}\}$ of vectors of integers in $Z_N^d$ indexed by vectors also in $Z_N^d$. Each $\vec{P}_{\vec{i}}$ can be thought of as an instruction.
3. Either a vector S indicating the end of the program in P, or a constant T, which functions as an instruction indicating that the computation is finished.
4. A vector $\vec{C} \in Z_N^d$, which functions as an instruction pointer.
5. A set $S = \{\vec{S}_{(i_1, \ldots, i_d)}\}$ of vectors of integers in $Z_N^d$ indexed by vectors also in $Z_N^d$. Each $\vec{S}_{\vec{i}}$ is a storage "cell".
6. A vector $\vec{D} \in Z_N^d$, which functions as a storage pointer.
7. One or more registers $(\vec{R}_1, \ldots, \vec{R}_m)$ of vectors of integers in $Z_N^d$ for $0 < m \leq N$.
8. The next instruction pointer mapping $f(\vec{R}_1, \ldots, \vec{R}_m, \vec{P}_{\vec{C}}, \vec{S}_{\vec{D}}, \vec{C}, \vec{D}): Z_N^{d(m+4)} \to Z_N^d$.
9. The next storage pointer mapping $g(\vec{R}_1, \ldots, \vec{R}_m, \vec{P}_{\vec{C}}, \vec{S}_{\vec{D}}, \vec{C}, \vec{D}): Z_N^{d(m+4)} \to Z_N^d$.
10. A specification of the registers that accept input from the host platform.
11. The register transition mapping $h(\vec{R}_1, \ldots, \vec{R}_m, \vec{P}_{\vec{C}}, \vec{S}_{\vec{D}}, \vec{C}, \vec{D}): Z_N^{d(m+4)} \to Z_N^{kd}$, where $k$, $0 \leq k \leq m$, is the number of registers not accepting input from the host platform.
12. The storage transition mapping $q(\vec{R}_1, \ldots, \vec{R}_m, \vec{P}_{\vec{C}}, \vec{S}_{\vec{D}}, \vec{C}, \vec{D}): Z_N^{d(m+4)} \to Z_N^d$.

This type of register machine can accept input from its host platform in one or more of the following ways:
- through one or more registers,
- through one or more selected "cells" in the storage space,
- through the initial contents of the storage space,
- through the initial contents of the instruction vectors.

In the case where one or more registers are used, the register transition mapping is adjusted so that it does not alter the contents of the registers accepting input from the host platform. The register machine may come with a list of registers and storage locations that function as outputs to the host platform.

A computation with this type of register machine is initialized with the following steps:

17. The initial values of $\vec{R}_1, \ldots, \vec{R}_m, \vec{C}, \vec{D}$ are given. Initial values for one or more storage cells $\vec{S}_{\vec{D}}$ in S may also be given.
18. All the elements in P are given.
19. Compute $\vec{P}_{\vec{C}}$ and $\vec{S}_{\vec{D}}$.

The computation step of this type of register machine consists of the following steps:

20. Compute the next instruction pointer: $\vec{C}\,'=f(\vec{R}_1, \ldots, \vec{R}_m, \vec{P}_{\vec{C}}, \vec{S}_{\vec{D}}, \vec{C}, \vec{D})$.
21. Compute the next storage pointer: $\vec{D}\,'=g(\vec{R}_1, \ldots, \vec{R}_m, \vec{P}_{\vec{C}}, \vec{S}_{\vec{D}}, \vec{C}, \vec{D})$.
22. Compute the value to be written to the current storage cell: $\vec{S}\,'=q(\vec{R}_1, \ldots, \vec{R}_m, \vec{P}_{\vec{C}}, \vec{S}_{\vec{D}}, \vec{C}, \vec{D})$.
23. Compute the register transition mapping: $(\vec{R}_{j_1}, \ldots, \vec{R}_{j_k})=h(\vec{R}_1, \ldots, \vec{R}_m, \vec{P}_{\vec{C}}, \vec{S}_{\vec{D}}, \vec{C}, \vec{D})$, where $j_1, \ldots, j_k$ specify the registers which the register machine may change.
24. Set $\vec{S}_{\vec{D}}=\vec{S}\,'$, $\vec{C}=\vec{C}\,'$, and $\vec{D}=\vec{D}\,'$.
25. Compute $\vec{P}_{\vec{C}}$ and $\vec{S}_{\vec{D}}$.

The computation is considered to be ended when the instruction pointer takes on the "end-of-program" value, or when a specified "stop" instruction is encountered, depending on the embodiment.

This type of register machine may be implemented using either a polynomial or function table representations of the mappings $f$, $g$, $q$, and $h$. These mappings are multivariate mappings over a finite ring of integers, and may thus be encrypted using any of the previously described methods of encryption. During use, there are no requirements as to when the host platform changes registers accepting input, and no requirements as to when the host platform reads from designated "output" registers/storage cells. This allows computational work to be minimized.

Embodiment 2: Extends the capabilities of the above register machine, allowing universal (Turing) computation. This type of register machine consists of the same elements as embodiment 1, but has in addition the following:

26. The specification of a register dedicated to output of movement direction, in the form of an integer y such that $0<y\leq m$, and an integer z such that $0<z\leq d$. The integer y indicates the register, and the integer z, the component in which this movement is stored.
27. The specification of a register dedicated as output to a Turing platform.
28. The specification of a register dedicated as input from a Turing platform.
29. A Turing platform, where each storage unit is a vector in $Z_N^d$.

The computation for this second embodiment of a register machine is identical to the first, except that there is a requirement that the host now also do a Turing platform computation step using the specified registers.

These register machines are amenable to method of encryption similar to those previously described. This method is difficult to implement with the previously mentioned Mealy-machine and BSS'-machine variants.

Encryption of register machines uses multivariate mappings. The mappings of the register machine and the mappings used for encryption, may be represented either with polynomials or with function tables. If the mappings are represented using polynomials, N must be a prime number. If the mappings are represented using function tables, N only needs to be big enough to accommodate the abstract machine on which the mappings are based. The encryption technique used is similar to those previously discussed, in that it uses symbolic functional composition to encrypt the mappings used to express the register machine. The difference is that every element read from a register or storage cell is encrypted with a key specific to each register or storage cell. Thus encryption and decryption functions take register number or storage cell index vector as addition parameters.

The encryption function for any register number i is $r_i(\vec{R}_i)$.

The decryption function for any register number i is $s_i(\vec{R}_i)$.

The encryption function for any storage cell indexed by $\vec{D}$ is $v(\vec{S}_{\vec{D}}, \vec{D})$. The decryption function for any storage cell indexed by $\vec{D}$ is $u(\vec{S}_{\vec{D}}, \vec{D})$.

Prior to encryption, the user selects a subset $I\subseteq S$ of storage cells to be encrypted. The user also selects a subset $J\subseteq\{1, \ldots, m\}$ of registers to encrypt. In one further generalization of this embodiment, it is possible to select storage cells and registers that are decrypted when used as arguments in the mappings $f$, $g$, $h$, and $q$, but not encrypted when being written to. In such a further generalization, it is also possible to select storage cells and registers that are read as plaintext, but are encrypted when written to.

The pair $(r_n, s_n)$ for a given n is generated as follows:
1. Two tables are defined, V and U, each with $N^d \times m$ elements.
2. Set every $U(i,j)=-1$ for all $(i,j)$ such that $0\leq i<N^d-1$ and $j\in J$.
3. Set every $U(i,j)=V(i,j)=i$ for all $(i,j)$ such that $0\leq i<N^d-1$ and $j\notin J$.
4. For every j from 1 to m do the following if $j\in J$:
   a. For every i from 0 to $N^d-1$ do:
      i. Select a random b from 0 to $N^d-1$ until $U(b,j)=-1$.
      ii. Set $U(b,j)=i$ and $V(i,j)=b$.

If $r_i$ and $s_i$ are represented as polynomials, $r_i$ is interpolated using the elements of V converted to d-vectors, and $s_i$ is interpolated using the elements of U converted to d-vectors. If $r_i$ is represented as a function table, the function table of $r_i$ containing lumped-together arguments and mapping values is set equal to V. Similarly, if $s_i$ is represented as a function table, the function table of $s_i$ containing lumped-together arguments and mapping values is set equal to U.

The pair (v,u) is generated as follows:
5. Two tables are defined, V and U, each with $N^d \times |S|$ elements, where $|S|$ is the number of elements in S.
6. Set every $U(i,j)=-1$ for all $(i,j)$ such that $0\leq i<N^d-1$ and $j\in I$.
7. Set every $U(i,j)=V(i,j)=i$ for all $(i,j)$ such that $0\leq i<N^d-1$ and $j\notin I$.
8. For every j from 1 to $|S|$ do if $j\in I$:
   a. For every i from 0 to $N_d-1$ do:
      i. Select a random b from 0 to $N^d-1$ until $U(b,j)=-1$.
      ii. Set $U(b,j)=i$ and $V(i,j)=b$.

If v and u are represented as polynomials, v is interpolated using the elements of V converted to d-vectors, and u is interpolated using the elements of U converted to d-vectors. If v is represented using its function table, the table for v with lumped-together arguments and mapping values is set equal to V. Similarly, if u is represented using its function table, the table for u with lumped-together arguments and mapping values is set equal to U.

Both of the register machine embodiments can be encrypted in the same way. Encryption proceeds as follows:
9. Generate the key pair (v,u), where $v, u: Z_N^{2d} \to Z_N^d$.
10. Generate the key pairs $(r_i, s_i)$, where $r_i, s_i: Z_N^d \to Z_N^d$.

11. In the mappings f, g, h, and q, for each i∈J, symbolically substitute $\vec{R}_i$ with $s(\vec{R}_i, i)$.

12. In the mappings f, g, h, and q, symbolically substitute S with $u(\vec{S}, \vec{D})$.

13. Symbolically compose h with v, giving $v(h( \ldots ), \vec{D})$.

14. Symbolically compose q with v, giving $v(q( \ldots ), \vec{D})$.

Due to the parametrization, a more general type of multivariate encryption is required: parameterized multivariate encryption. The mappings of the register machine may be combined to a mapping $H(\vec{R}_1, \ldots, \vec{R}_m, \vec{P}_{\vec{C}}, \vec{S}_{\vec{D}}, \vec{C}, \vec{D})$ where the above six conditions merely lay restrictions on the use of parameterized encryption, so that the partially encrypted machine has a chance of working.

Parameterized multivariate encryption is done using key quadruples $(c_i, g_i, r_i, s_i)$ applied to groups of variables and mapping components as for multivariate encryption. This operation can be applied to any mapping: $h: Z_N^d \to Z_N^e$. If the encryption is to be applied when h is a polynomial mapping, N must be a prime number. The number of variables or mapping components grouped together in the $i^{th}$ group is $c_i$. There are in all k groups, of which the first l cover the mapping components, and the remaining k−l groups the variables. It is a requirement that $\Sigma_{i=1}^{l} c_i = e$, and also a requirement that $\Sigma_{i=l+1}^{k} c_i = d$. The set $J \subseteq \{1, \ldots, l\}$ specifies the component groups of h that are to be encrypted irrespective of whether that encryption is parameterized or non-parameterized. The set $I \subseteq \{l+1, \ldots, k\}$ specifies the variable groups of h that are to be decrypted irrespective of whether that decryption is parameterized or non-parameterized.

The number $g_i$ either gives the index of a group of variables $\vec{w}_{i-l}$ (thus being such that $l < g_i \leq k$), or is some other value greater than k or less than l (−1 is recommended, if possible), indicating that no such group is referenced. If $g_i$ references a group of variables, that group of variables will be used to parametrize either the encryption of the group (if it is a group of mapping components), or the decryption of the group (if it is a group of variables).

Whenever $g_i$ references a group of variables or mapping components, the encryption and decryption keys are mappings on the form: $r_i, s_i: Z_N^{c_i + c_{gi}} \to Z_N^{c_i}$. Whenever $g_i$ does not reference any group, the encryption and decryption keys are mappings on the form: $r_i, s_i: Z_N^{c_i} \to Z_N^{c_i}$.

The resulting encryption algorithm is illustrated for the function table representation by the method "ParamEncrypt" given in the file "CompTable.java" in the source code appendix. The algorithm is very similar to that for multivariate encryption.

Reserve a temporary table $t_h^l$ defining a function $t_h^l: Z_{N^d} \to Z_{N^e}$.

For every i from 1 to k set $y_i = N^{c_i}$.

Set $z_1 = 1$.

For every i from 2 to l set $z_i = y_{i-1} z_{i-1}$.

Set $z_{l+1} = 1$.

For every i from l+2 to k set $z_i = y_{i-1} z_{i-1}$.

Initialize a vector $(b_1, \ldots, b_{k-1})$ to $(0, \ldots, 0)$. This vector represents the k−l variable blocks, in a base $N^{c_i}$ representation. For each variable block i: $b_i = \bigcirc^{c_{i+1}}_{j=1} N^{j-1} x_{a+j}$, where $a = \bigcirc^{i-1}_{j=1} c_{j+l}$.

Reserve a vector $(b'_1, \ldots, b'_{k-1})$.

For every i from 0 to $N^d - 1$ do:

Set u=0.

For every j from k to 1 do:

if $s_j$ is not the identity mapping:

A. if $l < g_j \leq k$

A. Set $m = y_{g_j} b_{j-l} + b_{g_j - l}$

B. Set $b'_{j-l} = r_j(m)$

B. otherwise set $b'_{j-l} = r_j(b_{j-l})$

A. otherwise set $b'_{j-l} = b_{j-l}$.

B. Multiply u by $y_j$.

C. Add $b'_{j-l}$ to u

Set $t'_h(U) = t_h(i)$.

Increment the vectorized index $(b_1, \ldots, b_{k-l})$, taking into account the different sets from which the individual components may be taken.

Reserve a vector $(b_1, \ldots, b_{k-l})$.

Initialize a vector $(b'_1, \ldots, b'_{k-l})$

For every i from 0 to $N^d - 1$ do:

Set $u = t'_h(i)$.

Set q=0;

For every j from 1 to l to:

A. Set p to the integer result of $u/z_j$.

B. Subtract $pz_j$ from u to get the remainder.

C. Set $b_j = u$.

D. if $r_j$ is not the identity mapping

A. if $l < g_j \leq k$

A. Set $m = y_{g_j} b_{j-l} + b_{g_j - l}$

B. Set $b_j = r_j(m)$

E. otherwise set $b_j = r_j(b_j)$

F. Add $z_j b_j$ $_{j \ 1 \ to \ q}$.

Set $t'_h(i) = q$.

Increment the vectorized index $(b'_1, \ldots, b'_{k-l})$, taking into account the different sets from which the individual components may be taken.

Lastly, copy the function table of $t'_h$ to the function table of $t_h$.

Figure 73:
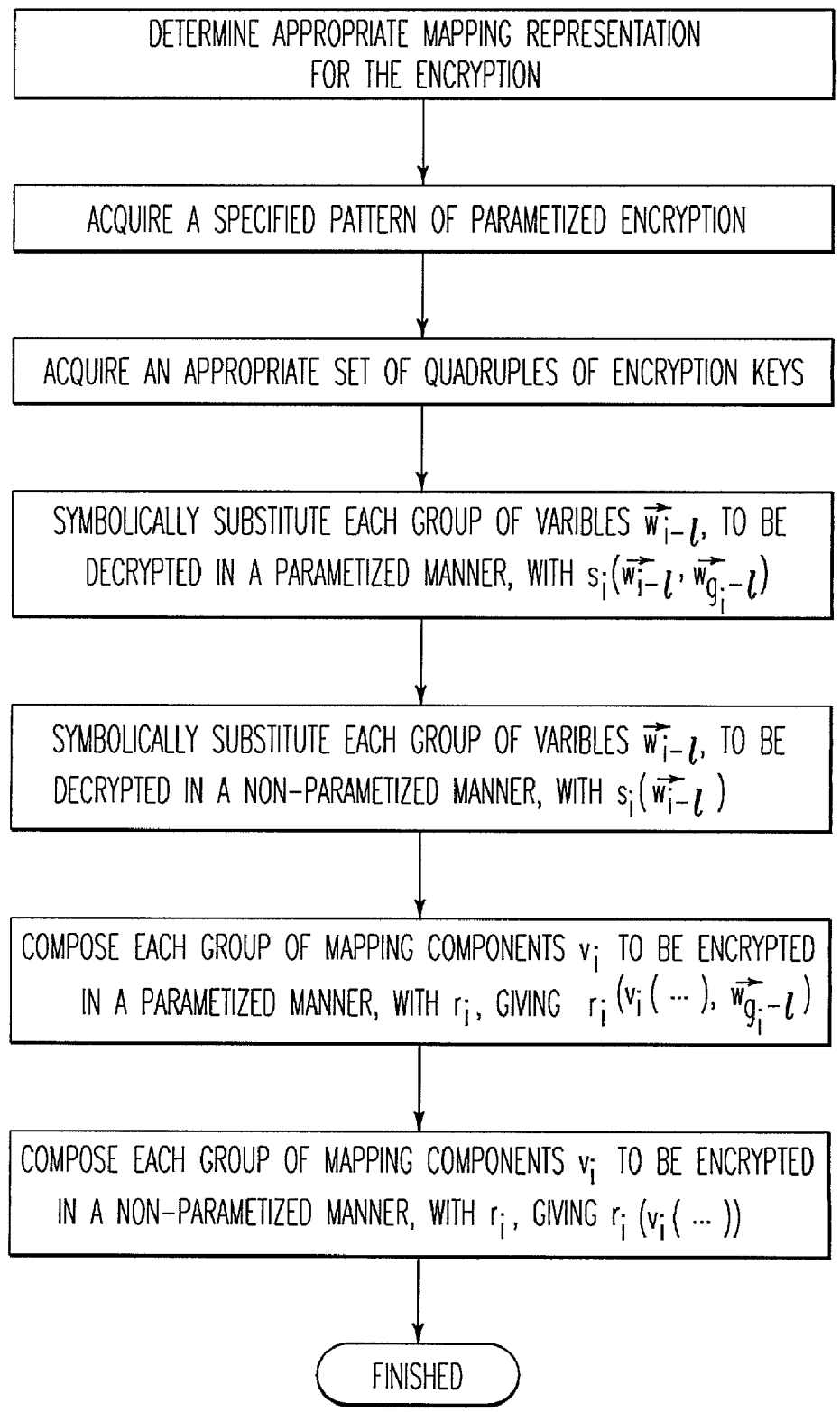
FIG. 73 illustrates a method of encrypting a multivariate mapping h with parameterized multivariate mappings.
Figure 74:
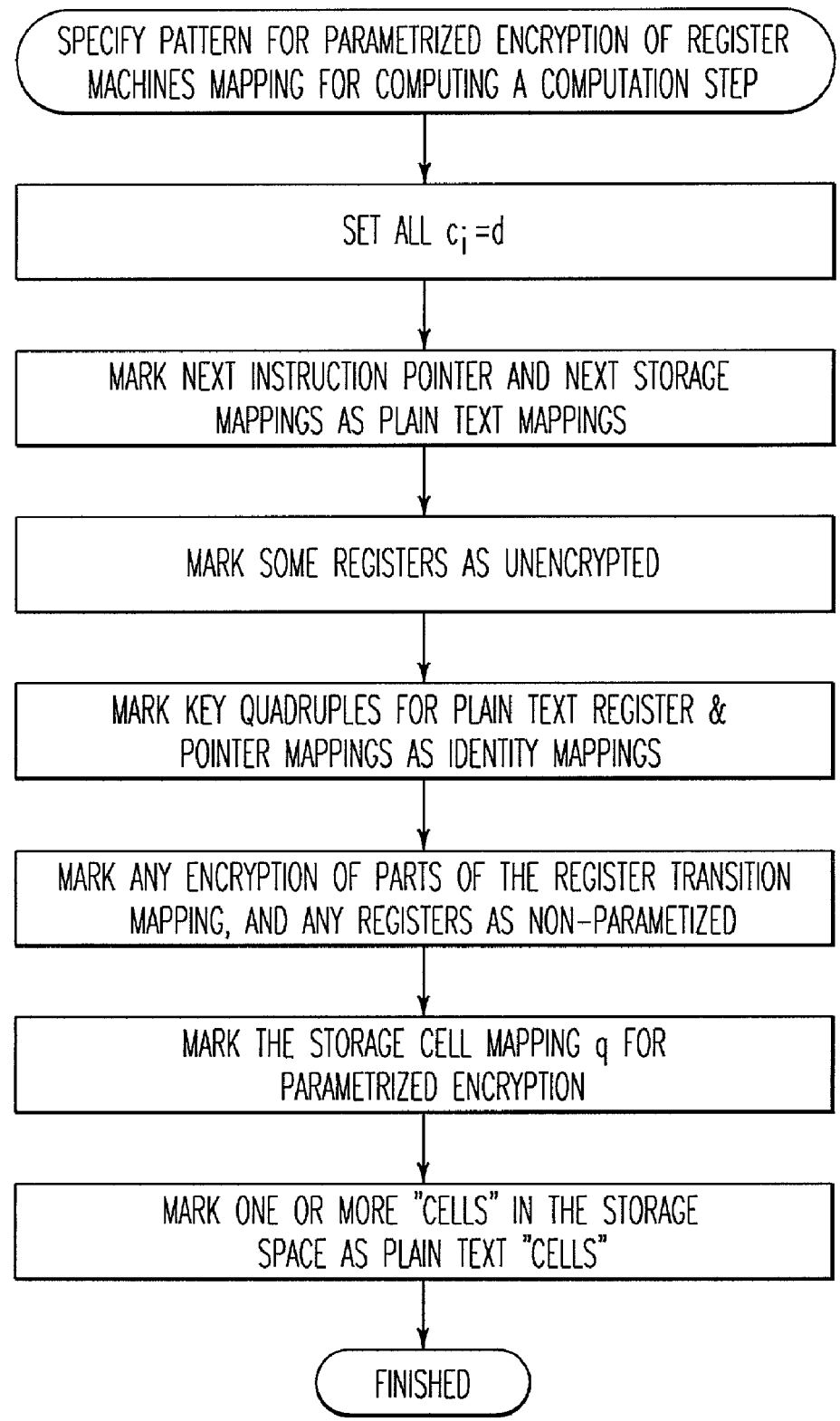
FIG. 74 illustrates a method of specifying an encryption pattern for parameterized encryption for a specialized application of a register machine.
Figure 75A:
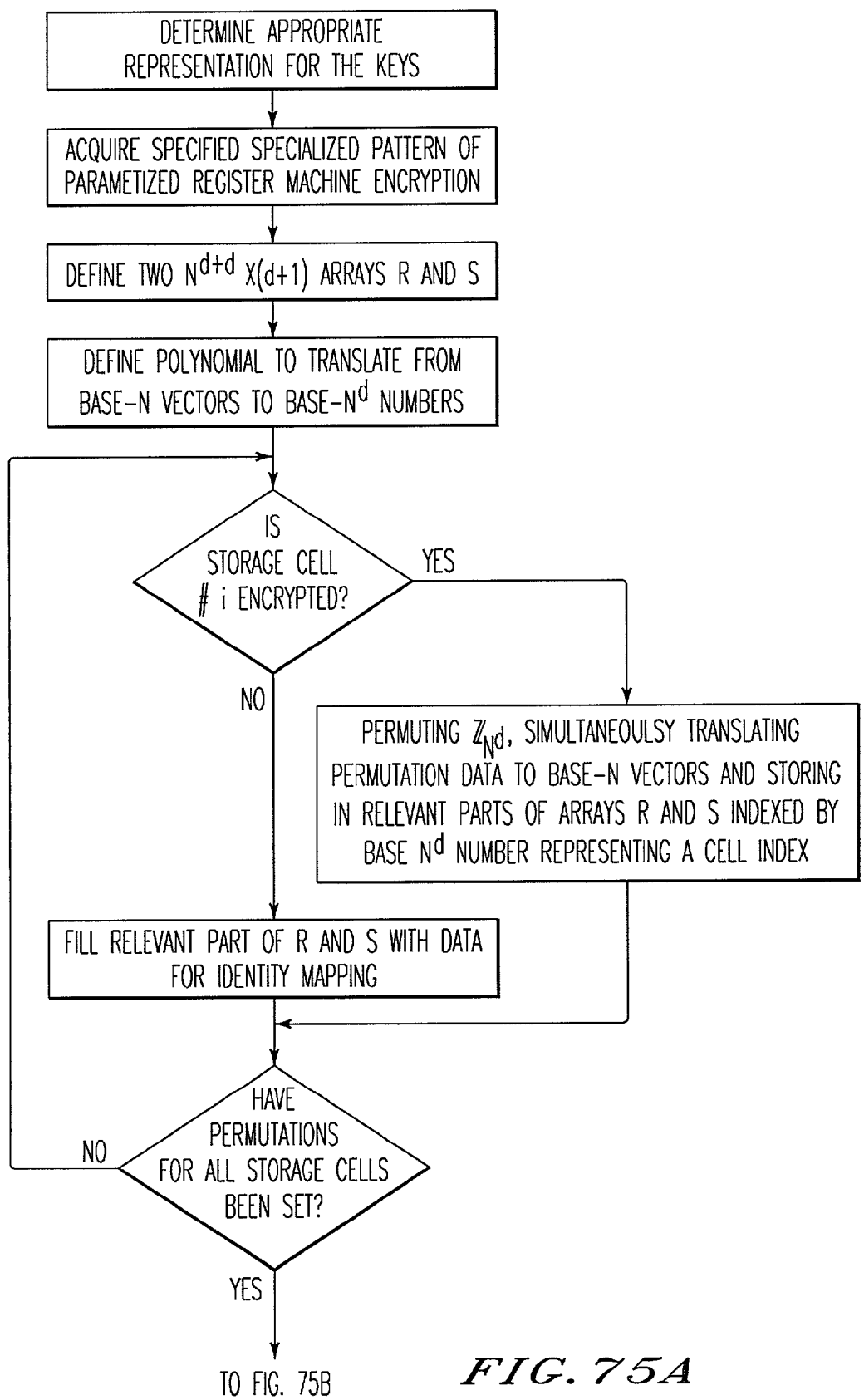
FIGS. 75A and 75B illustrate a method of key generation for parametric encryption that is specially adapted for application to a register machine.
Figure 75B:
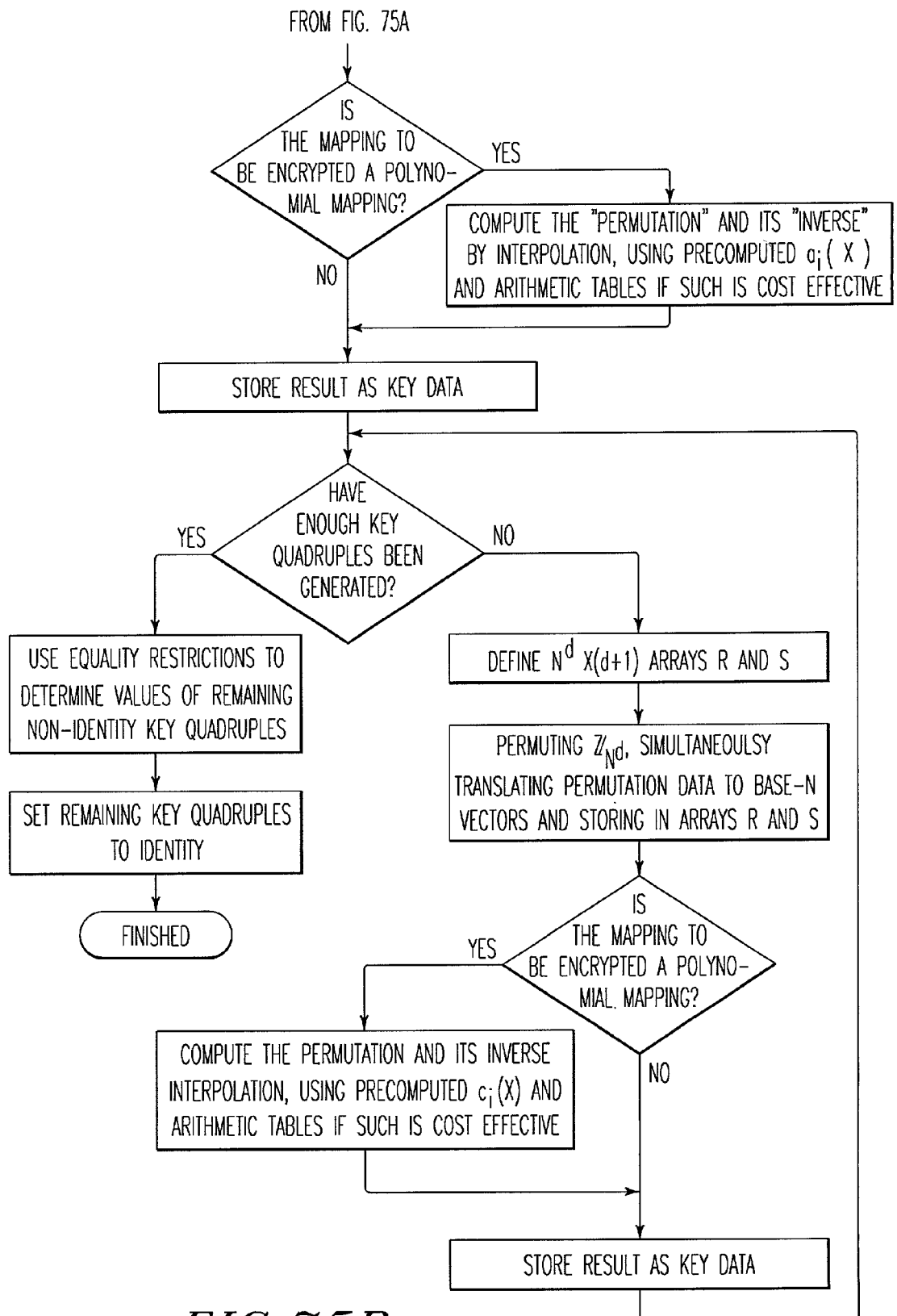
Figure 76:
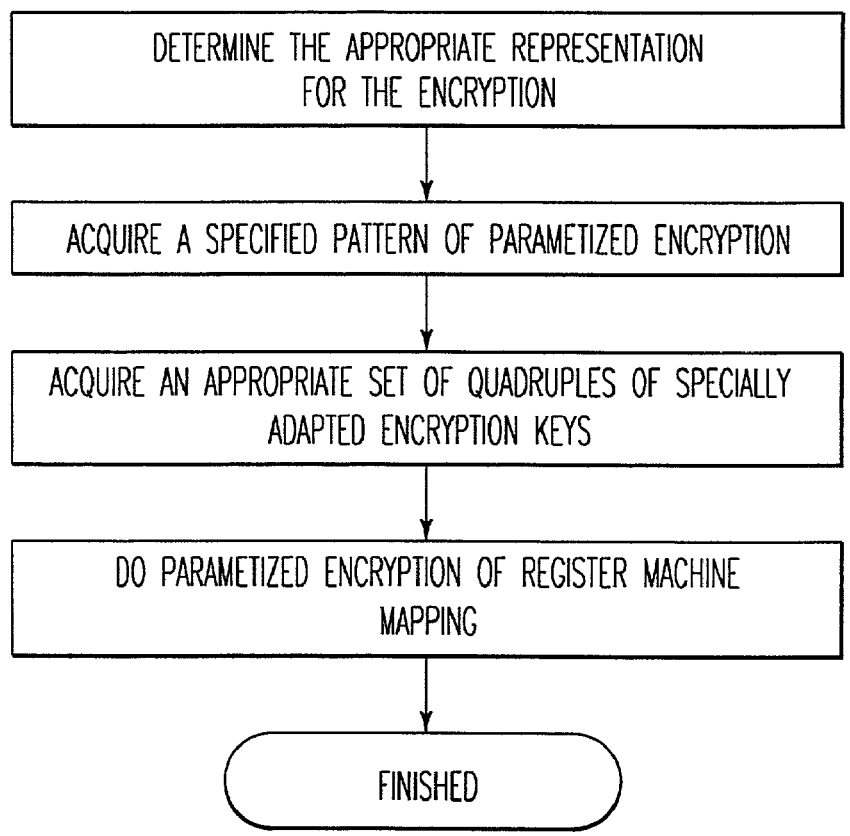
FIG. 76 illustrates a method of parameterized encryption specifically adapted to application to a register machine.

Additional more applied and less theoretical examples are provided below with reference to FIGS. 5A–73. An exemplary transition diagram with its corresponding inputs, states, and outputs is illustrated in FIG. 5A. The uppermost state "0" (sometimes referred to as "node '0'") has three possible inputs (i.e., 0, 1 and 2), which cause transitions to states 1, 2, and 0, respectively while outputting symbols 1, 2 and 2, respectively. The corresponding pairs of inputs and outputs are shown in the form input/output, and the state to which the state machine moves as a result of the input is shown by the directional arc (sometimes coming back to the original state). A corresponding function table is illustrated in FIG. 5B with the new states and outputs being shown in parentheses (i.e., in the form (δ,λ)).

As can be seen, the transition diagram does not include any dedicated state $q_a$ that can be used as a stopping state such that an outside observer would know that the calculation has ended, simply by looking at the current state of the machine. Accordingly, such a dedicated state is added so that the machine can signal the end of its computation (to itself and outside observers).

Conversely, as shown in the transition diagram of FIG. 5C, a node/state 3 is already isolated and may be used as a dedicated state $q_a$. (In that exemplary embodiment, when a "1" is input in state "2", the transition is undefined.) Such a state machine includes a function table representation as shown in FIG. 5D (including a corresponding undefined entry).

Figures 6A, 6B, 6C, 6D:
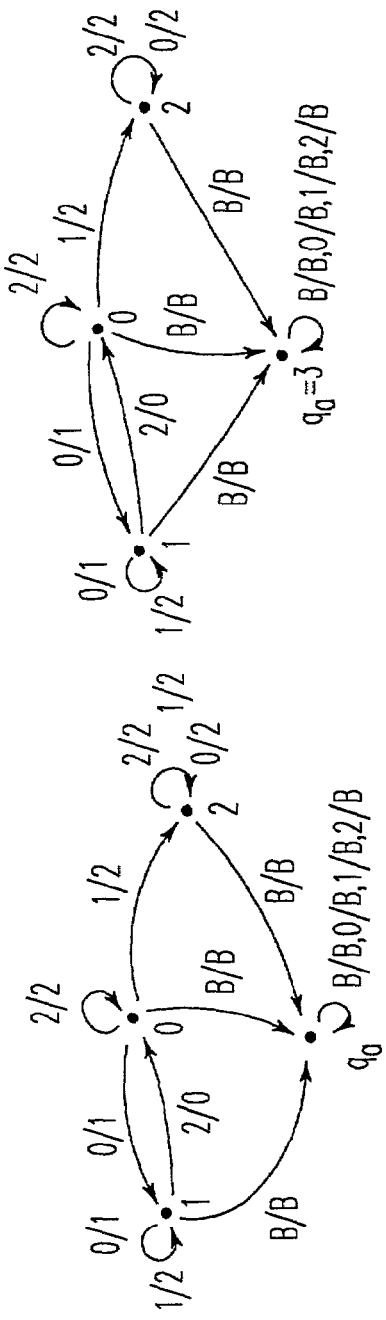
FIG. 6A is a transition diagram corresponding to the addition of inputs and outputs supporting the addition of the dedicated state $q_a$ to the diagram of FIG. 5A.
FIG. 6B is a corresponding function table supporting the augmented automata of FIG. 6A.
FIG. 6C is a transition diagram corresponding to the addition of inputs and outputs supporting the designation of the dedicated state $q_a$ in the diagram of FIG. 5C.
FIG. 6D is a corresponding function table supporting the augmented automata of FIG. 6C.

Continuing with the example of FIG. 5A, by adding a dedicated state $q_a$, and its corresponding arcs for each defined input, the transition diagram of FIG. 6 is created. Such a diagram can be written equivalently as the function table of FIG. 6B in which the dedicated state and the designated output symbol (indicating that the designated state has been entered) are written generically as $q_a$ and B, respectively. This addition creates, from an existing domain D, an augmented domain D' given by:

$$D' = \{(0, 0), (0, 1), (0, 2), (0, B), (1, 0), (1, 1), (1, 2), (1, B),$$
$$(2, 0), (2, 1), (2, 2), (2, B), (3, 0), (3, 1), (3, 2), (3, B)\}.$$

Similarly, the example of FIG. 5C can be augmented to include arcs corresponding to designated the isolated node 3 as the dedicated state q., thereby forming the diagram of FIG. 6C and its equivalent function table in FIG. 6D. In light of the fact that the transition is undefined when in state "2" and a "1" is received, the augmented domain corresponding to FIG. 6D is given by:

$$D' = \{(0, 0), (0, 1), (0, 2), (0, B), (1, 0), (1, 1), (1, 2), (1, B),$$
$$(2, 0), (2, 1), (2, 2), (2, B), (3, 0), (3, 1), (3, 2), (3, B)\}.$$

As seen in FIG. 7, various vectorizations are possible for the same original input, output and state spaces. In the vectorization example where $N \geq 4$, if N is not a prime number, the vectorization should only be used when using function table representations for encryption and computation. Preferably a user's selection of components/vectorizations is maintained between specification and use without the system attempting to perform a remapping.

As seen in FIGS. 8A–8C, the determination of an exemplary prime number is provided for each of the three illustrated cases of N. Generally, if a polynomial representation is used for FIGS. 8A–8C, N should be a prime number.

Continuing with the example of FIG. 7B, a prime number, 3, is used and a vectorization corresponding to N=3d is selected in which: $\Sigma'=\{(0,0), (0,1), (0,2), (1,0)\}$, $Q'=\{(0,0), (0,1), (0,2), (1,0)\}$, and $\Delta'=\{(0,0), (0,1), (0,2), (1,0)\}$, such that the table of FIG. 9A can be created by adding dummy states until Q' contains $N^2=9$ states. That is, starting with the originally defined 4 states, 9−4=5 rows (i.e., 5 nodes/states) are added to FIG. 9A, each with their own corresponding 4 entries per row. This initially leaves undefined all the entries corresponding to the newly added states, as shown in the bottom of FIG. 9A.

Similarly, having increased the number of states, the number of input symbols and output symbols are adjusted correspondingly. Adding dummy input symbols until $\Sigma'$ contains $3^2=9$ symbols gives $\Sigma'=\{(0,0), (0,1), (0,2), (1,0),$ (1,1), (1,2), (2,0), (2,1), (2,2)\}$. Corresponding dummy symbols can also be added to $\Delta'$ to create $\Delta'=\{(0,0), (0,1), (0,2), (1,0), (1,1), (1,2), (2,0), (2,1), (2,2)\}$. Each of the undefined entries (including the previously undefined entry corresponding to input (0,1) and state (0,2)) can be filled in with a specified value (e.g., ((1,0), (1,0)) to create the table of FIG. 9B.

As an alternative to the approach of FIG. 9B, each of the undefined entries that would have otherwise been filled in with a common value can instead be filled in with domain-specific random values. For example, for each entry illustrated in FIG. 10, each "*" can be replaced with a separately selected random number from 0 to 2 (inclusive). This filling out of values randomly includes the previously undefined entry corresponding to input (0,1) and state (0,2).

As an alternative to generating entries individually, rows of defined entries can be copied for undefined rows. For example, using the vectorization of FIG. 8B, an initial set of entries is generated as shown in FIG. 11A. A non-dedicated row (i.e., a row other than row (1,0)) is selected (e.g., row (0,1)) and used as the source for filling in values in the first undefined row (i.e., row (1,1)).

Equivalently, the first isolated node (1,1) in the graph of FIG. 11C is selected. The transitions corresponding to node (0,1) are repeated for node (1,1), thereby creating the graph of FIG. 11D. The copying processes of FIGS. 11B and 11D are repeated until all the rows corresponding to the newly created output variables are filled in.

Figure 12D:
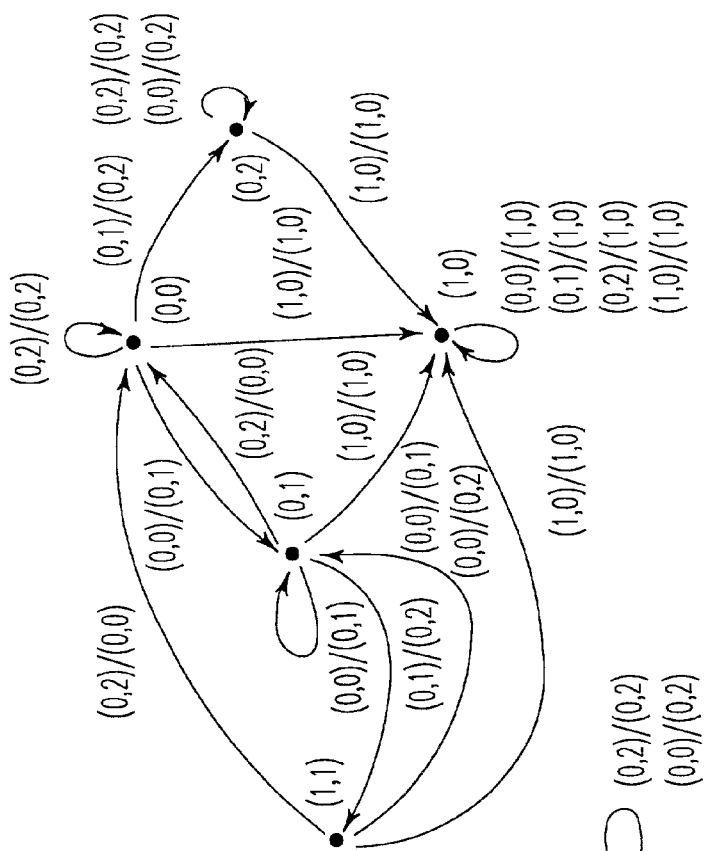
FIGS. 12C and 12D illustrate transition diagrams corresponding to the function tables of FIGS. 12A and 12B, respectively.
Figure 12C:
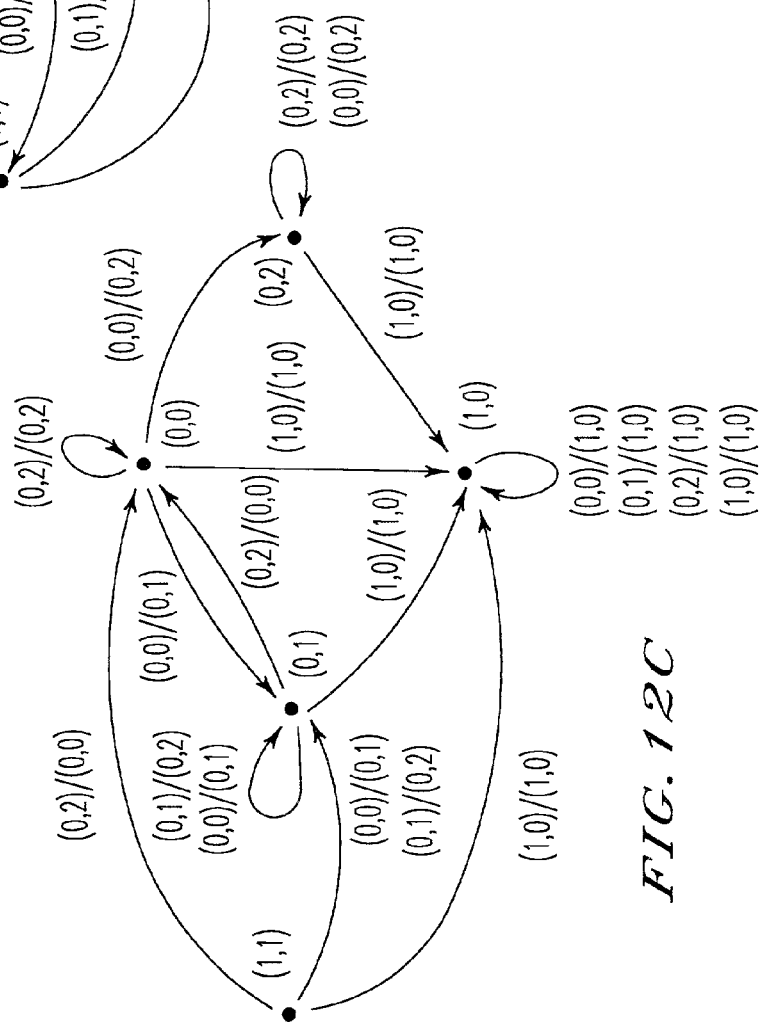

In addition to the random row copying process that created the function table of FIG. 11B (and which is repeated as FIG. 12A), transitions from the state being copied (q) to itself (q) can randomly be set to point to either q or q' (the copied version of q). For example, after row (0,1) is copied to row (1,1) as shown in FIG. 12A, the (0,1) entry of row (0,1) can be modified to point to the corresponding (0,1) entry in the newly copied row (1,1). Similarly, transitions in row (1,1) only could have been changed, as could transitions in both rows (0,1) and (1,1) for entries corresponding to entries that point back to themselves within an original row. Equivalent changes are shown in FIGS. 12C and 12D.

Again returning to the function table of FIG. 11B (which is repeated as FIG. 13A), an existing function table can be modified to switch the labels assigned to any pair of nodes without the loss of generality. For example, state (0,1) can be switched with state (1,0), and in the graphical representation of FIG. 12C would simply require a relabeling of the graph. However, the function table format results in a remapping as shown in FIG. 13B.

FIG. 14A illustrates the process of interchanging input symbols using the function table of FIG. 13B. By interchanging the columns of inputs (0,2) and (1,0), the function table of FIG. 14A is transformed into the function table of FIG. 14B. (Note that although $\Sigma'=\Sigma 2$, other mappings are possible such that the interchange is really a specification of a new input symbol.) Certain other criteria must also be examined, however, to ensure that such an interchange is acceptable. The first criterion is that, if a Mealy machine is to read its own output at some later stage (as is supported by Turing machines), every interchange of input symbols must be accompanied by a corresponding interchange of output symbols. Using the example of FIG. 14A, it would also be necessary to switch the (0,2) and (1,0) output symbols.

According to the second criterion, any interchange of input symbols must be recorded and stored locally, otherwise the rightful user of the machine may not be able to use it in a meaningful way. Input specifications provided to other parties must also be adjusted accordingly.

Nonetheless, the third criterion (which acts as an anti-criterion) is that if the interchanges are only done in the dummy symbols, changes do not affect the computation and can be ignored.

Similar to the process of FIGS. 14A and 14B (and with the same criteria), output symbols can be exchanged in an analogous fashion as shown in FIGS. 15A and 15B. (Note that although $\Delta'=\Delta$, other mappings are possible such that the interchange is really a specification of a new output symbol.) By interchanging the (0,2) and (1,0) output symbols, the function table of FIG. 15A becomes 15B.

Figures 16A, 16B:
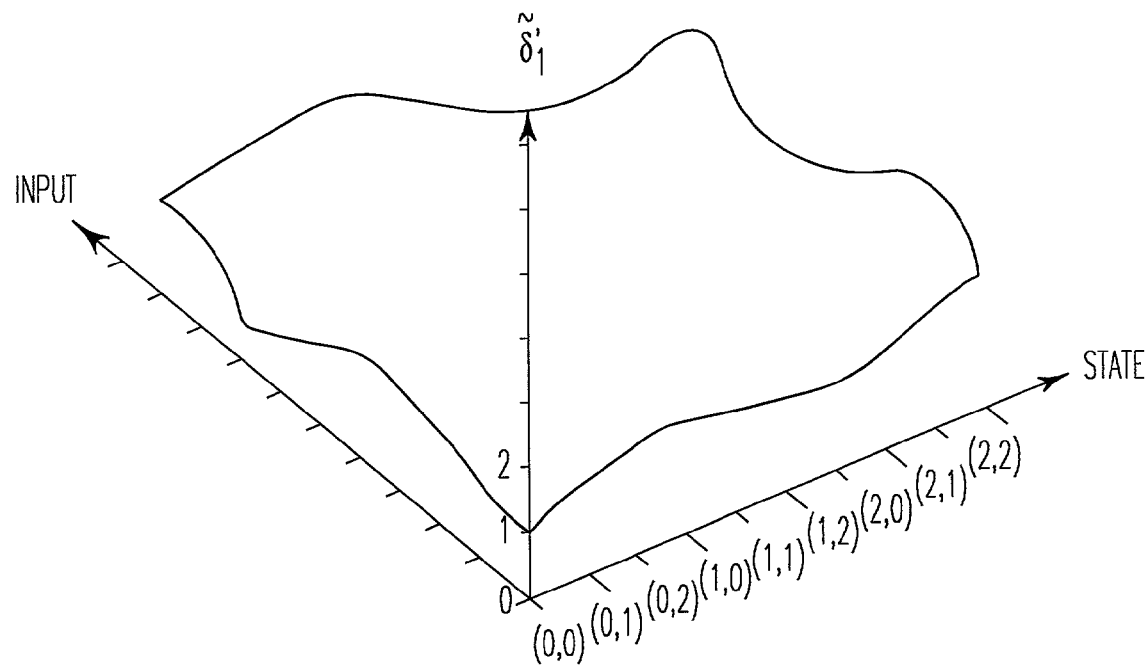
FIG. 16A is a polynomial mapping of inputs and states to outputs.
FIG. 16B is a polynomial interpolation for various states and inputs.

FIGS. 16A and 16B illustrate a method of transforming state transition and output mappings of an augmented Mealy machine to polynomial mappings. In the illustrated example, generally states have two components $x_1$, $x_2$, and inputs have two components $x_3$, $x4$ such that the output mapping has two components $\lambda'_1(x_1, x_2, x_3, x_4)$ and $\lambda'_2(x_1, x_2, x_3, x_4)$. Thus, the state transition mapping of the augmented machine has two components: $\delta'_1(x_1, x_2, x_3, x_4)$ and $\delta'_2(x_1, x_2, x_3, x_4)$. Generally each polynomial interpolation of a mapping component may be visualized as exemplified in FIG. 16B, although FIG. 16B is not intended to be drawn to scale. Thus, the interpolation for any given component is only guaranteed to exist if all components (be they in state, input, or output vectors) can be selected from the set of integers modulo some N, such that (a) N is greater than any possible individual component value as given by the state transition table and (b) N is a prime number.

FIG. 17 illustrates a method of precomputing the $a_1(x)$ functions; given by:

$$a_i(x) = \left(\prod_{\substack{k \in K \\ i \neq k}} \frac{x-k}{i-k}\right) \bmod N,$$

such that each $a_1(x)$ is symbolically constructed only once for the specified set. Those results are represented by their respective arrays of coefficients and can be used to decrease calculation time spent during computation.

Figure 20A:
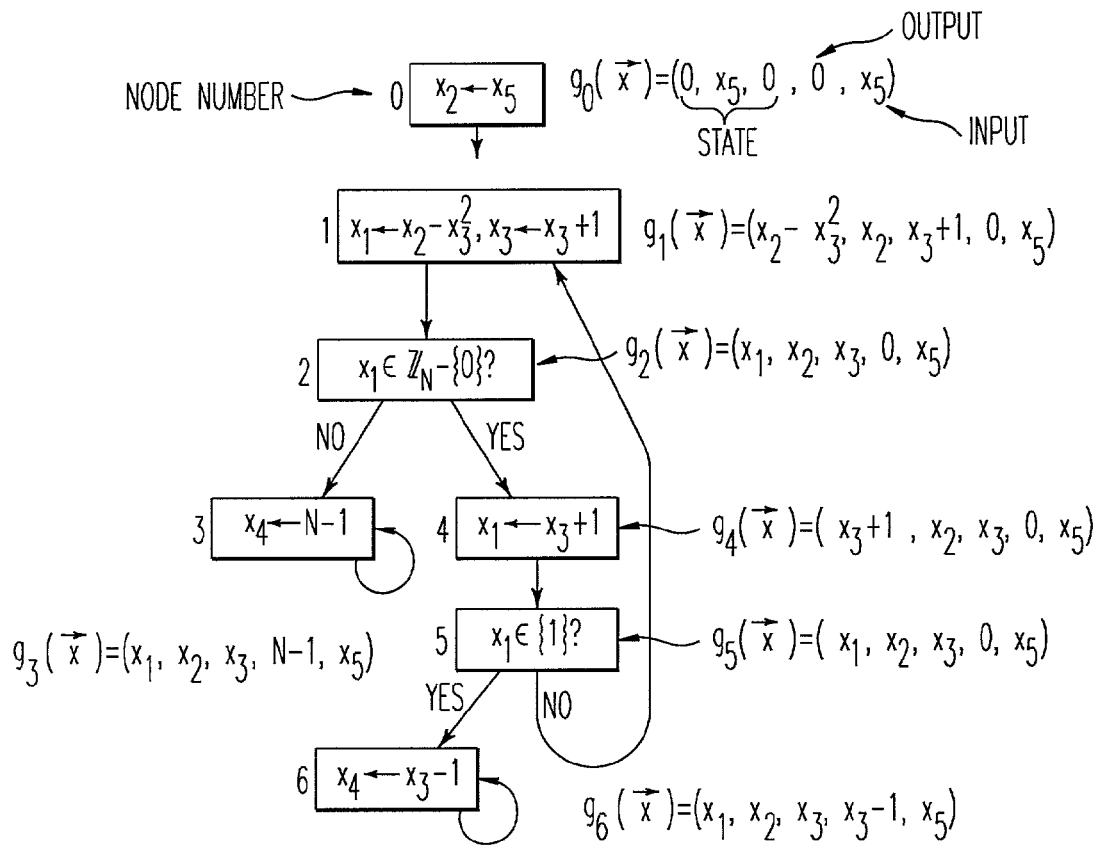
FIG. 20A illustrates a method of transforming the BSS machine of FIG. 19 into a BSS' machine.
Figure 20B:
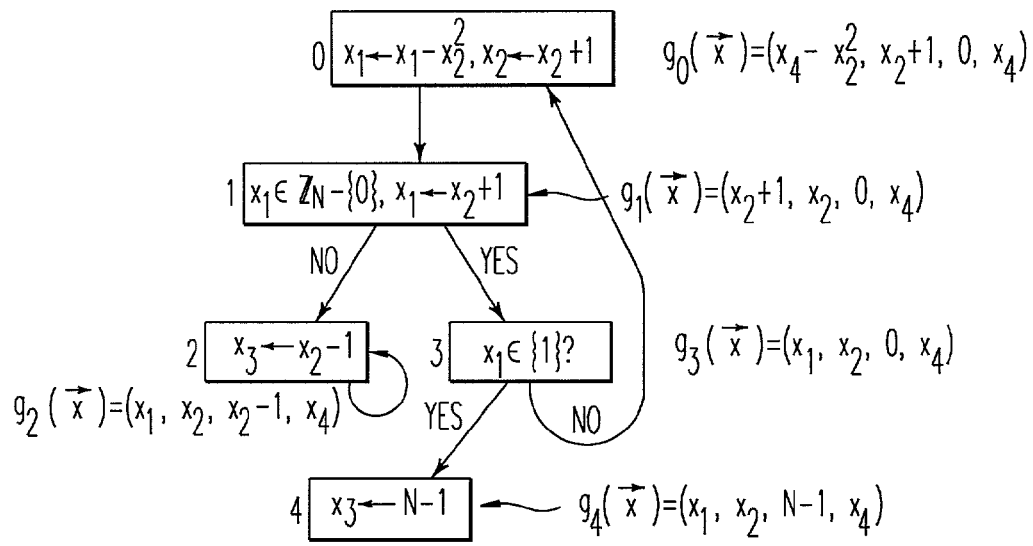
FIG. 20B illustrates an equivalent BSS' machine generated from scratch.

FIG. 18 illustrates a BSS machine to be modified into a BSS' machine under various conditions according to the present invention. Node numbering can be adjusted using the illustrated technique to begin numbering nodes at zero. Having generated a BSS machine according to FIG. 18, the input and output mappings are converted, and a computation mapping $g_1$ is added to every node that doesn't have one, as shown in FIG. 19. FIG. 20A illustrates a BSS machine resulting from the calculations of FIG. 19. It may, however, be easier to create an equivalent BSS' machine from scratch, such as the five node machine illustrated in FIG. 20B.

As shown in FIG. 21, the method of transforming a BSS' machine into a single polynomial mapping includes expressing a set membership relation $\in K$ as a polynomial. The result of symbolically multiplying together $(x-i)^{(N-1)}$, for every $i \notin K$, modulo N is called $b_K$. (Note that zero cannot be a member of K.) Since all $K_{i,j}$ are disjoint, their intersections are empty. Moreover, $\Delta(i, x)$ is symbolically calculated according to:

$$\Delta(i,x) = b_{K_{i,1}}(x)n_{i,1} + \ldots + b_{K_{i,l}}(x)n_{i,l} + (1 - b_{K_i}(x))n'',$$

where $b_{K_{i,j}}$ is the polynomial expression for evaluating the set inclusion relation. The next node function, expressed as a polynomial, combines all the $\Delta(i,x)$ according to the $a_i(x)$ functions using the domain definition:

$$\beta(n, x) = \sum_{i=0}^{p} a_i(n) \Delta(i, x),$$

where p is the number of nodes and N is the size of the field. The computation mappings are similarly combined to produce the computing endomorphism:

$$\left(\beta(n, x_1), \sum_{i=0}^{p} a_i(n) g_i(\vec{x})\right).$$

Figure 22A:
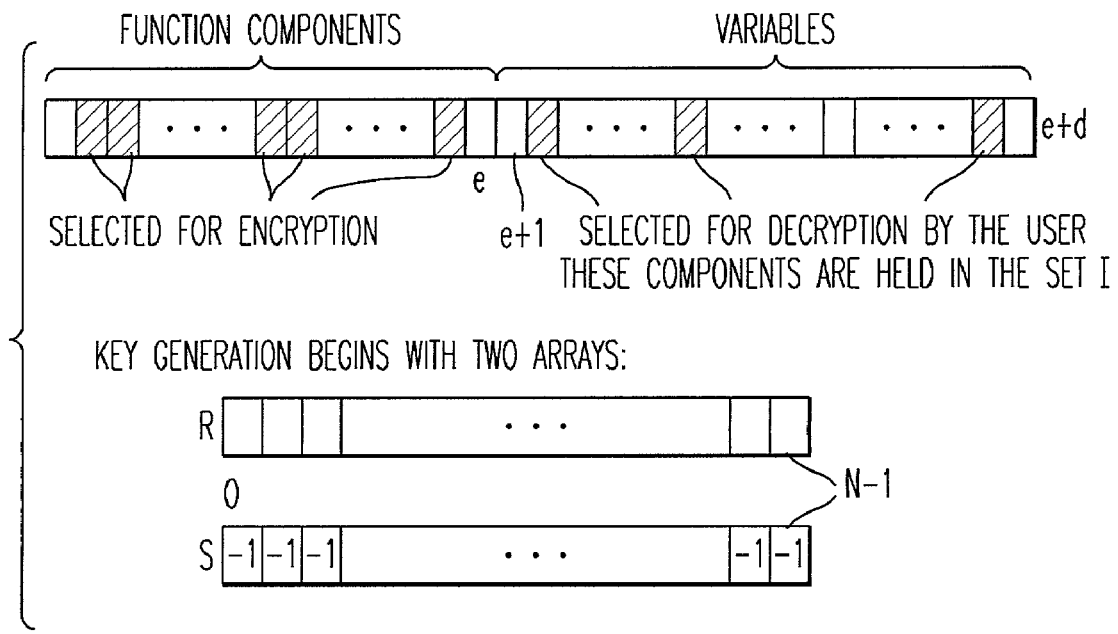
FIGS. 22A–22C illustrates three consecutive steps of a key generation process.
Figure 22B:
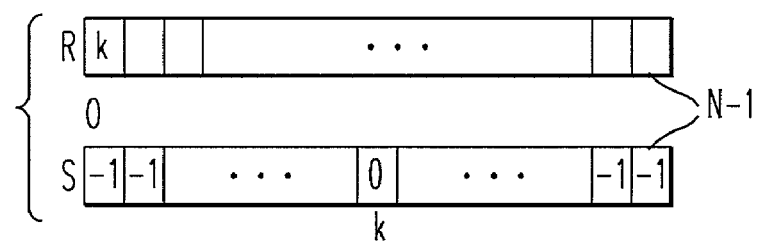
Figure 22C:
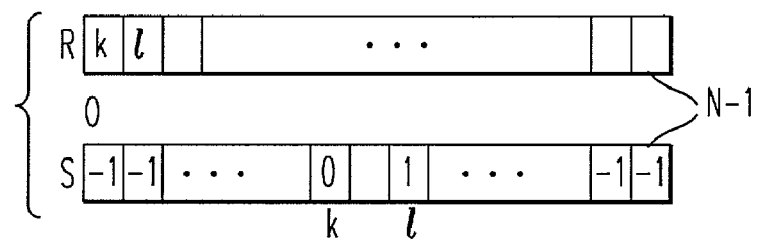

FIGS. 22A–22C illustrate three consecutive steps in generating keys for univariate encryption of multivariate polynomial mappings. First the elements to be encrypted and decrypted are selected by a user. Generally, elements selected by the user to be encrypted (from within the first "e" elements) are placed in the set J. and variables from elements "e+1" to "e+d" that are selected for decryption are held in set I. To save unnecessary computation, components not in J and variables not in I remain untouched. Keys are only generated in a sufficient number for those components/variables actually affected. The definition of ƒ gives the prime number used in generating key pairs. Key generation begins with the two arrays in FIG. 22A. After one step of the key generation process, the arrays may take on an exemplary form shown in FIG. 22B. After a second step, the exemplary embodiment is shown in FIG. 22C.

Figures 23, 24A, 24B:
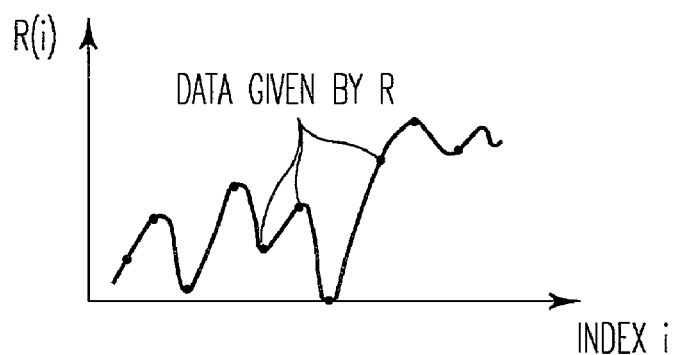
FIG. 23 illustrates a graph for use in computing a permutation and its inverse via interpolation.
FIGS. 24A and 24B illustrate two arithmetic operations over a field as exemplified for $Z_5$.

FIG. 23 illustrates an interpolated polynomial (given by the array R) that is used to compute a permutation according to one aspect of the present invention. The inverse is computed in a similar manner using the array S.

In order to save time (and component complexity), according to one embodiment of the present invention, a number of arithmetic operations are pre-computed. As shown in FIGS. 24A and 24B, it is possible to compute the multiplication and exponentiation of numbers and store the result in a look-up table for later (quick) reference.

Figure 25A:
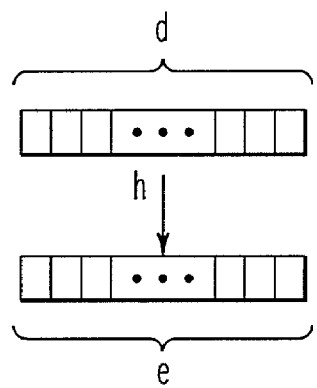
FIGS. 25A–25C illustrate encrypting plural variables and mapping components of multivariate polynomials with univariate polynomials.
Figure 25B:
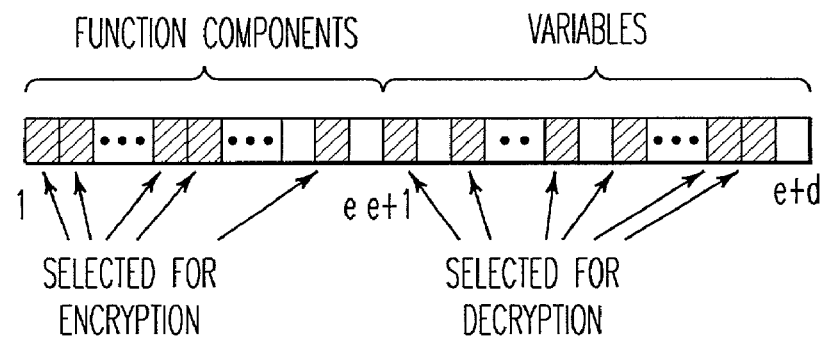
Figure 25C:
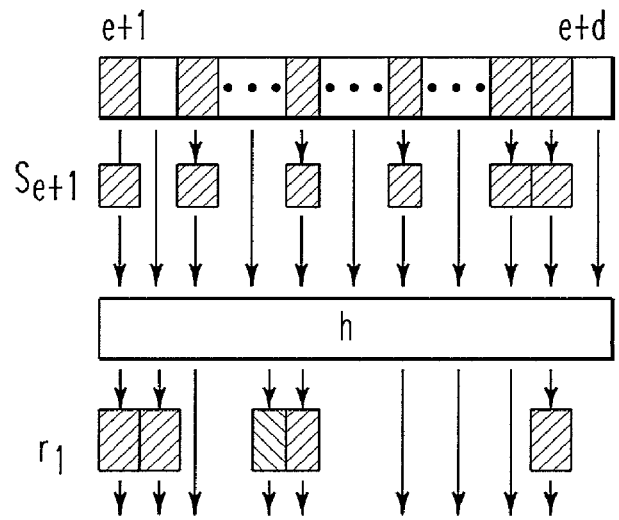

As shown in FIG. 25A, a mapping d can be encrypted into a form h. When encrypting plural variables and mapping components of multivariate polynomials with univariate polynomials, it is possible to utilize constraints on pairs of keys. For example, using a set of function components and variables as shown in FIG. 25B, it is possible to add a constraint that key pairs 1 and e+1 must be identical. Then, as shown in FIG. 25C, selected variables i (from set I) are then decrypted by symbolically composing them with corresponding inverse permutations $s_{e+1}$. Then function components j (from set J) are encrypted by symbolically composing them with the corresponding permutations $r_j$. Generally the result of $s_{e+1}$ and $r_j$ yields the resultant partially encrypted h, $E_{r,s} \circ h$.

Figure 26A:
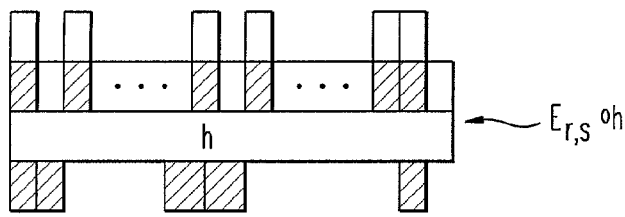
FIG. 26A illustrates a partially encrypted $Er_{r,s} \circ h$ to be used as a starting point in a process of re-encrypting plural variables and mapping components of multivariate polynomials with second univariate polynomials.
Figure 26B:
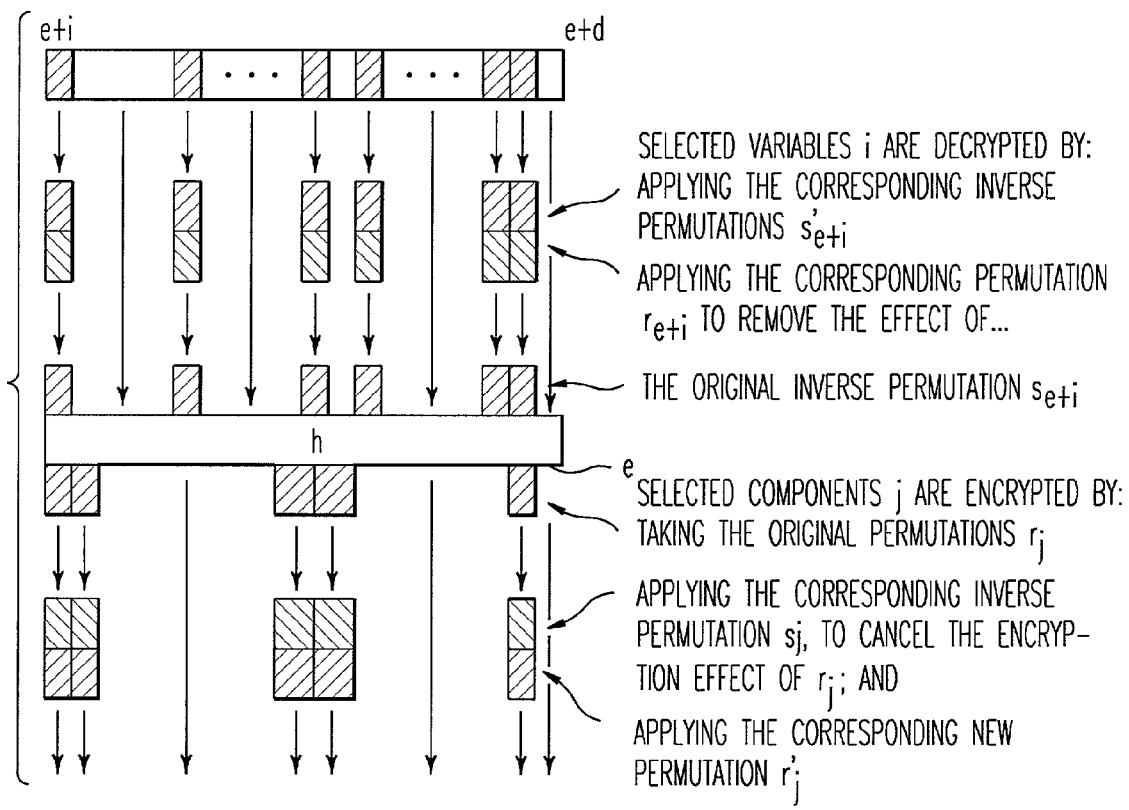
FIG. 26B illustrates a process of re-encrypting plural variables and mapping components of multivariate polynomials with second univariate polynomials.

FIG. 26A illustrates a partially encrypted $E_{r,s} \circ h$ (produced as a result of FIG. 25C) to be used as a starting point in a process of re-encrypting plural variables and mapping components of multivariate polynomials with second univariate polynomials. That partially encrypted result undergoes the process of symbolically re-encrypting plural variables and mapping components of multivariate polynomials with second univariate polynomials as shown in FIG. 26B. Thus, the original encryption in reversed and a new encryption is applied with a new set of keys.

Figure 26C:
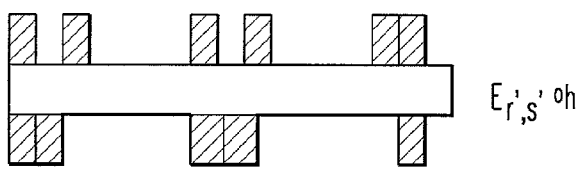
FIG. 26C illustrates a result of the re-encrypting process of FIG. 26B.

FIG. 26C illustrates a result of the re-encrypting process of FIG. 26B. Accordingly, a new $E_{r',s'} \circ h$ is created which is the same mapping partially encrypted with key pairs $(r_1', s_1') \ldots (r_{e+d}', s_{e+d}')$ instead of with $(r_1, s_1) \ldots (r_{e+d}, s_{e+d})$.

Figures 28A, 28B, 28C, 28D, 28E:
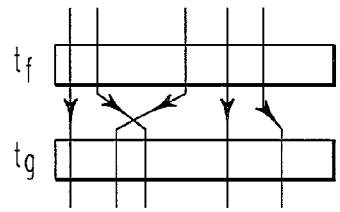
FIGS. 28A–28E illustrate a process of symbolically composing mappings represented as function tables to produce a combined function table.

FIGS. 27A and 28A illustrate function tables for $f(x_1, x_2)$ and $g(x_1, x_2)$, respectively that can be used in a symbolic composition of $g(f(\vec{x}))$. Generally, the composition of $t_f$ from FIG. 28B and $t_g$ from FIG. 28C create the table $t_{fg}$ as shown in FIG. 28D. Alternatively, the composition process is shown schematically in FIG. 28E.

Figure 29A:
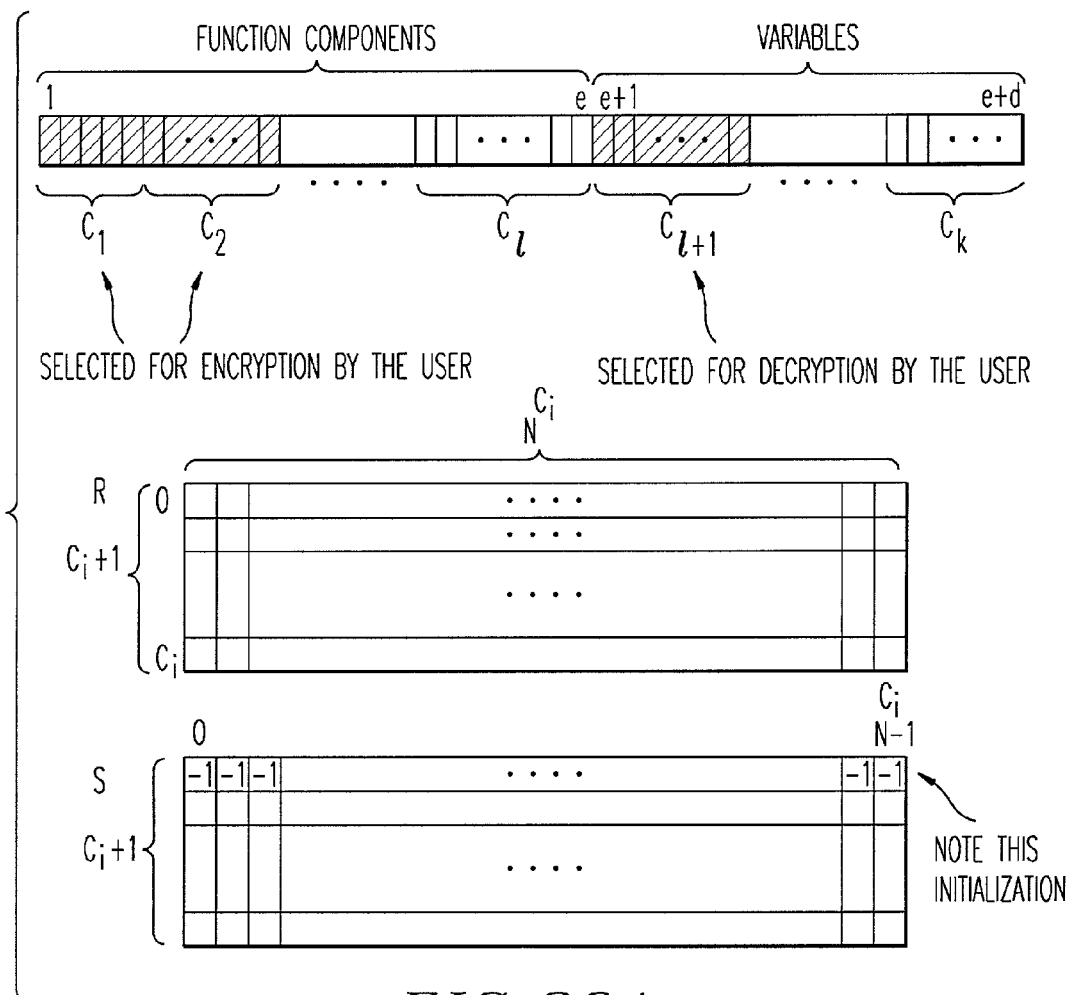
FIGS. 29A and 29B illustrate a process of generating keys for multivariate encryption of multivariate polynomial mappings.
Figure 29B:
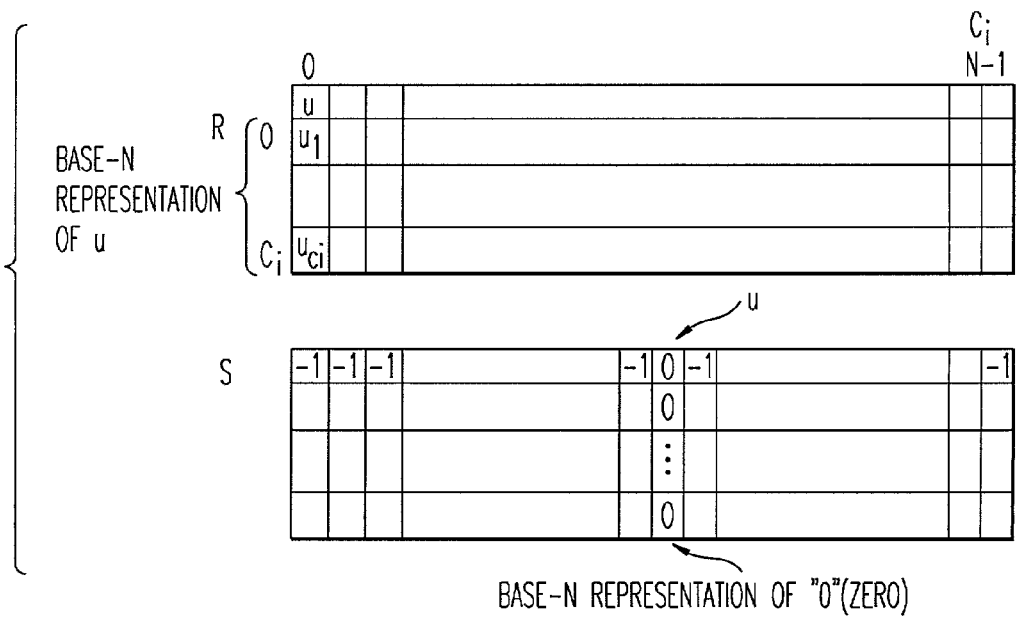

Again assuming a mapping as shown in FIG. 25A, function components selected for encryption are stored in the set J and variables stored for decryption are stored in the set I. As was mentioned in the description of FIG. 22A, to save unnecessary computation, components not in J and variables not in I remain untouched (as is possible in all similar key generation phases). Having started with the arrays of FIG. 29A, a first key generation step os performed, creating an exemplary representation shown in FIG. 29B. Subsequent interpolation of each R/S pair is performed similarly to the interpolation of FIG. 23.

Figure 30:
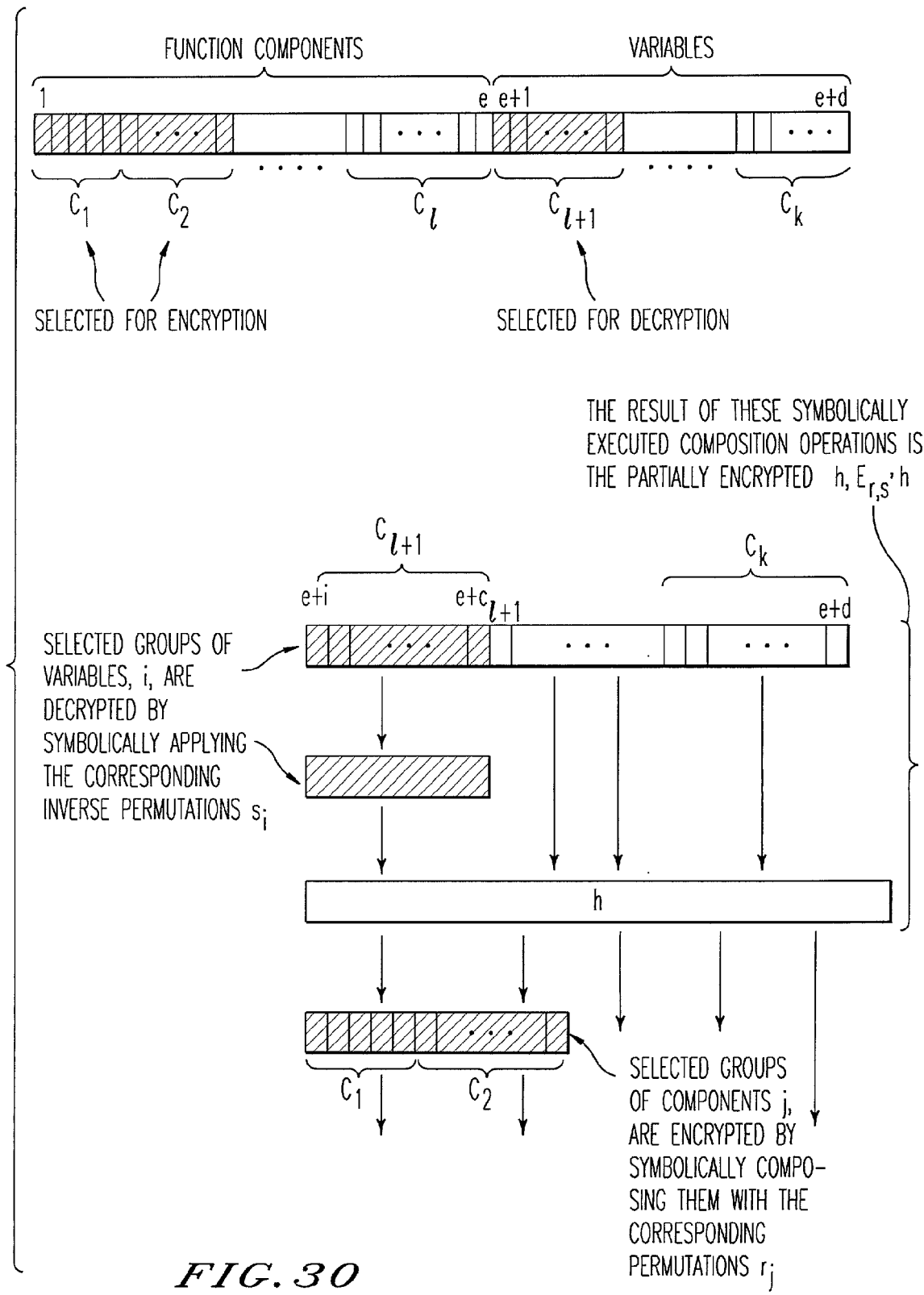
FIG. 30 illustrates the process of encrypting plural variables and mapping components of multivariate polynomials with multivariate polynomials.

As with the process of FIG. 25C, FIG. 30 illustrates decrypting selected groups of variables, i, encrypting selected groups of components, j, and creating a partially encrypted result h, $E_{r,s} \circ h$. However, the process of FIG. 30 utilizes multivariate polynomials instead of the univariate polynomials of FIG. 25. In such a case, rather than key pairs being identical for elements 1 and e+1, key triples are identical instead.

Figure 31A:
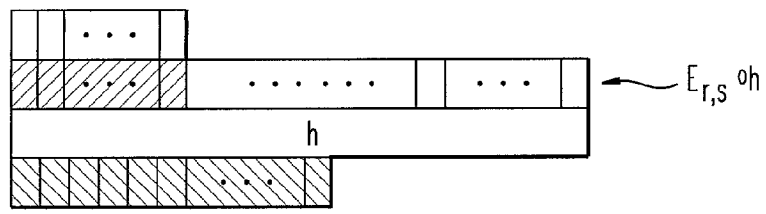
FIG. 31A illustrates a starting point of the process in FIG. 31B.
Figure 31B:
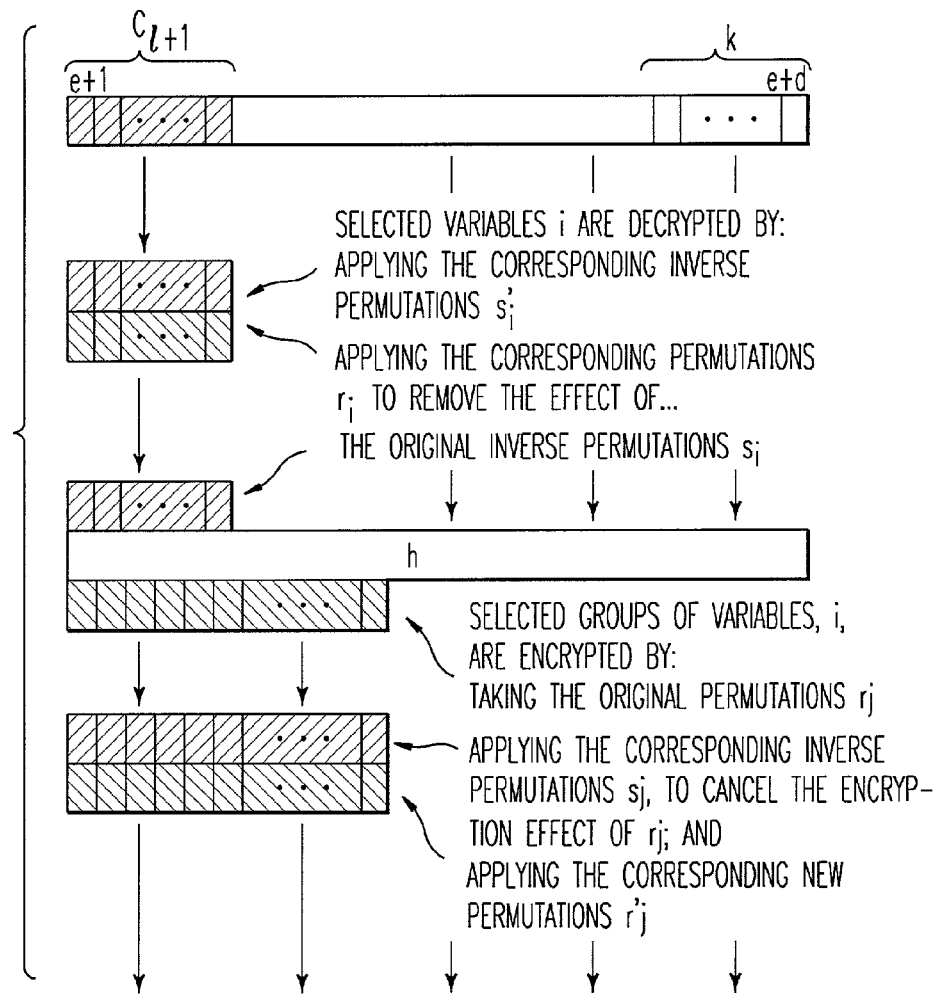
FIG. 31B illustrates the process of re-encrypting plural variables and mapping components of multivariate polynomials with second multivariate polynomials.
Figure 31C:
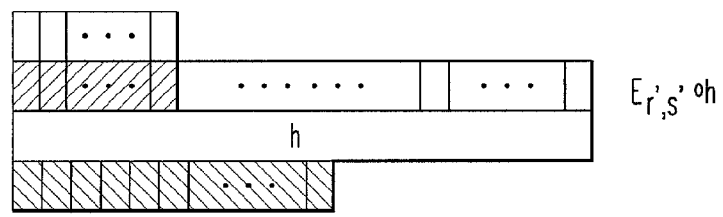
FIG. 31C illustrates the result of the process of FIG. 31B.
Figure 32A:
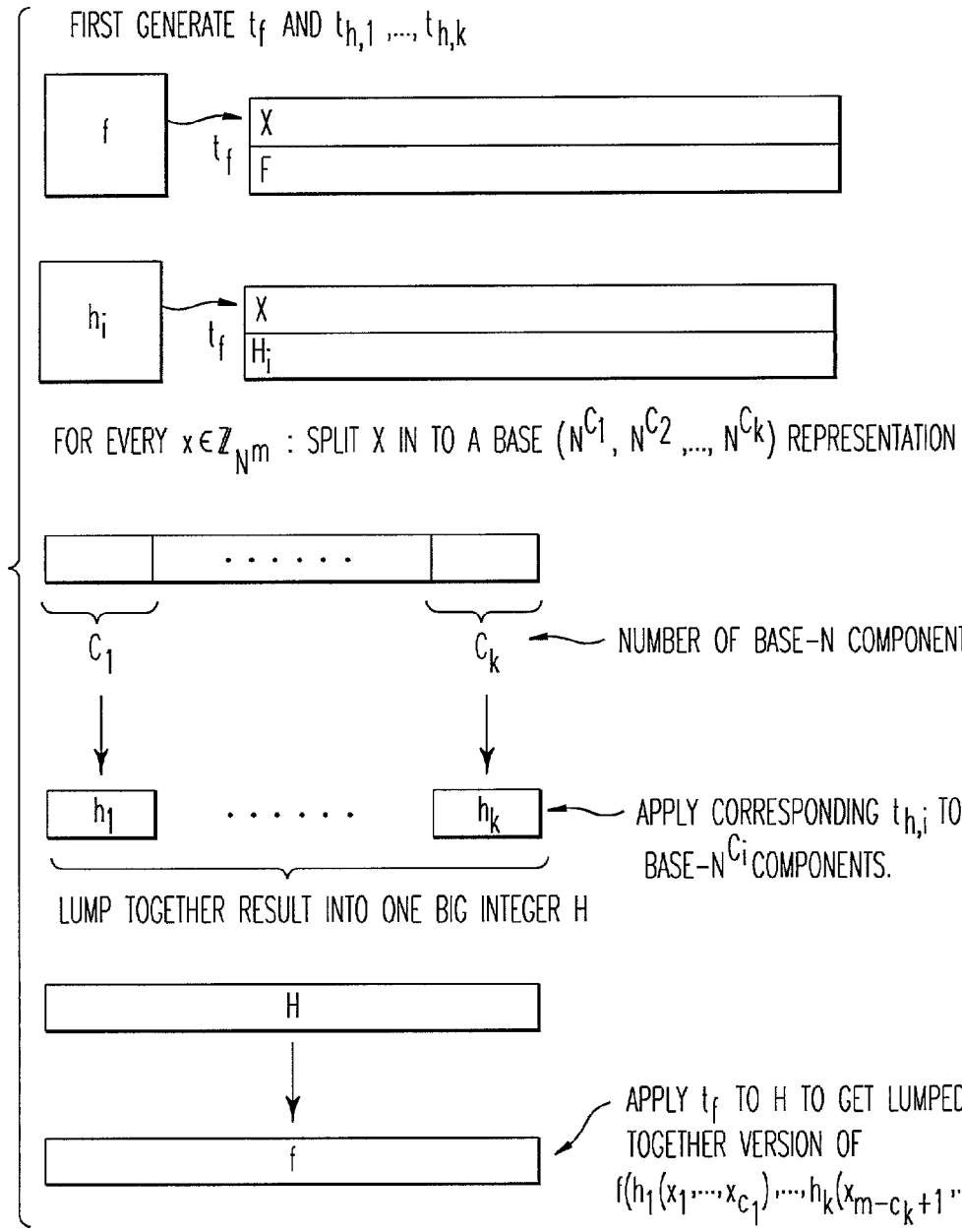
FIG. 32A illustrates a process of symbolically composing mappings represented as function tables to produce a combined function table.
Figure 32B:
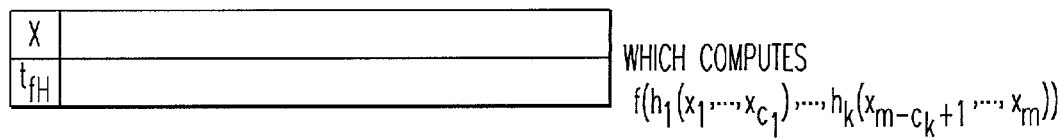
FIG. 32B illustrates the result of the process of FIG. 32A.
Figure 33A:
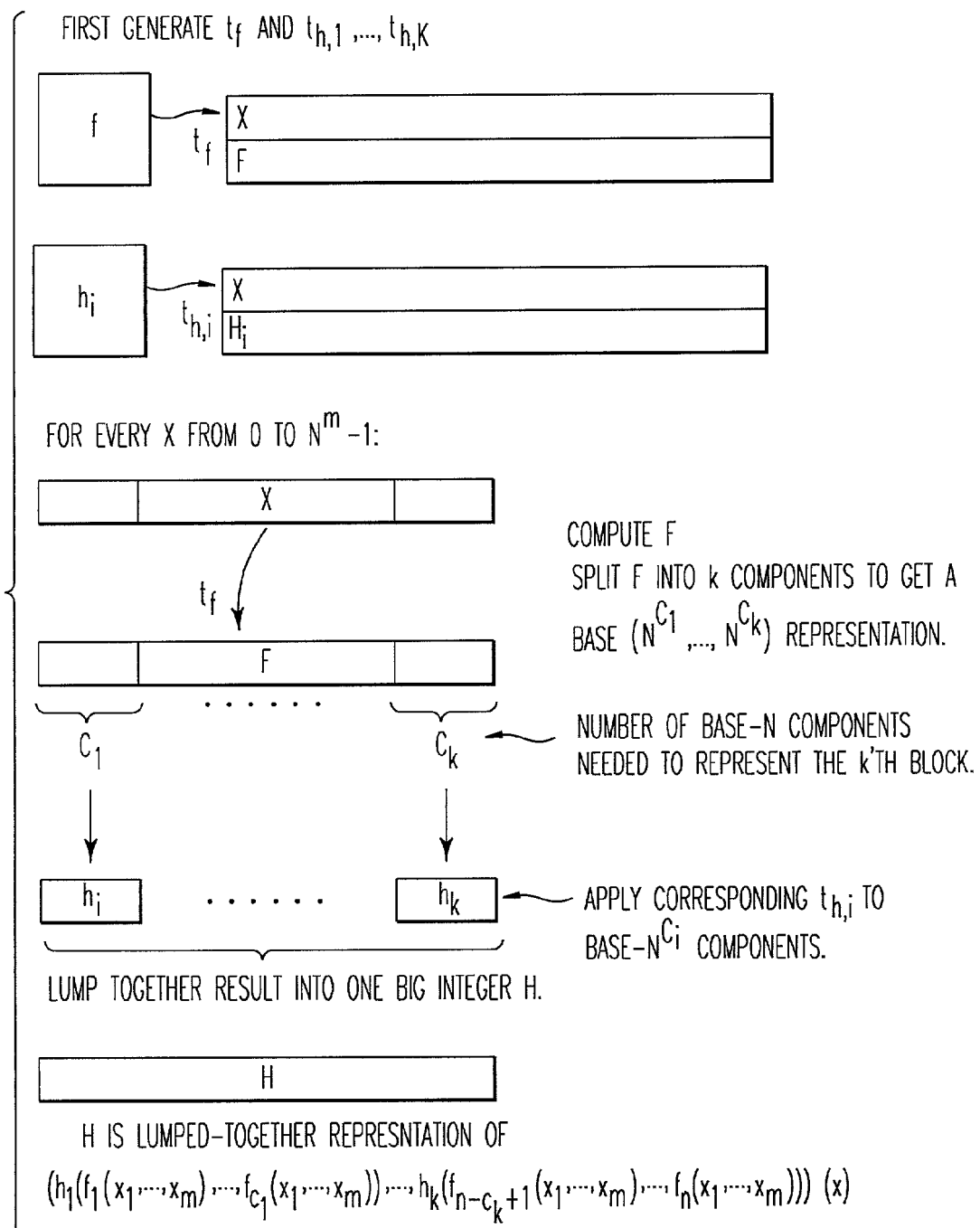
FIG. 33 illustrates a process of symbolically composing mappings represented as function tables to produce a combined function table.
Figure 33B:
Figure 34:
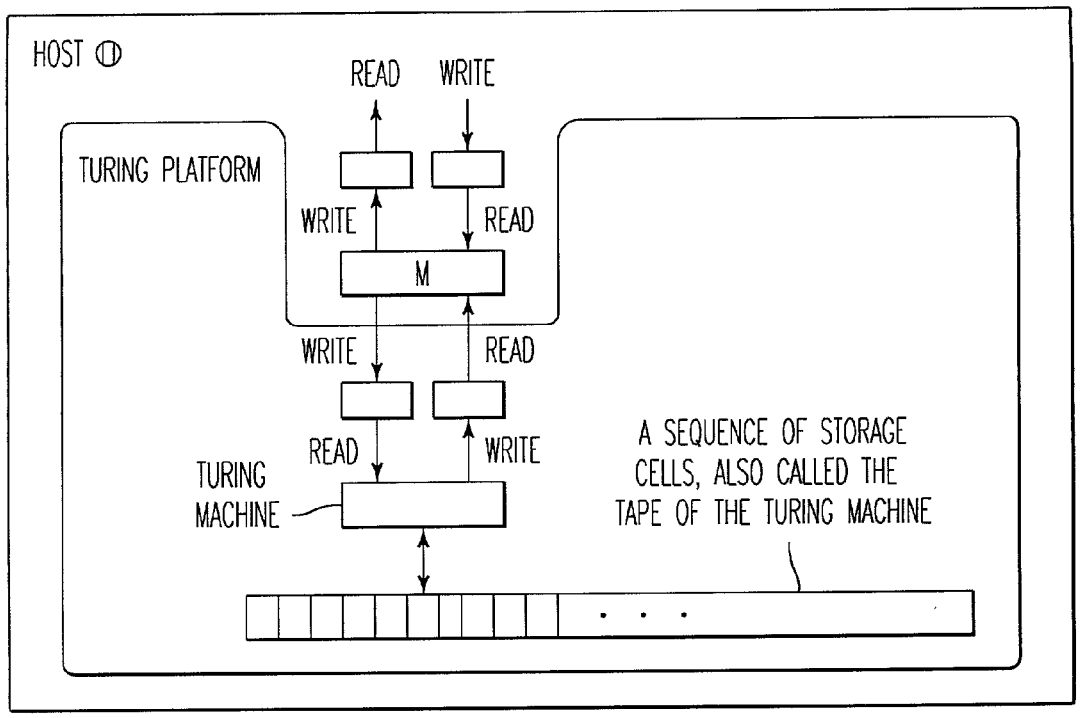
FIG. 34 illustrates a Turing platform supporting unencrypted and partially encrypted composition for some machine M on a host O.

Similar to the starting point, process and result of FIGS. 26A, 26B, and 26C, respectively, FIGS. 31A, 31B, and 31C illustrate the starting point, process and result of re-encrypting plural variables and mapping components of multivariate polynomials. However, in FIGS. 31A, 31B, and 31C, second multivariate polynomials are used in the process. Accordingly, by using key triples, a new $E_{r',s'} \circ h$ is created which is the same mapping partially encrypted with key triples $(c_1, r_1', s_1') \ldots (c_k, r_k', s_k')$ instead of with $(c_1, r_1, s_1) \ldots (c_k, r_k, s_k)$.

FIGS. 37A–38C illustrate a method of symbolic composition of two mappings using function tables. For the illus trated composition, e(1,1)=4, e(1,2)=3, e(2,1)=1, and e(2,2)=3. Thus, $f$'s 2 component will "disappear" in the composition and not be used at all. The resulting composition, $f(h_1(x_4, x_3), h_2(x_1, x_3))$ is given by $g(x_1, x_3, x_4)$. FIG. 38D illustrates an example of computing a composition for an entry $(x_1, x_3, x_4)=(0,1,0)$.

Figures 38A, 38B, 38C, 38D:
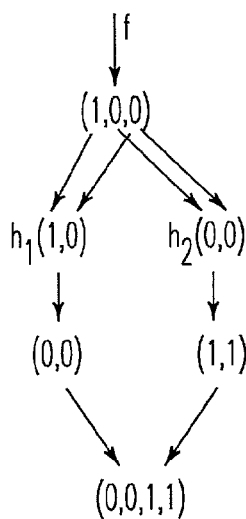
Figure 39A:
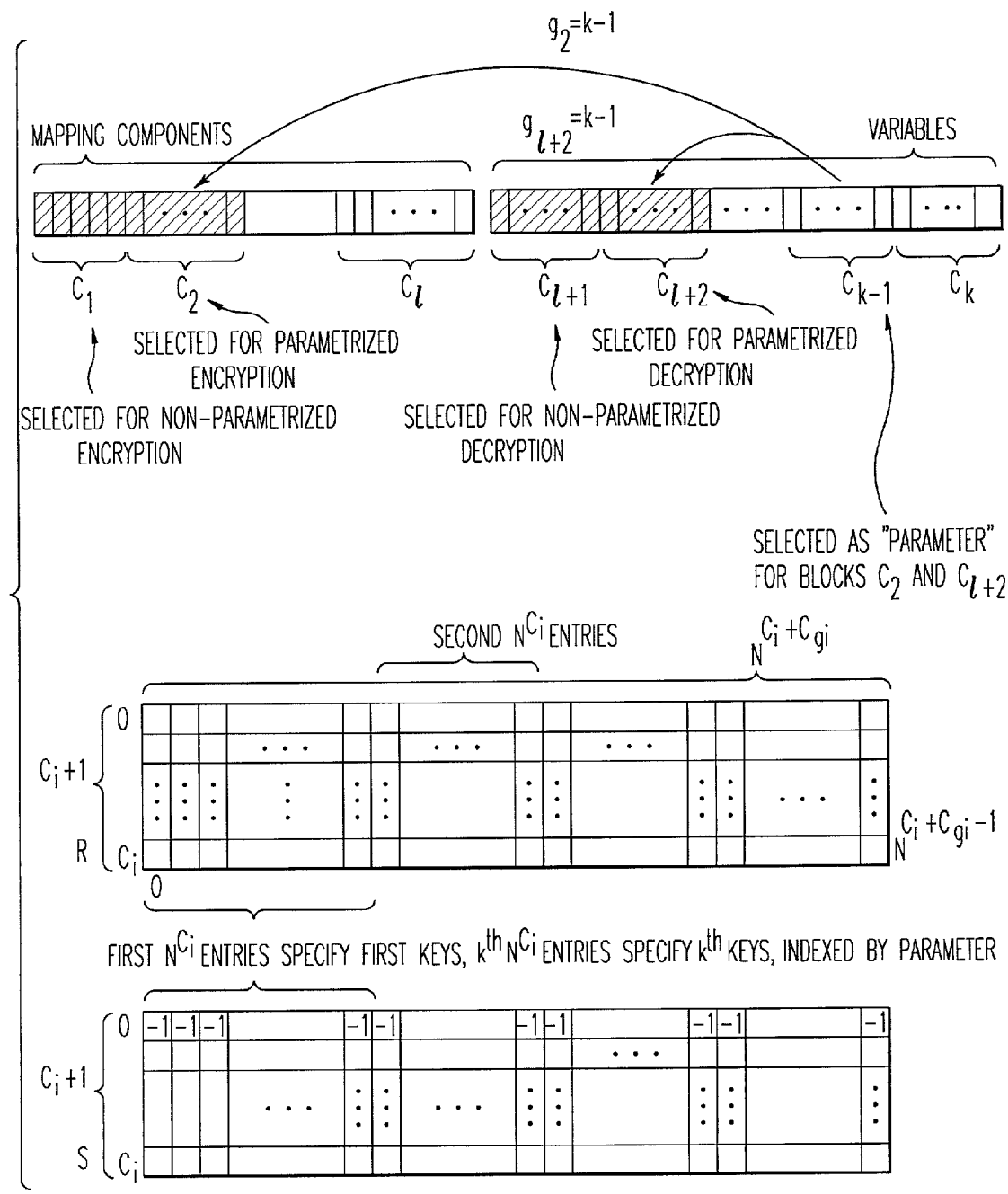
FIG. 39A illustrates a method of generating keys for parameterized encryption of multivariate mappings.

Similarly, according to FIG. 38A and 38B, a composition g is given by $g(x_1, x_2, x_3, x_4)=(h_1(f_1(\vec{x}), f_3(\vec{x})), h_2(f_2(\vec{x}), f_3(\vec{x})))$. As a result, for e'(1,1)=1, e'(1,2)=3, e'(2,1)=2, and e'(2,2)=3, an exemplary composition for $(x_1, x_2, x_3, x_4)=(0, 1,1,1)$ is illustrated in FIG. 38D.

Figure 40:
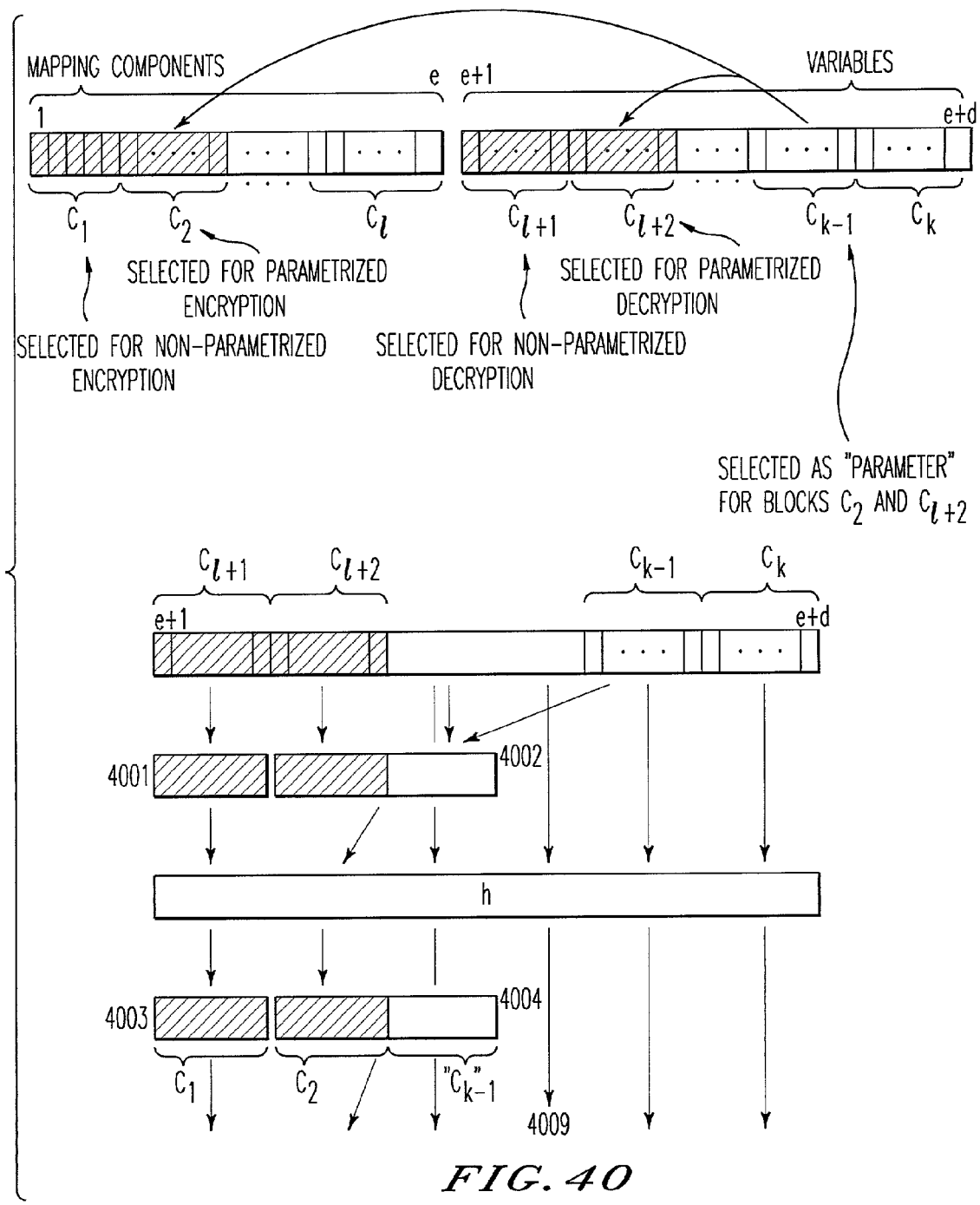
FIG. 40 illustrates a method of parameterized encryption of plural variables and mapping components of multivariate mappings with multivariate mappings.
Figure 41A:
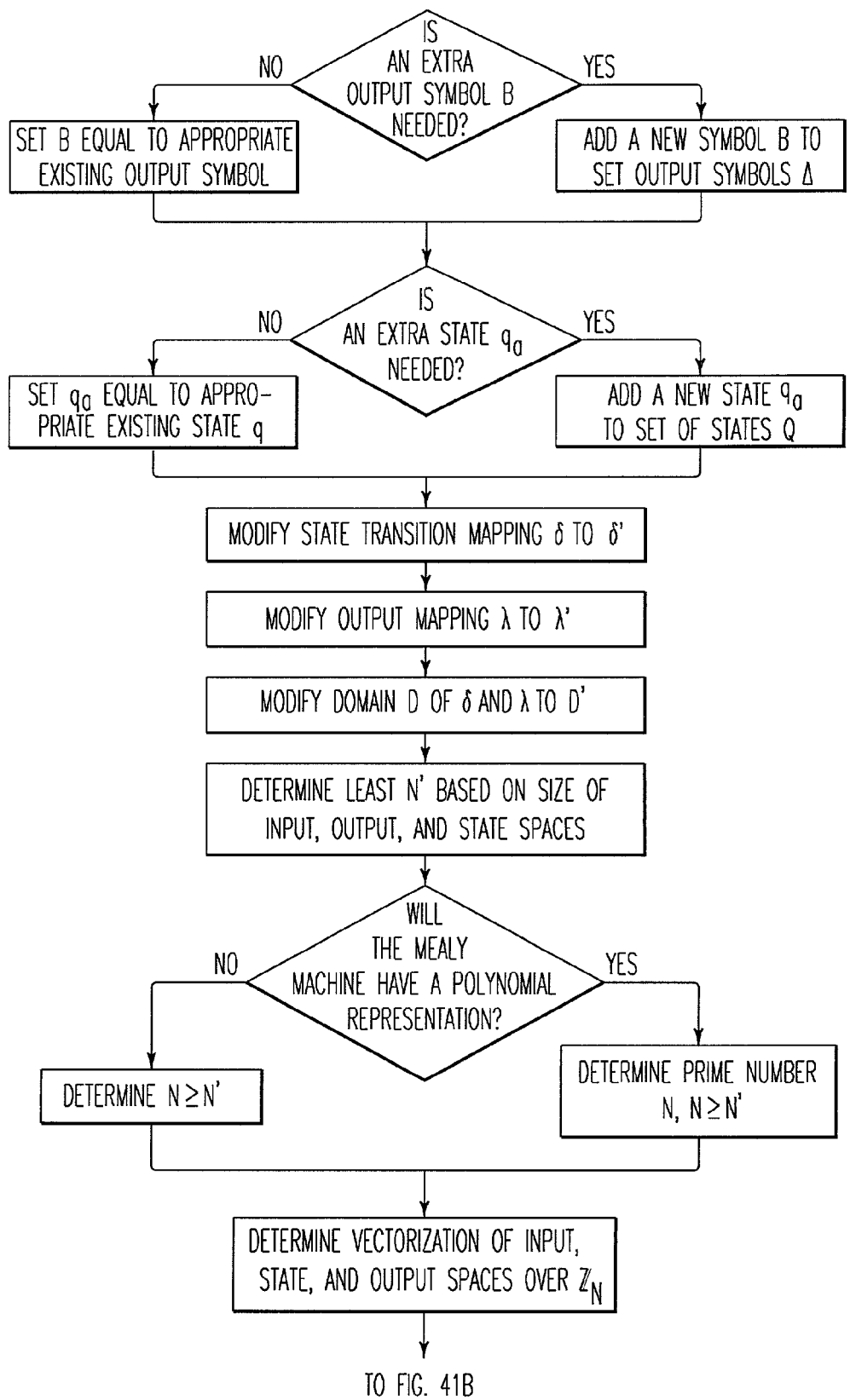
FIGS. 41A and 41B illustrate a method of augmenting a Mealy machine in preparation for its use in computation.
Figure 41B:
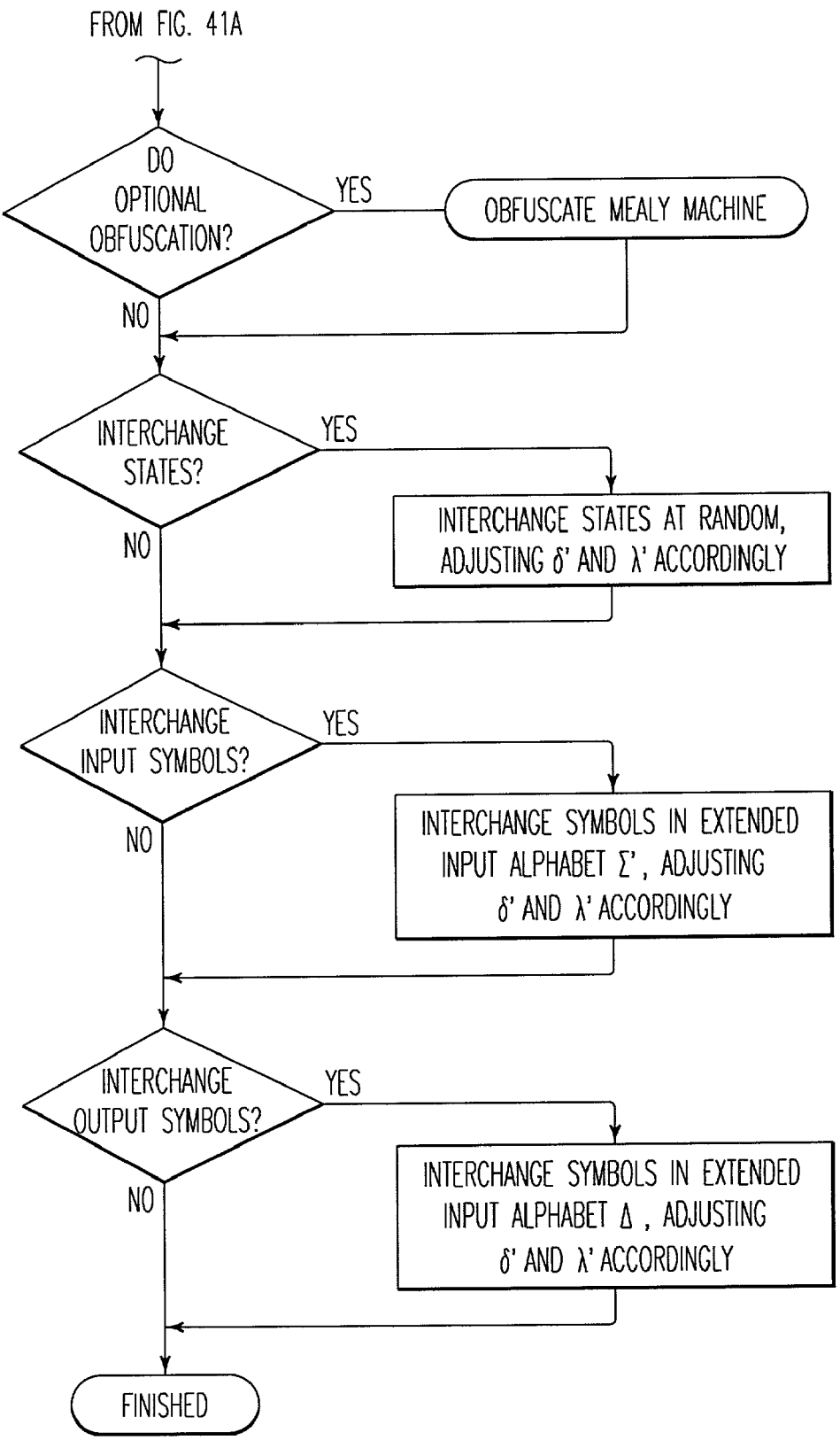
Figure 42A:
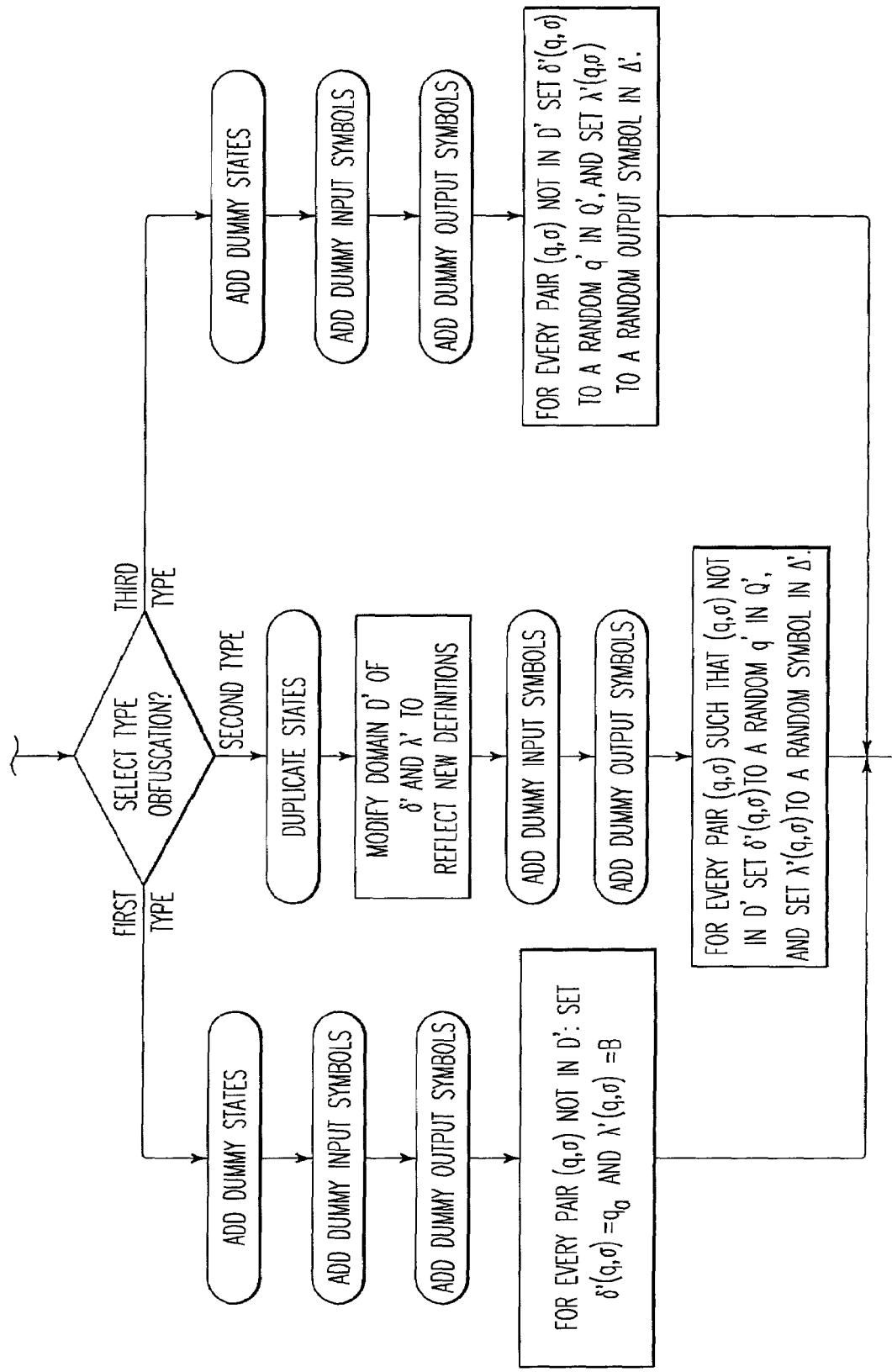
FIGS. 42A–42E illustrate a method of obfuscation of a Mealy machine as part of a method of augmentation.
Figure 42B:
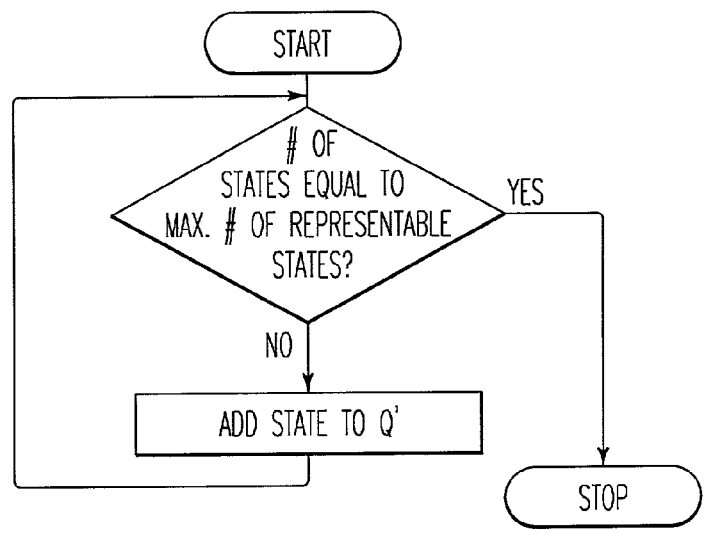
Figure 42C:
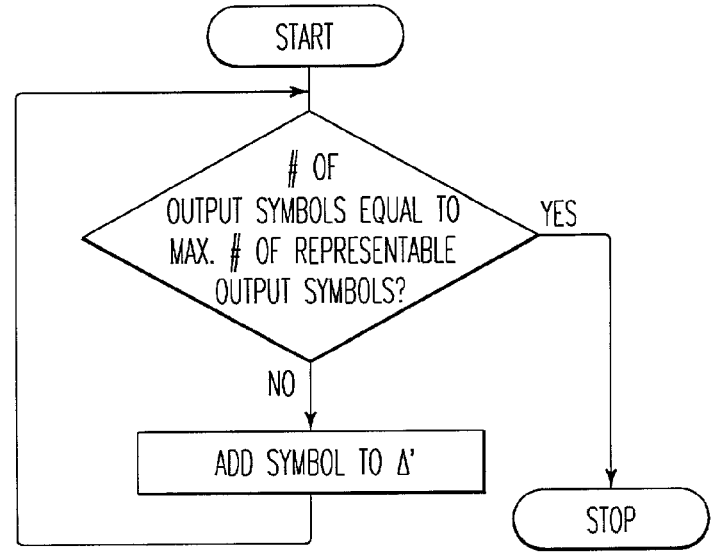
Figure 42D:
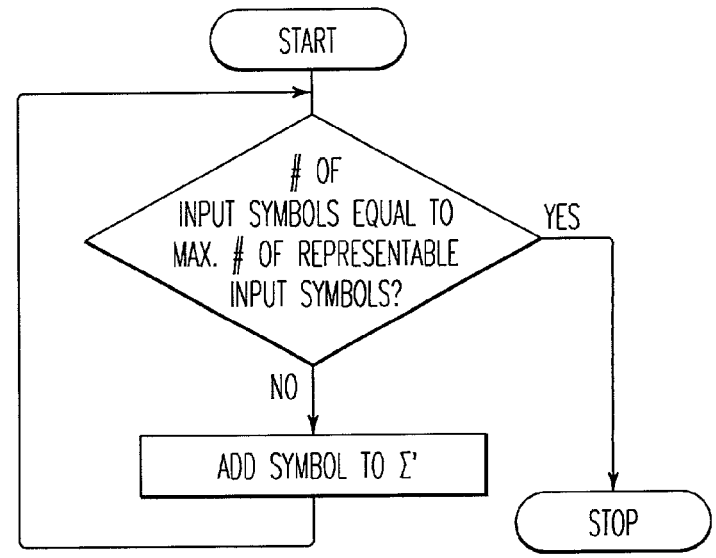
Figure 42E:
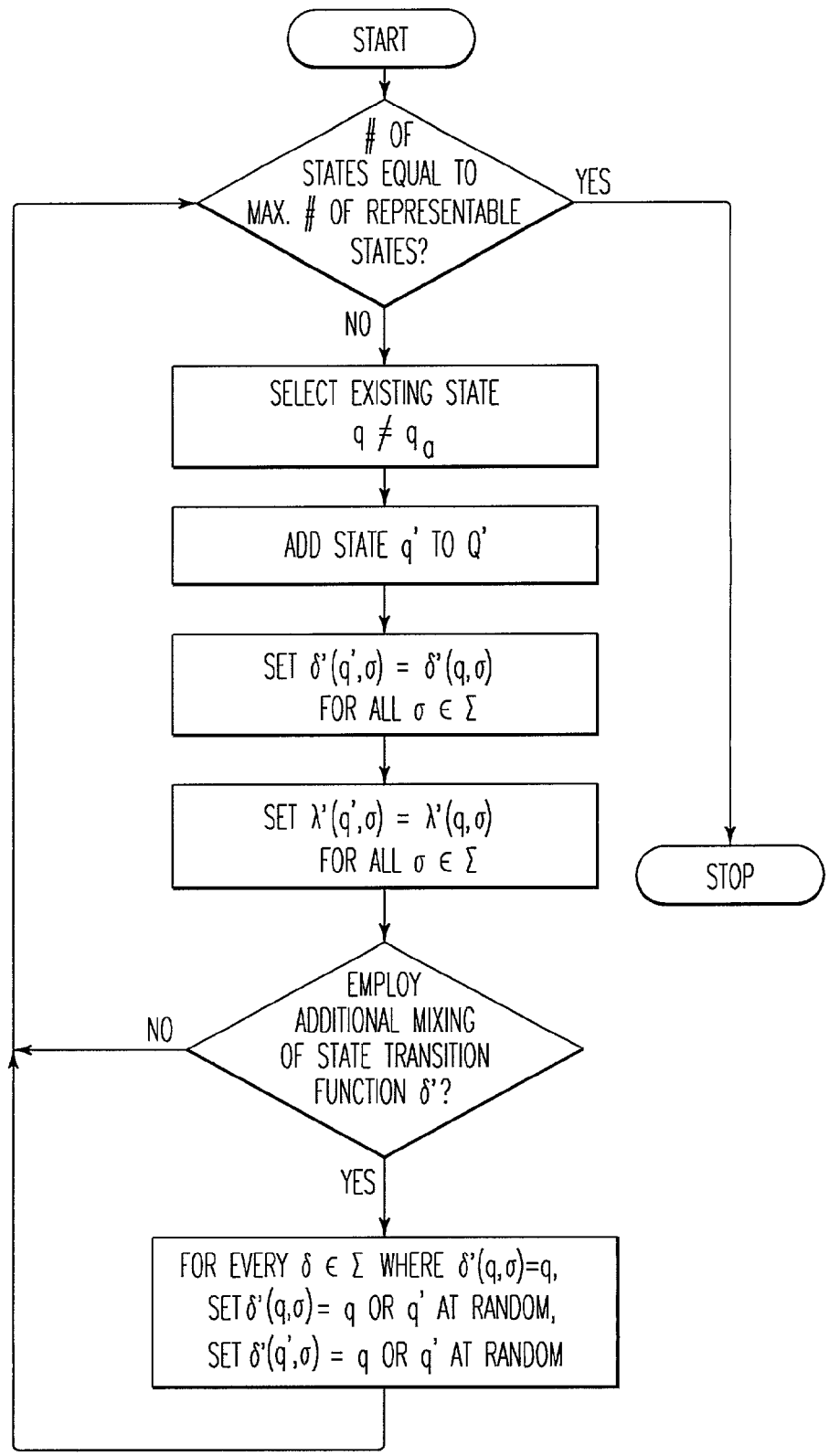
Figure 43A:
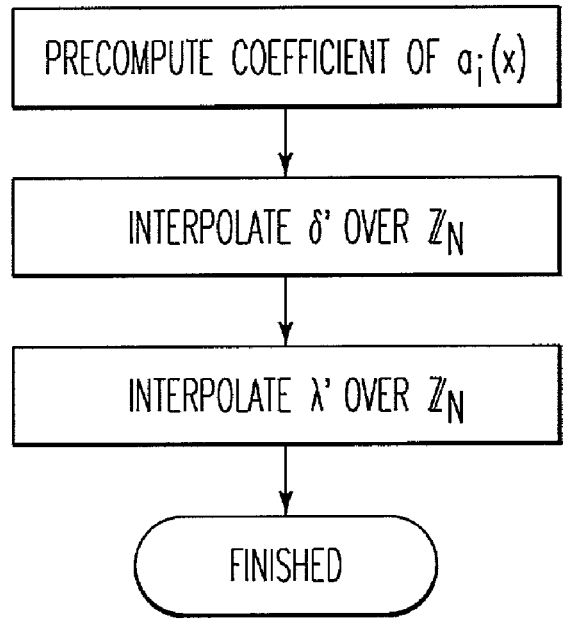
FIG. 43A and 43B illustrate processes of transforming state transition and output mappings of an augmented Mealy machine to polynomial mappings where precomputation is and is not cost effective, respectively.
Figure 43B:
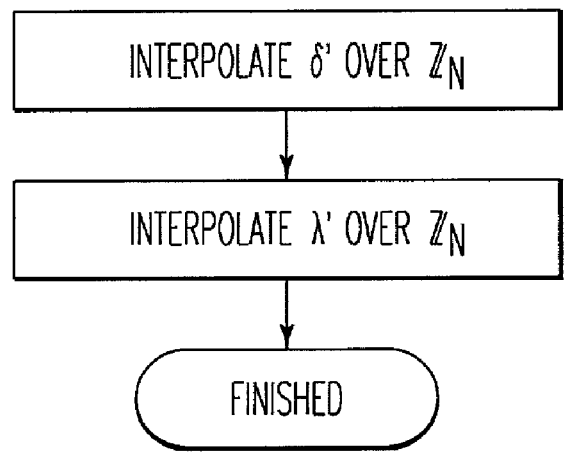
Figure 44:
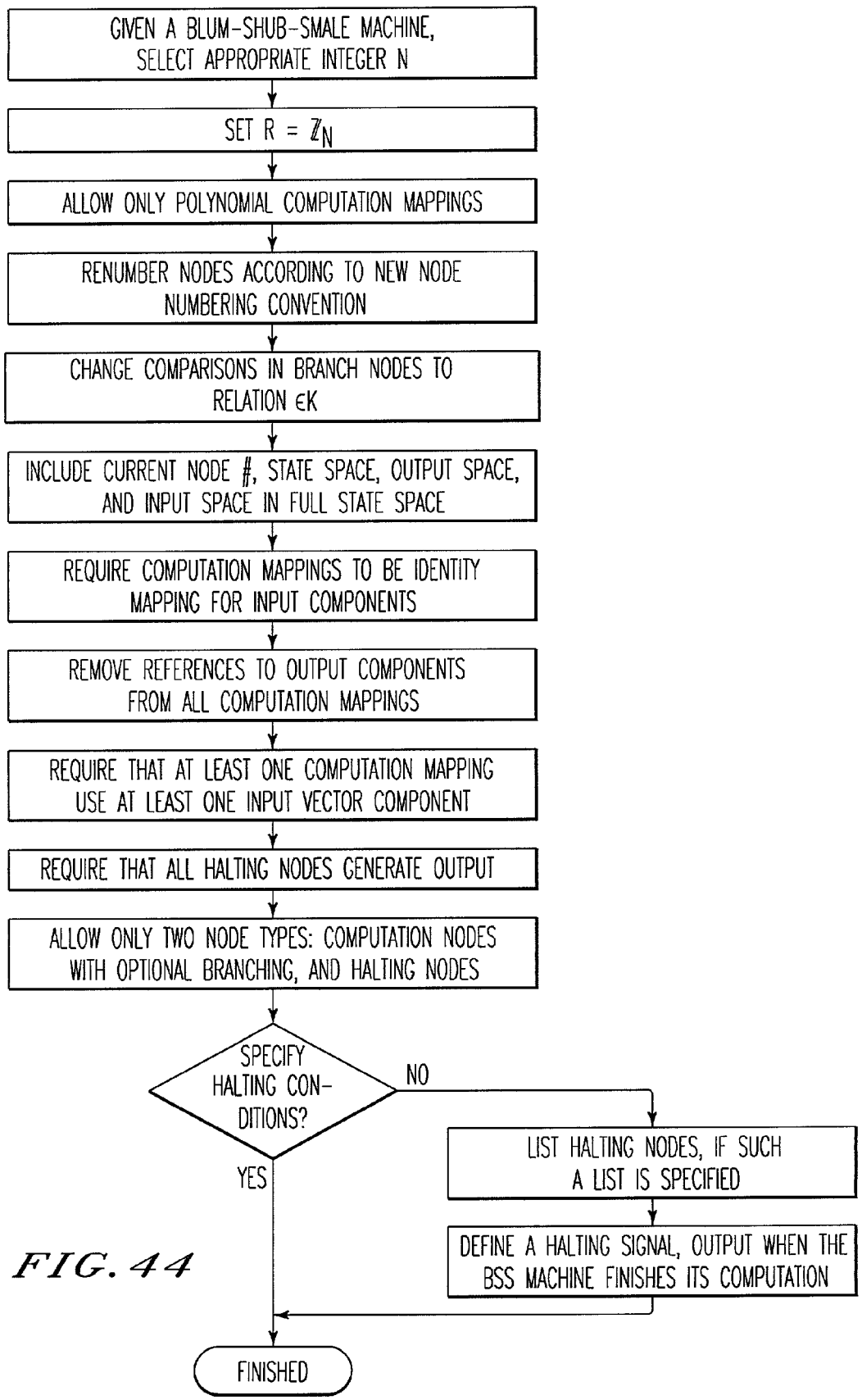
FIG. 44 illustrates a method of adapting a BSS machine for encrypted computation where the end result itself may be transformed into a single multivariate polynomial mapping.
Figure 45:
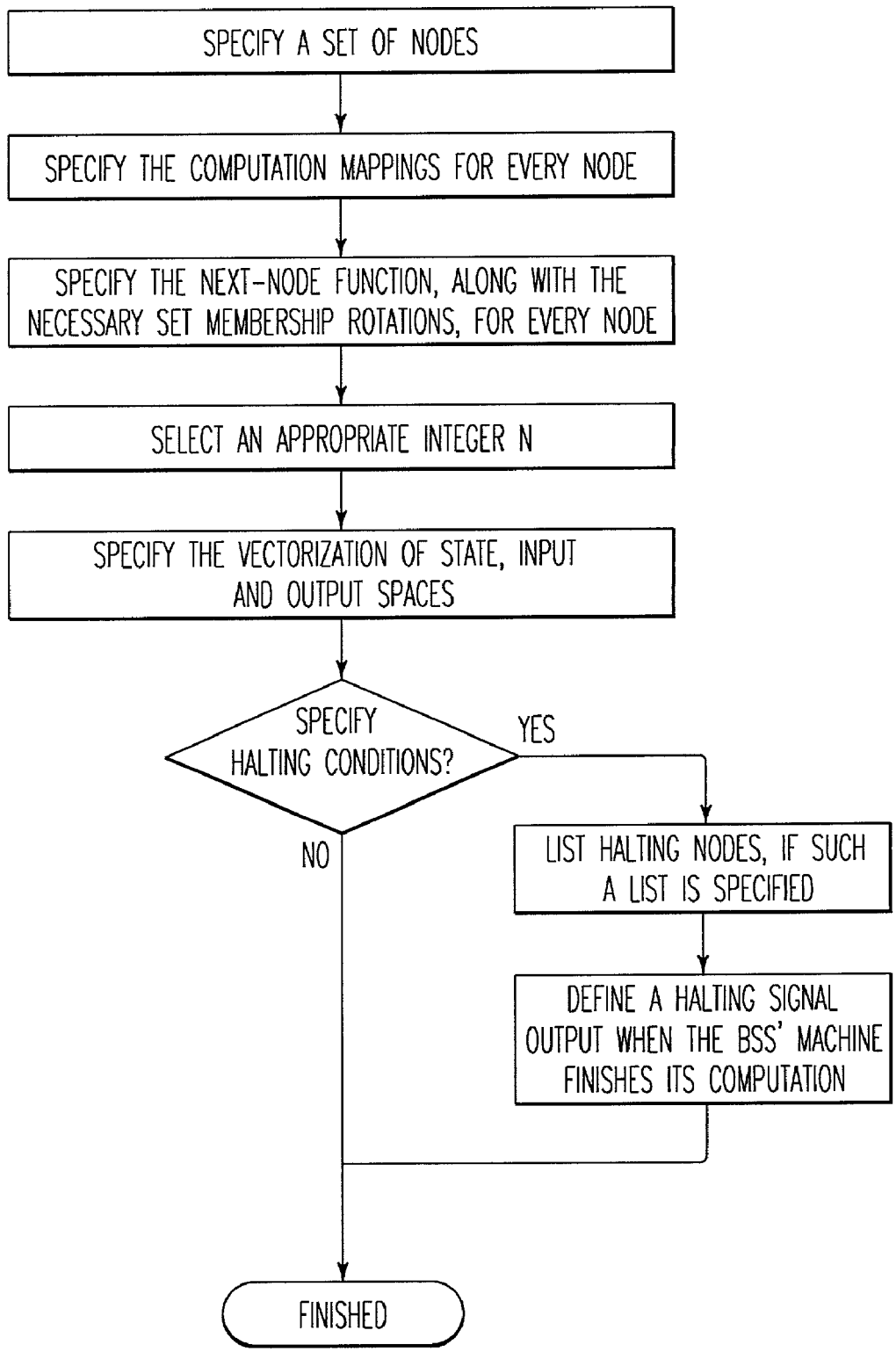
FIG. 45 illustrates a method of specifying a BSS' machine directly.
Figure 46:
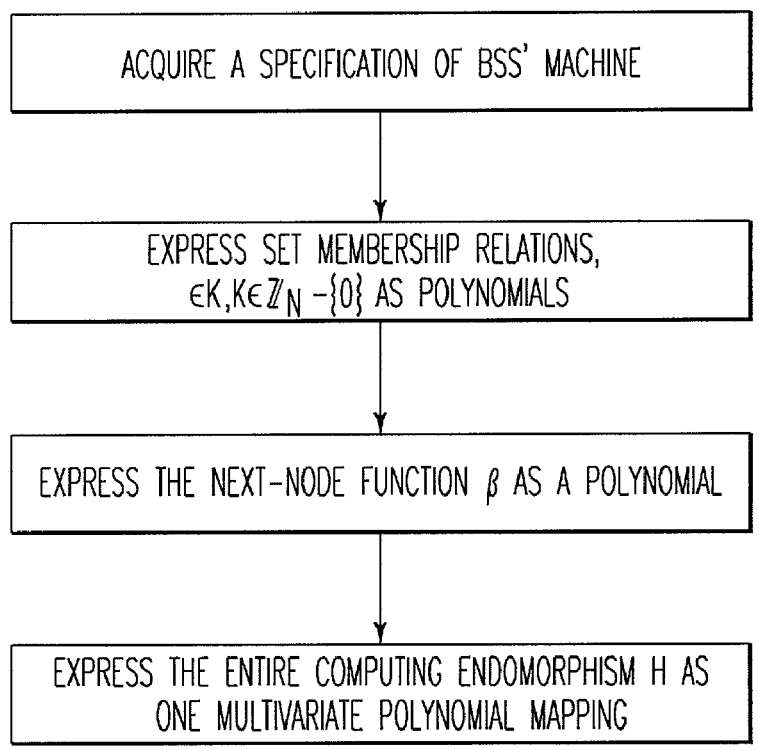
FIG. 46 illustrates a method of transforming a BSS' machine into a single multivariate polynomial mapping.
Figure 47:
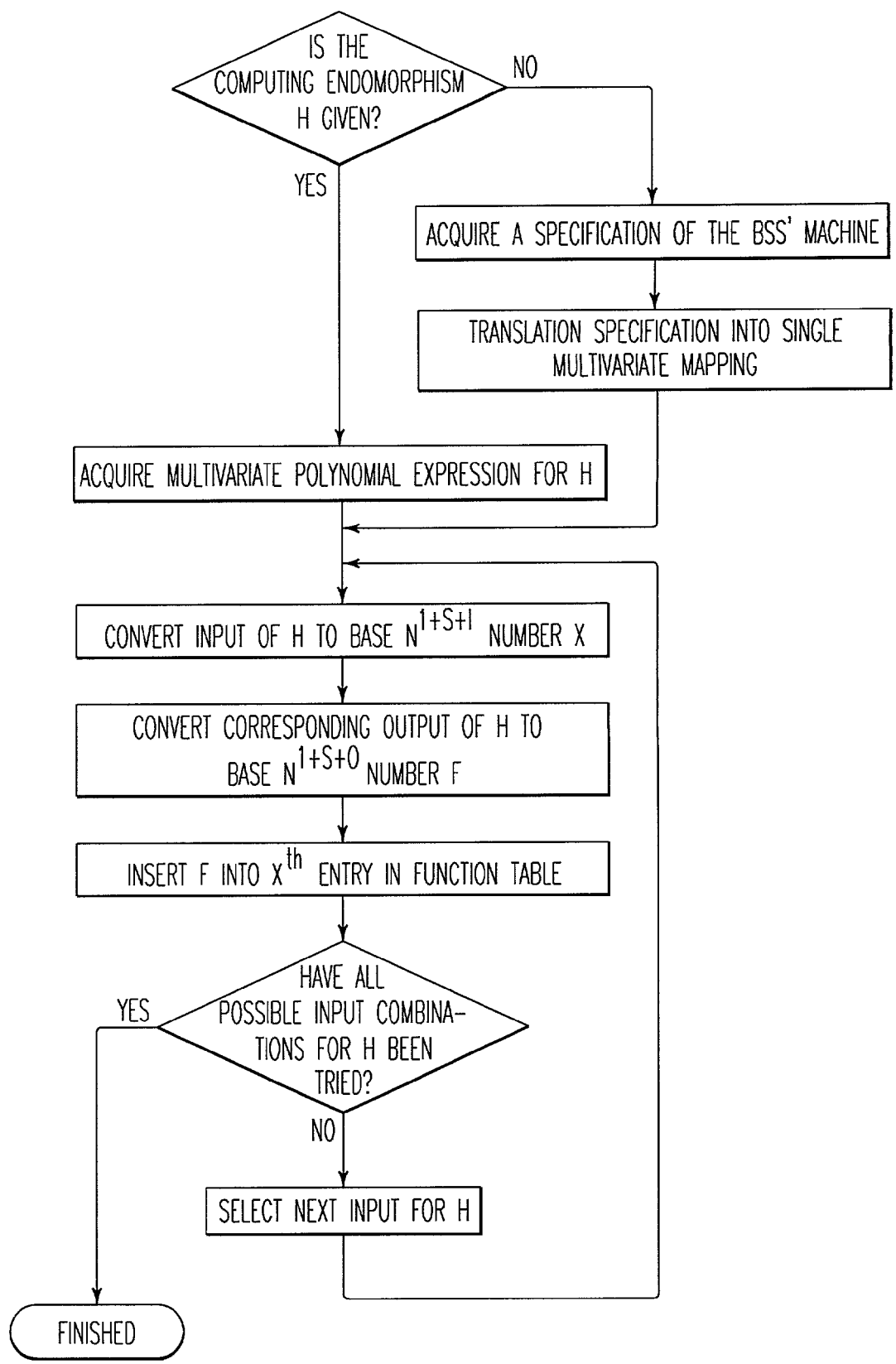
FIG. 47 illustrates a method of transforming a BSS' machine into a single mapping represented as a function table.
Figure 48:
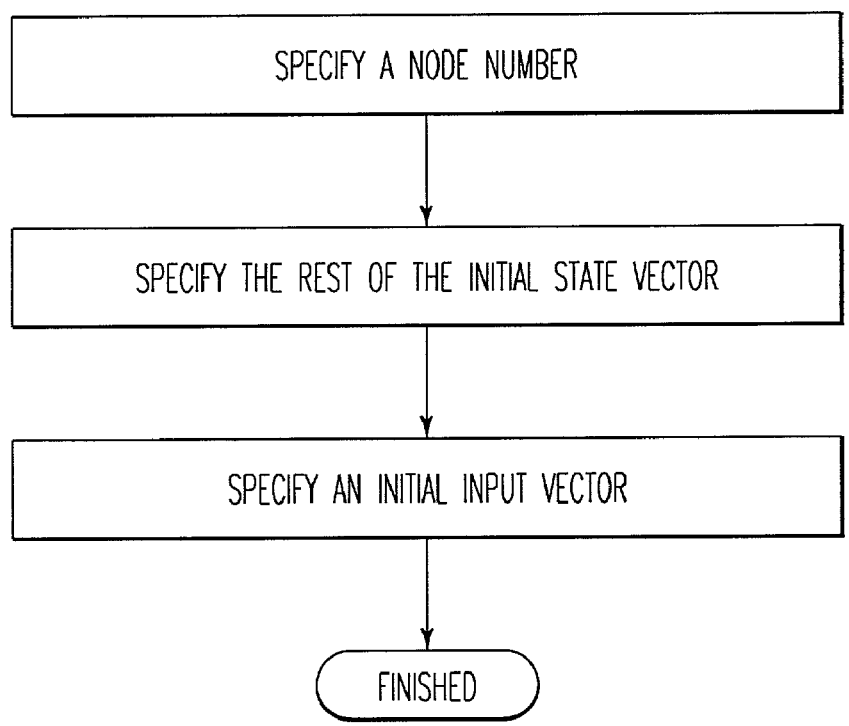
FIG. 48 illustrates a method of specifying an initial state for a BSS' machine.
Figure 49:
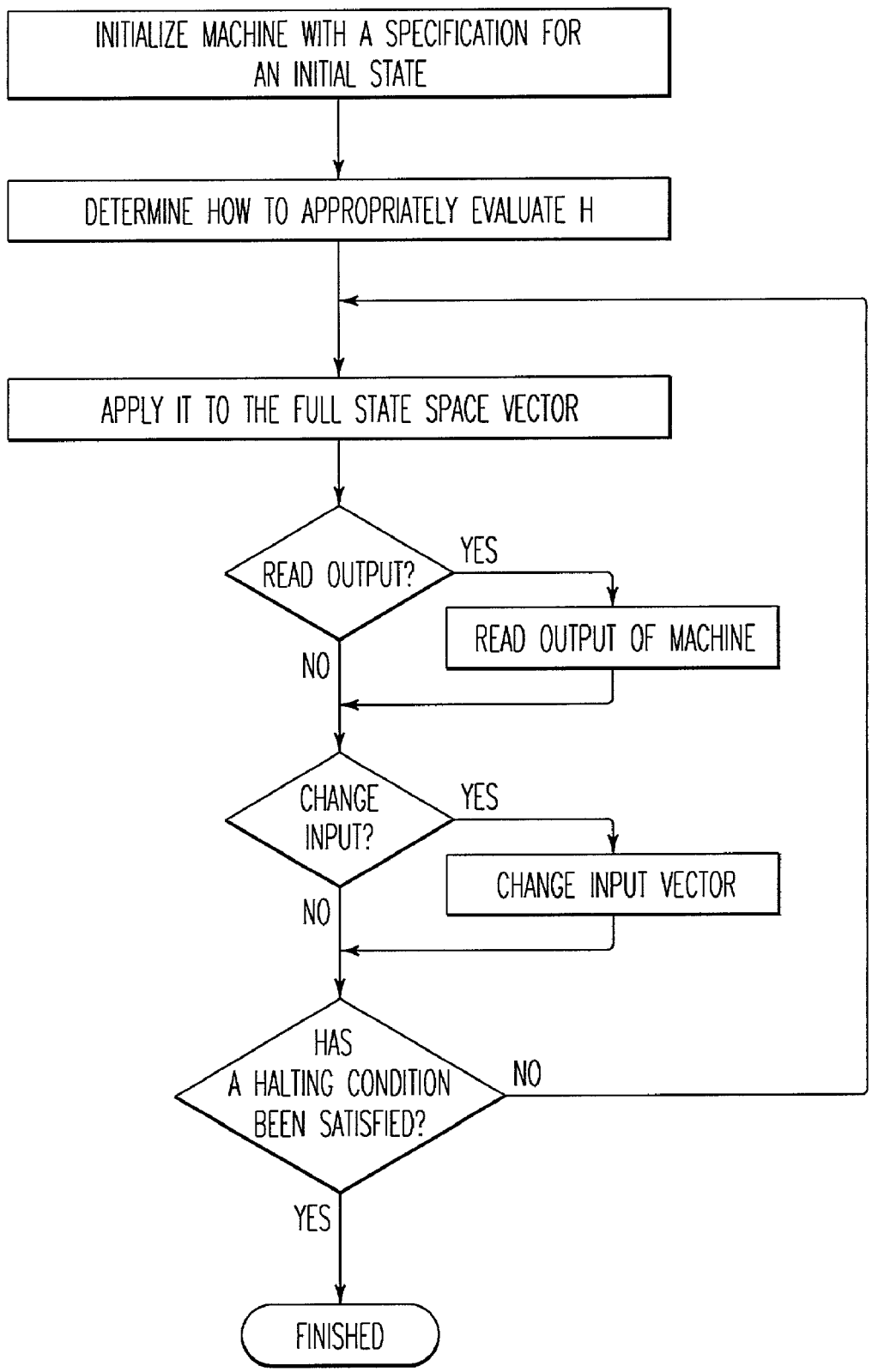
FIG. 49 illustrates a method of computing with a BSS' machine transformed to a single multivariate mapping H (the BSS' machine's computing endomorphism)
Figure 50:
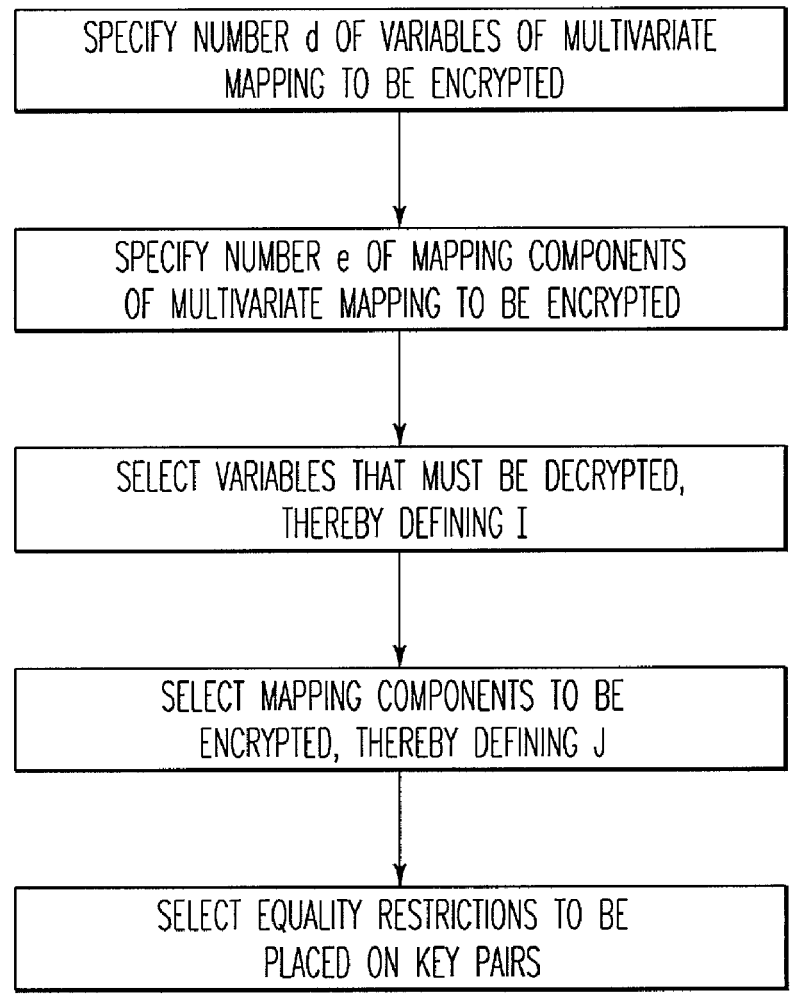
FIG. 50 illustrates a method of specifying a pattern of encryption of multivariate mappings with univariate mappings.
Figure 51:
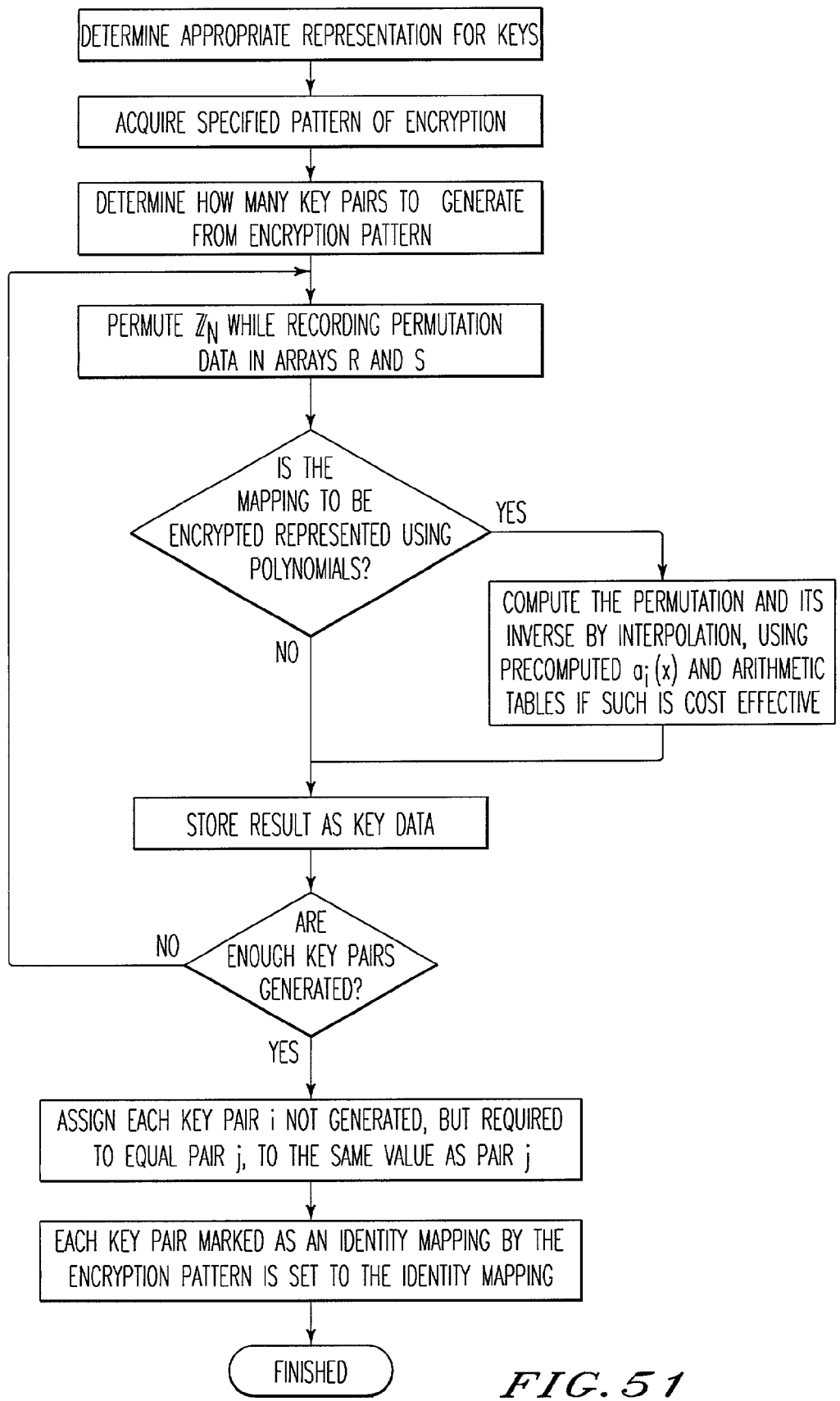
FIG. 51 illustrates a method of generating keys for univariate encryption of multivariate mappings.
Figure 52:
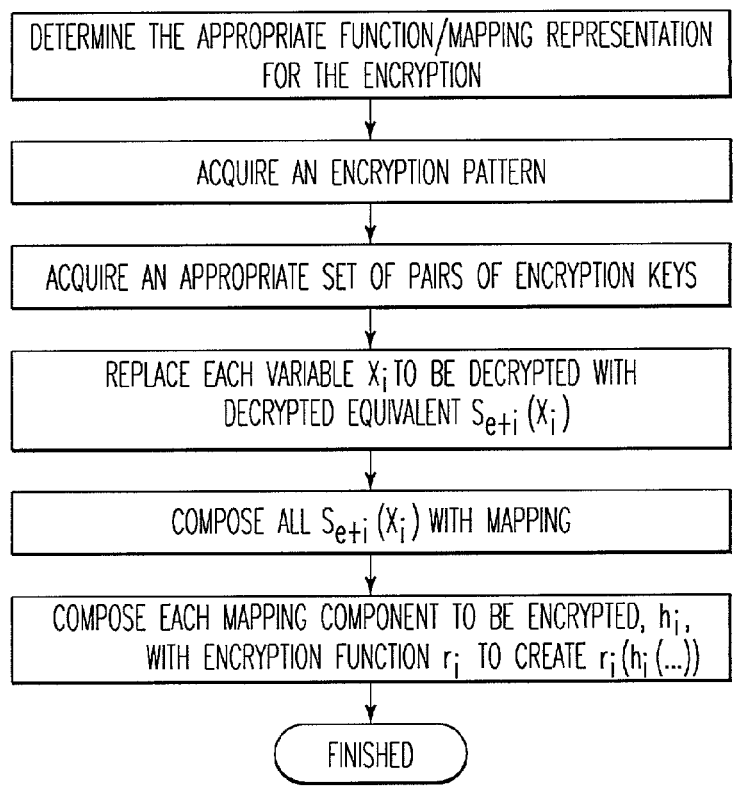
FIG. 52 illustrates a method of encrypting plural variables and components of multivariate mappings represented using either polynomials or function tables with univariate functions.
Figure 53:
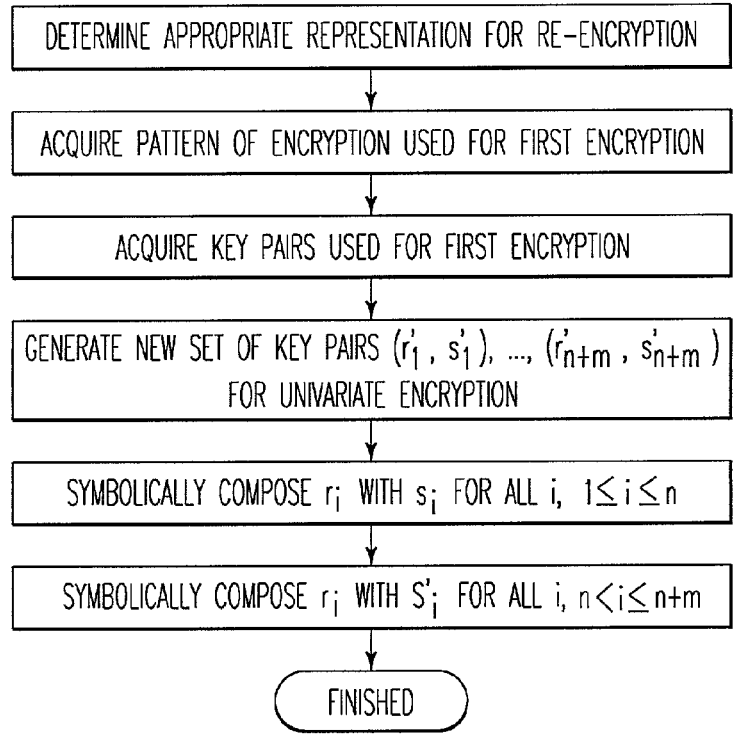
FIG. 53 illustrates a method of generating re-encryption keys for re-encryption of plural variables and components of multivariate mappings, already partially encrypted using first univariate functions, with second univariate functions.
Figure 54:
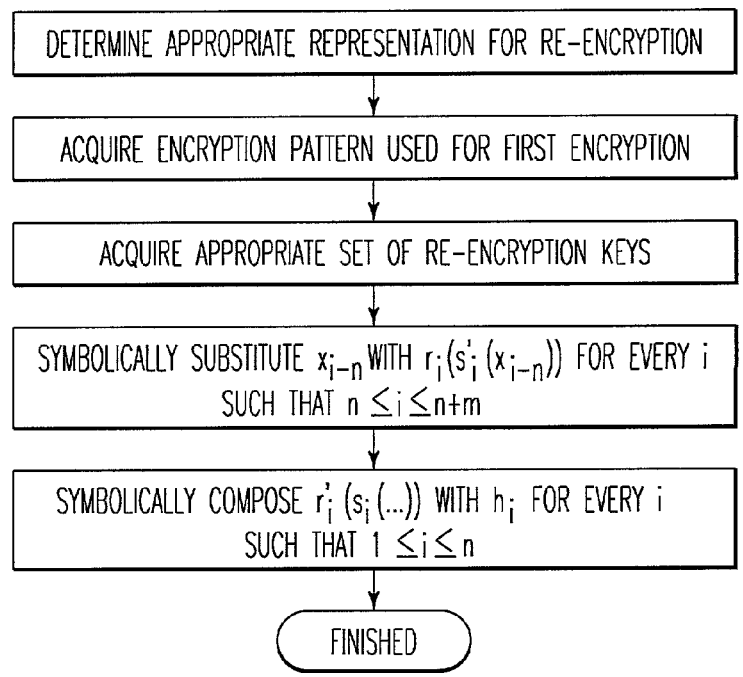
FIG. 54 illustrates a method of re-encrypting plural variables and mapping components of multivariate mappings, already partially encrypted using first univariate functions, with second univariate functions.
Figure 55:
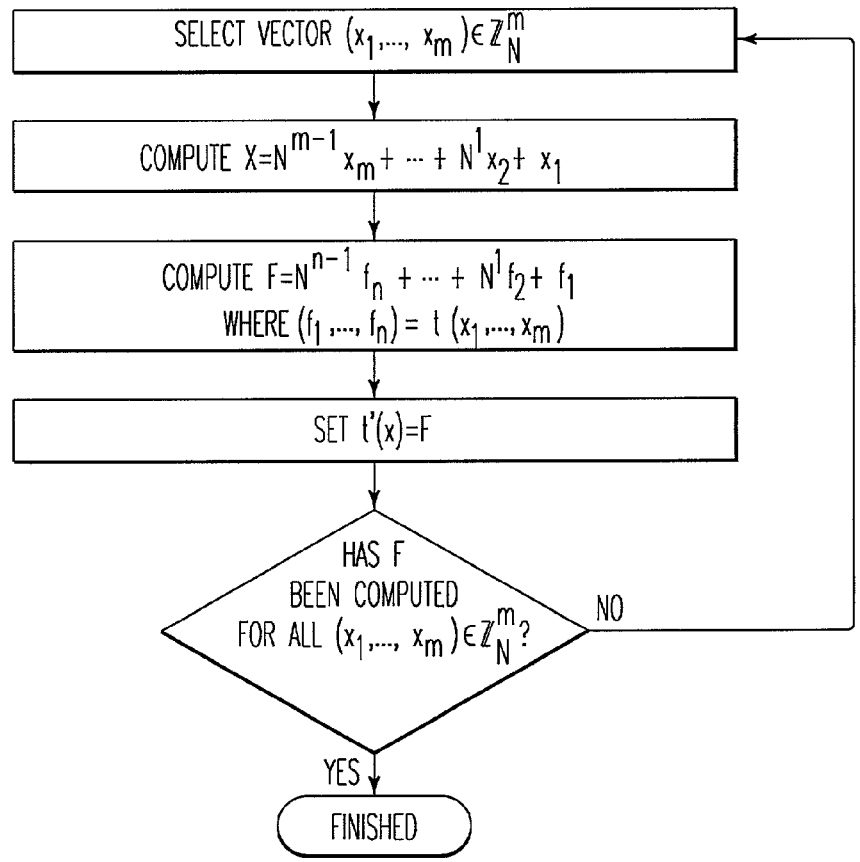
FIG. 55 illustrates a method of converting from a mapping, given as a function table, to a function given as a function table.
Figure 56:
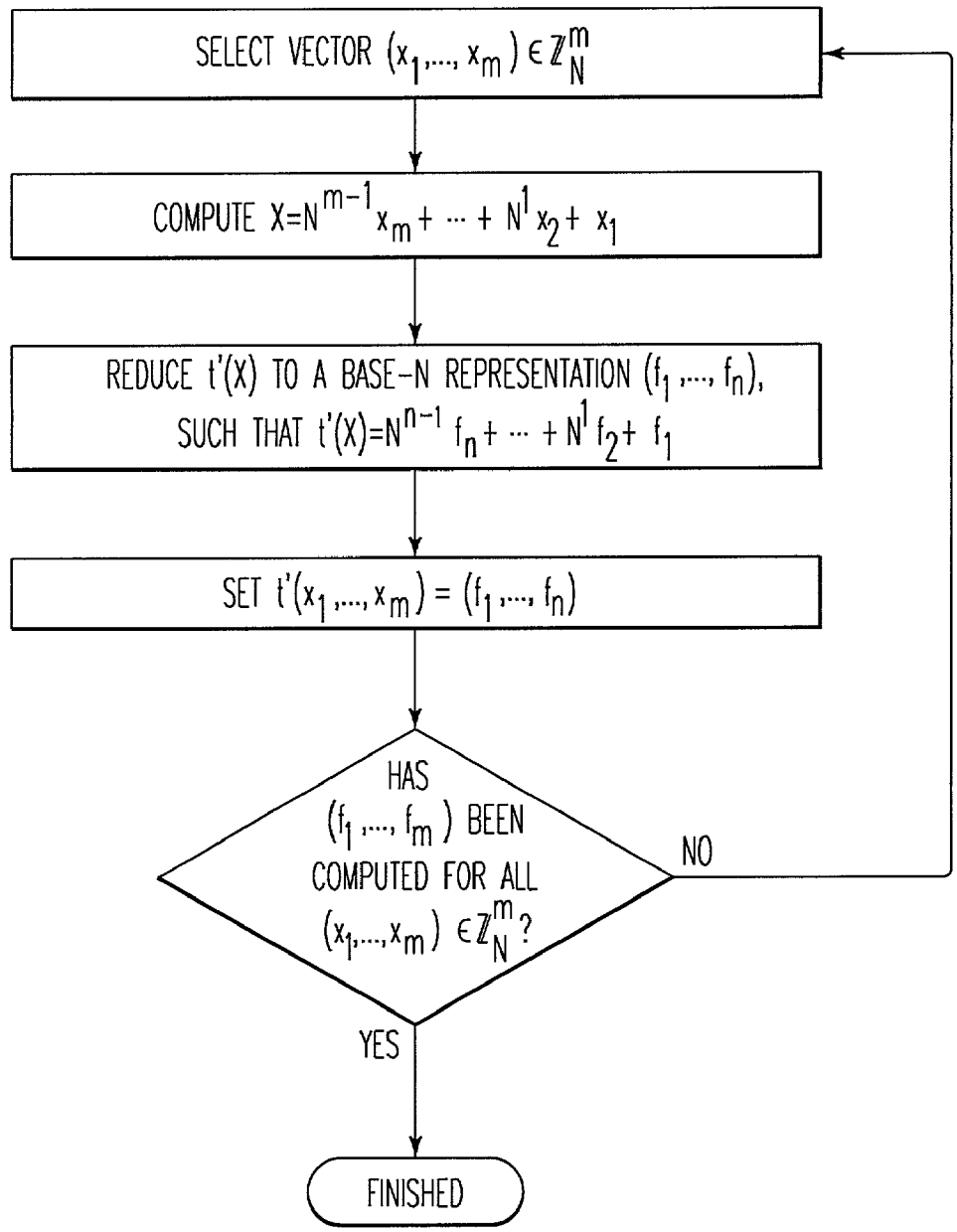
FIG. 56 illustrates a method of converting from a function, given as a function table, to a mapping given as a function table.
Figure 57:
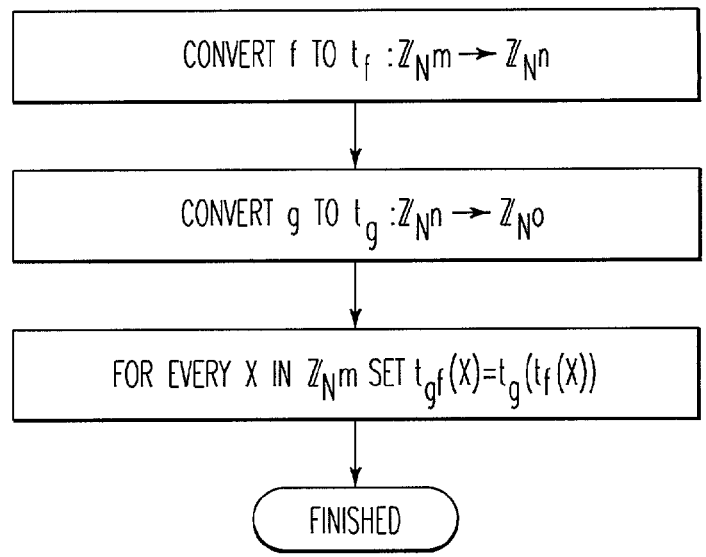
FIG. 57 illustrates a method of symbolically composing two mappings, both represented as a function tables, to produce a function table for their composition, $(g(f(x))$.
Figure 58:
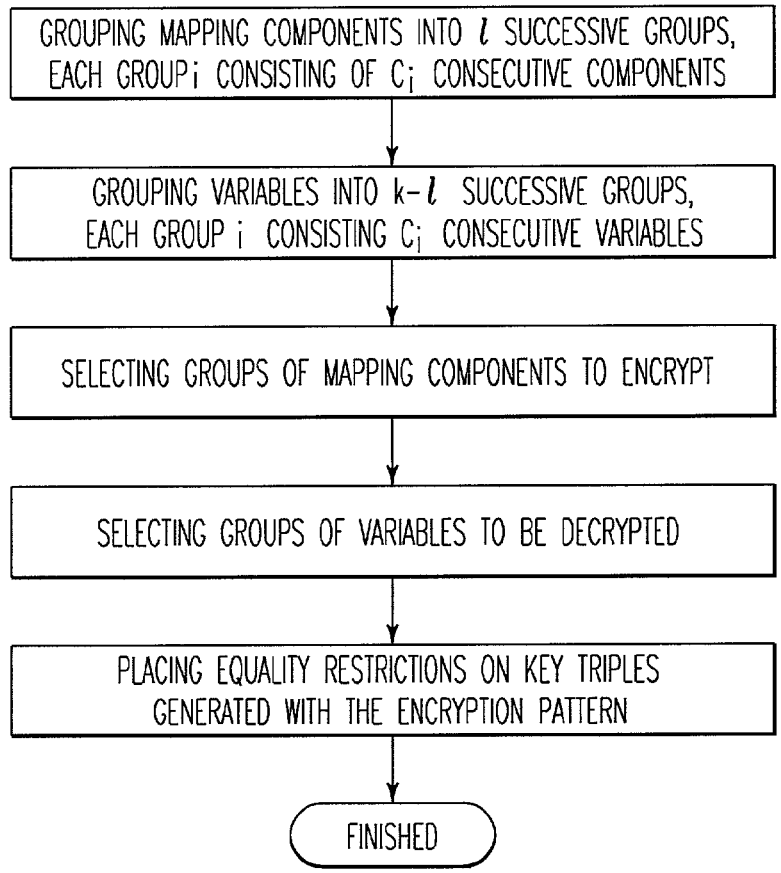
FIG. 58 illustrates a pattern of encryption of multivariate mappings with other multivariate mappings.
Figure 59:
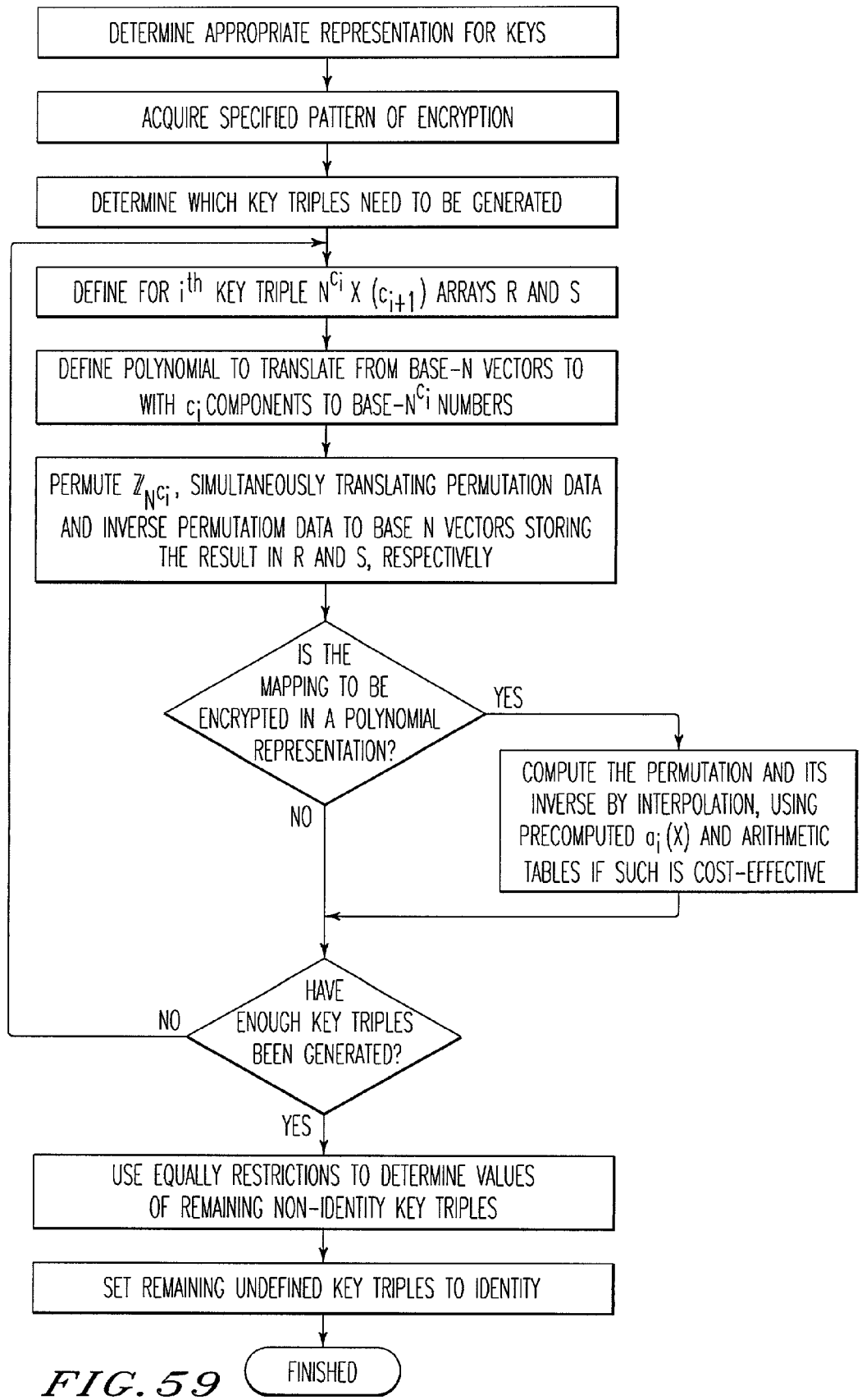
FIG. 59 illustrates a method of generating keys for multivariate encryption of multivariate mappings.
Figure 60:
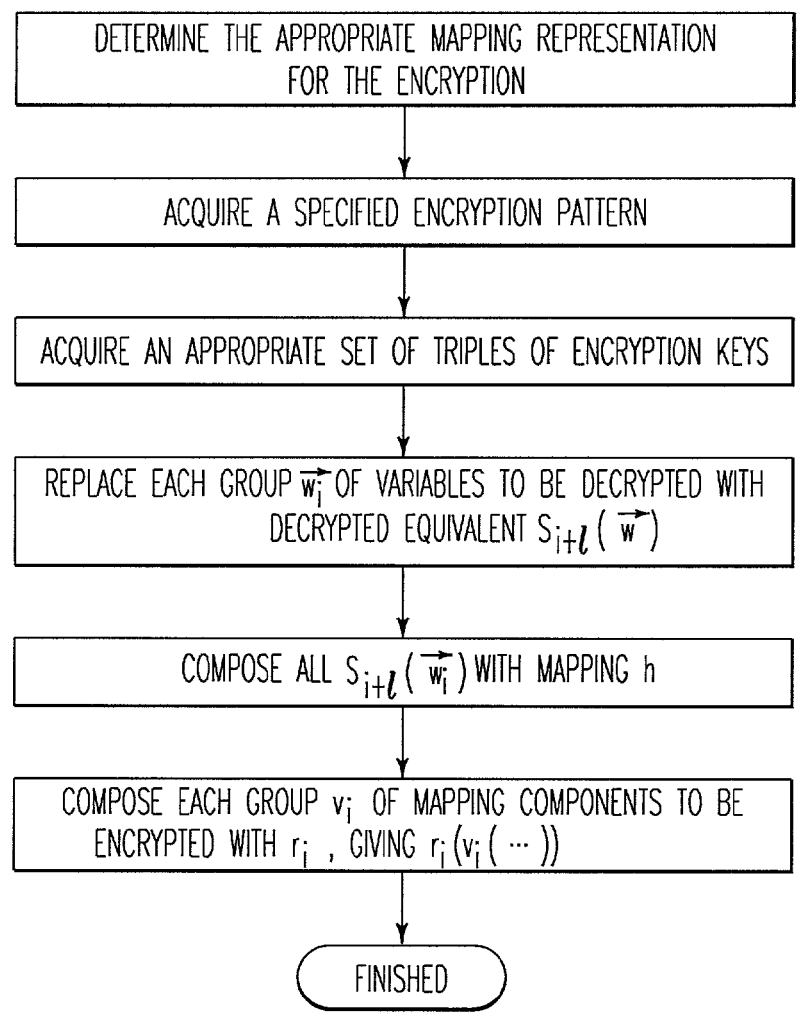
FIG. 60 illustrates a method of encrypting plural groups of variables and groups of mapping components of multivariate mappings, h, with other multivariate mappings.
Figure 61:
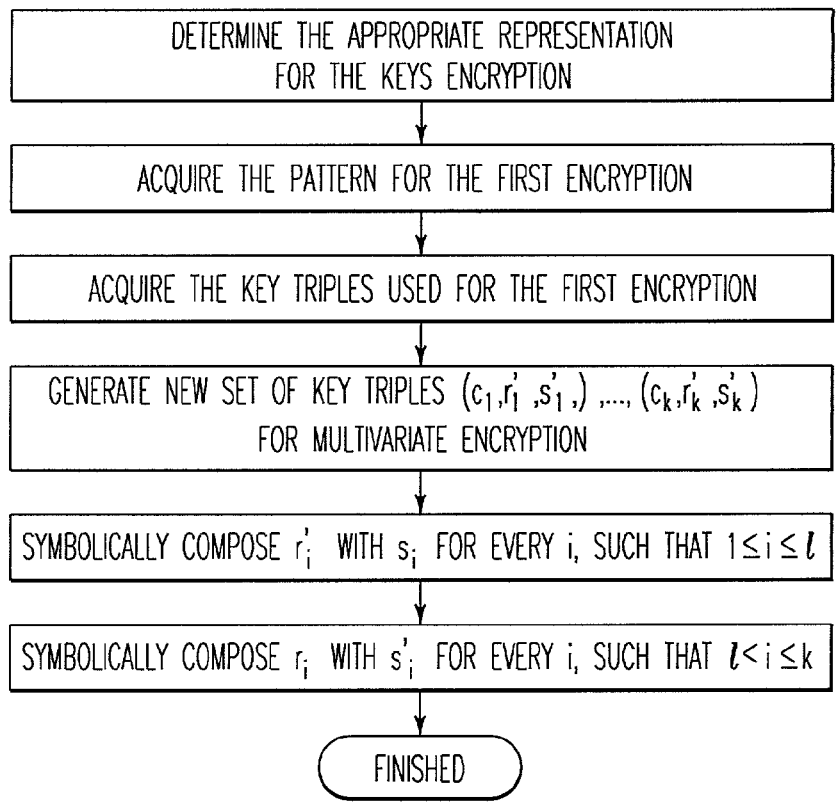
FIG. 61 illustrates a method of generating re-encryption keys for re-encrypting of a multivariate mapping, h, already partially encrypted with a first multivariate mapping, s, with second multivariate mappings.
Figure 62:
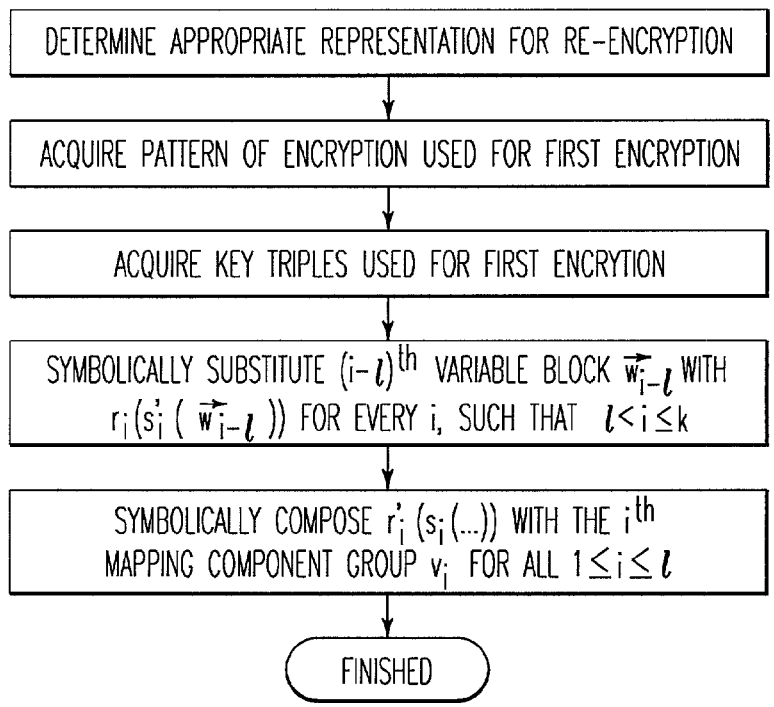
FIG. 62 illustrates a method of re-encrypting a multivariate mapping, h, already partially encrypted with a first multivariate mapping, s, with second multivariate mappings.
Figure 63:
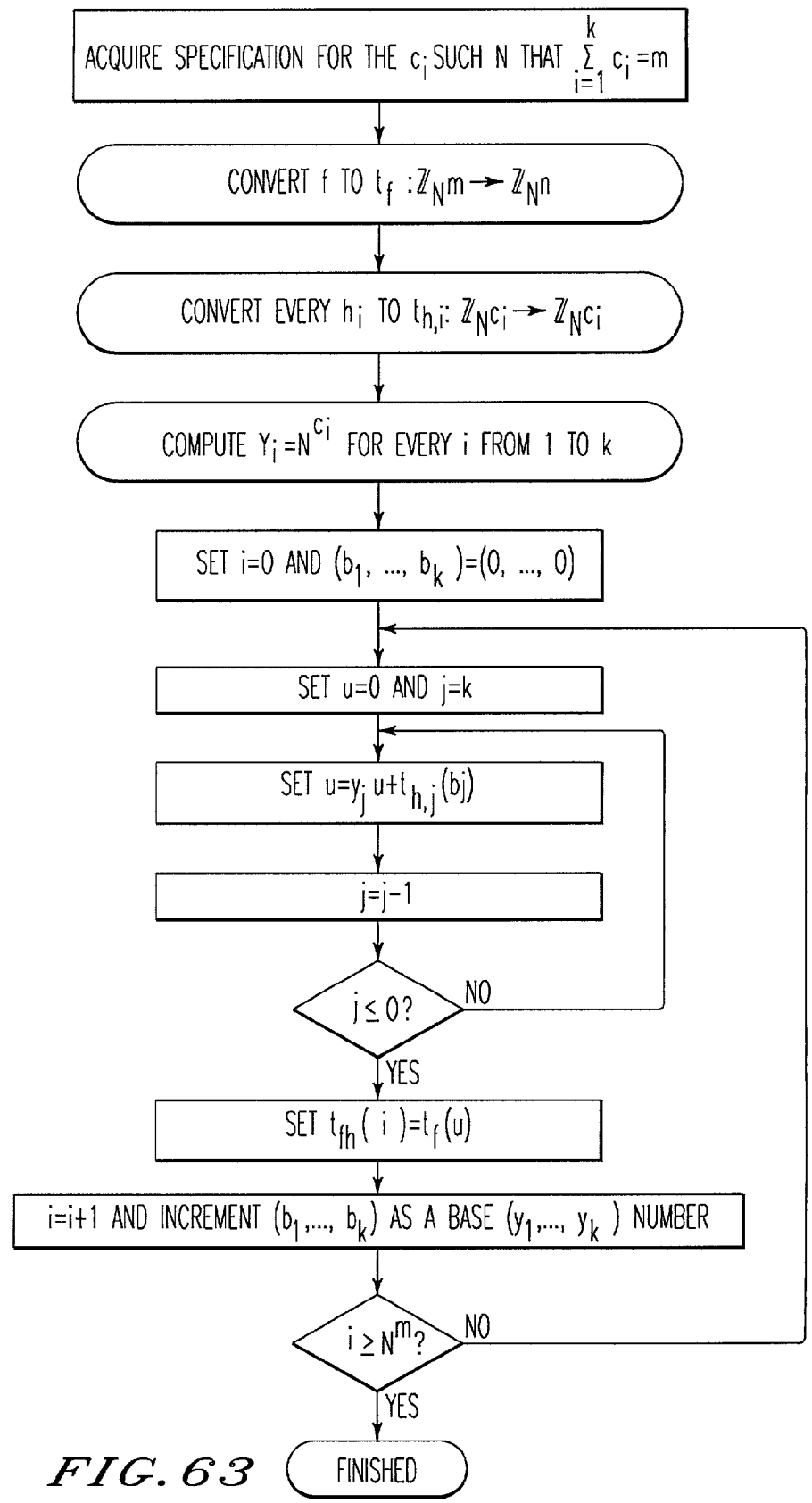
FIG. 63 illustrates a method of symbolically composing $f$ and $h_1, \ldots, h_k$, represented as function tables, to produce a function table for the composition, $f(h_1(\ ), h_2(\ ), \ldots h_k(\ ))$.
Figure 64A:
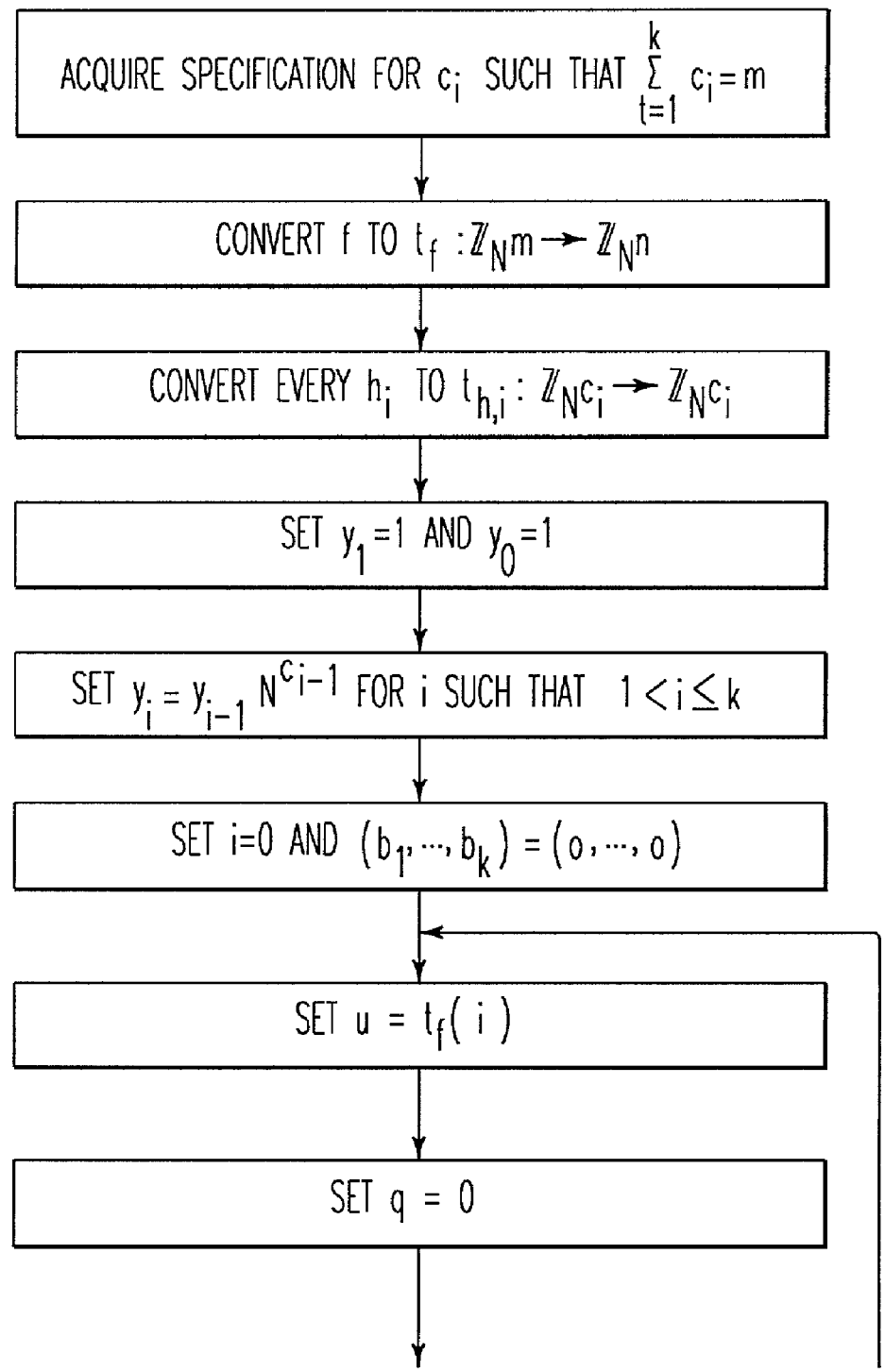
FIG. 64 illustrates a method of symbolically composing $f$ and $h_1, \ldots h_k$, represented as function tables, to produce a function table for the composition, $(h_1(f_1(\ldots), \ldots, f_{c_1}(\ldots)), \ldots, h_k(f_{n-c_k+1}(\ldots), \ldots, f_n(\ldots)))$.
Figure 64B:
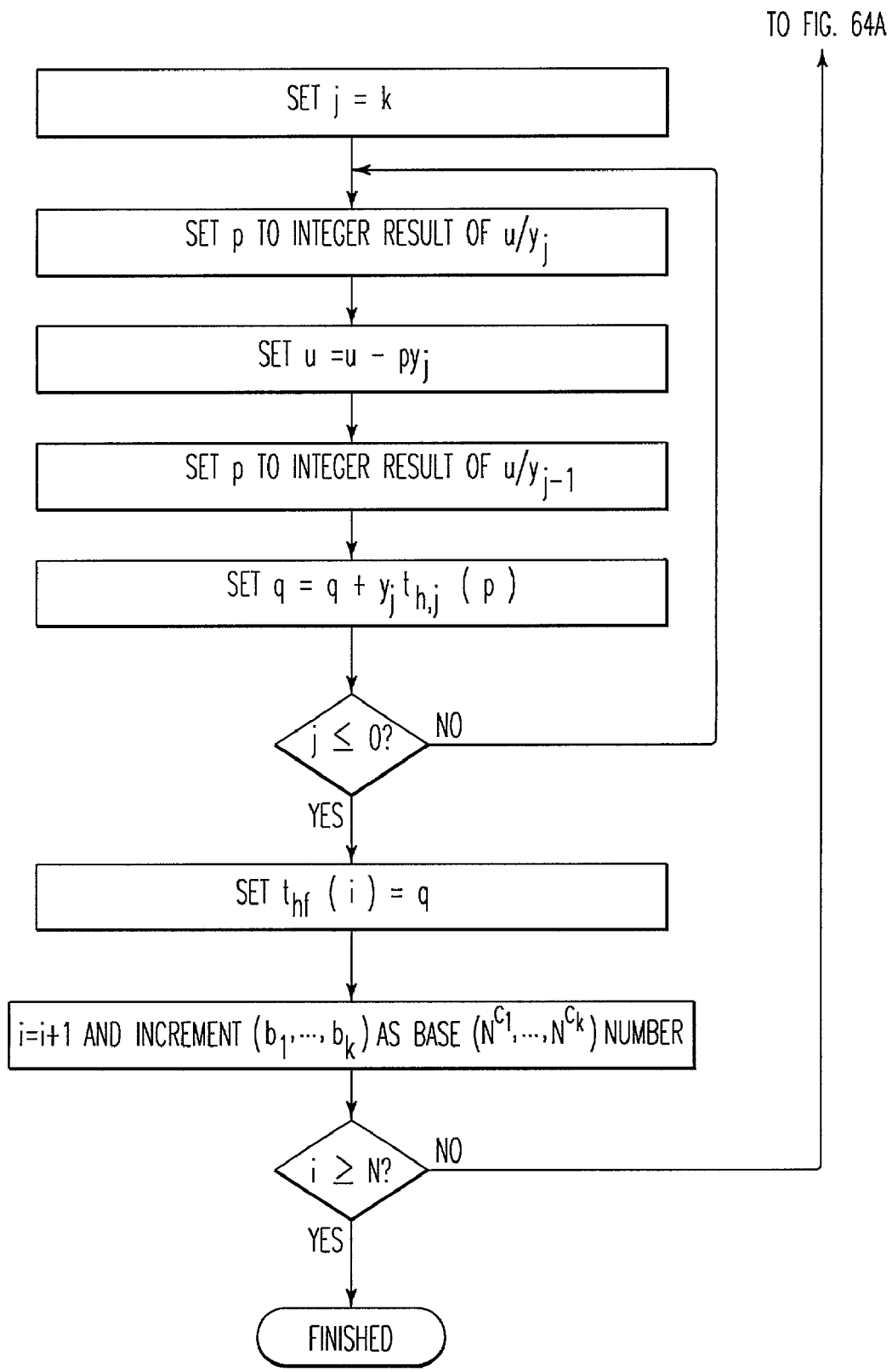
Figure 65:
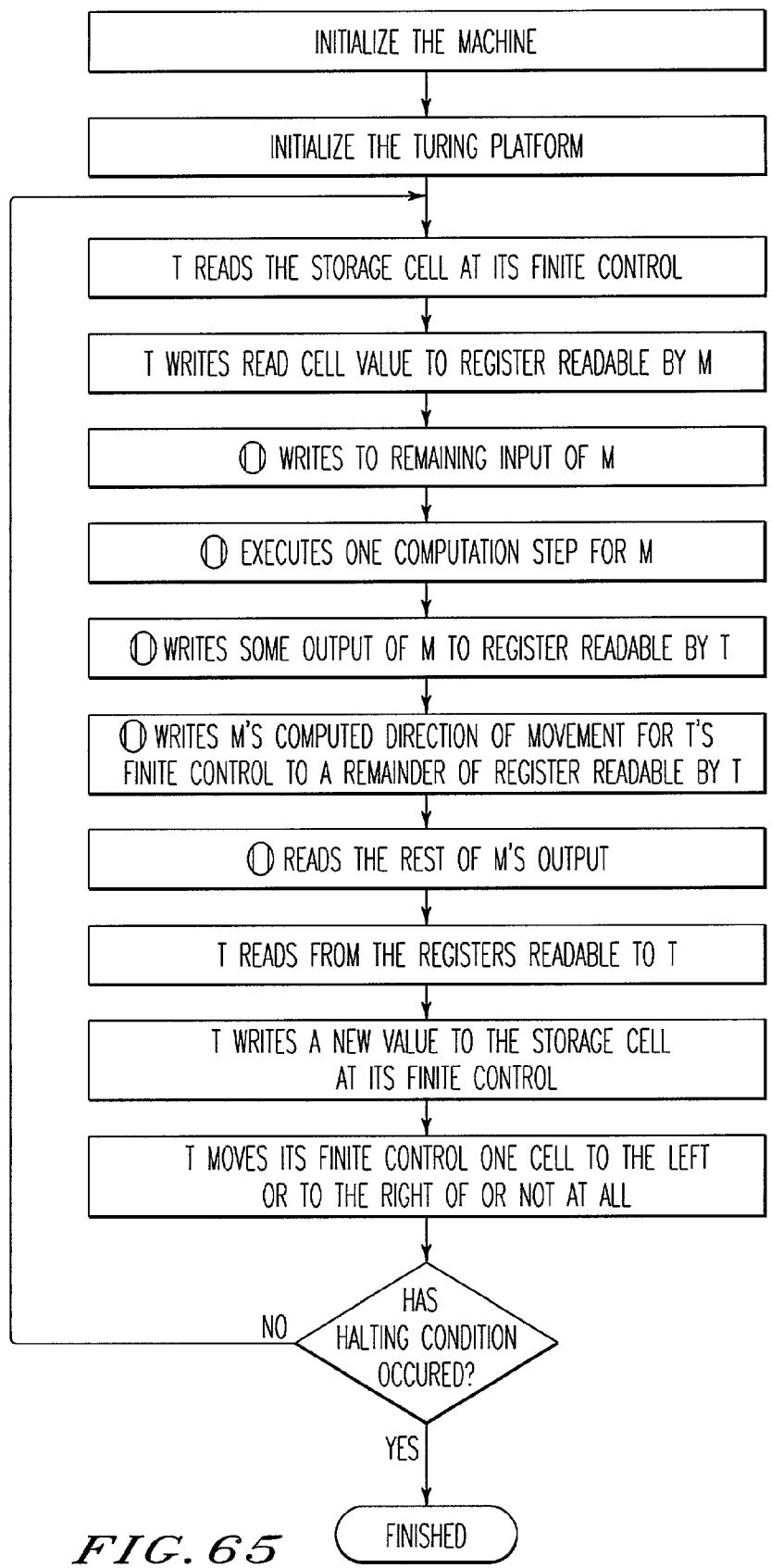
FIG. 65 illustrates a method of computing with a host O running a Turing platform T supporting at least one of a Mealy and a BSS' machine M.
Figure 66:
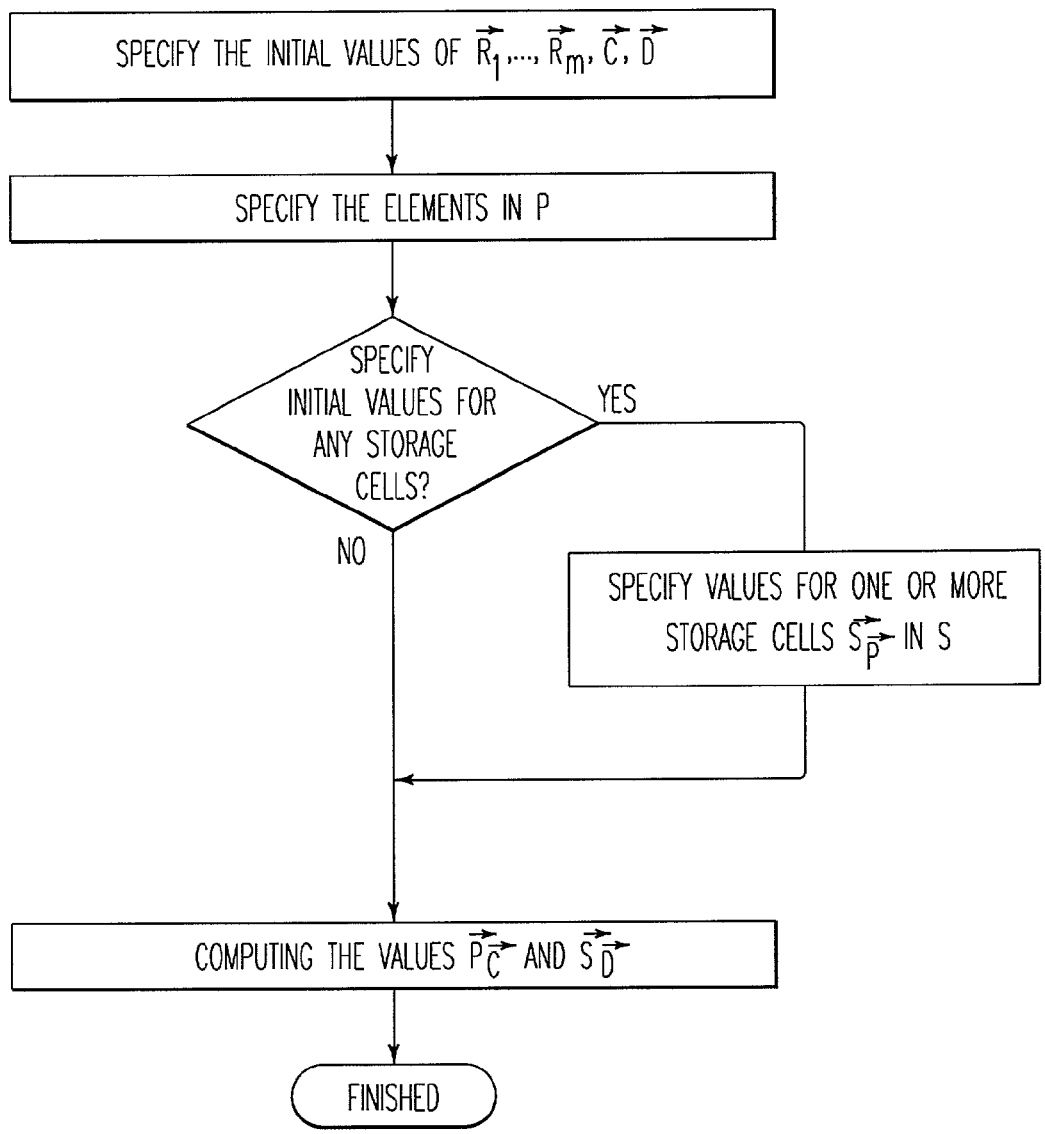
FIG. 66 illustrates a method of initializing a register machine.
Figure 67:
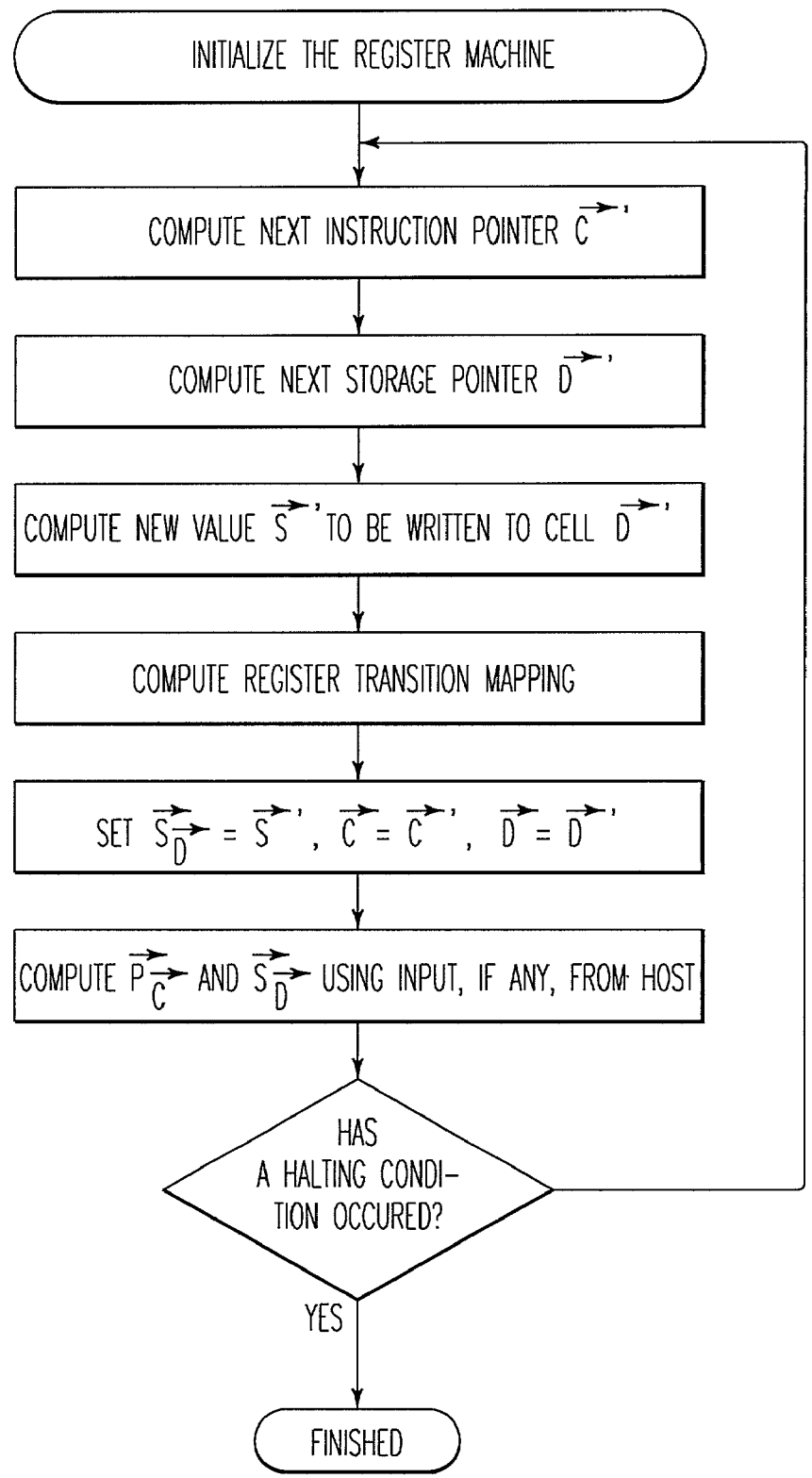
FIG. 67 illustrates a method of computing with a register machine.
Figure 68:
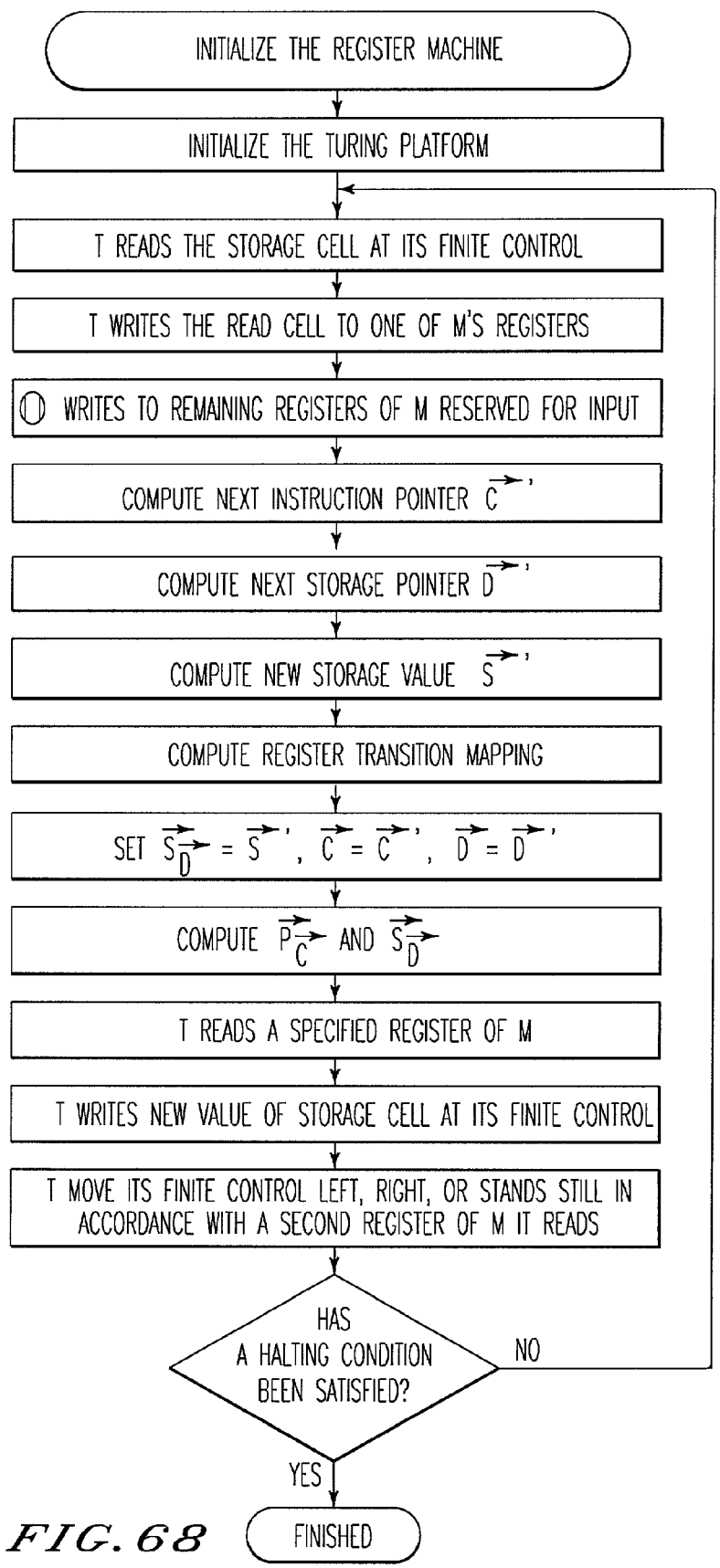
FIG. 68 illustrates a method of computing with a register machine M supported by a Turing platform T. on a host O.
Figure 69:
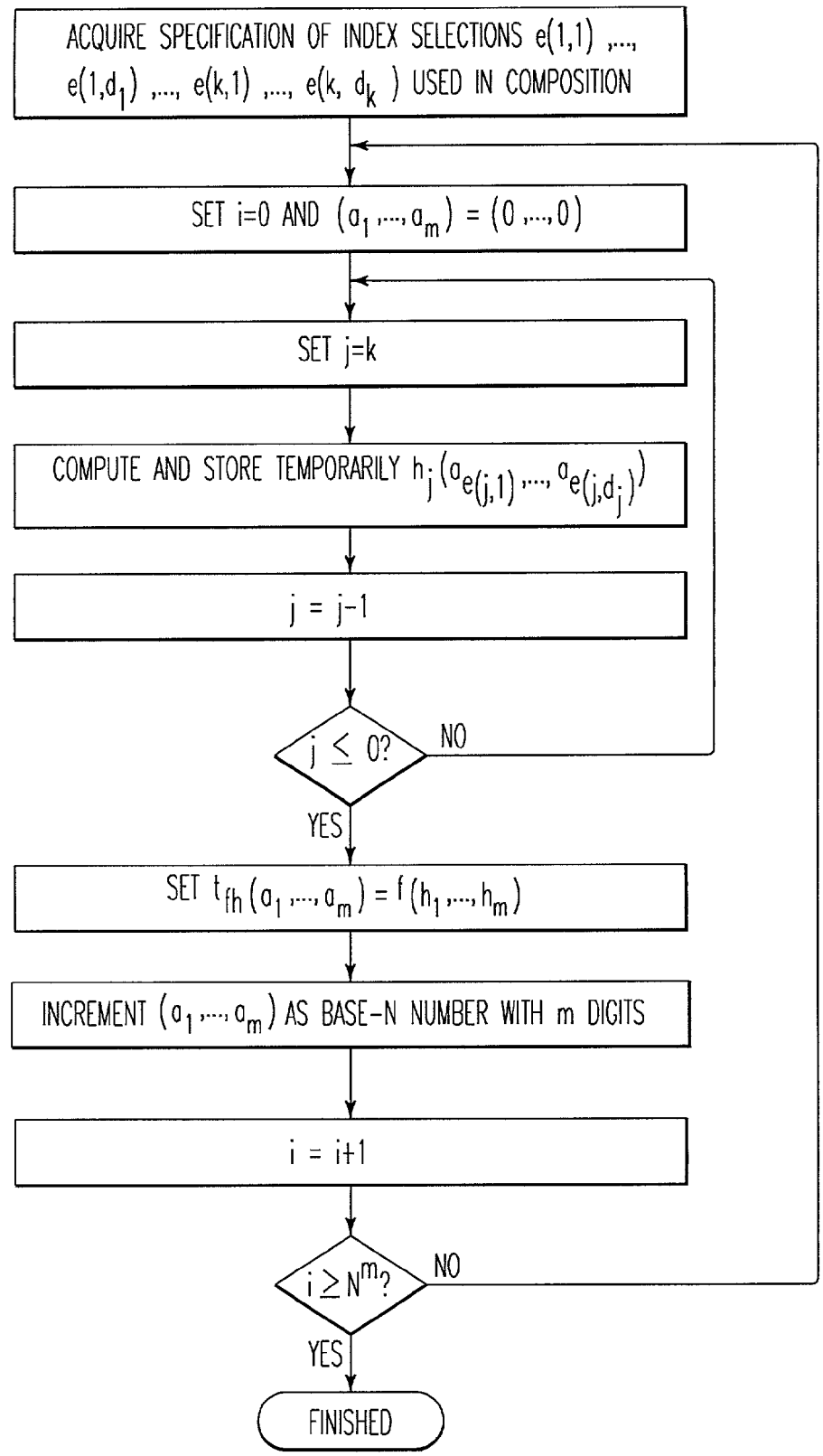
FIG. 69 illustrates a method of symbolically composing $f$ with and $h_1, \ldots h_k$, represented as function tables, to produce a mapping.
Figure 70:
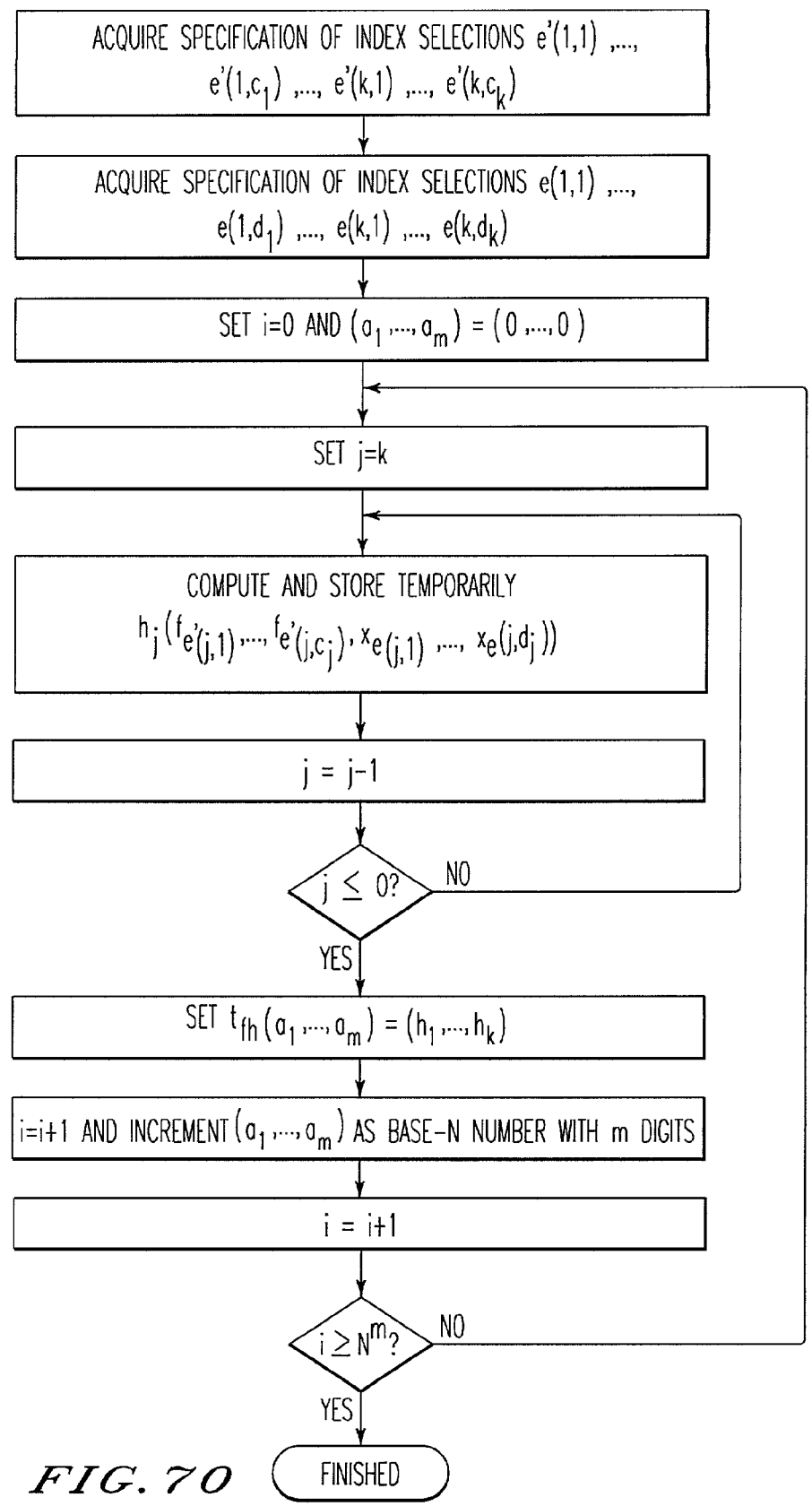
FIG. 70 illustrates a method of symbolically composing $h_1, \ldots, h_k$ with $f$, where all mappings are represented as function tables, producing a new composite mapping.
Figure 71:
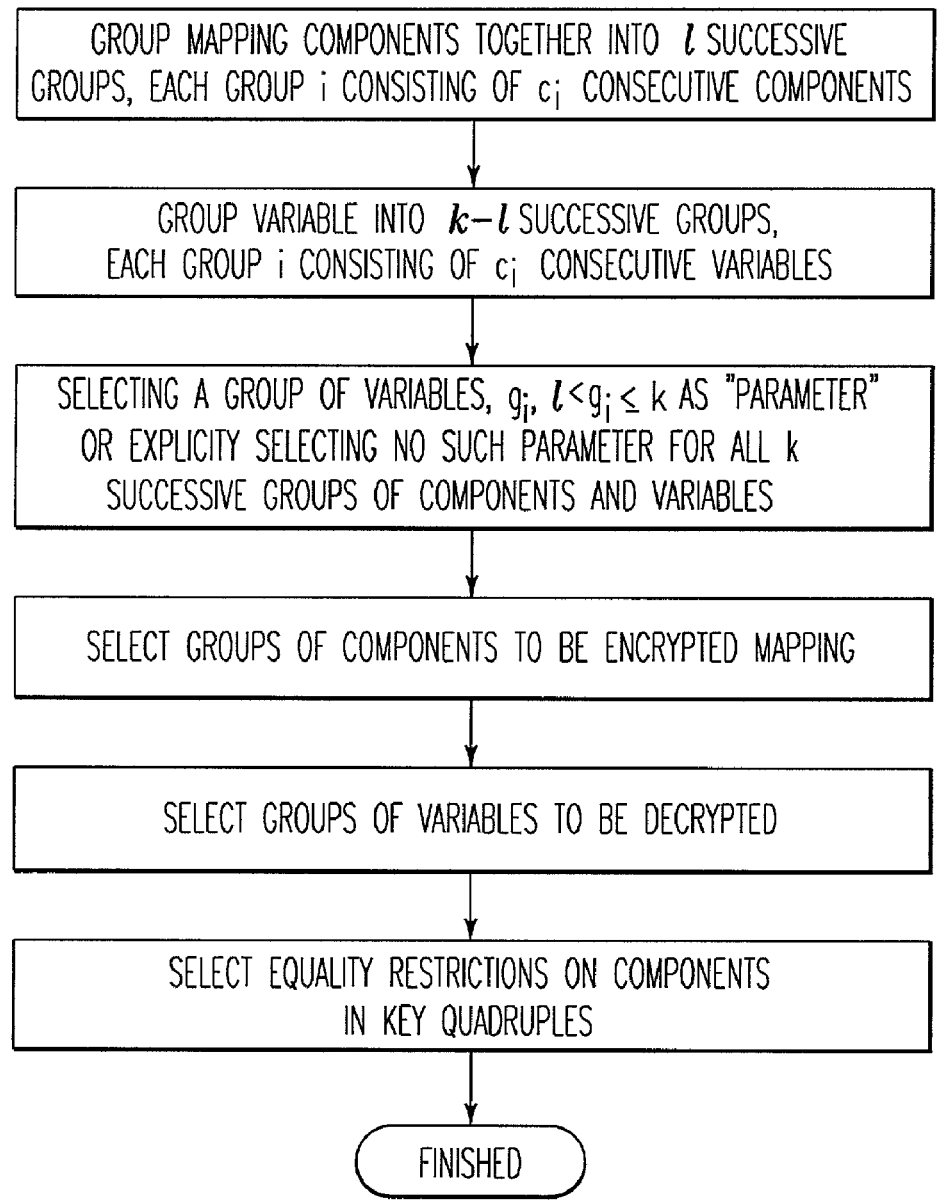
FIG. 71 illustrates a method of specifying a pattern of parameterized encryption of multivariate mappings with other multivariate mappings.
Figure 72A:
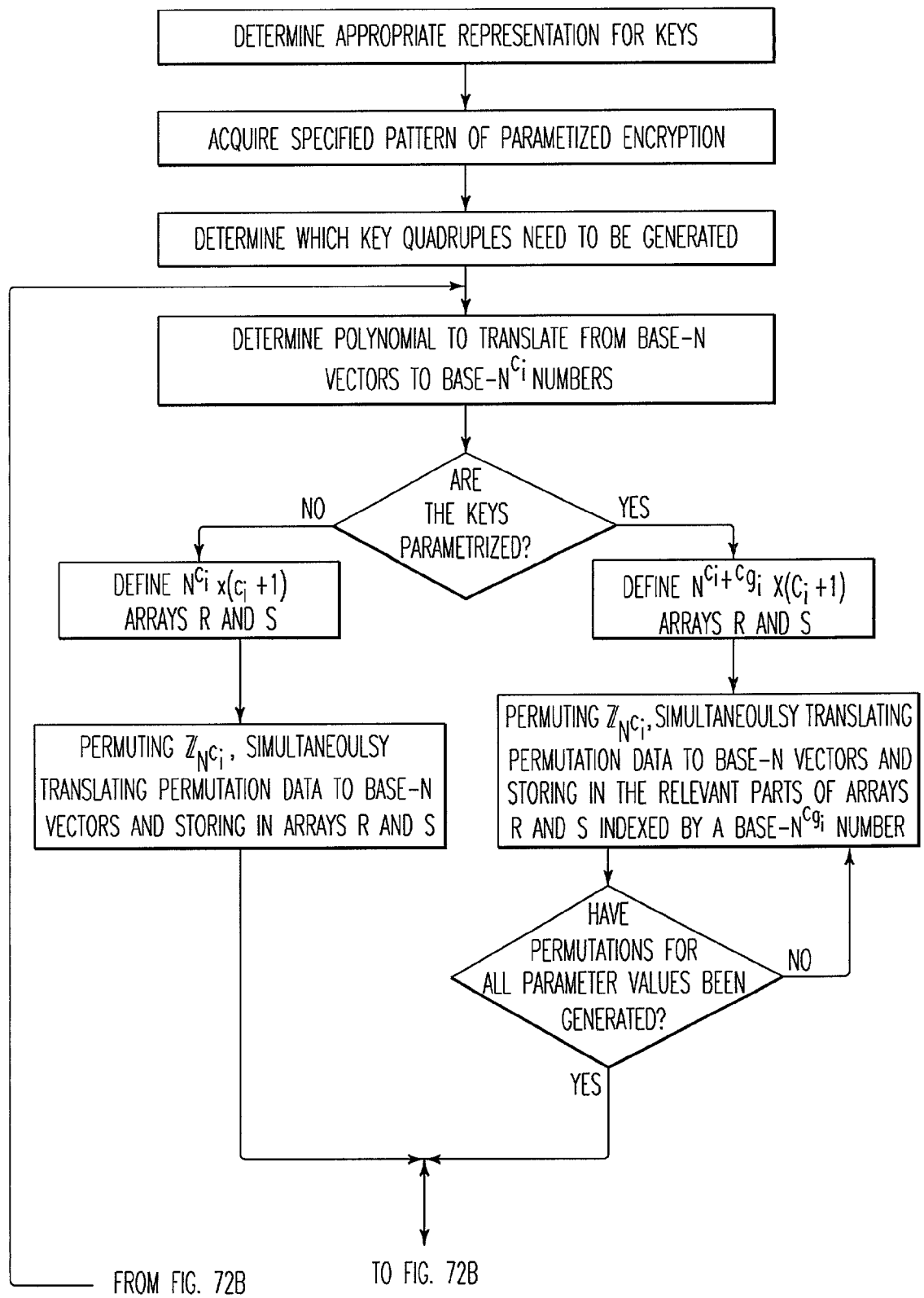
FIG. 72 illustrates a method of generating keys for parameterized multivariate encryption of multivariate mappings.
Figure 72B:
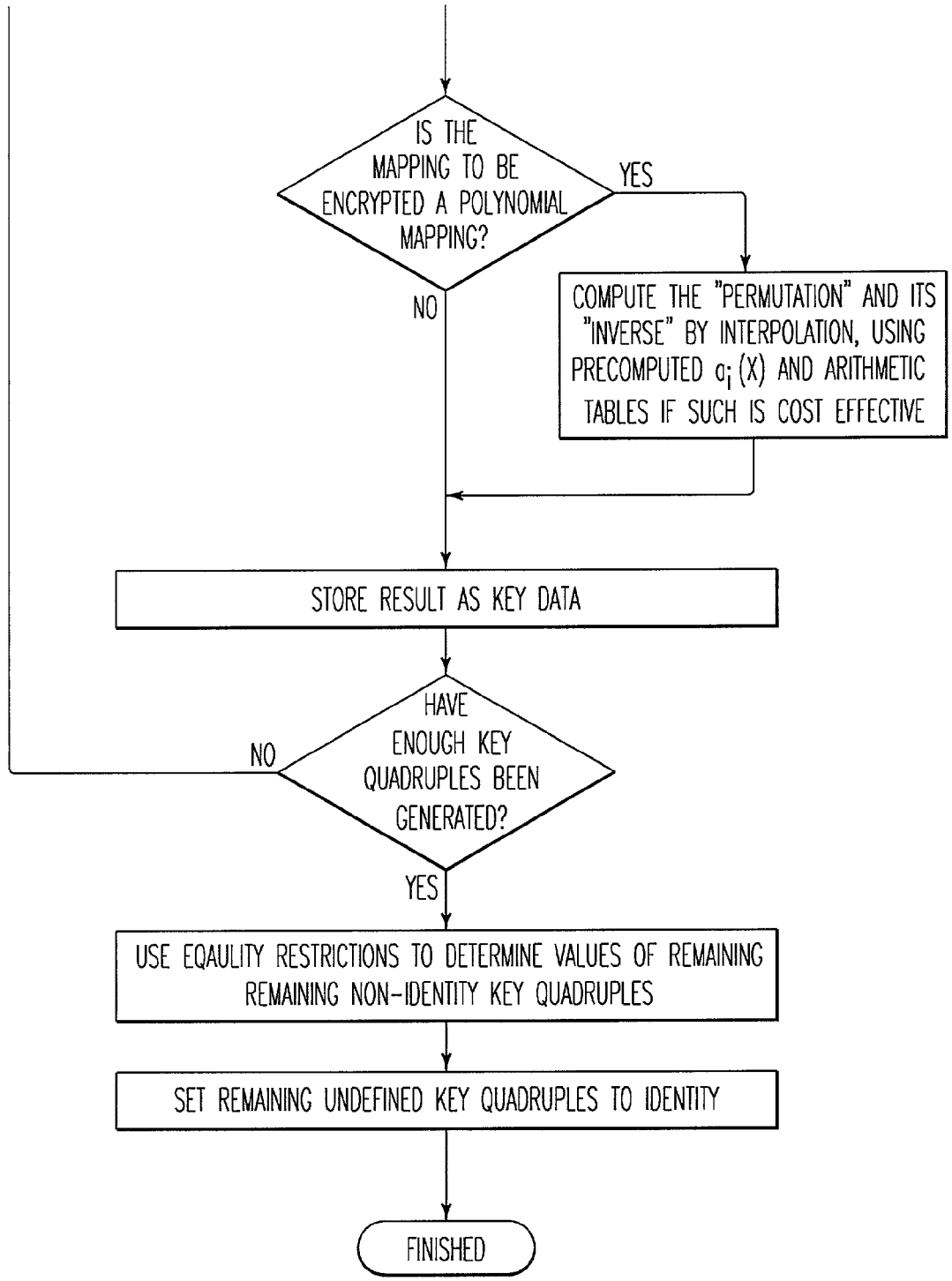

FIG. 40 illustrates a method of parameterized encryption of plural variables and mapping components of multivariate mappings with multivariate mappings. Three selection processes occur: (1) groups of variables to be decrypted are selected in either a parameterized or a non-parameterized manner; (2) groups of variables are selected as parameters; and (3) groups of components to be encrypted are selected in either a parameterized or a non-parameterized manner. In such an embodiment, key quadruples are used.

As referenced by 4001, the inverse permutation $s_i$ is symbolically applied to the group of variables, i, selected for non-parameterized decryption. Similarly, at 4002, the inverse permutation, $s_i$, indexed by variable block $g_i$ is symbolically applied to the group of variables, i, selected for parameterized decryption.

At 4003, selected groups of components, j, are encrypted by symbolically composing them with the corresponding permutations $r_j$. At 4004, selected groups of components, j, are parametrically encrypted by symbolically composing them with the corresponding permutations $r_j$, indexed by variable block $g_j$. The result is a partially parametrically encrypted h, $E_{r,s} \circ h$.

Attached hereto as part of the specification is a source code appendix of Java code. Such code is provided as an exemplary embodiment of certain routines related to the present invention and may need modification for certain environments. Such source code is not intended to limit the scope of protection afforded by the claims attached hereto.

Obviously, numerous modifications and variations of the present invention are possible in light of the above teachings. It is therefore to be understood that, within the scope of the appended claims, the invention may be practiced otherwise than as specifically described herein.

SOURCE CODE APPENDIX

```
---- CompTable.java ----
import java.util.*;

class CompTable {
  public CompTable(int arguments, int components, int characteristic) {
    dimin = arguments;
    dimout = components;
    if(characteristic < 3 || dimin < 1 || dimout < 1)
      System.out.println("CompTable:constructor 1: arguments out of range.\n");
    p = characteristic;
    c = new int[Imath.ipow(p,dimin)];
  } public CompTable(int arguments, int components, int characteristic,
                   int[] data) {
    dimin = arguments;
    dimout = components;
    if(characteristic < 5 || dimin < 1 || dimout < 1 || dimout !=
data.length)
      System.out.println("CompTable:constructor 2: arguments out of range.\n");
    p = characteristic;
    c = new int[Imath.ipow(p,dimin)];
    c = data;
  } public void Set(int index, int element) {
  // Assign a value to a function table element
    if(index >= 0 && index < c.length)  c[index] = element;
  } public int Get(int index) {
  // Assign the value of a function table element
    if(index >= 0 && index < c.length)
      return c[index];
    else
      return -1;
  } public int ComputationStep(int argument) {
  // Compute a computation step using the function table
    if(argument < 0 || argument > c.length - 1) {
      System.out.println("CompTable:ComputationStep: argument out of range.\n");
      return -1;
    }
    return c[argument];
  } public void UnivEncrypt(int[] encrypt, int[] decrypt,
        int[][] permutation) {
  // Encrypt this mapping in its function table representation
  // using a univariate permutation in its function table representation
```

```
if(encrypt.length != dimout || decrypt.length != dimin) {
  System.out.println("CompTable:UnivEncrypt: Invalid arguments.\n");
  return;
}
// Note: every permutation must be of length p
// Every "encrypt" and "decrypt" integer must be either -1 or a
// reference to one of the permutations // misc vars
int i, j, k, l, m;
int[] ind, tind;
int[] tc;
tc = new int[c.length];
int[] powers;

// vectorize and partially decrypt input placing result in tc array
ind = new int[dimin];
tind = new int[dimin];

for(i = 0; i < dimin; i++)  ind[i] = 0;
for(i = 0; i < c.length; i++) {
  k = 0;
  for(j = dimin - 1; j >= 0; j--) {
    if(decrypt[j] >= 0 && decrypt[j] < dimin)
      tind[j] = permutation[decrypt[j]][ind[j]];
    else
      tind[j] = ind[j];
    k *= p;
    k += tind[j];
  }
  tc[k] = c[i];
  // increment index
  j = 0;
  do {
    ind[j] ++;
    if(ind[j] == p) ind[j] = 0;
    j++;
  } while(ind[j - 1] == 0 && j < dimin);
}

// vectorize and partially encrypt output of tc array
powers = new int[dimout];
k = 1;
for(i = 0; i < dimout; i++) {
  powers[i] = k;
  k *= p;
}
ind = new int[dimout];
for(i = 0; i < c.length; i++) {
  k = tc[i];
  m = 0;
  for(j = dimout - 1; j >= 0; j--) {
    l = k / powers[j];
    k -= l * powers[j];
    ind[j] = l;
    if(encrypt[j] >= dimin && encrypt[j] < dimin + dimout)
      ind[j] = permutation[encrypt[j]][ind[j]];
    m += powers[j] * ind[j];
  }
  tc[i] = m;
}
for(i = 0; i < c.length; i++)  c[i] = tc[i];
```

```
} public void MultivEncrypt(int[] vbl, int fbl[], int[] decrypt,
      int[] encrypt, int[][] permutation) {
// Encrypt this mapping in its function table representation
// using a multivariate permutation in its function table representation
  // Note: the number of components in the variable blocks (sum vbl)
  // must equal dimin. Similarly sum fbl must equal dimout.
  // Each permutation is defined for one of the designated block
  // lengths, and contains p^bl[i] elements.

// Misc. vars.
  int i, j, k, l, m, sum, vdim, fdim;
  int[] ind, tind;
  int[] tc;
  boolean ok;
  tc = new int[c.length];

// Checks
  if(vbl.length != decrypt.length || fbl.length != encrypt.length) {
    System.out.println(
      "CompTable:MultivEncrypt: Mismatching block lengths and\n" +
      "    encryption/decryption specifications.\n");
    return;
  }
  for(vdim = 0, i = 0; i < vbl.length; i++)   vdim += vbl[i];
  for(fdim = 0, i = 0; i < fbl.length; i++)   fdim += fbl[i];
  if(vdim != dimin || fdim != dimout) {
    System.out.println(
      "CompTable:MultivEncrypt: Block definitions do not match\n" +
      "    input or output dimensions for the target mapping.\n");
    return;
  } for(ok = true, i = 0; i < decrypt.length && ok; i++)
    ok = (decrypt[i] < permutation.length);
  for(i = 0; i < encrypt.length && ok; i++)
    ok = (encrypt[i] < permutation.length);
  if(!ok) {
    System.out.println(
      "CompTable:MultivEncrypt: Encryption/decryption key\n" +
      "    references out of range.\n");
    return;
  }

// partially vectorize and partially decrypt input using
  // an irregular base
  int[] ivbase = new int[vbl.length];
  int[] ivpow = new int[vbl.length];
  for(k=1,i=0; i < vbl.length; i++) {
    ivbase[i] = k;
    ivpow[i] = Imath.ipow(p, vbl[i]);
    k *= ivpow[i];
  }
  int[] ifbase = new int[fbl.length];
  int[] fvpow = new int[fbl.length];
  for(k=1,i=0; i < fbl.length; i++) {
    ifbase[i] = k;
    fvpow[i] = Imath.ipow(p, fbl[i]);
    k *= fvpow[i];
  }
```

```
ind = new int[vbl.length]; // index variable blocks
tind = new int[vbl.length];

for(i = 0; i < vbl.length; i++)  ind[i] = 0;
for(i = 0; i < c.length; i++) {
  k = 0; // start of current block
  for(j = vbl.length - 1; j >= 0; j--) {// Loop over variable blocks
  if(decrypt[j] >= 0 && decrypt[j] < permutation.length)
    // Convert part of index vector to one indexing integer
    tind[j] = permutation[decrypt[j]][ind[j]];
  else
      tind[j] = ind[j];
  k *= ivpow[j];
  k += tind[j];
  }
  tc[k] = c[i];

// increment index
  j = 0;
  do {
    ind[j]++;
    if(ind[j] == ivpow[j]) ind[j] = 0;
    j++;
  } while(ind[j - 1] == 0 && j < vbl.length);
} ind = new int[fbl.length];
for(i = 0; i < c.length; i++) {
  k = tc[i];
  m = 0;
  for(j = fbl.length - 1; j >= 0; j--) {
    l = k / ifbase[j];
    k -= l * ifbase[j];
    ind[j] = l;
    if(encrypt[j] >= 0 && encrypt[j] < fbl.length)
      ind[j] = permutation[encrypt[j]][ind[j]];
    m += ifbase[j] * ind[j];
  }
  tc[i] = m;
}
for(i = 0; i < c.length; i++)  c[i] = tc[i];
} public void ParamEncrypt(int[] vbl, int[] varin, int[] fbl, int[] varout,
     int[] decrypt, int[] encrypt, int[][] permutation) {
// Encrypt using parametrized, multivariate key mappings
// The parameters specifiy the following:
//   vbl: Number of variables in each consecutive variable group
//   varin: Array containing index of the
//          variable group used as additional parameter per encryption.
//          These variables come in addition to the original variables.
//       The index is -1 if no parametrization occurs.
//   fbl: Number of components in each consecutive component group
//   varout: Array containing index of the
//          variable group used as additional parameters per encryption.
//          These variables come in addition to the original components.
//       The index is -1 if no parametrization occurs.
//   decrypt: Specifies whether a given block is to be left alone
//            (value -1) or has an index indicating a decryption mapping
//            in the permutations parameter.
//   encrypt: Specifies whether a given block is to be left alone
//            (value -1) or has an index indicating an encryption mapping
```

```
//              in the permutations parameter.
//    permutation: Specifies the all the permutations used for the
//              encryption.

// Misc. vars.
int i, j, k, l, m, n, vdim, fdim;
int[] ind, tind;
int[] tc;

boolean ok;
tc = new int[c.length];

// Checks
if(vbl.length != decrypt.length || fbl.length != encrypt.length ||
   vbl.length != varin.length || vbl.length != varout.length) {
  System.out.println(
    "CompTable:ParamEncrypt: Mismatching block lengths and\n" +
    "    encryption/decryption specifications.\n");
  return;
}
for(vdim = 0, i = 0; i < vbl.length; i++)  vdim += vbl[i];
for(fdim = 0, i = 0; i < fbl.length; i++)  fdim += fbl[i];
if(vdim != dimin || fdim != dimout) {
  System.out.println(
    "CompTable:ParamEncrypt: Block definitions do not match\n" +
    "    input or output dimensions for the target mapping.\n");
  return;
} for(ok = true, i = 0; i < decrypt.length && ok; i++)
  ok = (decrypt[i] < permutation.length);
for(i = 0; i < encrypt.length && ok; i++)
  ok = (encrypt[i] < permutation.length);
if(!ok) {
  System.out.println(
    "CompTable:MultivEncrypt: Encryption/decryption key\n" +
    "    references out of range.\n");
  return;
}

// partially vectorize and partially decrypt input using
// an irregular base
int[] ivbase = new int[vbl.length];
int[] ivpow = new int[vbl.length];
for(k=1,i=0; i < vbl.length; i++) {
  ivbase[i] = k;
  ivpow[i] = Imath.ipow(p, vbl[i]);
  k *= ivpow[i];
}
int[] ifbase = new int[fbl.length];
int[] fvpow = new int[fbl.length];
for(k=1,i=0; i < fbl.length; i++) {
  ifbase[i] = k;
  fvpow[i] = Imath.ipow(p, fbl[i]);
  k *= fvpow[i];
} ind = new int[vbl.length];  // index variable blocks
tind = new int[vbl.length];

for(i = 0; i < vbl.length; i++)  ind[i] = 0;
for(i = 0; i < c.length; i++) {
```

```
      k = 0; // start of current block
      for(j = vbl.length - 1; j >= 0; j--) {// Loop over variable blocks
      if(decrypt[j] >= 0 && decrypt[j] < permutation.length) {
        // As a convention, the additional parameters make up the
        // least significant bits of the lumped-together integer.
        if(varin[j] >= 0) {
          m = ind[j] * ivpow[varin[j]] + ind[varin[j]];
          tind[j] = permutation[decrypt[j]][m];
          } else
          tind[j] = permutation[decrypt[j]][ind[j]];
      } else
          tind[j] = ind[j];
      k *= ivpow[j];
      k += tind[j];
      }
      tc[k] = c[i];

// increment index
      j = 0;
      do {
        ind[j]++;
        if(ind[j] == ivpow[j]) ind[j] = 0;
        j++;
      } while(ind[j - 1] == 0 && j < vbl.length);
    } for(i = 0; i < vbl.length; i++)  ind[i] = 0;
    int[] find = new int[fbl.length];
    for(i = 0; i < c.length; i++) {
      k = tc[i];
      m = 0;
      for(j = fbl.length - 1; j >= 0; j--) {
        l = k / ifbase[j];
        k -= l * ifbase[j];
        find[j] = l;
        if(encrypt[j] >= 0 && encrypt[j] < fbl.length) {
          if(varout[j] >= 0) {
            n = find[j] * ivpow[varout[j]] + ind[varout[j]];
            find[j] = permutation[encrypt[j]][n];
          } else
              find[j] = permutation[encrypt[j]][find[j]];
        }
        m += ifbase[j] * find[j];
      }
      tc[i] = m;

// increment index
      j = 0;
      do {
        ind[j]++;
        if(ind[j] == ivpow[j]) ind[j] = 0;
        j++;
      } while(ind[j - 1] == 0 && j < vbl.length);
    }
    for(i = 0; i < c.length; i++)  c[i] = tc[i];

} private int[] c;
  private int p, dimin, dimout;
}
```

-88-

-89-

```
---- Imath.java ----  (minor code used by CompTable.java)
public final class Imath extends Object { public static int ipow(int n, int e) {
  // Exponentiation using the square-and-multiply algorithm
    int prod = 1, k = n;
    while (e >0) {
      if( (e&1) == 1) prod *= k;
        e >>= 1;
        k *= k;
    }
    return (n == 0 ? 0: prod);
  }
}
```

```
---- MappingTempl.java ----
import java.io.*;
import java.text.*;
import java.util.*;
import Fpoly.*;

class MappingTempl {
  public MappingTempl(int vars, int comps) {
  // Declare a mapping template, which contains enough information about
  // the mapping to enable correct encryption/"decryption" of any of its
  // variables and/or function components.
    d = vars;
    e = comps;
    name = new int[e][];
  } public void setmappingtempl(int[][] vname) {
  // Fix the naming pattern and template for each mapping component.
  // vname is a ragged array, containing the naming pattern, which has
  // the following format:
  //    - The first index refers to the mapping component.
  //    - The second index refers to the variable of that component.
  //    - The array entry itself contains the variable's index--that is
name
  //      as it is referenced in the complete mapping
    // Check to see if vname has right number of variables and components.
    if(vname.length != e) {
      System.out.println("setmappingtempl: Mismatched no. of function"
        +" components.");
      return;
    }
    int j = 0;
// A check is missing here, but this should not be a problem for
// correctly specified arguments
    name = vname;
  } public int noofvars() {
  // Return total number of variables
    return d;
  } public int noofcomponents() {
  // Return total number of components
    return e;
  }

// d is the number of variables, e the number of function components
public int d, e;
// name keeps track of the variable names, enabling correct encryption.
// Note that name is in general a ragged array.
public int[][] name;
}
```

```java
---- Univkeys.java ----
import java.io.*;
import java.text.*;
import java.util.*;

class Univkeys {
  public Univkeys(int modulus) {
    // Declare asymmetric secret key pair
    p = modulus;
    e = new Fpoly(1, p);
    d = new Fpoly(1, p);
  } public void generate(int seed) {
    // Generate asymmetric secret key pair
    int i, j, k, n, tmp;
    int[] efunc = new int[p];
    int[] dfunc = new int[p];
    int[][] a = new int[p][p];
    int[] factorial = new int[p];
    // Initialize pseudo random number generator
    Random prng = new Random(seed);
    // Initialize permutation and lagrange function data
    for(i = 0; i < p; i ++) {
      //Mark the inverse function's table entries to ensure bijectivity
      dfunc[i] = -1;
      efunc[i] = 0;
      for(j = 1; j < p; j++)   a[i][j] = 0;// Lagrange function data
      a[i][0] = 1; // Lagrange function data
      factorial[i] = 1;
    }
    // Generate the permutations
    for(i = 0; i < p; i++) {
      do {
        n = prng.nextInt();
        if(n < 0)   n = - n;
        n %= p;
      } while(dfunc[n] != -1);
      efunc[i] = n;
      dfunc[n] = i;
    }

// Interpolate symbolically to find the resultant mappings.
    // Lagrange interpolation is used.
    // First is precomputation of the a_i(x) polynomials
    for(k = 0; k < p; k++) {
      for(i = 0; i < p; i++) {
        if(i != k) {
          for(j = p-1; j > 0; j--) {
            tmp = e.table.fsub[0][k];
            tmp = e.table.fmul[tmp][a[i][j]];
            a[i][j] = e.table.fadd[tmp][a[i][j-1]];
          }
          a[i][0] = e.table.fmul[e.table.fsub[0][k]][a[i][0]];
          factorial[i] = e.table.fmul[factorial[i]][e.table.fsub[i][k]];
        }
      }
    }
    // Invert denominators and apply expressions
    for(i = 0; i < p; i++) {
      factorial[i] = e.table.finv[factorial[i]];
```

```
      for(j = 0; j < p; j++)   a[i][j] =
e.table.fmul[a[i][j]][factorial[i]];
    }

// Compute the keys
  for(i = 0; i < p; i++)
    for(j = 0; j < p; j++) {
      n = e.table.fmul[a[i][j]][efunc[i]];
      e.setcoef(j, e.table.fadd[n][e.coeff(j)]);
      n = e.table.fmul[a[i][j]][dfunc[i]];
      d.setcoef(j, e.table.fadd[n][d.coeff(j)]);
    }
} public void printkeys() {
  System.out.println("Encryption key is: e= "+e.print());
  System.out.println("Decryption key is: d= "+d.print());
} public void identity() {
  // A convenience function to ensure well-defined encryption templates
  for(int i = 2; i < e.noofcoeffs(); i++) {
    e.setcoef(i,0);
    d.setcoef(i,0);
  }
  e.setcoef(0,0);
  d.setcoef(0,0);
  e.setcoef(1,1);
  d.setcoef(1,1);
}

// p is the order of the finite field over which the keys are defined
public int p;
// e is the encryption key, and d the decryption key
public Fpoly e, d;
// All data are public, as this must in any case used as a private
component
// of another object
}
```

-93-

```java
---- UnivEncTempl.java ----
import java.io.*;
import java.text.*;
import java.util.*;
import Univkeys.*;

class UnivEncTempl {
  public UnivEncTempl(int vars, int comps, int modulus) {
  // Declare a univariate encryption template for a mapping with d
  // variables and e function components over the integers modulo p.
  // p must be a prime number.
    d = vars;
    e = comps;
    p = modulus;
    crypt = new int[d + e];
    equiv = new int[d + e];
    keyused = new int[d + e];
    ready = false;
  } public void setencpattern(int[] encrflag, int[] keyequiv) {
  // Define encryption pattern for this template
    if(encrflag.length != d + e || keyequiv.length != d + e) {
      System.out.println("setencpattern: Encryption/key equivalence"
        +" arrays have wrong length.");
      return;
    }
    // The format for the encryption flag array is as follows:
    // +1: Encrypt the component or variable in question
    //  0: Do nothing
    // -1: Decrypt the component or variable in question
    // The format for the keyequivalenc flag array is as follows:
    // For the i'th entry:
    // -1: No equivalence with other key pair required. The first
    //     element of the array must always have this value.
    // 0 <= j < i: Equivalence with other key pair required.
    // So before proceeding, check the contents of the arrays to make sure
    // they are valid.
    for(int i = 0; i < d + e; i++)
      if(encrflag[i] < -1 || encrflag[i] > 1
        || keyequiv[i] < -1 || keyequiv[i] >= i) {
        System.out.println("setencpattern: Encryption/key equivalence"
          +" arrays contain bad values.");
        return;
      }
    // Prepare first set of keys so that the pattern can be used
    int i, j;
    int k = 0;
    // Count number of individual key pairs needed and also generate
    // inverse reference from variables/components to keys they "use".
    // The format of this inverse array is as follows:
    // -1: No reference
    // 0 .. pairs-1: the key pair to use
    for(i = 0; i < d + e; i++)
      if(encrflag[i] != 0)
        if(keyequiv[i] == -1) {
          keyused[i] = k;
          k++;
        } else
          keyused[i] = keyused[keyequiv[i]];
      else
        keyused[i] = -1;
```

```
    pairs = k;
    // Generate the key pairs
    Random prng = new Random();
    int seed;
    key = new Univkeys[pairs];
    for(i = 0; i < pairs; i++) {
      seed = prng.nextInt();
      key[i] = new Univkeys(p);
      key[i].generate(seed);
    }
    ready = true;
    crypt = encrflag;
    equiv = keyequiv;
  } public void encrypt(Fpoly[] h, Fpoly[] result, MappingTempl m) {
  // Encrypt a mapping according to the defined encryption pattern
    // First some checks to see that some things are in order before
    // proceeding
    if(!ready) {
      System.out.println("encrypt: Encryption pattern not ready.");
      return;
    }
    if(h.length != result.length || h.length != m.noofcomponents()) {
      System.out.println("encrypt: arguments have mismatching numbers"
        +" of components.");
      return;
    }
    int i, j, k;
    for(i = 0; i < h.length; i++)
      if(h[i].dimension() != m.name[i].length) {
        System.out.println("encrypt: arguments have mismatching numbers"
          +" of variables.");
        return;
      }
    // Now to encrypt: each mapping component is taken one at a time
    Fpoly[] keytmp;
    Fpoly keytmp2;
    int[] tv, tv2;
    int[][] v2;
    int lpairs;
    for(i = 0; i < h.length; i++) {
      result[i].changeto(h[i]); // All operations are done on result
      // First compose the plaintext function with any encryptions of
      // its variables.
      tv = new int[result[i].dimension()];
      // Count the number of keys actually used, and generate substitution
      // data.
      lpairs = 0;
      for(j = 0; j < result[i].dimension(); j++) {
        if(keyused[m.name[i][j]] > -1) {
          tv[j] = -lpairs - 1;
          lpairs++;
        } else
          tv[j] = m.name[i][j];
      }
      // Prepare the substitution (encryption) functions
      if(lpairs > 0) {
        k = 0;
        keytmp = new Fpoly[lpairs];
        for(j = 0; j < result[i].dimension(); j++)
          if(crypt[m.name[i][j]] == 1) {
```

```
            // If variable no. m.name[i][j] is used encrypted, then
            // it must be decrypted prior to application of a mapping.
            keytmp[k]= new Fpoly(key[keyused[m.name[i][j]]].d);
            k++;
          } else if(crypt[m.name[i][j]] == -1) {
            // If variable no. m.name[i][j] is used decrypted (NOT in
            // plaintext), then it must be encrypted prior to
            // application of a mapping.
            keytmp[k] = new Fpoly(key[keyused[m.name[i][j]]].e);
            k++;
        result[i].composewith(keytmp, tv, m.name);
          }
        }

// Second compose the partially encrypted function with its
      // encryption key if that has been chosen, otherwise decrypt.
      if(crypt[d + i] == 1) {
        // If component no. i is used in encrypted form, encrypt.
        keytmp = new Fpoly[1];
        keytmp[0] = new Fpoly(result[i]);
        tv2 = new int[1];
        tv2[0] = -1;
        v2 = new int[1][result[i].dimension()];
        for(j = 0; j < v2[0].length; j++) {
          v2[0][j] = j;
        }
        keytmp2 = new Fpoly(key[keyused[d + i]].e);
        keytmp2.composewith(keytmp, tv2, v2);
        result[i] = keytmp2;
      } else if(crypt[d + i] == -1) {
        keytmp = new Fpoly[1];
        keytmp[0] = new Fpoly(result[i]);
        tv2 = new int[1];
        tv2[0] = -1;
        v2 = new int[1][result[i].dimension()];
        for(j = 0; j < v2[0].length; j++) {
          v2[0][j] = j;
        }
        keytmp2 = new Fpoly(key[keyused[d + i]].d);
        keytmp2.composewith(keytmp, tv2, v2);
        result[i] = keytmp2;
      }
    }
  } public int noofvars() {
  // Return number of variables.
    return d;
  } public int noofcomponents() {
  // Return number of function components.
    return e;
  } public int noofkeys() {
  // Return number of distinct key pairs.
    return pairs;
  }

// Note: there is no decryption method: i.e. no method of undoing the
// partial encryption process, as unambiguous decryption is
```

```
// mostly not possible.

public void printkeys() {
  // A method for printing keys
  // Used mainly for debugging
     for(int i = 0; i < key.length; i++) {
        System.out.println("Encryption key no. "+i+" = "
           +key[i].e.prettyprint());
        System.out.println("Decryption key no. "+i+" = "
           +key[i].d.prettyprint());
     }
  } private boolean ready;
  // Number of variables, number of mapping components, modulus
  private int d, e, p;
  // Encryption/decryption and equivalence relations
  private int[] crypt, equiv;
  // An inverse reference array from a variable/component to a key pair
  private int[] keyused;
  // Number of key pairs
  private int pairs;
  // The key pairs
  //private Univkeys[] key;
  public Univkeys[] key;
}

---- Imath.java ----
public final class Imath extends Object {
// Just a simple class to implement and export useful mischellany.

public static int ipow(int n, int e) {
   // Exponentiation using the square-and-multiply algorithm
      int prod = 1, k = n;
      while (e >0) {
         if( (e&1) == 1) prod *= k;
            e >>= 1;
            k *= k;
      }
      return (n == 0 ? 0: prod);
   }
}
```

```
---- Ftable.java ----
class Ftable {
  public Ftable(int p) {   int i,j,k;
    fmul = new int[p][p];
    fdiv = new int[p][p];
    fpow = new int[p][p];
    fadd = new int[p][p];
    fsub = new int[p][p];
    finv = new int[p];
    for(i = 0; i < p; i++) {
      k = 1;
      for(j = 0; j < p; j++) {
        fmul[i][j] = (i*j) % p;
        fpow[i][j] = k;
        k *= i;
        k %= p;
        fadd[i][j] = (i+j) % p;
        fsub[i][j] = (p+i-j) % p;
        if((j*i) % p == 1)   finv[i]=j;
      }
      fdiv[i][0] = -1;
    }
    for(i = 0; i < p; i++)
      for(j = 1; j < p; j++)
        fdiv[i][j] = fmul[i][finv[j]];
    fc = p;
  } public void checktable() {
    int i,j;
    System.out.println("Multiplication table");
    for(i = 0; i < fc; i++) {
      for(j = 0; j < fc; j++) {
        System.out.print(fmul[i][j]+" ");
      }
      System.out.println();
    }
    System.out.println("Division table");
    for(i = 0; i < fc; i++) {
      for(j = 0; j < fc; j++) {
        System.out.print(fdiv[i][j]+" ");
      }
      System.out.println();
    }
    System.out.println("Addition table");
    for(i = 0; i < fc; i++) {
      for(j = 0; j < fc; j++) {
        System.out.print(fadd[i][j]+" ");
      }
      System.out.println();
    }
    System.out.println("Subtraction table");
    for(i = 0; i < fc; i++) {
      for(j = 0; j < fc; j++) {
        System.out.print(fsub[i][j]+" ");
      }
      System.out.println();
    }
    System.out.println("Exponentiation table");
    for(i = 0; i < fc; i++) {
      for(j = 0; j < fc; j++) {
        System.out.print(fpow[i][j]+" ");
```

```
      }
      System.out.println();
    }
    System.out.println("Inversion table");
    for(i = 0; i < fc; i++) {
      System.out.print(finv[i]+" ");
    }
  } public   int[][] fmul,fdiv,fpow,fadd,fsub;
public   int[] finv;
int fc;
}
```

-99-

```
---- Fpoly.java ----
import java.util.*;

class Fpoly {
  public Fpoly(int dim, int characteristic) {
    // Initialize a polynomial with d=dim variables over a finite field
    // with p=characteristic elements. p must be a prime number.
    d = dim;
    p = characteristic;
    c = new int[Imath.ipow(p,d)];
    // Also generate a custom table with precomputed results to
    // (hopefully) speed up computations
    table = new Ftable(p);
  } public Fpoly(int dim, int characteristic, int[] data) {
    // Initialize a polynomial as above, but now also supplying the
    // coefficient data.
    d = dim;
    p = characteristic;
    c = new int[Imath.ipow(p,d)];
    for(int i = 0; i < Imath.ipow(p,d); i++) {
      if(data[i] < 0 || data[i] >= p) {
        System.out.println("Warning! Mismatched fields for polynomial data!");
        c[i] = Math.abs(data[i]) % p;
      }
      else
        c[i] = data[i];
    }
    table = new Ftable(p);
  } public Fpoly(Fpoly b) {
    // Initialize a new polynomial equal to b.
    d = b.dimension();
    p = b.over();
    int l = Imath.ipow(p,d);
    c = new int[l];
    for(int i = 0; i < l; i++)
      c[i] = b.coeff(i);
    table = new Ftable(p);
  } public int dimension() {return d;}
  // Return the number of variables in this polynomial.

public int over() {return p;}
  // Return the order of the finite field over which this polynomial
  // has been constructed.

public int coeff(int index) {return c[index];}
  // Return the index'th coefficient of this polynomial.
  // Note: the index is always one-dimensional regardless of the
  // number of variables involved public int noofcoeffs() {return c.length;}
  // Return the number of coefficients private void consistency() {
  // A simple consistency check. Only used for debugging.
    int l = noofcoeffs();
```

```
    if(l != c.length)
      System.out.println("Consistency: coefficient array has bad length.");
    for(int i = 0; i < l; i++)
      if(c[i] < 0 || c[i] >= p)
        System.out.println("Consistency: coefficient no. "+i+" out of
range.");
  } public void setcoef(int i,int nc) {
  // Set the value of a coefficient.
    if(nc < 0 || nc >= p) {
      System.out.println("setcoef: Coefficient out of range.");
      return;
    }
    c[i] = nc;
  } public void setequalto(Fpoly b) {
  // Set this polynomial equal to polynomial b, assuming that
  // this polynomial has the same number of variables as b and
  // is defined over the same field.
    int l = Imath.ipow(p,d);
    if(p == b.over() && d == b.dimension()) {
      for(int i = 0; i < l; i++)
        c[i] = b.coeff(i);
    } else {
      System.out.println("setequalto: Mismatched polynomials.");
    }
  } public void changeto(Fpoly b) {
  // Set this polynomial equal to b in all respects.
    d = b.dimension();
    p = b.over();
    int l = b.noofcoeffs();
    c = new int[l];
    for(int i = 0; i < l; i++)
      c[i] = b.coeff(i);
    table = new Ftable(p);
  } public void add(Fpoly q) {
  // Add polynomial q to this polynomial, but only if q is defined
  // over the same field as this polynomial.
  // Prerequisite: q must have dimension less than the polynomial
  // it is being added to.
    int qp = q.over();
    int qd = q.dimension();
    int ql = q.noofcoeffs();
    if(p == qp && d >= qd) {
      for(int i = 0; i < ql; i++)
        c[i] = table.fadd[q.coeff(i)][c[i]];
    } else {
      System.out.println("Warning! Polynomials are not properly matched for"
        +" addition.");
    }
  } int addexp(int a, int b) {
    if (a < 0 || b < 0) {
      System.out.println("Bad arguments in addexp. Operation ignored.\n");
```

```
      return -1;
    }
    int r = a + b;
    while(r > p - 1) { r -= (p - 1);}
    return r;
  } public void multiplyby(int[] mind, int mcoef, int[] overlap) {
    // Multiply by a monomial
    // It is assumed that the monomial has:
    //      - a coefficient in the integers mod p
    //      - exponent <= p-1 for all variables
    // The resulting polynomial has as its first d variables the
    // d variables of the original polynomial, and thereafter any
    // non-overlapping variables.
    // No consistency check is performed on overlap.
    int i, j, k, l; // general index variables
    int nd, nl; // new dimensions
    // Count total monomial variables - real overlaps
    l = 0;
    for(i = 0; i < overlap.length; i++)
      if(overlap[i] < 0 || overlap[i] > d-1)  l++;
    nd = d + l;
    nl = Imath.ipow(p,nd);
    Fpoly r = new Fpoly(nd,p);
    int[] rind = new int[nd];
    int[] ind = new int[d];
    if (mind.length != overlap.length) {
      System.out.println("multiplyby: No. of vars in arguments not consistent.");
      return;
    }
    if (mcoef < 0 || mcoef >= p) {
      System.out.println("multiplyby: Monomial coefficient out of range.");
      return;
    }
    // Initialize index vectors (to keep track of variables' exponents)
    for(i = 0; i < d; i++)  ind[i] = 0;
    // Initialize some other stuff
    for(i = 0; i < nl; i++)  r.setcoef(i, 0);
    // Let's start the computation
    for(i = 0; i < c.length; i++) {
      // Do a multiplication --- but only if c[i] != 0; it's no use otherwise
      if(c[i] != 0) {
        for(j = 0; j < d; j++) rind[j] = ind[j];
        k = 0;
        for(j = 0; j < mind.length; j++) {
          if (overlap[j] > -1 && overlap[j] < d)
            rind[overlap[j]] = addexp(rind[overlap[j]], mind[j]);
          else {
            rind[d+k] = mind[j]; // addition cannot be done here
            k++;
          }
        }
        // Compute linear version of index for resulting polynomial
        k = rind[nd - 1];
        for(j = nd - 2; j >= 0 ; --j) {
          k *= p;
          k += rind[j];
        }
        // Change coefficient in result
```

```
      l = table.fadd[r.coeff(k)][table.fmul[mcoef][c[i]]];
      r.setcoef(k, l);
    }
    // Increment index
    k = 0;
    do {
      ind[k]++;
      if(ind[k] > p - 1)  ind[k] = 0;
      k++;
    } while(ind[k - 1] == 0 && k < d);
  }
  this.changeto(r);
} public void times(Fpoly b, int[] v) {
  // First perform consistency check on v, the variable
  // correspondence list
  int i,j,k;
  if (v.length != b.dimension()) {
    System.out.println("times: Dimension of polynomial and overlap"
      +" vector don't match.");
    return;
  }
  // Also count number of "new" variables relative to d
  k = 0;
  for(i = 0; i < v.length; i++) {
    for(j = i + 1; j < v.length; j++)
      if (v[i] == v[j]) {
        System.out.println("times: Duplicate overlaps defined.");
        return;
      }
    if (v[i] > -1 && v[i] < d) k++;
  }
  // Second initialize the temporary variable used to store the result
  int nl, nd, bl;
  nd = d + b.dimension() - k; // Note: Inconsistencies may still occur!
  nl = Imath.ipow(p, nd);
  bl = b.noofcoeffs();
  Fpoly r = new Fpoly(nd,p);
  Fpoly tmp = new Fpoly(this);
  int[] ind = new int[b.dimension()];
  for(i = 0; i < b.dimension(); i++) {ind[i] = 0;}
  // The multiplication is broken down into multiplication
  // by individual monomials.
  for(i = 0; i < bl; i++) {
    if(b.coeff(i) != 0) {
      tmp.multiplyby(ind,b.coeff(i),v);
      r.add(tmp);
      tmp.changeto(this);
    }
    // Increment index vector
    j = 0;
    do {
      ind[j]++;
      if(ind[j] > p - 1) {ind[j] = 0;}
      j++;
    } while (j < b.dimension() && ind[j-1] == 0);
  }
  this.changeto(r);
}
```

```
      for(i = 0; i < nopol; i++)
        for(j = 0; j < v[i].length; j++) {
          k = v[i][j];
          if(k < nd && k >= 0)
            fv[k]++;
        }
      k = 0;
      l = 0;
      for(i = 0; i < nopol; i++)
        l += b[i].dimension();
      for(i = 0; i < nd; i++)
        k += fv[i];
      if(k != l) {
        System.out.println("composewith: Something still wrong with"
          +" variable names: don't know what");
        return;
      }
      int lead, lfact;
      int[] tmpv;
      int[] ind = new int[nopol];
      Fpoly r = new Fpoly(nd, p);
      for(i = 0; i < nl; i++)   r.setcoef(i,0);
      // Initialize temporary polynomial and datastructure for dynamic
      // programming speed-up of composition: storing all possible
      // substitution tuples t of the b1,...,bn functions
      Fpoly[] t = new Fpoly[bl];
      // The first entry can be done as an assignment
      t[0] = new Fpoly(nd, p);
      t[0].setcoef(0,1); // Any polynomial to the zero'th power is still 1
      for(i = 1; i < nl; i++)   t[0].setcoef(i,0);
      lead = 0;
      lfact = 1;
      k = 0;
      ind[0] = 1; for(i = 1; i < nopol; i++) ind[i] = 0;
      for(i = 1; i < bl; i++) {
        t[i] = new Fpoly(t[i - lfact]);
        t[i].times(b[lead], v[lead]);
        k = 0;
        do {
          ind[k]++;
          if(ind[k] > p - 1) ind[k] = 0;
          k++;
        } while(k < nopol && ind[k - 1] == 0);
        if(k - 1 > lead) {
          lead++;
          lfact *= p;
        }
      }
      // Preliminary substitution is now done
      // Next step is to multiply with the remaining factors of each
monomial,
      // multiply coefficients, and add together to get result.
      int[] lind = new int[d];
      int[] rind = new int[nd];
      int[] tind = new int[nd];
      int[] tmpind = new int[nd];
      for(i = 0; i < d; i++) lind[i] = 0;
      for(i = 0; i < c.length; i++) {
        // Generate corresponding index in the temporary storage
        // while also generating "non-substituted" part of composed
polynomial
        for(j = 0; j < nd; j++) rind[j] = 0; // Resetting rind
```

```
      for(j = 0; j < d; j++) {
        if(tv[j] < 0)
          ind[-(1 + tv[j])] = lind[j]; // An entry is a substitution or...
        else
          rind[tv[j]] = lind[j];        // a variable.
      }
      tp = ind[nopol - 1];
      for(j = nopol - 2; j >= 0; j--) {tp *= p; tp += ind[j];}
      // Now we can actually do the substitution itself
      for(j = 0; j < nd; j++) tind[j] = 0;
      for(j = 0; j < nl; j++) {
        for(k = 0; k < nd; k++)  tmpind[k] = addexp(rind[k], tind[k]);
        rp = tmpind[nd - 1];
        for(k = nd - 2; k >= 0; k--) {rp *= p; rp += tmpind[k];}
        r.setcoef(rp,
table.fadd[r.coeff(rp)][table.fmul[t[tp].coeff(j)][c[i]]]);
        k = 0;
        do {
          tind[k]++;
          if(tind[k] > p - 1) tind[k] = 0;
          k++;
        } while(k < nd && tind[k - 1] == 0);
      }
      // Update index vector for "this" polynomial
      j = 0;
      do {
        lind[j]++;
        if(lind[j] > p - 1) lind[j] = 0;
        j++;
      } while(j < d && lind[j - 1] == 0);
    }
    this.changeto(r);
  } public void multiplyby(int b) {
  // Multiply the entire polynomial by a constant
    for(int i = 0; i < c.length; i++) c[i] = table.fmul[c[i]][b];
  } public int evaluate(int[] x) {
  // Evaluate the value of this polynomial at x using a Horner-like
  // algorithm. -1 is returned if an error occurs.
    // First some checks on the input
    if(x.length != d) {
      System.out.println("evaluate: Input vector has wrong dimension.");
      return -1;
    }
    // Begin computation by computing the individual monomials
    int lead = 0;
    int lfact = 1;
    int i, k = 0;
    int[] ind = new int[d];
    int[] t = new int[c.length];
    t[0] = 1;
    ind[0] = 1; for(i = 1; i < d; i++) ind[i] = 0;
    for(i = 1; i < c.length; i++) {
      t[i] = table.fmul[x[lead]][t[i - lfact]];
      k = 0;
      do {
        ind[k]++;
        if(ind[k] > p - 1) ind[k] = 0;
```

```
      k++;
    } while(k < d && ind[k - 1] == 0);
    if(k - 1 > lead) {
      lead++;
      lfact *= p;
    }
  }
  // Finish computation by multiplying each monomial with its
  // corresponding coefficient and adding.
  int sum = 0;
  for(i = 0; i < c.length; i++)
    sum = table.fadd[sum][table.fmul[c[i]][t[i]]];
  return sum;
} public String print() {
// Printout routine that generates a string with a list of monomials
// starting with the monomial with highest total degree, and descending
// to the constant monomial. Monomials are written on the form
// cx1^e1x2^e2...xd^ed, where c is the constant, x1...xd variables, and
// e1...ed exponents.
  String tmp = "";
  int[] ex = new int[d];
  int i, j;
  for(i = 0; i < d; i++)
    ex[i] = p - 1;
  for(i = c.length - 1; i >= 0; i--) {
    if(i < c.length - 1) tmp+="+";
    tmp += c[i];
    for(j = 0; j < d; j++)
      tmp += "x" + (j+1) + "^" + ex[j];
    j = 0;
    do {
      ex[j] = table.fsub[ex[j]][1];
      if(j > 0) tmp += "\n";
      j++;
    } while (j < d && ex[j-1] == p-1);
  }
  return tmp;
} public String prettyprint() {
// Printout routine similar to Fpoly.print() except that every time
// the last variable has its exponent "reset" to p-1 during the printing,
// a newline character is inserted.
  String tmp = "";
  int[] ex = new int[d];
  int i, j;
  for(i = 0; i < d; i++)
    ex[i] = p - 1;
  for(i = c.length-1; i >= 0; i--) {
    if(i < c.length-1) tmp += "+";
    tmp += c[i];
    for(j = 0; j < d; j++)
      tmp += "x" + (j+1) + "^" + ex[j];
    j = 0;
    do {
      ex[j] = table.fsub[ex[j]][1];
      j++;
    } while (j < d && ex[j-1] == p-1);
    if(j > 1) tmp += "\n";
  }
```

-107-

```
    return tmp;
  } private   int[] c;
private   int p,d;
   Ftable table;
}
```

-108-

```
---- Multikeys.java ----
import java.io.*;
import java.text.*;
import java.util.*;

class Multikeys {
//IMPORTANT: This object's implementation is INCOMPLETE.  It is not intended to
//provide the multivariate key functionality in its present form.
// NOTE: The completion of this class is analogous to Univkeys,
// with differences having to do with number of
// variables block sizes etc.
  public Multikeys(int modulus, int blocksize) {
    p = modulus;
    c = blocksize;
    e = new Fpoly(c, p);
    d = new Fpoly(c, p);
  } public void generate(int seed) {
// Generate asymmetric secret key pair
    int i, j, k, n, tmp;
    int cl = e.noofcoeffs();
    int[][] efunc = new int[cl][c+1];
    int[][] dfunc = new int[cl][c+1];
    int[][] a = new int[p][p];
    int[] suma = new int[p];
    int[] factorial = new int[p];
// Precompute a_n(y) functions
    for(i = 0; i < p; i ++) {
      for(j = 1; j < p; j++)  a[i][j] = 0;// Lagrange function data
      a[i][0] = 1; // Lagrange function data
      factorial[i] = 1;
    }
    for(k = 0; k < p; k++) {
      for(i = 0; i < p; i++) {
        if(i != k) {
          for(j = 1; j < p; j++) {
            tmp = e.table.fmul[e.table.fsub[0][k]][a[i][j]];
            suma[j] = e.table.fadd[tmp][a[i][j-1]];
          }
          suma[0] = e.table.fmul[e.table.fsub[0][k]][a[i][0]];
          factorial[i] = e.table.fmul[factorial[i]][e.table.fsub[i][k]];
        }
      }
    }
    // Initialize pseudo random number generator
     Random prng = new Random(seed);
    // Initialize permutation and lagrange function data
    for(i = 0; i < cl; i++) {
      //Mark the inverse function's table entries to ensure bijectivity
      dfunc[i][0] = -1;
      efunc[i][0] = 0;
    }
    // Generate the permutations
    for(i = 0; i < p; i++) {
      do {
        n = prng.nextInt();
        if(n < 0)   n = - n;
        n %= p;
      } while(dfunc[n][0] != -1);
      efunc[i][0] = n;
```

```
        dfunc[n][0] = i;
    }
  } int p, c;
Fpoly e, d;
}
```

The invention claimed is:

1. A computer-implemented method of encrypting plural variables and mapping components of multivariate mappings, represented, with univariate mappings of an appropriate representation, comprising the steps of:
   A. determining a representation for the encryption;
   B. replacing each variable to be decrypted $x_i$ with a decrypted equivalent $s_{e+i}(x_i)$;
   C. composing the decrypted equivalents with a mapping h; and
   D. composing each mapping component to be encrypted, $h_i$, with an encryption function $r_i$, to create $r_i(h_i(\ldots))$.

2. The method as claimed in claim 1, wherein the multivariate mappings comprise mappings represented as one of function tables and polynomials.

3. A computer-implemented method of generating keys for multivariate encryption of multivariate mappings, comprising the steps of:
   A. determining a representation for the keys including key triples;
   B. defining a polynomial f to translate from base-N vectors having $c_i$ components to base-$N^{c_i}$, number;
   C. defining, for an $i^{th}$ key triple, arrays $R_i$ and $S_i$ each having $N^{c_i} \times (c_i+1)$ elements;
   D. permuting a ring $Z_{N^{c_i}}$, and simultaneously translating a permutation and its inverse to a field $Z_N^{c_i}$, storing ring permutations in $R_i$ and storing translated permutations and inverses in $S_i$;
   E. repeating steps B–D for each key triple not set equal to identity; and
   F. converting each array $R_i$ and $S_i$ to the determined key representation.

4. The method as claimed in claim 3, wherein the mappings to be encrypted are expressed using polynomials, further comprising the step of computing the permutation and its inverse by interpolation, using at least a portion of R and S as interpolation data, using $a_j(x)$, once for each unique key triple that is to be generated.

5. The method as claimed in claim 3, further comprising the step of setting all key triples that are to do neither encryption nor decryption to the identity mapping.

6. The method as claimed in claim 3, further comprising the steps of (1) pre-computing arithmetic operations over the field $Z_N$ and (2) pre-computing coefficients of the functions $a_j(x)$, wherein the steps of permuting comprises using the pre-computed $a_j(x)$.

7. The method as claimed in claim 3, further comprising the step of restricting a new set of key triples based on a pattern of encryption used during an encryption of the first multivariate polynomials.

8. A computer-implementation method of encrypting plural groups of variables and groups of mapping components of multivariate mappings, with other multivariate mappings, comprising the steps of:
   A. determining a mapping representation for encryption;
   B. replacing each group of encrypted variables $\vec{w}_i$, with a decrypted equivalent $s_{i+i}(\vec{w}_i)$;
   C. composing each of the decrypted equivalents with a mapping h; and
   D. composing each group of mapping components to be encrypted $v_i$ with $r_i$ giving $r_i(v_i(\ldots))$.

* * * * *

UNITED STATES PATENT AND TRADEMARK OFFICE
CERTIFICATE OF CORRECTION

PATENT NO. : 7,162,032 B2  Page 1 of 1
APPLICATION NO. : 09/737742
DATED : December 18, 2000
INVENTOR(S) : Tonnes Brekne It is certified that error appears in the above-identified patent and that said Letters Patent is hereby corrected as shown below:

On the title page, Item (73), the Assignee is incorrect. Item (73) should read:

--(73)  Assignee:  Telenor ASA, Fornebu (NO)--

Signed and Sealed this

Twelfth Day of February, 2008

JON W. DUDAS
*Director of the United States Patent and Trademark Office*

UNITED STATES PATENT AND TRADEMARK OFFICE
CERTIFICATE OF CORRECTION

PATENT NO. : 7,162,032 B2 Page 1 of 1
APPLICATION NO. : 09/737742
DATED : January 9, 2007
INVENTOR(S) : Tonnes Brekne It is certified that error appears in the above-identified patent and that said Letters Patent is hereby corrected as shown below:

On the title page, Item (73), the Assignee is incorrect. Item (73) should read:

--(73)   Assignee:  Telenor ASA, Fornebu (NO)--

This certificate supersedes the Certificate of Correction issued February 12, 2008.

Signed and Sealed this

Fourth Day of March, 2008

JON W. DUDAS
*Director of the United States Patent and Trademark Office*